(12) United States Patent
Sugio

(10) Patent No.: US 11,212,519 B2
(45) Date of Patent: Dec. 28, 2021

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventor: Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/117,808

(22) Filed: Dec. 10, 2020

(65) Prior Publication Data

US 2021/0099696 A1 Apr. 1, 2021

Related U.S. Application Data

(63) Continuation of application No. PCT/JP2019/023776, filed on Jun. 14, 2019.
(Continued)

(51) Int. Cl.
*H04N 19/103* (2014.01)
*H04N 19/184* (2014.01)
(Continued)

(52) U.S. Cl.
CPC ......... *H04N 19/103* (2014.11); *H04N 19/184* (2014.11); *H04N 19/44* (2014.11); *H04N 19/597* (2014.11)

(58) Field of Classification Search
CPC .... H04N 19/103; H04N 19/184; H04N 19/44; H04N 19/597; H04N 19/423; G06T 9/00
See application file for complete search history.

(56) References Cited

U.S. PATENT DOCUMENTS

2014/0375638 A1 12/2014 Tomaru et al.
2017/0310984 A1* 10/2017 Lee .................. H04N 19/31
(Continued)

FOREIGN PATENT DOCUMENTS

WO 2014/020663 2/2014

OTHER PUBLICATIONS

International Search Report (ISR) dated Aug. 20, 2019 in International (PCT) Application No. PCT/JP2019/023776.
(Continued)

*Primary Examiner* — Tat C Chio
(74) *Attorney, Agent, or Firm* — Wenderoth, Lind & Ponack, L.L.P.

(57) ABSTRACT

A three-dimensional data encoding method is a three-dimensional data encoding method of encoding a plurality of three-dimensional points, and includes: selecting one prediction mode for calculating, using attribute information of a second three-dimensional point in a vicinity of a first three-dimensional point, a predicted value of attribute information of the first three-dimensional point; calculating a predicted value according to the one prediction mode; calculating a prediction residual that is a difference between the attribute information of the first three-dimensional point and the predicted value; and generating a bitstream that includes the one prediction mode and the prediction residual, and in the calculating of the predicted value, a predetermined fixed value is calculated as a predicted value calculated according to the one prediction mode in a case in which a predicted value based on the attribute information of
(Continued)

the second three-dimensional point is not assigned to the one prediction mode.

20 Claims, 82 Drawing Sheets

Related U.S. Application Data

(60) Provisional application No. 62/685,596, filed on Jun. 15, 2018.

(51) Int. Cl.
*H04N 19/44* (2014.01)
*H04N 19/597* (2014.01)

(56) References Cited

U.S. PATENT DOCUMENTS

2019/0311501 A1* 10/2019 Mammou ............... G06T 17/00
2020/0137399 A1* 4/2020 Li ......................... H04N 19/91

OTHER PUBLICATIONS

George P. Gerdan, et al., "Transforming Cartesian coordinates X,Y,Z to Geographical coordinates φ, λ, h", The Australian Surveyor, vol. 44, No. 1, Jun. 1999.

* cited by examiner

FIRST SPC

GOS INDEX NUMBER (ENCODING ORDER)

FIG. 41

A : BIT SEQUENCE WHEN SCANNING NODES AND LEAVES BREADTH-FIRST : 10010000 10000001 00000010 leaf1 leaf2 leaf3

B : BIT SEQUENCE WHEN SCANNING NODES AND LEAVES DEPTH-FIRST : 10010000 10000001 leaf1 leaf2 00000010 leaf3

FIG. 46

```
space_header() {
    ...
    for (i=0; i<MaxRefSpc_l0;i++) {
        RT_flag_l0[i]
        if (RT_flag_l0[i]) {
            R_l0[i]
            T_l0[i]
        }
    }
    ...
    for (i=0; i<MaxRefSpc_l1;i++) {
        RT_flag_l1[i]
        if (RT_flag_l1[i]) {
            R_l1[i]
            T_l1[i]
        }
    }
    ...
}
```

FIG. 55

| VALUE | BIT |
|---|---|
| 0 | 1 |
| 1 | 010 |
| 2 | 011 |
| 3 | 00100 |
| 4 | 00101 |
| 5 | 00110 |
| 6 | 00111 |
| 7 | 0001000 |
| ... | ... |

FIG. 56

| VALUE | BIT |
|---|---|
| 3 | 00100 |
| 4 | 00101 |
| 5 | 00110 |
| 6 | 00111 |

PREFIX SUFFIX 00  1  00

TERMINATE SYMBOL

FIG. 57

```
attribute_header{
...
NumLoD
...
for (i=0; i<NumLoD; i++) {
 NumOfPoint[i]
}
...
for (i=0; i<NumLoD-1; i++) {
 Thres_LoD[i]
}
...
for (i=0; i<NumLoD; i++) {
 NumNeighborPoint[i]
}
...
for (i=0; i<NumLoD; i++) {
 THd[i]
}
...
for (i=0; i<NumLoD; i++) {
 QS[i]
}
...
for (i=0; i<NumLoD; i++) {
 R_TH[i]
}
...
}
```

FIG. 58

```
attribute_data{
...
for (i=0; i<NumLoD; i++) {
 for(j=0; j<NumOfPoint[i]; j++) {
  n-bit code
  if (n-bit code == R_TH[i])
   remaining code
 }
}
...
}
```

FIG. 61

| VALUE | BIT |
|---|---|
| 3 ← | 00100 ← |
| 4 | 00101 |
| 5 | 00110 |
| 6 | 00111 |

PREFIX SUFFIX
00 1 00
↑
TERMINATE SYMBOL

FIG. 62

| VALUE | BIT |
|---|---|
| 0 | 1 |
| 1 | 010 |
| 2 | 011 |
| 3 ← | 00100 REVERSE LOOKUP |
| 4 | 00101 |
| 5 | 00110 |
| 6 | 00111 |
| 7 | 0001000 |
| ... | ... |

| PREDICTION MODE | PREDICTED VALUE |
|---|---|
| 0 | AVERAGE VALUE OF a0, a1, a2, b1 |
| 1 | b1 |
| 2 | a2 |
| 3 | a1 |
| 4 | a0 |

FIG. 71

| PREDICTION MODE | PREDICTED VALUE |
|---|---|
| 0 | AVERAGE VALUE OF a0, a1 |
| 1 | a1 |
| 2 | a0 |
| 3 | NOT AVAILABLE |
| 4 | NOT AVAILABLE |

FIG. 72

| PREDICTION MODE | PREDICTED VALUE |
|---|---|
| 0 | AVERAGE VALUE OF a0, a1, a2, b1 (Yave, Uave, Vave) |
| 1 | b1 = (Yb1, Ub1, Vb1) |
| 2 | a2 = (Ya2, Ua2, Va2) |
| 3 | a1 = (Ya1, Ua1, Va1) |
| 4 | a0 = (Ya0, Ua0, Va0) |

FIG. 73

| PREDICTION MODE | PREDICTED VALUE |
|---|---|
| 0 | AVERAGE VALUE OF a0, a1, a2, b1<br>Rave |
| 1 | b1 = Rb1 |
| 2 | a2 = Ra2 |
| 3 | a1 = Ra1 |
| 4 | a0 = Ra0 |

FIG. 74

| PREDICTION MODE Y | PREDICTED VALUE |
|---|---|
| 0 | AVERAGE VALUE OF a0, a1, a2, b1<br>Yave |
| 1 | b1 = Yb1 |
| 2 | a2 = Ya2 |
| 3 | a1 = Ya1 |
| 4 | a0 = Ya0 |

FIG. 75

| PREDICTION MODE U | PREDICTED VALUE |
|---|---|
| 0 | AVERAGE VALUE OF a0, a1, a2, b1<br>Uave |
| 1 | b1 = Ub1 |
| 2 | a2 = Ua2 |
| 3 | a1 = Ua1 |
| 4 | a0 = Ua0 |

FIG. 76

| PREDICTION MODE V | PREDICTED VALUE |
|---|---|
| 0 | AVERAGE VALUE OF a0, a1, a2, b1<br>Vave |
| 1 | b1 = Vb1 |
| 2 | a2 = Va2 |
| 3 | a1 = Va1 |
| 4 | a0 = Va0 |

FIG. 77

| PREDICTION MODE UV | PREDICTED VALUE |
|---|---|
| 0 | AVERAGE VALUE OF a0, a1, a2, b1 (Uave, Vave) |
| 1 | b1 = (Ub1, Vb1) |
| 2 | a2 = (Ua2, Va2) |
| 3 | a1 = (Ua1, Va1) |
| 4 | a0 = (Ua0, Va0) |

FIG. 78

| PREDICTION MODE | BINARY DATA |
|---|---|
| 0 | 0 |
| 1 | 10 |
| 2 | 110 |
| 3 | 1110 |
| 4 | 1111 |

FIG. 79

| PREDICTION MODE | BINARY DATA |
|---|---|
| 0 | 0 |
| 1 | 10 |
| 2 | 110 |
| 3 | 1110 |
| 4 | 11110 |

FIG. 80

| PREDICTION MODE | BINARY DATA |
|---|---|
| 0 | 000 |
| 1 | 001 |
| 2 | 010 |
| 3 | 011 |
| 4 | 100 |

| PREDICTION MODE | BINARY DATA |
|---|---|
| 0 | 0 |
| 1 | 10 |
| 2 | 110 |
| 3 | 1110 |
| 4 | 11110 |

ONE BIT   REMAINING BIT
  1            110

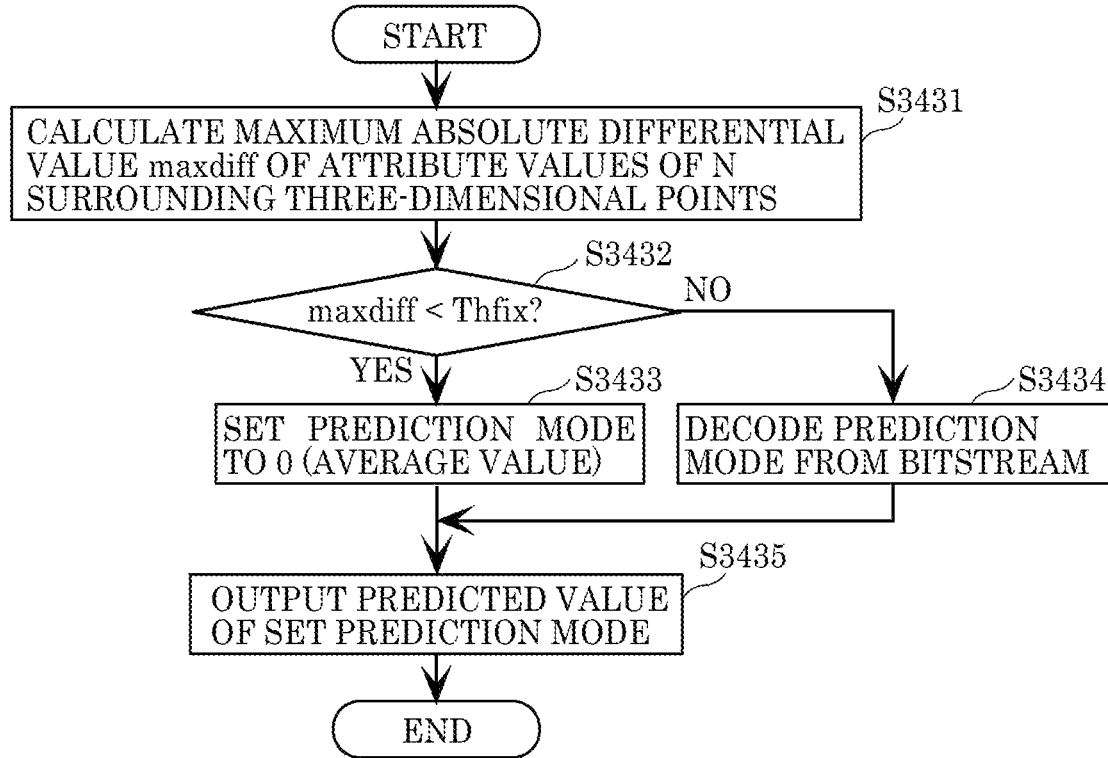

FIG. 91

```
attribute_header{
...
NumLoD
...
for (i=0; i<NumLoD; i++) {
 NumNeighborPoint[i]
}
...
for (i=0; i<NumLoD; i++) {
 NumPredMode[i]
}
...
for (i=0; i<NumLoD; i++) {
 Thfix[i]
}
...
for (i=0; i<NumLoD; i++) {
 NumOfPoint[i]
}
...
}
```

```
attribute_data {
...
 for (i=0; i<NumLoD; i++) {
  for (j=0; j<NumOfPoint[i]; j++) {
   if (maxdiff>= Thfix[i] && NumPredMode[i] > 1)
    PredMode
   n-bit code
   if (n-bit code == R_TH[i])
    remaining code
  }
 }
 ...
}
```

FIG. 108

| PREDICTION MODE | PREDICTED VALUE |
|---|---|
| 0 | AVERAGE VALUE OF a0 AND a1 |
| 1 | a1 |
| 2 | a0 |
| 3 | NOT AVAILABLE (UNDEFINED VALUE A) |
| 4 | NOT AVAILABLE (UNDEFINED VALUE B) |

Rows 0, 1, 2: AVAILABLE

FIG. 109

| PREDICTION MODE | BINARY DATA |
|---|---|
| 0 | 0 |
| 1 | 10 |
| 2 | 110 |
| 3 | 1110 |
| 4 | 1111 |

FIG. 110

| PREDICTION MODE | PREDICTED VALUE |
|---|---|
| 0 | AVERAGE VALUE OF a0 AND a1 |
| 1 | a1 |
| 2 | a0 |
| 3 | NOT AVAILABLE (UNDEFINED VALUE C) |
| 4 | NOT AVAILABLE (UNDEFINED VALUE D) |

Modes 0, 1, 2: AVAILABLE

FIG. 111

| PREDICTION MODE | PREDICTED VALUE |
|---|---|
| 0 | AVERAGE VALUE OF a0 AND a1 |
| 1 | a1 |
| 2 | a0 |
| 3 | INITIAL VALUE (VALUE OF 0) |
| 4 | INITIAL VALUE (VALUE OF 0) |

Modes 0, 1, 2: AVAILABLE

FIG. 112

| PREDICTION MODE | BINARY DATA |
|---|---|
| 0 | 0 |
| 1 | 10 |
| 2 | 110 |
| 3 | 1110 |
| 4 | 1111 |

FIG. 113

| PREDICTION MODE | PREDICTED VALUE | |
|---|---|---|
| 0 | AVERAGE VALUE OF a0 AND a1 | ⎫ |
| 1 | a1 | ⎬ AVAILABLE |
| 2 | a0 | ⎭ |
| 3 | INITIAL VALUE (VALUE OF 0) | |
| 4 | INITIAL VALUE (VALUE OF 0) | |

FIG. 114

| PREDICTION MODE | PREDICTED VALUE |
|---|---|
| 0 | INITIAL VALUE (VALUE OF 0) |
| 1 | INITIAL VALUE (VALUE OF 0) |
| 2 | INITIAL VALUE (VALUE OF 0) |
| 3 | INITIAL VALUE (VALUE OF 0) |
| 4 | INITIAL VALUE (VALUE OF 0) |

FIG. 115

| PREDICTION MODE | PREDICTED VALUE |
|---|---|
| 0 | AVERAGE VALUE OF a0 AND a1 |
| 1 | a1 |
| 2 | a0 |
| 3 | INITIAL VALUE (VALUE OF 0) |
| 4 | INITIAL VALUE (VALUE OF 0) |

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2019/023776 filed on Jun. 14, 2019, claiming the benefit of priority of U.S. Provisional Patent Application No. 62/685,596 filed on Jun. 15, 2018, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point group (point cloud) in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include MPEG-4 AVC and HEVC standardized by MPEG).

Meanwhile, point, cloud compression is partially supported by, for example, an open-source library (Point Cloud Library) for point cloud-related processing.

Furthermore, a technique for searching for and displaying a facility located in the surroundings of the vehicle is known (for example, see International Publication WO 2014/020663).

SUMMARY

There have been demands for correctly decoding attribute information in decoding three-dimensional data.

The present disclosure aims to provide a three-dimensional data encoding method, a three-dimensional data decoding method, a three-dimensional data encoding device, or a three-dimensional data decoding device which is capable of correctly decoding attribute information in decoding three-dimensional data.

A three-dimensional data encoding method according to an aspect of the present disclosure is a three-dimensional data encoding method of encoding a plurality of three-dimensional points. The three-dimensional data encoding method includes: selecting one prediction mode among two or more prediction modes for calculating, using attribute information of one or more second three-dimensional points in a vicinity of a first three-dimensional point, a predicted value of attribute information of the first three-dimensional point; calculating a predicted value according to the one prediction mode selected; calculating a prediction residual that is a difference between the attribute information of the first three-dimensional point and the predicted value calculated; and generating a bitstream that includes the one prediction mode selected and the prediction residual. In the calculating of the predicted value, a predetermined fixed value is assigned as a predicted value calculated according to the one prediction mode selected in a case in which a predicted value based on the attribute information of the one or more second three-dimensional points is not assigned to the one prediction mode selected.

A three-dimensional data decoding method according to an aspect of the present disclosure is a three-dimensional data decoding method of decoding a plurality of three-dimensional points. The three-dimensional data decoding method includes: obtaining a prediction mode and a prediction residual of a first three-dimensional point among the plurality of three-dimensional points by obtaining a bitstream; calculating a predicted value according to the prediction mode obtained; and calculating attribute information of the first three-dimensional point by adding the predicted value and the prediction residual, in the calculating of the predicted value, a predetermined fixed value is assigned as a predicted value calculated according to the prediction mode obtained in a case in which a predicted value based on attribute information of one or more second three-dimensional points in a vicinity of the first three-dimensional point is not assigned to the prediction mode obtained.

The present disclosure can provide a three-dimensional data encoding method, a three-dimensional data decoding method, a three-dimensional data encoding device, or a three-dimensional data decoding device which can correctly decode attribute information in decoding three-dimensional data.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 41 is a diagram showing an example of bit sequences of the volume according to Embodiment 7;

FIG. 46 is a diagram showing an example syntax of an RT flag and RT information according to Embodiment 7;

FIG. 55 is a diagram illustrating examples of exponential-Golomb codes according to Embodiment 8;

FIG. 56 is a diagram indicating a process on exponential-Golomb codes according to Embodiment 8;

FIG. 57 is a diagram indicating an example of a syntax in attribute header according to Embodiment 8;

FIG. 58 is a diagram indicating an example of a syntax in attribute data according to Embodiment 8;

FIG. 61 is a diagram indicating processing on exponential-Golomb codes according to Embodiment 8;

FIG. 62 is a diagram indicating an example of a reverse lookup table indicating relationships between remaining codes and the values thereof according to Embodiment 8;

FIG. 71 is a diagram showing a second example of a table representing predicted values calculated in the prediction modes according to Embodiment 9;

FIG. 72 is a diagram showing a third example of a table representing predicted values calculated in the prediction modes according to Embodiment 9;

FIG. 73 is a diagram showing a fourth example of a table representing predicted values calculated in the prediction modes according to Embodiment 9;

FIG. 74 is a diagram showing a fifth example of a table representing predicted values calculated in the prediction modes according to Embodiment 9;

FIG. 75 is a diagram showing a sixth example of a table representing predicted values calculated in the prediction modes according to Embodiment 9;

FIG. 76 is a diagram showing a seventh example of a table representing predicted values calculated in the prediction modes according to Embodiment 9;

FIG. 77 is a diagram showing an eighth example of a table representing predicted values calculated in the prediction modes according to Embodiment 9;

FIG. 78 is a diagram showing a first example of a binarization table in binarizing and encoding prediction mode values according to Embodiment 9;

FIG. 79 is a diagram showing a second example of a binarization table in binarizing and encoding the prediction mode values according to Embodiment 9;

FIG. 80 is a diagram showing a third example of a binarization table in binarizing and encoding the prediction mode values according to Embodiment 9;

FIG. 89 is a flowchart of an example of a process of determining whether the prediction mode value is fixed or decoded under condition A in decoding according to Embodiment 9;

FIG. 90 is a diagram for describing maximum absolute differential value maxdiff according to Embodiment 9;

FIG. 91 is a diagram showing an example of a syntax according to Embodiment 9;

FIG. 108 is a diagram according to Embodiment 10 which illustrates an example of a table indicating predicted values calculated according to respective prediction modes by a three-dimensional data encoding device;

FIG. 109 is a diagram according to Embodiment 10 which illustrates an example of a binarization table indicating a case in which prediction mode values are encoded by binarization;

FIG. 110 is a diagram according to Embodiment 10 which illustrates an example of a table indicating predicted values calculated according to the respective prediction modes by a three-dimensional data decoding device;

FIG. 111 is a diagram according to Embodiment 10 which illustrates an example of a table indicating predicted values calculated according to the respective prediction modes by the three-dimensional data encoding device;

FIG. 112 is a diagram according to Embodiment 10 which illustrates an example of a binarization table indicating a case in which the prediction mode values are encoded by binarization;

FIG. 113 is a diagram according to Embodiment 10 which illustrates an example of a table indicating predicted values calculated according to the respective prediction modes by the three-dimensional data decoding device;

FIG. 114 illustrates an example according to Embodiment 10 which illustrates an initial table used for processing of assigning predicted values to the prediction modes;

FIG. 115 is a diagram according to Embodiment 10 which illustrates an example of a table which is generated using the initial table and in which predicted values are calculated according to the respective prediction modes by the three-dimensional data encoding device;

FIG. 119 is a flowchart according to Embodiment 10 which illustrates three-dimensional data decoding processing performed by the three-dimensional data decoding device;

FIG. 120 is a flowchart according to Embodiment 10 which illustrates attribute information decoding processing;

FIG. 121 is a flowchart according to Embodiment 10 which illustrates processing of calculating a predicted value;

FIG. 122 is a flowchart according to Embodiment 10 which illustrates another example of processing of calculating a predicted value;

FIG. 123 is a flowchart according to Embodiment 10 which illustrates processing of selecting a prediction mode;

FIG. 124 is a flowchart according to Embodiment 10 which illustrates processing of calculating a predicted value;

FIG. 125 is a block diagram according to Embodiment 10 which illustrates a configuration of the three-dimensional data encoding device;

FIG. 126 is a block diagram according to Embodiment 10 which illustrates a configuration of the three-dimensional data decoding device;

FIG. 127 is a flowchart according to Embodiment 10 which illustrates processing performed by the three-dimensional data encoding device; and FIG. 128 is a flowchart according to Embodiment 10 which illustrates processing performed by the three-dimensional data decoding device.

DETAILED DESCRIPTION OF THE EMBODIMENTS

Figure 1:
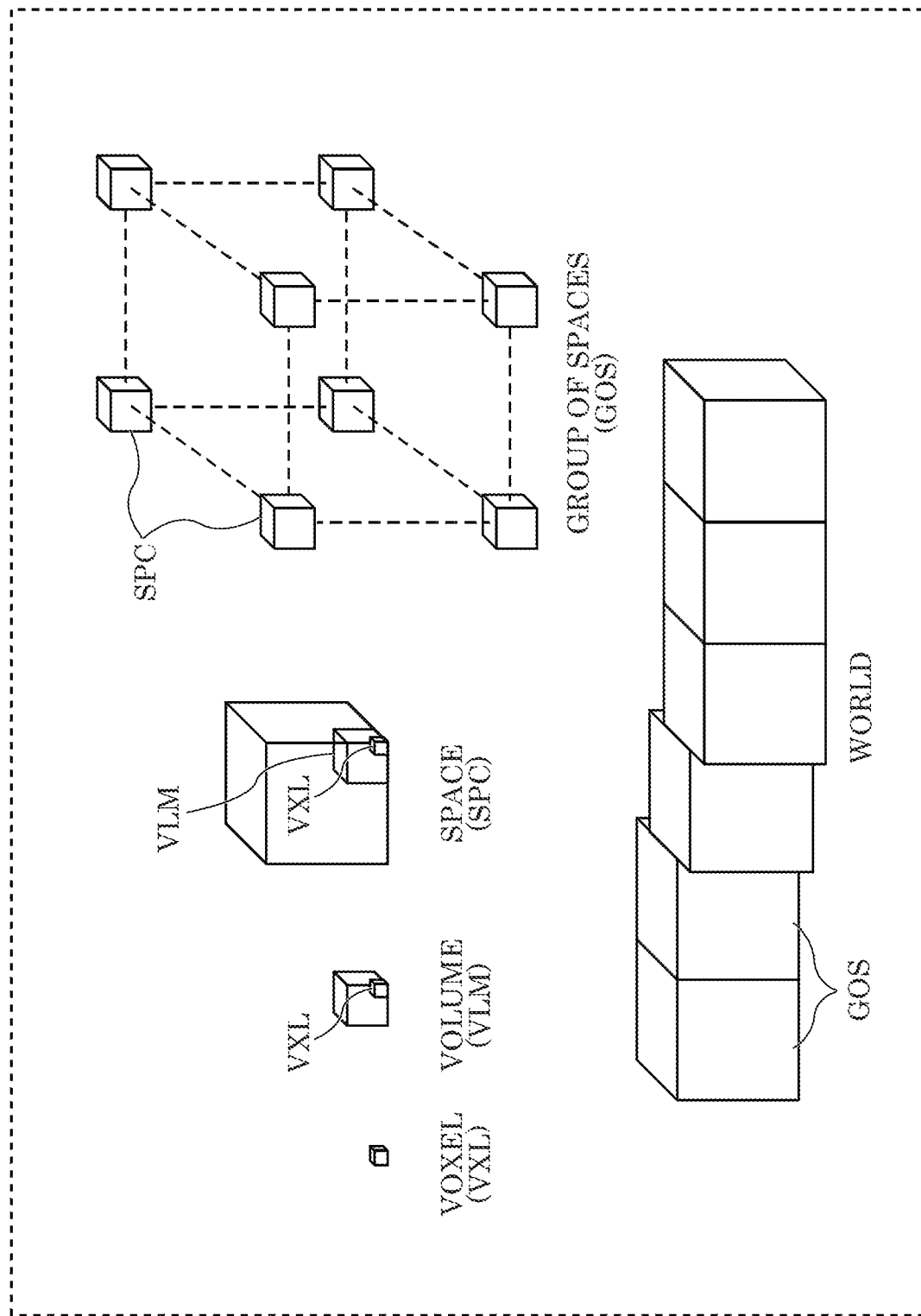
FIG. 1 is a diagram showing the structure of encoded three-dimensional data according to Embodiment 1.

A three-dimensional data encoding method according to an aspect of the present disclosure is a three-dimensional data encoding method of encoding a plurality of three-dimensional points. The three-dimensional data encoding method includes: selecting one prediction mode among two or more prediction modes for calculating, using attribute information of one or more second three-dimensional points in a vicinity of a first three-dimensional point, a predicted value of attribute information of the first three-dimensional point; calculating a predicted value according to the one prediction mode selected; calculating a prediction residual that is a difference between the attribute information of the first three-dimensional point and the predicted value calculated; and generating a bitstream that includes the one prediction mode selected and the prediction residual. In the calculating of the predicted value, a predetermined fixed value is assigned as a predicted value calculated according to the one prediction mode selected in a case in which a predicted value based on the attribute information of the one or more second three-dimensional points is not assigned to the one prediction mode selected.

With this, a predetermined fixed value is assigned as a predicted value calculated according to a prediction mode to which one or more predicted values are not assigned. For this reason, a bitstream to be generated includes a prediction mode and a prediction residual that is calculated according to the predicted value calculated according to the selected prediction mode. Accordingly, the three-dimensional data decoding device can calculate a predicted value that coincides with a predicted value that is calculated in the encoding since, in the same manner as the three-dimensional data encoding method, a predetermined fixed value is assigned as a predicted value calculated according to a prediction mode to which one or more predicted values are not assigned when decoding attribute information of a three-dimensional point to be processed from the obtained bitstream. Therefore, the three-dimensional data decoding device can correctly decode the attribute information of the three-dimensional point to be processed.

Furthermore, in the calculating of the predicted value, the case in which a predicted value based on the attribute information of the one or more second three-dimensional points is not assigned to the one prediction mode selected may be a case in which the predicted value is not assigned to the one prediction mode selected due to a total number of the one or more second three-dimensional points being less than or equal to a predetermined number.

In addition, the predetermined fixed value may be an initial value.

The predetermined fixed value may also be zero.

Moreover, in the calculating of the predicted value, an average of the attribute information of the one or more second three-dimensional points may be calculated as the predicted value calculated according to a first prediction mode among the two or more prediction modes, and the attribute information of the one or more second three-dimensional points may be calculated as the predicted value calculated according to a second prediction mode among the two or more prediction modes.

Furthermore, the two or more prediction modes are indicated by prediction mode values each having a different value, and a prediction mode value indicating a prediction mode to which the average is assigned as a predicted value may be less than a prediction mode value indicating a prediction mode to which the attribute information of the one or more second three-dimensional points is assigned as a predicted value.

In addition, the two or more prediction modes are indicated by prediction mode values each having a different value, and a prediction mode value indicating a prediction mode to which attribute information of one second three-dimensional point among the one or more second three-dimensional points is assigned as a predicted value may be less than a prediction mode value indicating a prediction mode to which attribute information of another second three-dimensional point among the one or more second three-dimensional points is assigned as a predicted value. The another second three-dimensional point is located further away from the first three-dimensional point than the one second three-dimensional point.

A three-dimensional data decoding method according to an aspect of the present disclosure is a three-dimensional data decoding method of decoding a plurality of three-dimensional points. The three-dimensional data decoding method includes: obtaining a prediction mode and a prediction residual of a first three-dimensional point among the plurality of three-dimensional points by obtaining a bitstream; calculating a predicted value according to the prediction mode obtained; and calculating attribute information of the first three-dimensional point by adding the predicted value and the prediction residual. In the calculating of the predicted value, a predetermined fixed value is assigned as a predicted value calculated according to the prediction mode obtained in a case in which a predicted value based on attribute information of one or more second three-dimensional points in a vicinity of the first three-dimensional point is not assigned to the prediction mode obtained.

Accordingly, a predicted value that coincides with a predicted value that is calculated in encoding can be calculated since, in the same manner as the three-dimensional data encoding method, a predetermined fixed value is assigned as a predicted value calculated according to a prediction mode to which one or more predicted values are not assigned when decoding attribute information of a three-dimensional point to be processed from the obtained bitstream. Therefore, the attribute information of the three-dimensional point to be processed can be correctly decoded.

In addition, in the calculating of the predicted value, the case in which a predicted value based on the attribute information of the one or more second three-dimensional points is not assigned to the prediction mode obtained may be a case in which a predicted value is not assigned to the prediction mode obtained due to a total number of the one or more second three-dimensional points being less than or equal to a predetermined number.

Moreover, the predetermined fixed value may be an initial value.

The predetermined fixed value may also be zero.

Furthermore, in the calculating of the predicted value, an average of the attribute information of the one or more second three-dimensional points may be calculated as the predicted value calculated according to a first prediction mode among two or more prediction modes, and the attribute information of the one or more second three-dimensional points may be calculated as the predicted value calculated according to a second prediction mode among the two or more prediction modes.

In addition, the two or more prediction modes are indicated by prediction mode values each having a different value, and a prediction mode value indicating a prediction mode to which the average is assigned as a predicted value may be less than a prediction mode value indicating a prediction mode to which the attribute information of the one or more second three-dimensional points is assigned as a predicted value.

Moreover, two or more prediction modes are indicated by prediction mode values each having a different value, and a prediction mode value indicating a prediction mode to which attribute information of one second three-dimensional point among the one or more second three-dimensional points is assigned as a predicted value may be less than a prediction mode value indicating a prediction mode to which attribute information of another second three-dimensional point among the one or more second three-dimensional points is assigned as a predicted value. The another second three-dimensional point is located further away from the first three-dimensional point than the one second three-dimensional point.

Furthermore, a three-dimensional data encoding device according to an aspect of the present disclosure is a three-dimensional data encoding device that encodes a plurality of three-dimensional points. The three-dimensional data encoding device includes a processor and memory. Using the memory, the processor: selects one prediction mode among two or more prediction modes for calculating, using attribute information of one or more second three-dimensional points in a vicinity of a first three-dimensional point, a predicted value of attribute information of the first three-dimensional point; calculates a predicted value according to the one prediction mode selected; calculates a prediction residual that is a difference between the attribute information of the first three-dimensional point and the predicted value calculated; generates a bitstream that includes the one prediction mode selected and the prediction residual; and in the calculating of the predicted value, assigns a predetermined fixed value as a predicted value calculated according to the one prediction mode selected in a case in which a predicted value based on the attribute information of the one or more second three-dimensional points is not assigned to the one prediction mode selected.

With this, a predetermined fixed value is assigned as a predicted value calculated according to a prediction mode to which one or more predicted values are not assigned. For this reason, a bitstream to be generated includes a prediction mode and a prediction residual that is calculated according to the predicted value calculated according to the selected prediction mode. Accordingly, the three-dimensional data decoding device can calculate a predicted value that coincides with a predicted value that is calculated in the encoding since, in the same manner as the three-dimensional data encoding method, a predetermined fixed value is assigned as a predicted value calculated according to a prediction mode to which one or more predicted values are not assigned when decoding attribute information of a three-dimensional point to be processed from the obtained bitstream. Therefore, the three-dimensional data decoding device can correctly decode the attribute information of the three-dimensional point to be processed.

In addition, a three-dimensional data decoding device according to an aspect of the present disclosure is a three-dimensional data decoding device that decodes a plurality of three-dimensional points. The three-dimensional data decoding device includes a processor and memory. Using the memory, the processor: obtains a prediction mode and a prediction residual of a first three-dimensional point among the plurality of three-dimensional points by obtaining a bitstream; calculates a predicted value according to the prediction mode obtained; calculates attribute information of the first three-dimensional point by adding the predicted value and the prediction residual; and in the calculating of the predicted value, assigns a predetermined fixed value as a predicted value calculated according to the prediction mode obtained in a case in which a predicted value based on attribute information of one or more second three-dimensional points in a vicinity of the first three-dimensional point is not assigned to the prediction mode obtained.

Accordingly, a predicted value that coincides with a predicted value that is calculated in encoding can be calculated since, in the same manner as the three-dimensional data encoding method, a predetermined fixed value is assigned as a predicted value calculated according to a prediction mode to which one or more predicted values are not assigned when decoding attribute information of a three-dimensional point to be processed from the obtained bitstream. Therefore, the attribute information of the three-dimensional point to be processed can be correctly decoded.

It is to be noted that these general or specific aspects may be implemented as a system, a method, an integrated circuit, a computer program, or a computer-readable recording medium such as a CD-ROM, or may be implemented as any optional combination of a system, a method, an integrated circuit, a computer program, and a recording medium.

Hereinafter, exemplary embodiments will be described in detail with reference to the drawings. Note that the embodiments described below each show a specific example of the present disclosure. The numerical values, shapes, materials, elements, the arrangement and connection of the elements, steps, order of the steps, etc. indicated in the following embodiments are mere examples, and therefore are not intended to limit the scope of the present disclosure. Therefore, among elements in the following embodiments, those not recited in any one of the broadest, independent claims are described as optional elements.

Embodiment 1

First, the data structure of encoded three-dimensional data (hereinafter also referred to as encoded data) according to the present embodiment will be described. FIG. 1 is a diagram showing the structure of encoded three-dimensional data according to the present embodiment.

In the present embodiment, a three-dimensional space is divided into spaces (SPCs), which correspond to pictures in moving picture encoding, and the three-dimensional data is encoded on a SPC-by-SPC basis. Each SPC is further divided into volumes (VLMs), which correspond to macroblocks, etc. in moving picture encoding, and predictions and transforms are performed on a VLM-by-VLM basis. Each volume includes a plurality of voxels (VXLs), each being a minimum unit in which position coordinates are associated. Note that prediction is a process of generating predictive three-dimensional data analogous to a current processing unit by referring to another processing unit, and encoding a differential between the predictive three-dimensional data and the current processing unit, as in the case of predictions performed on two-dimensional images. Such prediction includes not only spatial prediction in which another prediction unit corresponding to the same time is referred to, but also temporal prediction in which a prediction unit corresponding to a different time is referred to.

When encoding a three-dimensional space represented by point cloud data such as a point cloud, for example, the three-dimensional data encoding device (hereinafter also referred to as the encoding device) encodes the points in the point cloud or points included in the respective voxels in a collective manner, in accordance with a voxel size. Finer voxels enable a highly-precise representation of the three-dimensional shape of a point cloud, while larger voxels enable a rough representation of the three-dimensional shape of a point cloud.

Note that the following describes the case where three-dimensional data is a point cloud, but three-dimensional data is not limited to a point cloud, and thus three-dimensional data of any format may be employed.

Also note that voxels with a hierarchical structure may be used. In such a case, when the hierarchy includes n levels, whether a sampling point is included in the n−1th level or lower levels (levels below the n-th level) may be sequentially indicated. For example, when only the n-th level is decoded, and the n−1th level or lower levels include a sampling point, the n-th level can be decoded on the assumption that a sampling point is included at the center of a voxel in the n-th level.

Also, the encoding device obtains point cloud data, using, for example, a distance sensor, a stereo camera, a monocular camera, a gyroscope sensor, or an inertial sensor.

As in the case of moving picture encoding, each SPC is classified into one of at least the three prediction structures that include: intra SPC (I-SPC), which is individually decodable; predictive SPC (P-SPC) capable of only a unidirectional reference; and bidirectional SPC (B-SPC) capable of bidirectional references. Each SPC includes two types of time information: decoding time and display time.

Furthermore, as shown in FIG. 1, a processing unit that includes a plurality of SPCs is a group of spaces (GOS), which is a random access unit. Also, a processing unit that includes a plurality of GOSs is a world (WLD).

The spatial region occupied by each world is associated with an absolute position on earth, by use of, for example, GPS, or latitude and longitude information. Such position information is stored as meta-information. Note that meta-information may be included in encoded data, or may be transmitted separately from the encoded data.

Also, inside a GOS, all SPCs may be three-dimensionally adjacent to one another, or there may be a SPC that is not three-dimensionally adjacent to another SPC.

Note that the following also describes processes such as encoding, decoding, and reference to be performed on three-dimensional data included in processing units such as GOS, SPC, and VLM, simply as performing encoding/to encode, decoding/to decode, referring to, etc. on a processing unit. Also note that three-dimensional data included in a processing unit includes, for example, at least one pair of a spatial position such as three-dimensional coordinates and an attribute value such as color information.

Next, the prediction structures among SPCs in a GOS will be described. A plurality of SPCs in the same GOS or a plurality of VLMs in the same SPC occupy mutually different spaces, while having the same time information (the decoding time and the display time).

A SPC in a GOS that comes first in the decoding order is an I-SPC. GOSs come in two types: closed GOS and open GOS. A closed GOS is a GOS in which all SPCs in the GOS are decodable when decoding starts from the first I-SPC. Meanwhile, an open GOS is a GOS in which a different GOS is referred to in one or more SPCs preceding the first I-SPC in the GOS in the display time, and thus cannot be singly decoded.

Note that in the case of encoded data of map information, for example, a WLD is sometimes decoded in the backward direction, which is opposite to the encoding order, and thus backward reproduction is difficult when GOSs are interdependent. In such a case, a closed GOS is basically used.

Each GOS has a layer structure in height direction, and SPCs are sequentially encoded or decoded from SPCs in the bottom layer.

Figure 2:
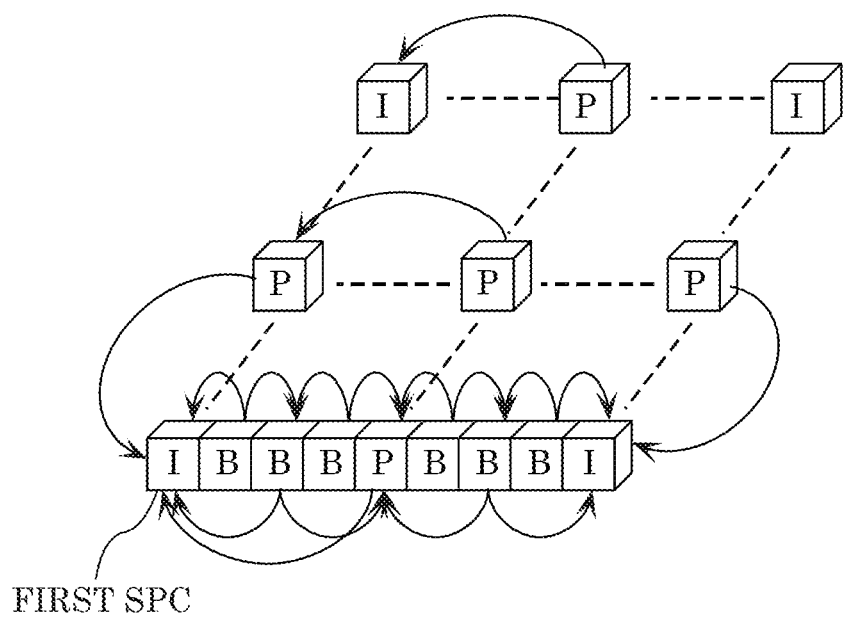
FIG. 2 is a diagram showing an example of prediction structures among SPCs that belong to the lowermost layer in a GOS according to Embodiment 1.
Figure 3:
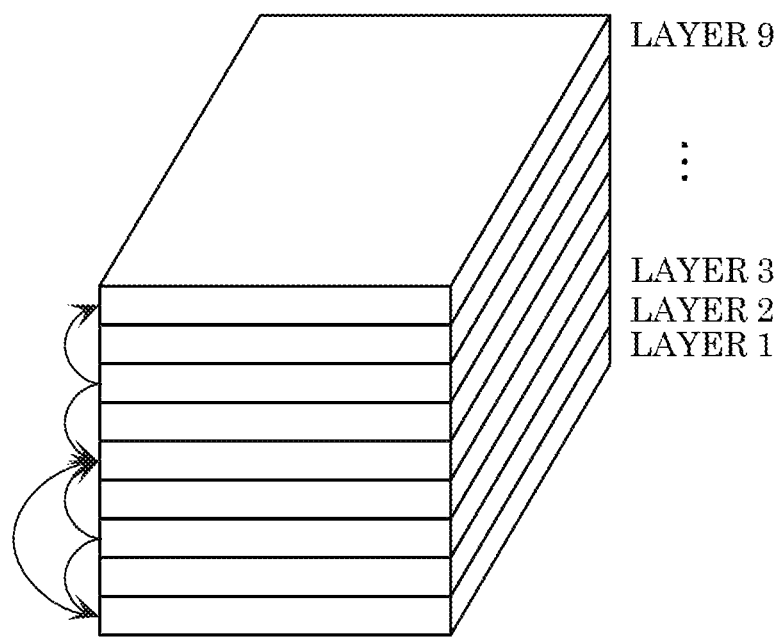
FIG. 3 is a diagram showing an example of prediction structures among layers according to Embodiment 1.

FIG. 2 is a diagram showing an example of prediction structures among SPCs that belong to the lowermost layer in a GOS. FIG. 3 is a diagram showing an example of prediction structures among layers.

A GOS includes at least one I-SPC. Of the objects in a three-dimensional space, such as a person, an animal, a car, a bicycle, a signal, and a building serving as a landmark, a small-sized object is especially effective when encoded as an I-SPC. When decoding a GOS at a low throughput or at a high speed, for example, the three-dimensional data decoding device (hereinafter also referred to as the decoding device) decodes only I-SPC(s) in the GOS.

The encoding device may also change the encoding interval or the appearance frequency of I-SPCs, depending on the degree of sparseness and denseness of the objects in a WLD.

In the structure shown in FIG. 3, the encoding device or the decoding device encodes or decodes a plurality of layers sequentially from the bottom layer (layer 1). This increases the priority of data on the ground and its vicinity, which involve a larger amount of information, when, for example, a self-driving car is concerned.

Regarding encoded data used for a drone, for example, encoding or decoding may be performed sequentially from SPCs in the top layer in a GOS in height direction.

The encoding device or the decoding device may also encode or decode a plurality of layers in a manner that the decoding device can have a rough grasp of a GOS first, and then the resolution is gradually increased. The encoding device or the decoding device may perform encoding or decoding in the order of layers 3, 8, 1, 9 . . . , for example.

Next, the handling of static objects and dynamic objects will be described.

A three-dimensional space includes scenes or still objects such as a building and a road (hereinafter collectively referred to as static objects), and objects with motion such as a car and a person (hereinafter collectively referred to as dynamic objects). Object detection is separately performed by, for example, extracting keypoints from point cloud data, or from video of a camera such as a stereo camera. In this description, an example method of encoding a dynamic object will be described.

A first method is a method in which a static object and a dynamic object are encoded without distinction. A second method is a method in which a distinction is made between a static object and a dynamic object on the basis of identification information.

For example, a GOS is used as an identification unit. In such a case, a distinction is made between a GOS that includes SPCs constituting a static object and a GOS that includes SPCs constituting a dynamic object, on the basis of identification information stored in the encoded data or stored separately from the encoded data.

Alternatively, a SPC may be used as an identification unit. In such a case, a distinction is made between a SPC that includes VLMs constituting a static object and a SPC that includes VLMs constituting a dynamic object, on the basis of the identification information thus described.

Alternatively, a VLM or a VXL may be used as an identification unit. In such a case, a distinction is made between a VLM or a VXL that includes a static object and a VLM or a VXL that includes a dynamic object, on the basis of the identification information thus described.

The encoding device may also encode a dynamic object as at least one VLM or SPC, and may encode a VLM or a SPC including a static object and a SPC including a dynamic object as mutually different GOSs. When the GOS size is variable depending on the size of a dynamic object, the encoding device separately stores the GOS size as meta-information.

The encoding device may also encode a static object and a dynamic object separately from each other, and may superimpose the dynamic object onto a world constituted by static objects. In such a case, the dynamic object is constituted by at least one SPC, and each SPC is associated with at least one SPC constituting the static object onto which the each SPC is to be superimposed. Note that a dynamic object may be represented not by SPC(s) but by at least one VLM or VXL.

The encoding device may also encode a static object and a dynamic object as mutually different streams.

The encoding device may also generate a GOS that includes at least one SPC constituting a dynamic object. The encoding device may further set the size of a GOS including a dynamic object (GOS_M) and the size of a GOS including a static object corresponding to the spatial region of GOS_M at the same size (such that the same spatial region is occupied). This enables superimposition to be performed on a GOS-by-GOS basis.

SPC(s) included in another encoded GOS may be referred to in a P-SPC or a B-SPC constituting a dynamic object. In the case where the position of a dynamic object temporally changes, and the same dynamic object is encoded as an object in a GOS corresponding to a different time, referring to SPC(s) across GOSs is effective in terms of compression rate.

The first method and the second method may be selected in accordance with the intended use of encoded data. When encoded three-dimensional data is used as a map, for example, a dynamic object is desired to be separated, and thus the encoding device uses the second method. Meanwhile, the encoding device uses the first method when the separation of a dynamic object is not required such as in the case where three-dimensional data of an event such as a concert and a sports event is encoded.

The decoding time and the display time of a GOS or a SPC are storable in encoded data or as meta-information. All static objects may have the same time information. In such a case, the decoding device may determine the actual decoding time and display time. Alternatively, a different value may be assigned to each GOS or SPC as the decoding time, and the same value may be assigned as the display time. Furthermore, as in the case of the decoder model in moving picture encoding such as Hypothetical Reference Decoder (HRD) compliant with HEVC, a model may be employed that ensures that a decoder can perform decoding without fail by having a buffer of a predetermined size and by reading a bitstream at a predetermined bit rate in accordance with the decoding times.

Figure 4:
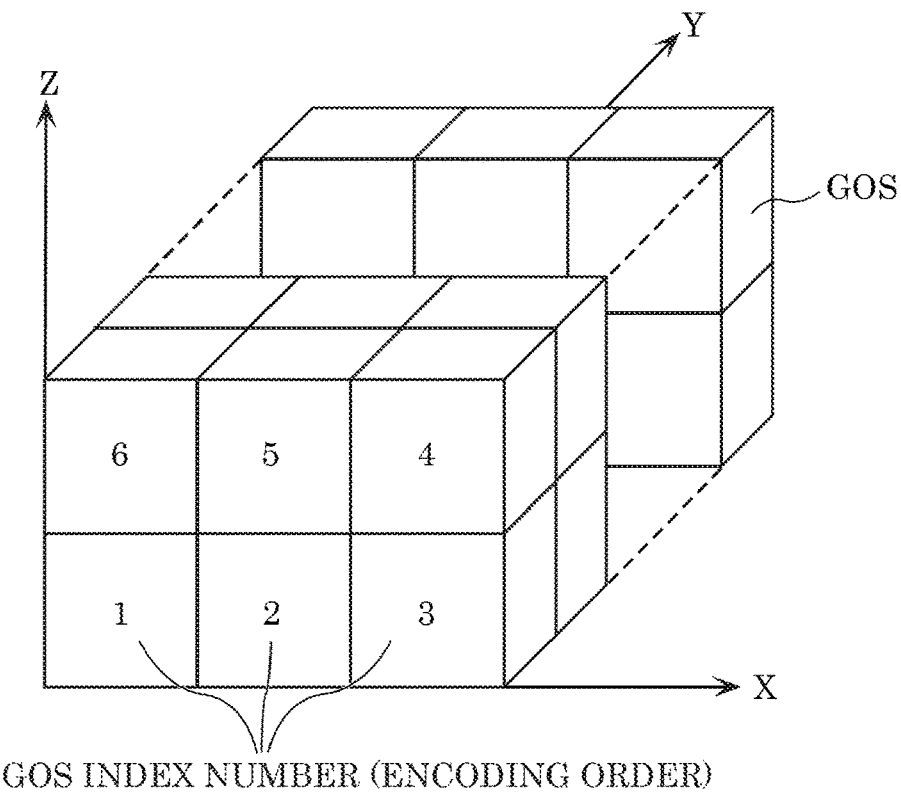
FIG. 4 is a diagram showing an example order of encoding GOSs according to Embodiment 1.

Next, the topology of GOSs in a world will be described. The coordinates of the three-dimensional space in a world are represented by the three coordinate axes (x axis, y axis, and z axis) that are orthogonal to one another. A predetermined rule set for the encoding order of GOSs enables encoding to be performed such that spatially adjacent GOSs are contiguous in the encoded data. In an example shown in FIG. 4, for example, GOSs in the x and z planes are successively encoded. After the completion of encoding all GOSs in certain x and z planes, the value of the y axis is updated. Stated differently, the world expands in the y axis direction as the encoding progresses. The GOS index numbers are set in accordance with the encoding order.

Here, the three-dimensional spaces in the respective worlds are previously associated one-to-one with absolute geographical coordinates such GPS coordinates or latitude/longitude coordinates. Alternatively, each three-dimensional space may be represented as a position relative to a previously set reference position. The directions of the x axis, the y axis, and the z axis in the three-dimensional space are represented by directional vectors that are determined on the basis of the latitudes and the longitudes, etc. Such directional vectors are stored together with the encoded data as meta-information.

GOSs have a fixed size, and the encoding device stores such size as meta-information. The GOS size may be changed depending on, for example, whether it is an urban area or not, or whether it is inside or outside of a room. Stated differently, the GOS size may be changed in accordance with the amount or the attributes of objects with information values. Alternatively, in the same world, the encoding device may adaptively change the GOS size or the interval between I-SPCs in GOSs in accordance with the object density, etc. For example, the encoding device sets the GOS size to smaller and the interval between I-SPCs in GOSs to shorter, as the object density is higher.

Figure 5:
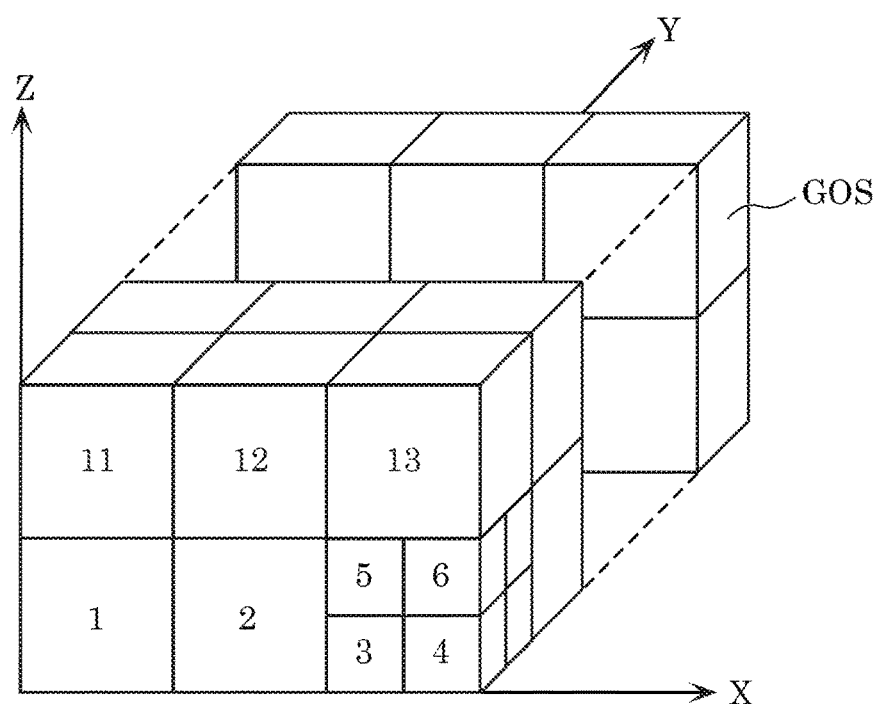
FIG. 5 is a diagram showing an example order of encoding GOSs according to Embodiment 1.

In an example shown in FIG. 5, to enable random access with a finer granularity, a GOS with a high object density is partitioned into the regions of the third to tenth GOSs. Note that the seventh to tenth GOSs are located behind the third to sixth GOSs.

Figure 6:
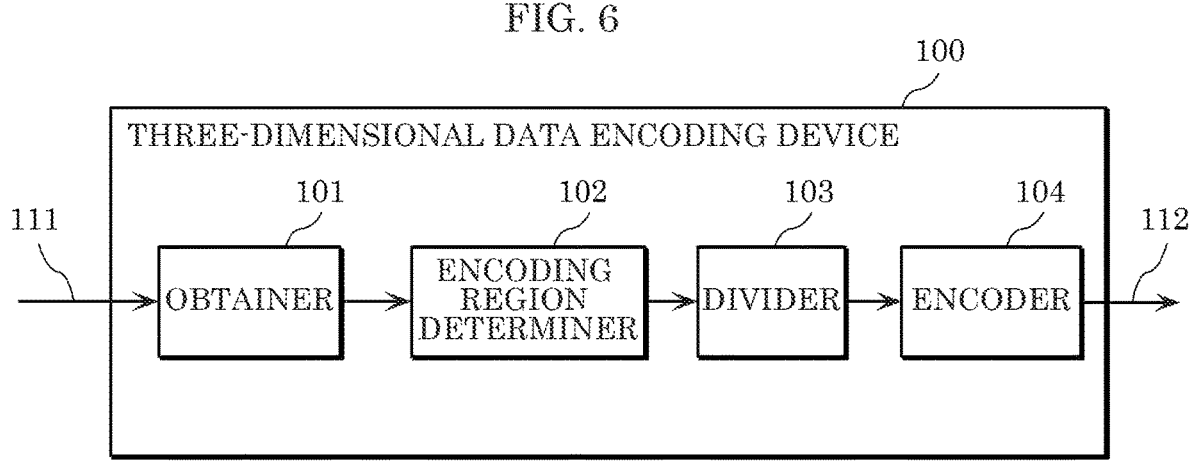
FIG. 6 is a block diagram of a three-dimensional data encoding device according to Embodiment 1.
Figure 7:
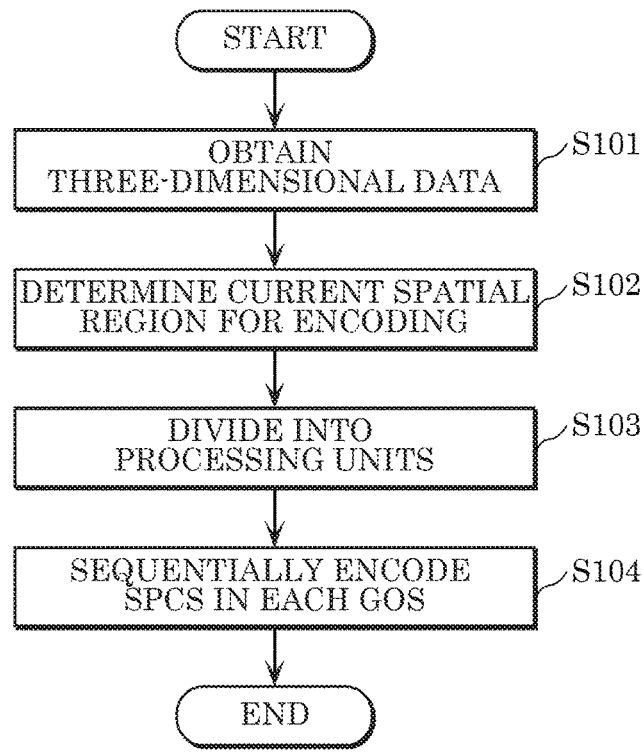
FIG. 7 is a flowchart of encoding processes according to Embodiment 1.

Next, the structure and the operation flow of the three-dimensional data encoding device according to the present embodiment will be described. FIG. 6 is a block diagram of three-dimensional data encoding device 100 according to the present embodiment. FIG. 7 is a flowchart of an example operation performed by three-dimensional data encoding device 100.

Three-dimensional data encoding device 100 shown in FIG. 6 encodes three-dimensional data 111, thereby generating encoded three-dimensional data 112. Such three-dimensional data encoding device 100 includes obtainer 101, encoding region determiner 102, divider 103, and encoder 104.

As shown in FIG. 7, first, obtainer 101 obtains three-dimensional data 111, which is point cloud data (S101).

Next, encoding region determiner 102 determines a current region for encoding from among spatial regions corresponding to the obtained point cloud data (S102). For example, in accordance with the position of a user or a vehicle, encoding region determiner 102 determines, as the current region, a spatial region around such position.

Next, divider 103 divides the point cloud data included in the current region into processing units. The processing units here means units such as GOSs and SPCs described above. The current region here corresponds to, for example, a world described above. More specifically, divider 103 divides the point cloud data into processing units on the basis of a predetermined GOS size, or the presence/absence/size of a dynamic object (S103). Divider 103 further determines the starting position of the SPC that comes first in the encoding order in each GOS.

Next, encoder 104 sequentially encodes a plurality of SPCs in each GOS, thereby generating encoded three-dimensional data 112 (S104).

Note that although an example is described here in which the current region is divided into GOSs and SPCs, after which each GOS is encoded, the processing steps are not limited to this order. For example, steps may be employed in which the structure of a single GOS is determined, which is followed by the encoding of such GOS, and then the structure of the subsequent GOS is determined.

As thus described, three-dimensional data encoding device 100 encodes three-dimensional data 111, thereby generating encoded three-dimensional data 112. More specifically, three-dimensional data encoding device 100 divides three-dimensional data into first processing units (GOSs), each being a random access unit and being associated with three-dimensional coordinates, divides each of the first processing units (GOSs) into second processing units (SPCs), and divides each of the second processing units (SPCs) into third processing units (VLMs). Each of the third processing units (VLMs) includes at least one voxel (VXL), which is the minimum unit in which position information is associated.

Next, three-dimensional data encoding device 100 encodes each of the first processing units (GOSs), thereby generating encoded three-dimensional data 112. More specifically, three-dimensional data encoding device 100 encodes each of the second processing units (SPCs) in each of the first processing units (GOSs). Three-dimensional data encoding device 100 further encodes each of the third processing units (VLMs) in each of the second processing units (SPCs).

When a current first processing unit (GOS) is a closed GOS, for example, three-dimensional data encoding device 100 encodes a current second processing unit (SPC) included in such current first processing unit (GOS) by referring to another second processing unit (SPC) included in the current first processing unit (GOS). Stated differently, three-dimensional data encoding device 100 refers to no second processing unit (SPC) included in a first processing unit (GOS) that is different from the current first processing unit (GOS).

Meanwhile, when a current first processing unit (GOS) is an open GOS, three-dimensional data encoding device 100 encodes a current second processing unit (SPC) included in such current first processing unit (GOS) by referring to another second processing unit (SPC) included in the current first processing unit (GOS) or a second processing unit (SPC) included in a first processing unit (GOS) that is different from the current first processing unit (GOS).

Also, three-dimensional data encoding device 100 selects, as the type of a current second processing unit (SPC), one of the following: a first type (I-SPC) in which another second processing unit (SPC) is not referred to; a second type (P-SPC) in which another single second processing unit (SPC) is referred to; and a third type in which other two second processing units (SPC) are referred to. Three-dimensional data encoding device 100 encodes the current second processing unit (SPC) in accordance with the selected type.

Figure 8:
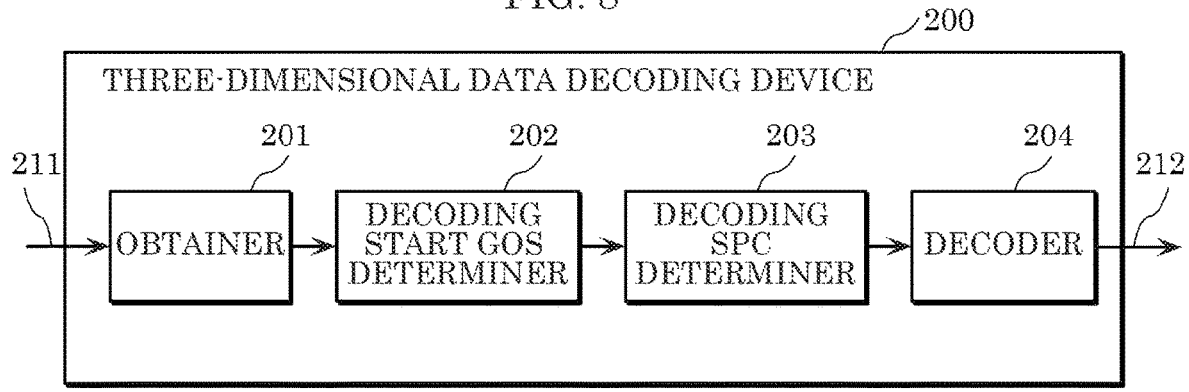
FIG. 8 is a block diagram of a three-dimensional data decoding device according to Embodiment 1.
Figures 9, 10:
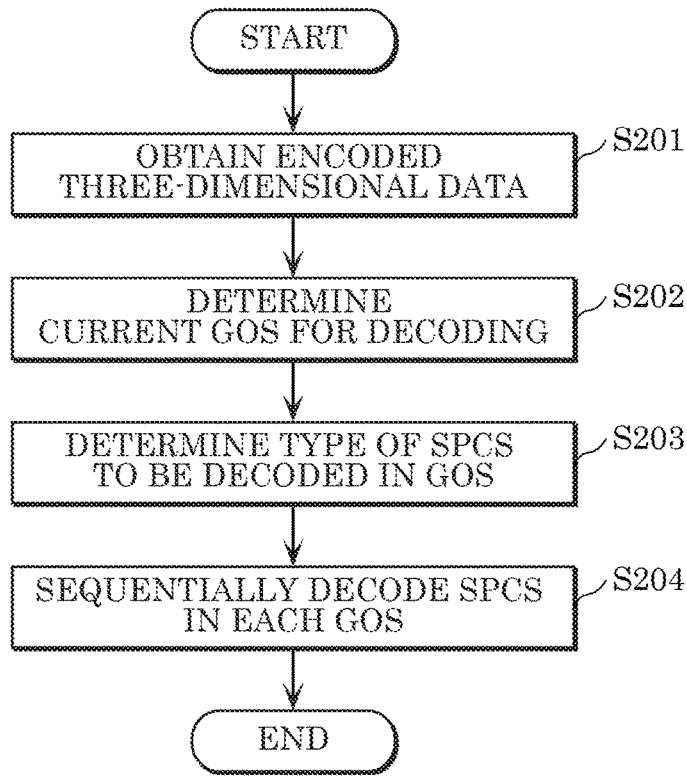
FIG. 9 is a flowchart of decoding processes according to Embodiment 1.
FIG. 10 is a diagram showing an example of meta information according to Embodiment 1.

Next, the structure and the operation flow of the three-dimensional data decoding device according to the present embodiment will be described. FIG. 8 is a block diagram of three-dimensional data decoding device 200 according to the present embodiment. FIG. 9 is a flowchart of an example operation performed by three-dimensional data decoding device 200.

Three-dimensional data decoding device 200 shown in FIG. 8 decodes encoded three-dimensional data 211, thereby generating decoded three-dimensional data 212. Encoded three-dimensional data 211 here is, for example, encoded three-dimensional data 112 generated by three-dimensional data encoding device 100. Such three-dimensional data decoding device 200 includes obtainer 201, decoding start GOS determiner 202, decoding SPC determiner 203, and decoder 204.

First, obtainer 201 obtains encoded three-dimensional data 211 (S201). Next, decoding start GOS determiner 202 determines a current GOS for decoding (S202). More specifically, decoding start GOS determiner 202 refers to meta-information stored in encoded three-dimensional data 211 or stored separately from the encoded three-dimensional data to determine, as the current GOS, a GOS that includes a SPC corresponding to the spatial position, the object, or the time from which decoding is to start.

Next, decoding SPC determiner 203 determines the type(s) (I, P, and/or B) of SPCs to be decoded in the GOS (S203). For example, decoding SPC determiner 203 determines whether to (1) decode only I-SPC(s), (2) to decode I-SPC(s) and P-SPCs, or (3) to decode SPCs of all types. Note that the present step may not be performed, when the type(s) of SPCs to be decoded are previously determined such as when all SPCs are previously determined to be decoded.

Next, decoder 204 obtains an address location within encoded three-dimensional data 211 from which a SPC that comes first in the GOS in the decoding order (the same as the encoding order) starts. Decoder 204 obtains the encoded data of the first SPC from the address location, and sequentially decodes the SPCs from such first SPC (S204). Note that the address location is stored in the meta-information, etc.

Three-dimensional data decoding device 200 decodes decoded three-dimensional data 212 as thus described. More specifically, three-dimensional data decoding device 200 decodes each encoded three-dimensional data 211 of the first processing units (GOSs), each being a random access unit and being associated with three-dimensional coordinates, thereby generating decoded three-dimensional data 212 of the first processing units (GOSs). Even more specifically, three-dimensional data decoding device 200 decodes each of the second processing units (SPCs) in each of the first processing units (GOSs). Three-dimensional data decoding device 200 further decodes each of the third processing units (VLMs) in each of the second processing units (SPCs).

The following describes meta-information for random access. Such meta-information is generated by three-dimensional data encoding device 100, and included in encoded three-dimensional data 112 (211).

In the conventional random access for a two-dimensional moving picture, decoding starts from the first frame in a random access unit that is close to a specified time. Meanwhile, in addition to times, random access to spaces (coordinates, objects, etc.) is assumed to be performed in a world.

To enable random access to at least three elements of coordinates, objects, and times, tables are prepared that associate the respective elements with the GOS index numbers. Furthermore, the GOS index numbers are associated with the addresses of the respective first I-SPCs in the GOSs. FIG. 10 is a diagram showing example tables included in the meta-information. Note that not all the tables shown in FIG. 10 are required to be used, and thus at least one of the tables is used.

The following describes an example in which random access is performed from coordinates as a starting point. To access the coordinates (x2, y2, and z2), the coordinates-GOS table is first referred to, which indicates that the point corresponding to the coordinates (x2, y2, and z2) is included in the second GOS. Next, the GOS-address table is referred to, which indicates that the address of the first I-SPc in the second GOS is addr(2). As such, decoder 204 obtains data from this address to start decoding.

Note that the addresses may either be logical addresses or physical addresses of an HDD or a memory. Alternatively, information that identifies file segments may be used instead of addresses. File segments are, for example, units obtained by segmenting at least one GOS, etc.

When an object spans across a plurality of GOSs, the object-GOS table may show a plurality of GOSs to which such object belongs. When such plurality of GOSs are closed GOSs, the encoding device and the decoding device can perform encoding or decoding in parallel. Meanwhile, when such plurality of GOSs are open GOSs, a higher compression efficiency is achieved by the plurality of GOSs referring to each other.

Example objects include a person, an animal, a car, a bicycle, a signal, and a building serving as a landmark. For example, three-dimensional data encoding device 100 extracts keypoints specific to an object from a three-dimensional point cloud, etc., when encoding a world, and detects the object on the basis of such keypoints to set the detected object as a random access point.

As thus described, three-dimensional data encoding device 100 generates first information indicating a plurality of first processing units (GOSs) and the three-dimensional coordinates associated with the respective first processing units (GOSs). Encoded three-dimensional data 112 (211) includes such first information. The first information further indicates at least one of objects, times, and data storage locations that are associated with the respective first processing units (GOSs).

Three-dimensional data decoding device 200 obtains the first information from encoded three-dimensional data 211. Using such first information, three-dimensional data decoding device 200 identifies encoded three-dimensional data 211 of the first processing unit that corresponds to the specified three-dimensional coordinates, object, or time, and decodes encoded three-dimensional data 211.

The following describes an example of other meta-information. In addition to the meta-information for random access, three-dimensional data encoding device 100 may also generate and store meta-information as described below, and three-dimensional data decoding device 200 may use such meta-information at the time of decoding.

When three-dimensional data is used as map information, for example, a profile is defined in accordance with the intended use, and information indicating such profile may be included in meta-information. For example, a profile is defined for an urban or a suburban area, or for a flying object, and the maximum or minimum size, etc. of a world, a SPC or a VLM, etc. is defined in each profile. For example, more detailed information is required for an urban area than for a suburban area, and thus the minimum VLM size is set to small.

The meta-information may include tag values indicating object types. Each of such tag values is associated with VLMs, SPCs, or GOSs that constitute an object. For example, a tag value may be set for each object type in a manner, for example, that the tag value "0" indicates "person," the tag value "1" indicates "car," and the tag value "2" indicates "signal". Alternatively, when an object type is hard to judge, or such judgment is not required, a tag value may be used that indicates the size or the attribute indicating, for example, whether an object is a dynamic object or a static object.

The meta-information may also include information indicating a range of the spatial region occupied by a world.

The meta-information may also store the SPC or VXL size as header information common to the whole stream of the encoded data or to a plurality of SPCs, such as SPCs in a GOS.

The meta-information may also include identification information on a distance sensor or a camera that has been used to generate a point cloud, or information indicating the positional accuracy of a point cloud in the point cloud.

The meta-information may also include information indicating whether a world is made only of static objects or includes a dynamic object.

The following describes variations of the present embodiment.

The encoding device or the decoding device may encode or decode two or more mutually different SPCs or GOSs in parallel. GOSs to be encoded or decoded in parallel can be determined on the basis of meta-information, etc. indicating the spatial positions of the GOSs.

When three-dimensional data is used as a spatial map for use by a car or a flying object, etc. in traveling, or for creation of such a spatial map, for example, the encoding device or the decoding device may encode or decode GOSs or SPCs included in a space that is identified on the basis of GPS information, the route information, the zoom magnification, etc.

The decoding device may also start decoding sequentially from a space that is close to the self-location or the traveling route. The encoding device or the decoding device may give a lower priority to a space distant from the self-location or the traveling route than the priority of a nearby space to encode or decode such distant place. To "give a lower priority" means here, for example, to lower the priority in the processing sequence, to decrease the resolution (to apply decimation in the processing), or to lower the image quality (to increase the encoding efficiency by, for example, setting the quantization step to larger).

When decoding encoded data that is hierarchically encoded in a space, the decoding device may decode only the bottom layer in the hierarchy.

The decoding device may also start decoding preferentially from the bottom layer of the hierarchy in accordance with the zoom magnification or the intended use of the map.

For self-location estimation or object recognition, etc. involved in the self-driving of a car or a robot, the encoding device or the decoding device may encode or decode regions at a lower resolution, except for a region that is lower than or at a specified height from the ground (the region to be recognized).

The encoding device may also encode point clouds representing the spatial shapes of a room interior and a room exterior separately. For example, the separation of a GOS representing a room interior (interior GOS) and a GOS representing a room exterior (exterior GOS) enables the decoding device to select a GOS to be decoded in accordance with a viewpoint location, when using the encoded data.

The encoding device may also encode an interior GOS and an exterior GOS having close coordinates so that such GOSs come adjacent to each other in an encoded stream. For example, the encoding device associates the identifiers of such GOSs with each other, and stores information indicating the associated identifiers into the meta-information that is stored in the encoded stream or stored separately. This enables the decoding device to refer to the information in the meta-information to identify an interior GOS and an exterior GOS having close coordinates.

The encoding device may also change the GOS size or the SPC size depending on whether a GOS is an interior GOS or an exterior GOS. For example, the encoding device sets the size of an interior GOS to smaller than the size of an exterior GOS. The encoding device may also change the accuracy of extracting keypoints from a point cloud, or the accuracy of detecting objects, for example, depending on whether a GOS is an interior GOS or an exterior GOS.

The encoding device may also add, to encoded data, information by which the decoding device displays objects with a distinction between a dynamic object and a static object. This enables the decoding device to display a dynamic object together with, for example, a red box or letters for explanation. Note that the decoding device may display only a red box or letters for explanation, instead of a dynamic object. The decoding device may also display more particular object types. For example, a red box may be used for a car, and a yellow box may be used for a person.

The encoding device or the decoding device may also determine whether to encode or decode a dynamic object and a static object as a different SPC or GOS, in accordance with, for example, the appearance frequency of dynamic objects or a ratio between static objects and dynamic objects. For example, when the appearance frequency or the ratio of dynamic objects exceeds a threshold, a SPC or a GOS including a mixture of a dynamic object and a static object is accepted, while when the appearance frequency or the ratio of dynamic objects is below a threshold, a SPC or GOS including a mixture of a dynamic object and a static object is unaccepted.

When detecting a dynamic object not from a point cloud but from two-dimensional image information of a camera, the encoding device may separately obtain information for identifying a detection result (box or letters) and the object position, and encode these items of information as part of the encoded three-dimensional data. In such a case, the decoding device superimposes auxiliary information (box or letters) indicating the dynamic object onto a resultant of decoding a static object to display it.

The encoding device may also change the sparseness and denseness of VXLs or VLMs in a SPC in accordance with the degree of complexity of the shape of a static object. For example, the encoding device sets VXLs or VLMs at a higher density as the shape of a static object is more complex. The encoding device may further determine a quantization step, etc. for quantizing spatial positions or color information in accordance with the sparseness and denseness of VXLs or VLMs. For example, the encoding device sets the quantization step to smaller as the density of VXLs or VLMs is higher.

As described above, the encoding device or the decoding device according to the present embodiment encodes or decodes a space on a SPC-by-SPC basis that includes coordinate information.

Furthermore, the encoding device and the decoding device perform encoding or decoding on a volume-by-volume basis in a SPC. Each volume includes a voxel, which is the minimum unit in which position information is associated.

Also, using a table that associates the respective elements of spatial information including coordinates, objects, and times with GOSs or using a table that associates these elements with each other, the encoding device and the decoding device associate any ones of the elements with each other to perform encoding or decoding. The decoding device uses the values of the selected elements to determine the coordinates, and identifies a volume, a voxel, or a SPC from such coordinates to decode a SPC including such volume or voxel, or the identified SPC.

Furthermore, the encoding device determines a volume, a voxel, or a SPC that is selectable in accordance with the elements, through extraction of keypoints and object recognition, and encodes the determined volume, voxel, or SPC, as a volume, a voxel, or a SPC to which random access is possible.

SPCs are classified into three types: I-SPC that is singly encodable or decodable; P-SPC that is encoded or decoded by referring to any one of the processed SPCs; and B-SPC that is encoded or decoded by referring to any two of the processed SPCs.

At least one volume corresponds to a static object or a dynamic object. A SPC including a static object, and a SPC including a dynamic object are encoded or decoded as mutually different GOSs. Stated differently, a SPC including a static object and a SPC including a dynamic object are assigned to different GOSs.

Dynamic objects are encoded or decoded on an object-by-object basis, and are associated with at least one SPC including a static object. Stated differently, a plurality of dynamic objects are individually encoded, and the obtained encoded data of the dynamic objects is associated with a SPC including a static object.

The encoding device and the decoding device give an increased priority to I-SPC(s) in a GOS to perform encoding or decoding. For example, the encoding device performs encoding in a manner that prevents the degradation of I-SPCs (in a manner that enables the original three-dimensional data to be reproduced with a higher fidelity after decoded). The decoding device decodes, for example, only I-SPCs.

The encoding device may change the frequency of using I-SPCs depending on the sparseness and denseness or the number (amount) of the objects in a world to perform encoding. Stated differently, the encoding device changes the frequency of selecting I-SPCs depending on the number or the sparseness and denseness of the objects included in the three-dimensional data. For example, the encoding device uses I-SPCs at a higher frequency as the density of the objects in a world is higher.

The encoding device also sets random access points on a GOS-by-GOS basis, and stores information indicating the spatial regions corresponding to the GOSs into the header information.

The encoding device uses, for example, a default, value as the spatial size of a GOS. Note that the encoding device may change the GOS size depending on the number (amount) or the sparseness and denseness of objects or dynamic objects. For example, the encoding device sets the spatial size of a GOS to smaller as the density of objects or dynamic objects is higher or the number of objects or dynamic objects is greater.

Also, each SPC or volume includes a keypoint group that is derived by use of information obtained by a sensor such as a depth sensor, a gyroscope sensor, or a camera sensor. The coordinates of the keypoints are set at the central positions of the respective voxels. Furthermore, finer voxels enable highly accurate position information.

The keypoint group is derived by use of a plurality of pictures. A plurality of pictures include at least two types of time information: the actual time information and the same time information common to a plurality of pictures that are associated with SPCs (for example, the encoding time used for rate control, etc.).

Also, encoding or decoding is performed on a GOS-by-GOS basis that includes at least one SPC.

The encoding device and the decoding device predict P-SPCs or B-SPCs in a current GOS by referring to SPCs in a processed GOS.

Alternatively, the encoding device and the decoding device predict P-SPCs or B-SPCs in a current GOS, using the processed SPCs in the current GOS, without referring to a different GOS.

Furthermore, the encoding device and the decoding device transmit or receive an encoded stream on a world-by-world basis that includes at least one GOS.

Also, a GOS has a layer structure in one direction at least in a world, and the encoding device and the decoding device start encoding or decoding from the bottom layer. For example, a random accessible GOS belongs to the lowermost layer. A GOS that belongs to the same layer or a lower layer is referred to in a GOS that belongs to an upper layer. Stated differently, a GOS is spatially divided in a predetermined direction in advance to have a plurality of layers, each including at least one SPC. The encoding device and the decoding device encode or decode each SPC by referring to a SPC included in the same layer as the each SPC or a SPC included in a layer lower than that of the each SPC.

Also, the encoding device and the decoding device successively encode or decode GOSs on a world-by-world basis that includes such GOSs. In so doing, the encoding device and the decoding device write or read out information indicating the order (direction) of encoding or decoding as metadata. Stated differently, the encoded data includes information indicating the order of encoding a plurality of GOSs.

The encoding device and the decoding device also encode or decode mutually different two or more SPCs or GOSs in parallel.

Furthermore, the encoding device and the decoding device encode or decode the spatial information (coordinates, size, etc.) on a SPC or a GOS.

The encoding device and the decoding device encode or decode SPCs or GOSs included in an identified space that is identified on the basis of external information on the self-location or/and region size, such as GPS information, route information, or magnification.

The encoding device or the decoding device gives a lower priority to a space distant from the self-location than the priority of a nearby space to perform encoding or decoding.

The encoding device sets a direction at one of the directions in a world, in accordance with the magnification or the intended use, to encode a GOS having a layer structure in such direction. Also, the decoding device decodes a GOS having a layer structure in one of the directions in a world that has been set in accordance with the magnification or the intended use, preferentially from the bottom layer.

The encoding device changes the accuracy of extracting keypoints, the accuracy of recognizing objects, or the size of spatial regions, etc. included in a SPC, depending on whether an object is an interior object or an exterior object. Note that the encoding device and the decoding device encode or decode an interior GOS and an exterior GOS having close coordinates in a manner that these GOSs come adjacent to each other in a world, and associate their identifiers with each other for encoding and decoding.

Embodiment 2

When using encoded data of a point cloud in an actual device or service, it is desirable that necessary information be transmitted/received in accordance with the intended use to reduce the network bandwidth. However, there has been no such functionality in the structure of encoding three-dimensional data, nor an encoding method therefor.

The present embodiment describes a three-dimensional data encoding method and a three-dimensional data encoding device for providing the functionality of transmitting/receiving only necessary information in encoded data of a three-dimensional point cloud in accordance with the intended use, as well as a three-dimensional data decoding method and a three-dimensional data decoding device for decoding such encoded data.

Figure 11:
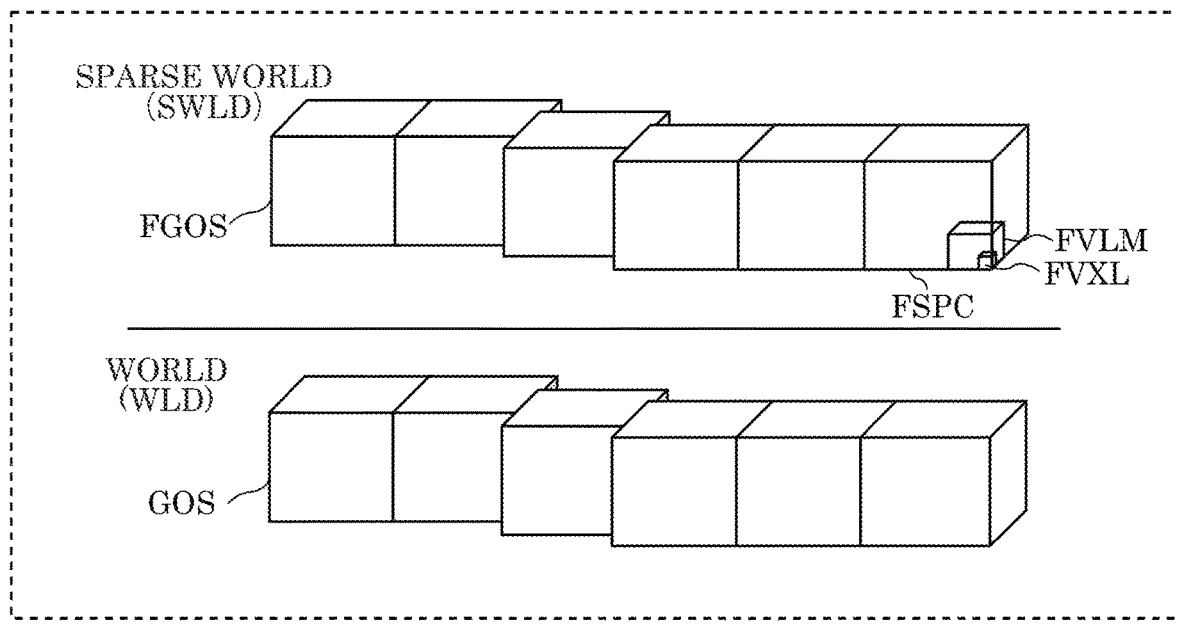
FIG. 11 is a diagram showing an example structure of a SWLD according to Embodiment 2.

A voxel (VXL) with a feature greater than or equal to a given amount is defined as a feature voxel (FVXL), and a world (WLD) constituted by FVXLs is defined as a sparse world (SWLD). FIG. 11 is a diagram showing example structures of a sparse world and a world. A SWLD includes: FGOSs, each being a GOS constituted by FVXLs; FSPCs, each being a SPC constituted by FVXLs and FVLMs, each being a VLM constituted by FVXLs. The data structure and prediction structure of a FGOS, a FSPC, and a FVLM may be the same as those of a GOS, a SPC, and a VLM.

A feature represents the three-dimensional position information on a VXL or the visible-light information on the position of a VXL. A large number of features are detected especially at a corner, an edge, etc. of a three-dimensional object. More specifically, such a feature is a three-dimensional feature or a visible-light feature as described below, but may be any feature that represents the position, luminance, or color information, etc. on a VXL.

Used as three-dimensional features are signature of histograms of orientations (SHOT) features, point feature histograms (PFH) features, or point pair feature (PPF) features.

SHOT features are obtained by dividing the periphery of a VXL, and calculating an inner product of the reference point and the normal vector of each divided region to represent the calculation result as a histogram. SHOT features are characterized by a large number of dimensions and high-level feature representation.

PFH features are obtained by selecting a large number of two point pairs in the vicinity of a VXL, and calculating the normal vector, etc. from each two point pair to represent the calculation result as a histogram. PFH features are histogram features, and thus are characterized by robustness against a certain extent of disturbance and also high-level feature representation.

PPF features are obtained by using a normal vector, etc. for each two points of VXLs. PPF features, for which all VXLs are used, has robustness against occlusion.

Used as visible-light features are scale-invariant feature transform (SIFT), speeded up robust features (SURF), or histogram of oriented gradients (HOG), etc. that use information on an image such as luminance gradient information.

A SWLD is generated by calculating the above-described features of the respective VXLs in a WLD to extract FVXLs. Here, the SWLD may be updated every time the WLD is updated, or may be regularly updated after the elapse of a certain period of time, regardless of the timing at which the WLD is updated.

A SWLD may be generated for each type of features. For example, different SWLDs may be generated for the respective types of features, such as SWLD1 based on SHOT features and SWLD2 based on SIFT features so that SWLDs are selectively used in accordance with the intended use. Also, the calculated feature of each FVXL may be held in each FVXL as feature information.

Next, the usage of a sparse world (SWLD) will be described. A SWLD includes only feature voxels (FVXLs), and thus its data size is smaller in general than that of a WLD that includes all VXLs.

In an application that utilizes features for a certain purpose, the use of information on a SWLD instead of a WLD reduces the time required to read data from a hard disk, as well as the bandwidth and the time required for data transfer over a network. For example, a WLD and a SWLD are held in a server as map information so that map information to be sent is selected between the WLD and the SWLD in accordance with a request from a client. This reduces the network bandwidth and the time required for data transfer. More specific examples will be described below.

Figure 12:
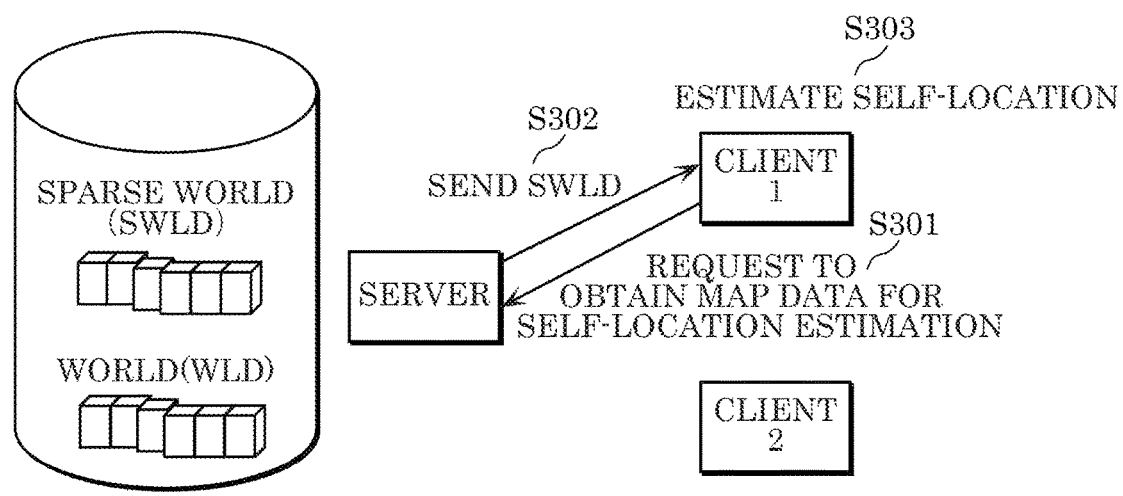
FIG. 12 is a diagram showing example operations performed by server and a client according to Embodiment 2.
Figure 13:
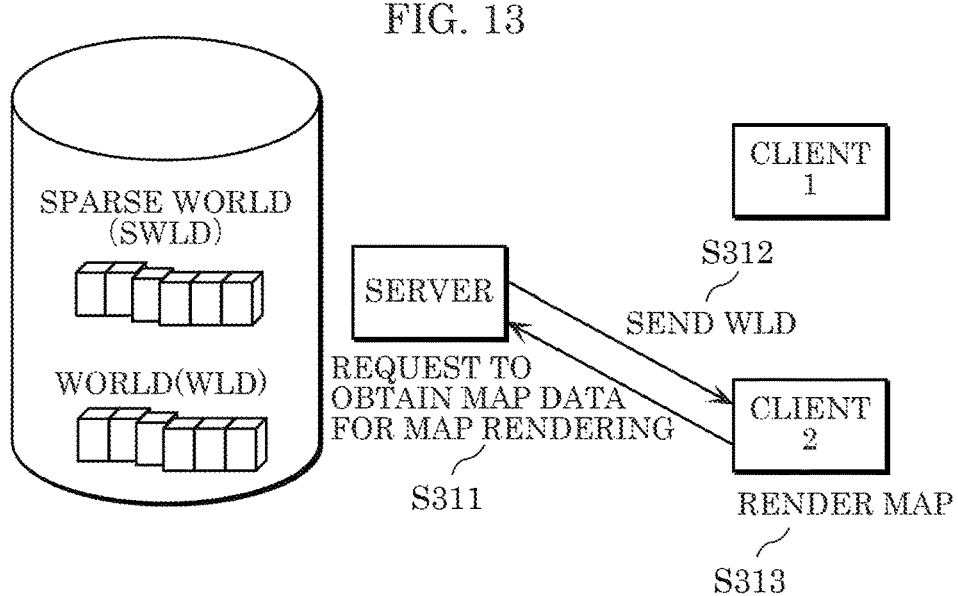
FIG. 13 is a diagram showing example operations performed by the server and a client according to Embodiment 2.

FIG. 12 and FIG. 13 are diagrams showing usage examples of a SWLD and a WLD. As FIG. 12 shows, when client 1, which is a vehicle-mounted device, requires map information to use it for self-location determination, client 1 sends to a server a request for obtaining map data for self-location estimation (S301). The server sends to client 1 the SWLD in response to the obtainment request (S302). Client 1 uses the received SWLD to determine the self-location (S303). In so doing, client 1 obtains VXL information on the periphery of client 1 through various means including a distance sensor such as a rangefinder, as well as a stereo camera and a combination of a plurality of monocular cameras. Client 1 then estimates the self-location information from the obtained VXL information and the SWLD. Here, the self-location information includes three-dimensional position information, orientation, etc. of client 1.

As FIG. 13 shows, when client 2, which is a vehicle-mounted device, requires map information to use it for rendering a map such as a three-dimensional map, client 2 sends to the server a request for obtaining map data for map rendering (S311). The server sends to client 2 the WLD in response to the obtainment request (S312). Client 2 uses the received WLD to render a map (S313). In so doing, client 2 uses, for example, image client 2 has captured by a visible-light camera, etc. and the WLD obtained from the server to create a rendering image, and renders such created image onto a screen of a car navigation system, etc.

As described above, the server sends to a client a SWLD when the features of the respective VXLs are mainly required such as in the case of self-location estimation, and sends to a client a WLD when detailed VXL information is required such as in the case of map rendering. This allows for an efficient sending/receiving of map data.

Note that a client may self-judge which one of a SWLD and a WLD necessary, and request the server to send a SWLD or a WLD. Also, the server may judge which one of a SWLD and a WLD to send in accordance with the status of the client or a network.

Next, a method will be described of switching the sending/receiving between a sparse world (SWLD) and a world (WLD).

Figure 14:
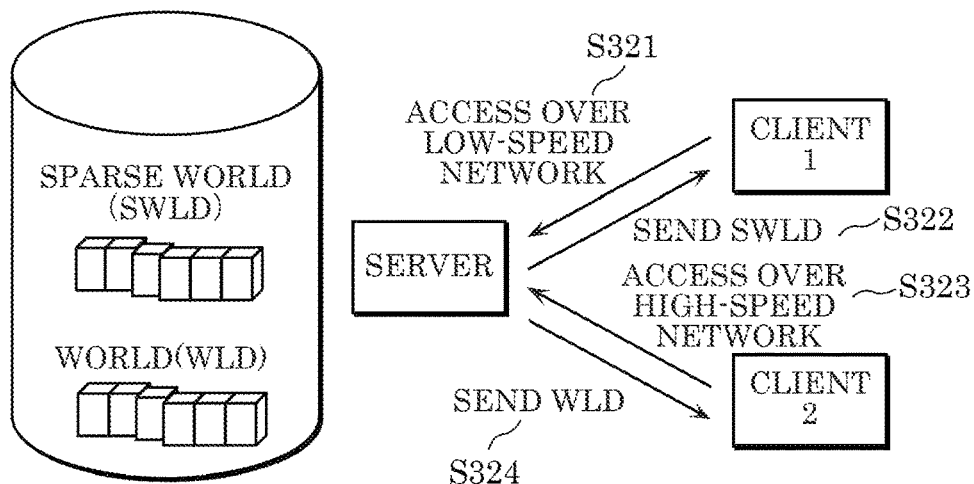
FIG. 14 is a diagram showing example operations performed by the server and the clients according to Embodiment 2.

Whether to receive a WLD or a SWLD may be switched in accordance with the network bandwidth. FIG. 14 is a diagram showing an example operation in such case. For example, when a low-speed network is used that limits the usable network bandwidth, such as in a Long-Term Evolution (LTE) environment, a client accesses the server over a low-speed network (S321), and obtains the SWLD from the server as map information (S322). Meanwhile, when a high-speed network is used that has an adequately broad network bandwidth, such as in a WiFi environment, a client accesses the server over a high-speed network (S323), and obtains the WLD from the server (S324). This enables the client to obtain appropriate map information in accordance with the network bandwidth such client is using.

More specifically, a client receives the SWLD over an LTE network when in outdoors, and obtains the WLD over a WiFi network when in indoors such as in a facility. This enables the client to obtain more detailed map information on indoor environment.

As described above, a client may request for a WLD or a SWLD in accordance with the bandwidth of a network such client is using. Alternatively, the client may send to the server information indicating the bandwidth of a network such client is using, and the server may send to the client data (the WLD or the SWLD) suitable for such client in accordance with the information. Alternatively, the server may identify the network bandwidth the client is using, and send to the client data (the WLD or the SWLD) suitable for such client.

Figure 15:
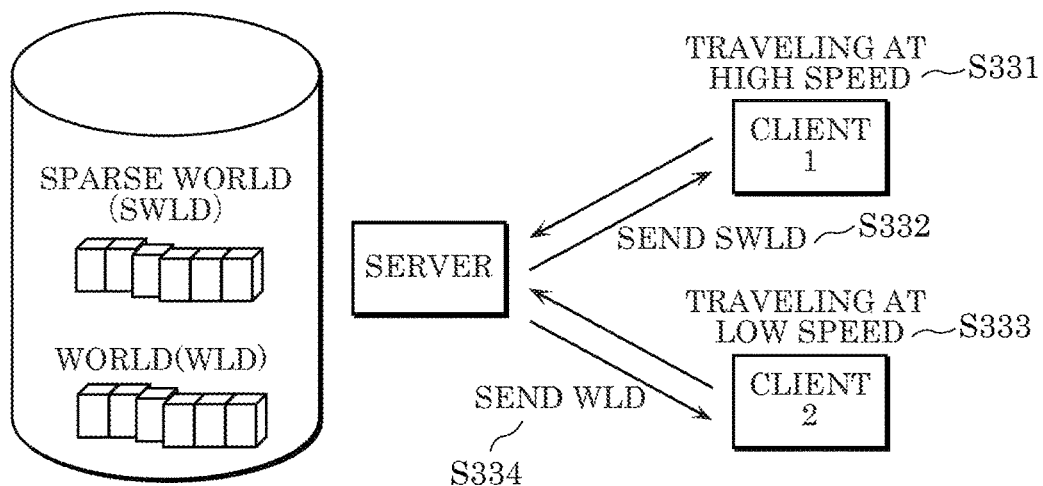
FIG. 15 is a diagram showing example operations performed by the server and the clients according to Embodiment 2.

Also, whether to receive a WLD or a SWLD may be switched in accordance with the speed of traveling. FIG. 15 is a diagram showing an example operation in such case. For example, when traveling at a high speed (S331), a client receives the SWLD from the server (S332). Meanwhile, when traveling at a low speed (S333), the client receives the WLD from the server (S334). This enables the client to obtain map information suitable to the speed, while reducing the network bandwidth. More specifically, when traveling on an expressway, the client, receives the SWLD with a small data amount, which enables the update of rough map information at an appropriate speed. Meanwhile, when traveling on a general road, the client receives the WLD, which enables the obtainment of more detailed map information.

As described above, the client may request the server for a WLD or a SWLD in accordance with the traveling speed of such client. Alternatively, the client may send to the server information indicating the traveling speed of such client, and the server may send to the client data (the WLD or the SWLD) suitable to such client in accordance with the information. Alternatively, the server may identify the traveling speed of the client to send data (the WLD or the SWLD) suitable to such client.

Also, the client may obtain, from the server, a SWLD first, from which the client may obtain a WLD of an important region. For example, when obtaining map information, the client first Obtains a SWLD for rough map information, from which the client narrows to a region in which features such as buildings, signals, or persons appear at high frequency so that the client can later obtain a WLD of such narrowed region. This enables the client to obtain detailed information on a necessary region, while reducing the amount of data received from the server.

The server may also create from a WLD different SWLDs for the respective objects, and the client may receive SWLDs in accordance with the intended use. This reduces the network bandwidth. For example, the server recognizes persons or cars in a WLD in advance, and creates a SWLD of persons and a SWLD of cars. The client, when wishing to obtain information on persons around the client, receives the SWLD of persons, and when wising to obtain information on cars, receives the SWLD of cars. Such types of SWLDs may be distinguished by information (flag, or type, etc.) added to the header, etc.

Figure 16:
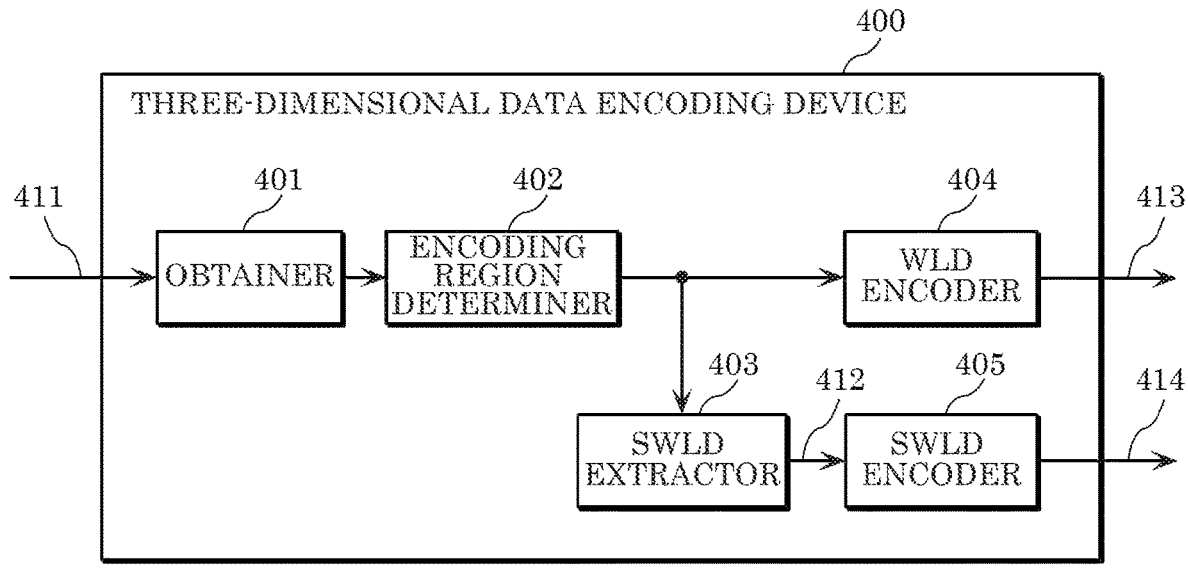
FIG. 16 is a block diagram of a three-dimensional data encoding device according to Embodiment 2.
Figure 17:
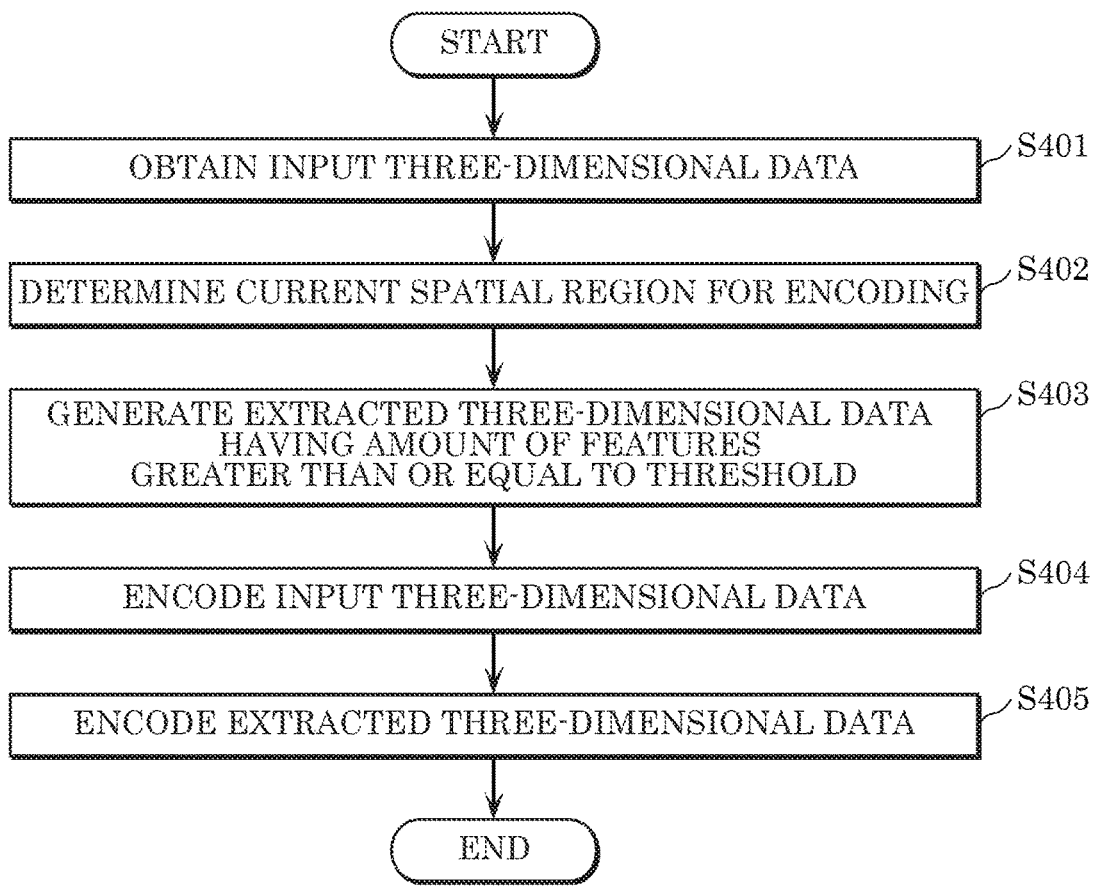
FIG. 17 is a flowchart of encoding processes according to Embodiment 2.

Next, the structure and the operation flow of the three-dimensional data encoding device (e.g., a server) according to the present embodiment will be described. FIG. 16 is a block diagram of three-dimensional data encoding device 400 according to the present embodiment. FIG. 17 is a flowchart of three-dimensional data encoding processes performed by three-dimensional data encoding device 400.

Three-dimensional data encoding device 400 shown in FIG. 16 encodes input three-dimensional data 411, thereby generating encoded three-dimensional data 413 and encoded three-dimensional data 414, each being an encoded stream. Here, encoded three-dimensional data 413 is encoded three-dimensional data corresponding to a WLD, and encoded three-dimensional data 414 is encoded three-dimensional data corresponding to a SWLD. Such three-dimensional data encoding device 400 includes, obtainer 401, encoding region determiner 402, SWLD extractor 403, WLD encoder 404, and SWLD encoder 405.

First, as FIG. 17 shows, obtainer 401 obtains input three-dimensional data 411, which is point cloud data in a three-dimensional space (S401).

Next, encoding region determiner 402 determines a current spatial region for encoding on the basis of a spatial region in which the point cloud data is present (S402).

Next, SWLD extractor 403 defines the current spatial region as a WLD, and calculates the feature from each VXL included in the WLD. Then, SWLD extractor 403 extracts VXLs having an amount of features greater than or equal to a predetermined threshold, defines the extracted VXLs as FVXLs, and adds such FVXLs to a SWLD, thereby generating extracted three-dimensional data 412 (S403). Stated differently, extracted three-dimensional data 412 having an amount of features greater than or equal to the threshold is extracted from input three-dimensional data 411.

Next, WED encoder 404 encodes input three-dimensional data 411 corresponding to the WLD, thereby generating encoded three-dimensional data 413 corresponding to the WLD (S404). In so doing, WLD encoder 404 adds to the header of encoded three-dimensional data 413 information that distinguishes that such encoded three-dimensional data 413 is a stream including a SWLD.

SWLD encoder 405 encodes extracted three-dimensional data 412 corresponding to the SWLD, thereby generating encoded three-dimensional data 414 corresponding to the SWLD (S405). In so doing, SWLD encoder 405 adds to the header of encoded three-dimensional data 414 information that distinguishes that such encoded three-dimensional data 414 is a stream including a SWLD.

Note that the process of generating encoded three-dimensional data 413 and the process of generating encoded three-dimensional data 414 may be performed in the reverse order. Also note that a part or all of these processes may be performed in parallel.

A parameter "world_type" is defined, for example, as information added to each header of encoded three-dimensional data 413 and encoded three-dimensional data 414 world_type=0 indicates that a stream includes a WLD, and world_type=1 indicates that a stream includes a SWLD. An increased number of values may be further assigned to define a larger number of types, e.g., world_type=2. Also, one of encoded three-dimensional data 413 and encoded three-dimensional data 414 may include a specified flag. For example, encoded three-dimensional data 414 may be assigned with a flag indicating that such stream includes a SWLD. In such a case, the decoding device can distinguish whether such stream is a stream including a WLD or a stream including a SWLD in accordance with the presence/absence of the flag.

Also, an encoding method used by WLD encoder 404 to encode a WILD may be different from an encoding method used by SWLD encoder 405 to encode a SWLD.

For example, data of a SWLD is decimated, and thus can have a lower correlation with the neighboring data than that of a WLD. For this reason, of intra prediction and inter prediction, inter prediction may be more preferentially performed in an encoding method used for a SWLD than in an encoding method used for a WLD.

Also, an encoding method used for a SWLD and an encoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Also, SWLD encoder 405 performs encoding in a manner that encoded three-dimensional data 414 of a SWLD has a smaller data size than the data size of encoded three-dimensional data 413 of a WLD. A SWLD can have a lower inter-data correlation, for example, than that of a WLD as described above. This can lead to a decreased encoding efficiency, and thus to encoded three-dimensional data 414 having a larger data size than the data size of encoded three-dimensional data 413 of a WLD. When the data size of the resulting encoded three-dimensional data 414 is larger than the data size of encoded three-dimensional data 413 of a WLD, SWLD encoder 405 performs encoding again to re-generate encoded three-dimensional data 414 having a reduced data size.

For example, SWLD extractor 408 re-generates extracted three-dimensional data 412 having a reduced number of keypoints to be extracted, and SWLD encoder 405 encodes such extracted three-dimensional data 412. Alternatively, SWLD encoder 405 may perform more coarse quantization. More coarse quantization is achieved, for example, by rounding the data in the lowermost level in an octree structure described below.

When failing to decrease the data size of encoded three-dimensional data 414 of the SWLD to smaller than the data size of encoded three-dimensional data 413 of the WLD, SWLD encoder 405 may not generate encoded three-dimensional data 414 of the SWLD. Alternatively, encoded three-dimensional data 413 of the WLD may be copied as encoded three-dimensional data 414 of the SWLD. Stated differently, encoded three-dimensional data 413 of the WLD may be used as it is as encoded three-dimensional data 414 of the SWLD.

Figure 18:
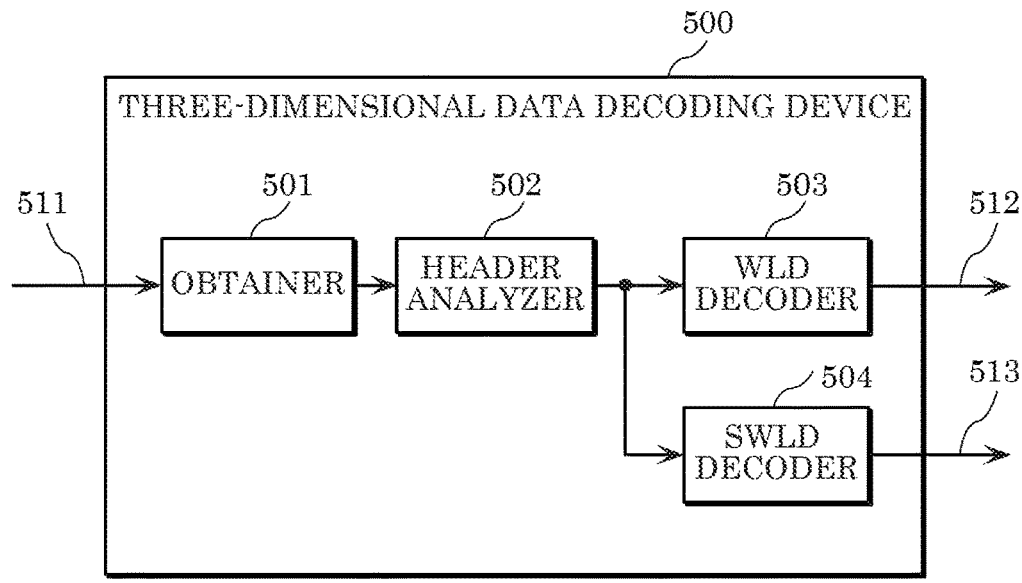
FIG. 18 is a block diagram of a three-dimensional data decoding device according to Embodiment 2.
Figure 19:
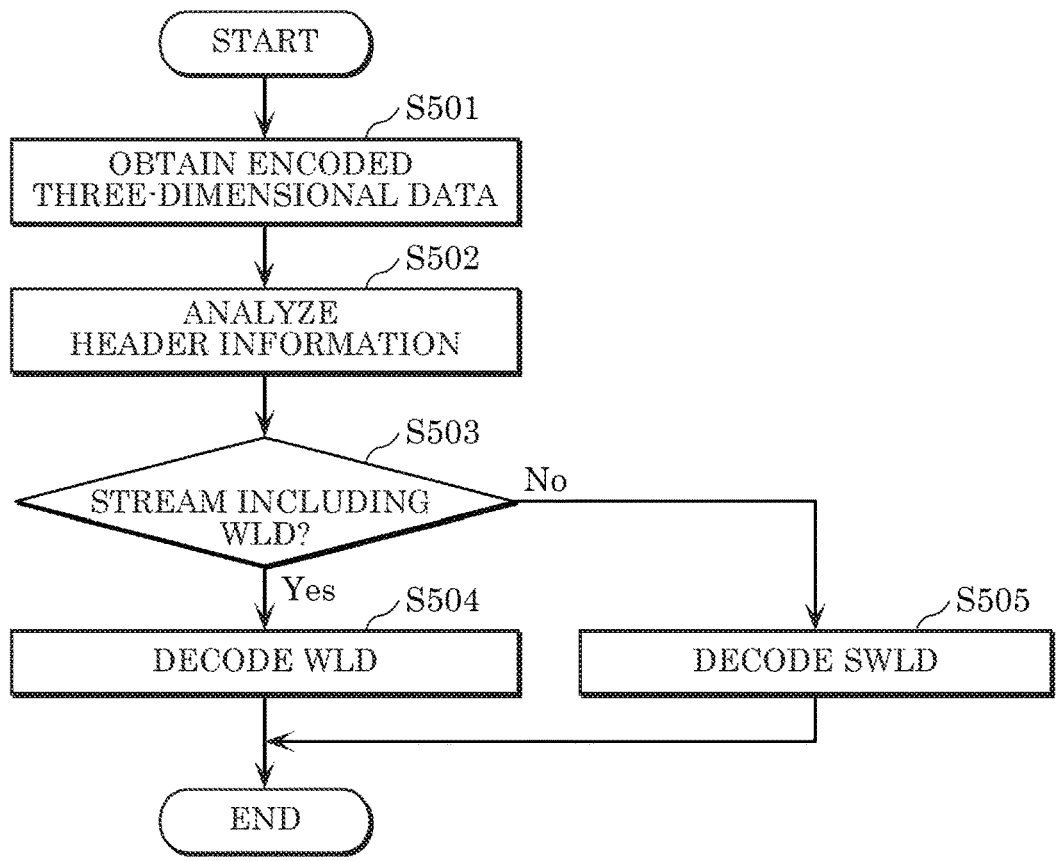
FIG. 19 is a flowchart of decoding processes according to Embodiment 2.

Next, the structure and the operation flow of the three-dimensional data decoding device (e.g., a client) according to the present embodiment will be described. FIG. 18 is a block diagram of three-dimensional data decoding device 500 according to the present embodiment. FIG. 19 is a flowchart of three-dimensional data decoding processes performed by three-dimensional data decoding device 500.

Three-dimensional data decoding device 500 shown in FIG. 18 decodes encoded three-dimensional data 511, thereby generating decoded three-dimensional data 512 or decoded three-dimensional data 513. Encoded three-dimensional data 511 here is, for example, encoded three-dimensional data 413 or encoded three-dimensional data 414 generated by three-dimensional data encoding device 400.

Such three-dimensional data decoding device 500 includes obtainer 501, header analyzer 502, WLD decoder 503, and SWLD decoder 504.

First, as FIG. 19 shows, obtainer 501 obtains encoded three-dimensional data 511 (S501). Next, header analyzer 502 analyzes the header of encoded three-dimensional data 511 to identify whether encoded three-dimensional data 511 is a stream including a WLD or a stream including a SWLD (S502). For example, the above-described parameter world_type is referred to in making such identification.

When encoded three-dimensional data 511 is a stream including a WLD (Yes in S503), WLD decoder 503 decodes encoded three-dimensional data 511, thereby generating decoded three-dimensional data 512 of the WLD (S504). Meanwhile, when encoded three-dimensional data 511 is a stream including a SWLD (NO in S503), SWLD decoder 504 decodes encoded three-dimensional data 511, thereby generating decoded three-dimensional data 513 of the SWLD (S505).

Also, as in the case of the encoding device, a decoding method used by WLD decoder 503 to decode a WLD may be different from a decoding method used by SWLD decoder 504 to decode a SWLD. For example, of intra prediction and inter prediction, inter prediction may be more preferentially performed in a decoding method used for a SWLD than in a decoding method used for a WLD.

Also, a decoding method used for a SWLD and a decoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Figure 20:
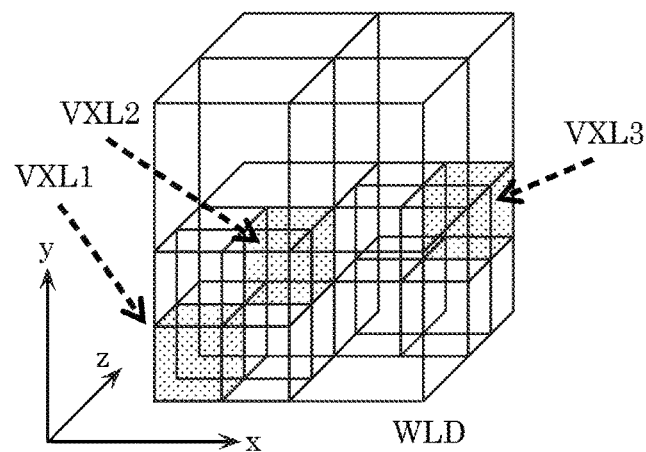
FIG. 20 is a diagram showing an example structure of a WLD according to Embodiment 2.
Figure 21:
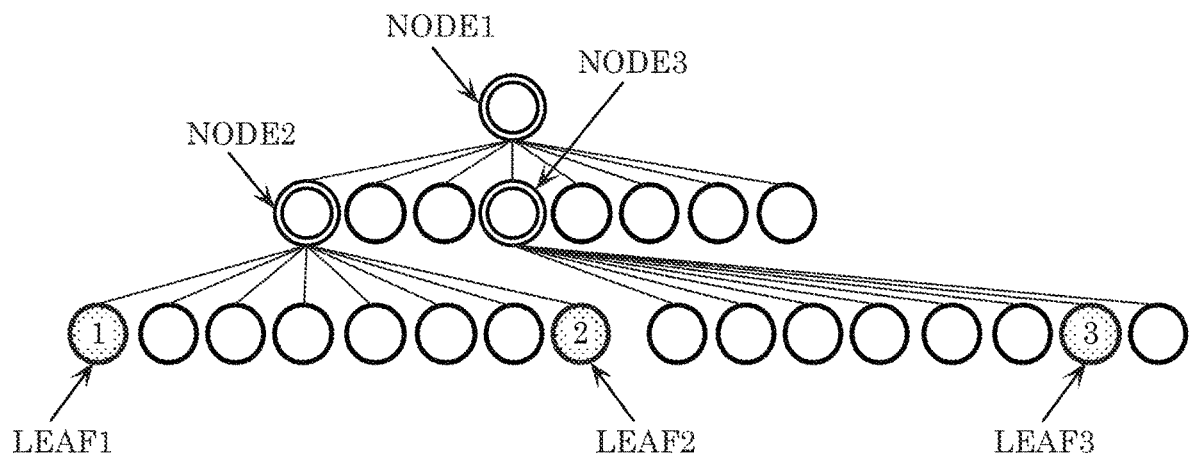
FIG. 21 is a diagram showing an example octree structure of the WLD according to Embodiment 2.

Next, an octree representation will be described, which is a method of representing three-dimensional positions. VXL data included in three-dimensional data is converted into an octree structure before encoded. FIG. 20 is a diagram showing example VXLs in a WLD. FIG. 21 is a diagram showing an octree structure of the WLD shown in FIG. 20. An example shown in FIG. 20 illustrates three VXLs 1 to 3 that include point clouds (hereinafter referred to as effective VXLs). As FIG. 21 shows, the octree structure is made of nodes and leaves. Each node has a maximum of eight nodes or leaves. Each leaf has VXL information. Here, of the leaves shown in FIG. 21, leaf 1, leaf 2, and leaf 3 represent VXL1, VXL2, and VXL3 shown in FIG. 20, respectively.

More specifically, each node and each leaf correspond to a three-dimensional position. Node 1 corresponds to the entire block shown in FIG. 20. The block that corresponds to node 1 is divided into eight blocks. Of these eight blocks, blocks including effective VXLs are set as nodes, while the other blocks are set as leaves. Each block that corresponds to a node is further divided into eight nodes or leaves. These processes are repeated by the number of times that is equal to the number of levels in the octree structure. All blocks in the lowermost level are set as leaves.

Figure 22:
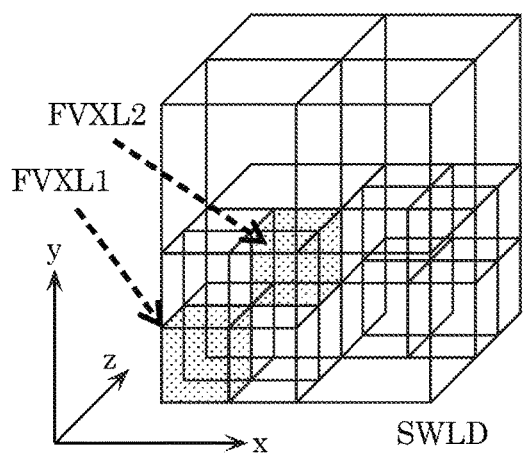
FIG. 22 is a diagram showing an example structure of a SWLD according to Embodiment 2.
Figure 23:
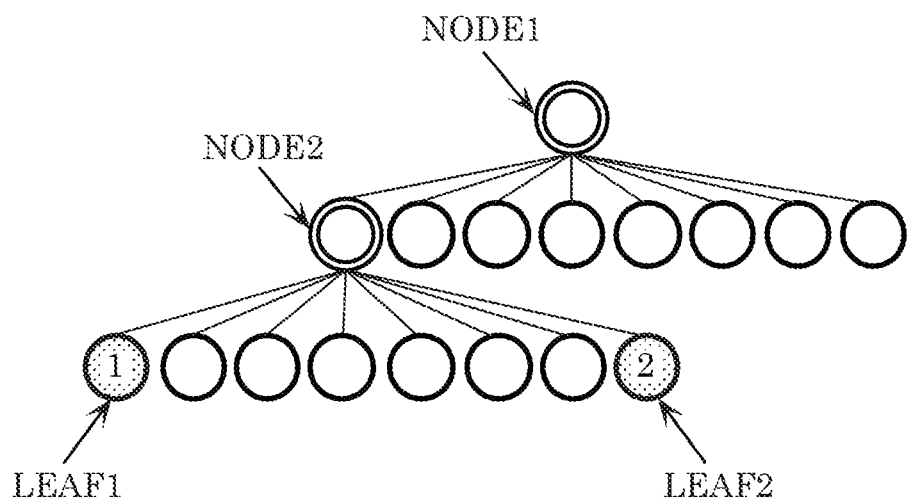
FIG. 23 is a diagram showing an example octree structure of the SWIM according to Embodiment 2.

FIG. 22 is a diagram showing an example SWLD generated from the WLD shown in FIG. 20. VXL1 and VXL2 shown in FIG. 20 are judged as FVXL1 and FVXL2 as a result of feature extraction, and thus are added to the SWLD. Meanwhile, VXL3 is not judged as a FVXL, and thus is not added to the SWLD. FIG. 23 is a diagram showing an octree structure of the SWLD shown in FIG. 22. In the octree structure shown in FIG. 23, leaf 3 corresponding to VXL3 shown in FIG. 21 is deleted. Consequently, node 3 shown in FIG. 21 has lost an effective VXL, and has changed to a leaf. As described above, a SWLD has a smaller number of leaves in general than a WLD does, and thus the encoded three-dimensional data of the SWLD is smaller than the encoded three-dimensional data of the WLD.

The following describes variations of the present embodiment.

For self-location estimation, for example, a client, being a vehicle-mounted device, etc., may receive a SWLD from the server to use such SWLD to estimate the self-location. Meanwhile, for obstacle detection, the client may detect obstacles by use of three-dimensional information on the periphery obtained by such client through various means including a distance sensor such as a rangefinder, as well as a stereo camera and a combination of a plurality of monocular cameras.

In general, a SWLD is less likely to include VXL data on a flat region. As such, the server may hold a subsample world (subWLD) obtained by subsampling a WLD for detection of static obstacles, and send to the client the SWLD and the subWLD. This enables the client to perform self-location estimation and obstacle detection on the client's part, while reducing the network bandwidth.

When the client renders three-dimensional map data at a high speed, map information having a mesh structure is more useful in some cases. As such, the server may generate a mesh from a WLD to hold it beforehand as a mesh world (MWLD). For example, when wishing to perform coarse three-dimensional rendering, the client receives a MWLD, and when wishing to perform detailed three-dimensional rendering, the client receives a WLD. This reduces the network bandwidth.

In the above description, the server sets, as FVXLs, VXLs having an amount of features greater than or equal to the threshold, but the server may calculate FVXLs by a different method. For example, the server may judge that a VXL, a VLM, a SPC, or a GOS that constitutes a signal, or an intersection, etc. as necessary for self-location estimation, driving assist, or self-driving, etc., and incorporate such VXL, VLM, SPC, or GOS into a SWLD as a FVXL, a FVLM, a FSPC, or a FGOS. Such judgment may be made manually. Also, FVXLs, etc. that have been set on the basis of an amount of features may be added to FVXLs, etc. obtained by the above method. Stated differently, SWLD extractor 403 may further extract, from input three-dimensional data 411, data corresponding to an object having a predetermined attribute as extracted three-dimensional data 412.

Also, that a VXL, a VLM, a SPC, or a GOS is necessary for such intended usage may be labeled separately from the features. The server may separately hold, as an upper layer of a SWLD (e.g., a lane world), FVXLs of a signal or an intersection, etc. necessary for self-location estimation, driving assist, or self-driving, etc.

The server may also add an attribute to VXLs in a WLD on a random access basis or on a predetermined unit basis. An attribute, for example, includes information indicating whether VXLs are necessary for self-location estimation, or information indicating whether VXLs are important as traffic information such as a signal, or an intersection, etc. An attribute may also include a correspondence between VXLs and features (intersection, or road, etc.) in lane information (geographic data files (GDF), etc.).

A method as described below may be used to update a WLD or a SWLD.

Update information indicating changes, etc. in a person, a roadwork, or a tree line (for trucks) is uploaded to the server as point clouds or meta data. The server updates a WLD on the basis of such uploaded information, and then updates a SWLD by use of the updated WLD.

The client, when detecting a mismatch between the three-dimensional information such client has generated at the time of self-location estimation and the three-dimensional information received from the server, may send to the server the three-dimensional information such client has generated, together with an update notification. In such a case, the server updates the SWLD by use of the WLD. When the SWLD is not to be updated, the server judges that the WLD itself is old.

In the above description, information that distinguishes whether an encoded stream is that of a WLD or a SWLD is added as header information of the encoded stream. However, when there are many types of worlds such as a mesh world and a lane world, information that distinguishes these types of the worlds may be added to header information. Also, when there are many SWLDs with different amounts of features, information that distinguishes the respective SWLDs may be added to header information.

In the above description, a SWLD is constituted by FVXLs, but a SWLD may include VXLs that have not been judged as FVXLs. For example, a SWLD may include an adjacent VXL used to calculate the feature of a FVXL. This enables the client to calculate the feature of a FVXL, when receiving a SWLD, even in the case where feature information is not added to each FVXL of the SWLD. In such a case, the SWLD may include information that distinguishes whether each VXL is a FVXL or a VXL.

As described above, three-dimensional data encoding device 400 extracts, from input three-dimensional data 411 (first three-dimensional data), extracted three-dimensional data 412 (second three-dimensional data) having an amount of a feature greater than or equal to a threshold, and encodes extracted three-dimensional data 412 to generate encoded three-dimensional data 414 (first encoded three-dimensional data).

This three-dimensional data encoding device 400 generates encoded three-dimensional data 414 that is obtained by encoding data having an amount of a feature greater than or equal to the threshold. This reduces the amount of data compared to the case where input three-dimensional data 411 is encoded as it is. Three-dimensional data encoding device 400 is thus capable of reducing the amount of data to be transmitted.

Three-dimensional data encoding device 400 further encodes input three-dimensional data 411 to generate encoded three-dimensional data 413 (second encoded three-dimensional data).

This three-dimensional data encoding device 400 enables selective transmission of encoded three-dimensional data 413 and encoded three-dimensional data 414, in accordance, for example, with the intended use, etc.

Also, extracted three-dimensional data 412 is encoded by a first encoding method, and input three-dimensional data 411 is encoded by a second encoding method different from the first encoding method.

This three-dimensional data encoding device 400 enables the use of an encoding method suitable for each of input three-dimensional data 411 and extracted three-dimensional data 412.

Also, of intra prediction and inter prediction, the inter prediction is more preferentially performed in the first encoding method than in the second encoding method.

This three-dimensional data encoding device 400 enables inter prediction to be more preferentially performed on extracted three-dimensional data 412 in which adjacent data items are likely to have low correlation.

Also, the first encoding method and the second encoding method represent three-dimensional positions differently. For example, the second encoding method represents three-dimensional positions by octree, and the first encoding method represents three-dimensional positions by three-dimensional coordinates.

This three-dimensional data encoding device 400 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Stated differently, such identifier indicates whether the encoded three-dimensional data is encoded three-dimensional data 413 of a WLD or encoded three-dimensional data 414 of a SWLD.

This enables the decoding device to readily judge whether the obtained encoded three-dimensional data is encoded three-dimensional data 413 or encoded three-dimensional data 414.

Also, three-dimensional data encoding device 400 encodes extracted three-dimensional data 412 in a manner that encoded three-dimensional data 414 has a smaller data amount than a data amount of encoded three-dimensional data 413.

This three-dimensional data encoding device 400 enables encoded three-dimensional data 414 to have a smaller data amount than the data amount of encoded three-dimensional data 413.

Also, three-dimensional data encoding device 400 further extracts data corresponding to an object having a predetermined attribute from input three-dimensional data 411 as extracted three-dimensional data 412. The object having a predetermined attribute is, for example, an object necessary for self-location estimation, driving assist, or self-driving, etc., or more specifically, a signal, an intersection, etc.

This three-dimensional data encoding device 400 is capable of generating encoded three-dimensional data 414 that includes data required by the decoding device.

Also, three-dimensional data encoding device 400 (server) further sends, to a client, one of encoded three-dimensional data 413 and encoded three-dimensional data 414 in accordance with a status of the client.

This three-dimensional data encoding device 400 is capable of sending appropriate data in accordance with the status of the client.

Also, the status of the client includes one of a communication condition (e.g., network bandwidth) of the client and a traveling speed of the client.

Also, three-dimensional data encoding device 400 further sends, to a client, one of encoded three-dimensional data 413 and encoded three-dimensional data 414 in accordance with a request from the client.

This three-dimensional data encoding device 400 is capable of sending appropriate data in accordance with the request from the client.

Also, three-dimensional data decoding device 500 according to the present embodiment decodes encoded three-dimensional data 413 or encoded three-dimensional data 414 generated by three-dimensional data encoding device 400 described above.

Stated differently, three-dimensional data decoding device 500 decodes, by a first decoding method, encoded three-dimensional data 414 obtained by encoding extracted three-dimensional data 412 having an amount of a feature greater than or equal to a threshold, extracted three-dimensional data 412 having been extracted from input three-dimensional data 411. Three-dimensional data decoding device 500 also decodes, by a second decoding method, encoded three-dimensional data 413 obtained by encoding input three-dimensional data 411, the second decoding method being different from the first decoding method.

This three-dimensional data decoding device 500 enables selective reception of encoded three-dimensional data 414 obtained by encoding data having an amount of a feature greater than or equal to the threshold and encoded three-dimensional data 413, in accordance, for example, with the intended use, etc. Three-dimensional data decoding device 500 is thus capable of reducing the amount of data to be transmitted. Such three-dimensional data decoding device 500 further enables the use of a decoding method suitable for each of input three-dimensional data 411 and extracted three-dimensional data 412.

Also, of intra prediction and inter prediction, the inter prediction is more preferentially performed in the first decoding method than in the second decoding method.

This three-dimensional data decoding device 500 enables inter prediction to be more preferentially performed on the extracted three-dimensional data in which adjacent data items are likely to have low correlation.

Also, the first decoding method and the second decoding method represent three-dimensional positions differently.

For example, the second decoding method represents three-dimensional positions by octree, and the first decoding method represents three-dimensional positions by three-dimensional coordinates.

This three-dimensional data decoding device 500 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Three-dimensional data decoding device 500 refers to such identifier in identifying between encoded three-dimensional data 413 and encoded three-dimensional data 414.

This three-dimensional data decoding device 500 is capable of readily judging whether the obtained encoded three-dimensional data is encoded three-dimensional data 413 or encoded three-dimensional data 414.

Three-dimensional data decoding device 500 further notifies a server of a status of the client (three-dimensional data decoding device 500). Three-dimensional data decoding device 500 receives one of encoded three-dimensional data 413 and encoded three-dimensional data 414 from the server, in accordance with the status of the client.

This three-dimensional data decoding device 500 is capable of receiving appropriate data in accordance with the status of the client.

Also, the status of the client includes one of a communication condition (e.g., network bandwidth) of the client and a traveling speed of the client.

Three-dimensional data decoding device 500 further makes a request of the server for one of encoded three-dimensional data 413 and encoded three-dimensional data 414, and receives one of encoded three-dimensional data 413 and encoded three-dimensional data 414 from the server, in accordance with the request.

This three-dimensional data decoding device 500 is capable of receiving appropriate data in accordance with the intended use.

Embodiment 3

The present embodiment will describe a method of transmitting/receiving three-dimensional data between vehicles. For example, the three-dimensional data is transmitted/received between the own vehicle and the nearby vehicle.

Figure 24:
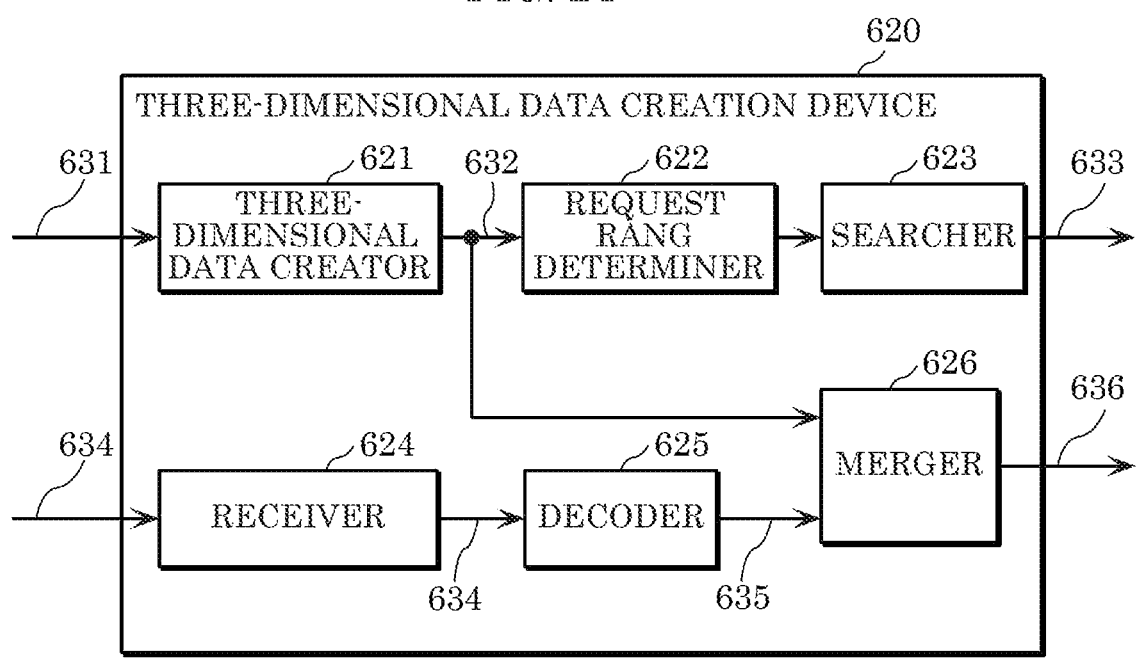
FIG. 24 is a block diagram of a three-dimensional data creation device according to Embodiment 3.

FIG. 24 is a block diagram of three-dimensional data creation device 620 according to the present embodiment. Such three-dimensional data creation device 620, which is included, for example, in the own vehicle, mergers first three-dimensional data 632 created by three-dimensional data creation device 620 with the received second three-dimensional data 635, thereby creating third three-dimensional data 636 having a higher density.

Such three-dimensional data creation device 620 includes three-dimensional data creator 621, request range determiner 622, searcher 623, receiver 624, decoder 625, and merger 626.

First, three-dimensional data creator 621 creates first three-dimensional data 632 by use of sensor information 631 detected by the sensor included in the own vehicle. Next, request range determiner 622 determines a request range, which is the range of a three-dimensional space, the data on which is insufficient in the created first three-dimensional data 632.

Next, searcher 623 searches for the nearby vehicle having the three-dimensional data of the request range, and sends request range information 633 indicating the request range to nearby vehicle 601 having been searched out (S623). Next, receiver 624 receives encoded three-dimensional data 634, which is an encoded stream of the request range, from nearby vehicle 601 (S624). Note that searcher 623 may indiscriminately send requests to vehicles included in a specified range to receive encoded three-dimensional data 634 from a vehicle that has responded to the request. Searcher 623 may send a request not only to vehicles but also to an object such as a signal and a sign, and receive encoded three-dimensional data 634 from the object.

Next, decoder 625 decodes the received encoded three-dimensional data 634, thereby obtaining second three-dimensional data 635. Next, merger 626 merges first three-dimensional data 632 with second three-dimensional data 635, thereby creating three-dimensional data 636 having a higher density.

Figure 25:
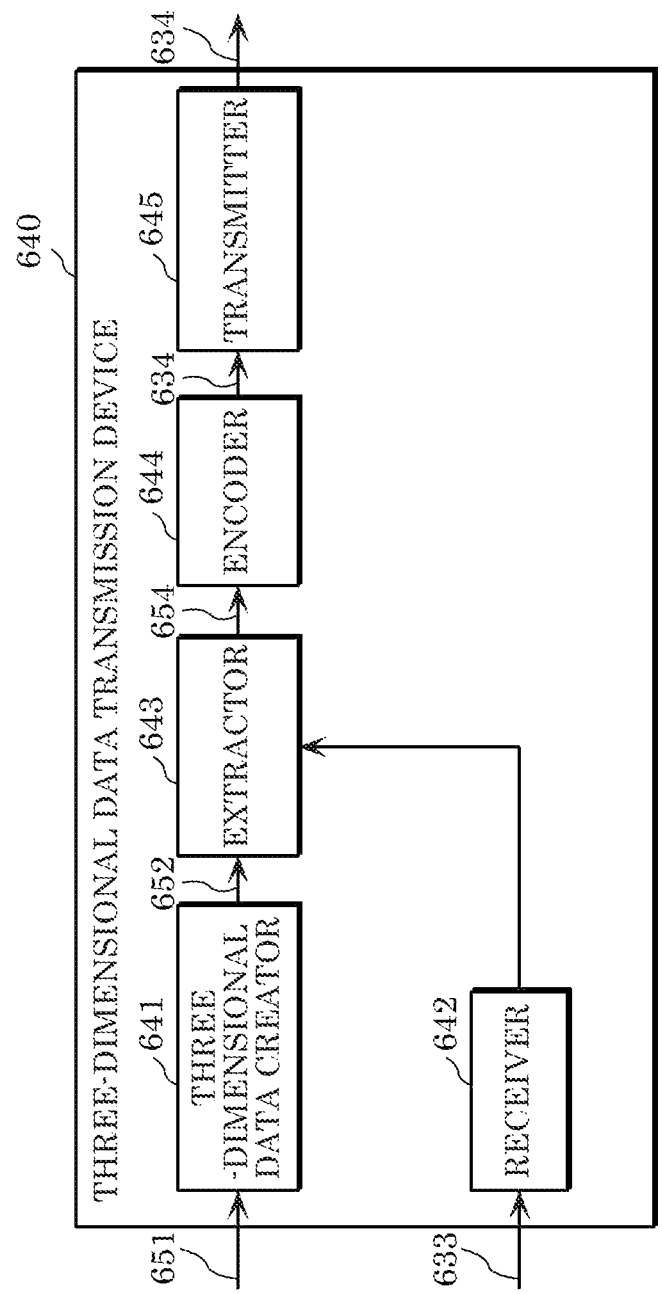
FIG. 25 is a block diagram of a three-dimensional data transmission device according to Embodiment 3.

Next, the structure and operations of three-dimensional data transmission device 640 according to the present embodiment will be described. FIG. 25 is a block diagram of three-dimensional data transmission device 640.

Three-dimensional data transmission device 640 is included, for example, in the above-described nearby vehicle. Three-dimensional data transmission device 640 processes fifth three-dimensional data 652 created by the nearby vehicle into sixth three-dimensional data 654 requested by the own vehicle, encodes sixth three-dimensional data 654 to generate encoded three-dimensional data 634, and sends encoded three-dimensional data 634 to the own vehicle.

Three-dimensional data transmission device 640 includes three-dimensional data creator 641, receiver 642, extractor 643, encoder 644, and transmitter 645.

First, three-dimensional data creator 641 creates fifth three-dimensional data 652 by use of sensor information 651 detected by the sensor included in the nearby vehicle. Next, receiver 642 receives request range information 633 from the own vehicle.

Next, extractor 643 extracts from fifth three-dimensional data 652 the three-dimensional data of the request range indicated by request range information 633, thereby processing fifth three-dimensional data 652 into sixth three-dimensional data 654. Next, encoder 644 encodes sixth three-dimensional data 654 to generate encoded three-dimensional data 643, which is an encoded stream. Then, transmitter 645 sends encoded three-dimensional data 634 to the own vehicle.

Note that although an example case is described here in which the own vehicle includes three-dimensional data creation device 620 and the nearby vehicle includes three-dimensional data transmission device 640, each of the vehicles may include the functionality of both three-dimensional data creation device 620 and three-dimensional data transmission device 640.

Embodiment 4

The present embodiment describes operations performed in abnormal cases when self-location estimation is performed on the basis of a three-dimensional map.

A three-dimensional map is expected to find its expanded use in self-driving of a vehicle and autonomous movement, etc. of a mobile object such as a robot and a flying object (e.g., a drone). Example means for enabling such autonomous movement include a method in which a mobile object travels in accordance with a three-dimensional map, while estimating its self-location on the map (self-location estimation).

The self-location estimation is enabled by matching a three-dimensional map with three-dimensional information on the surrounding of the own vehicle (hereinafter referred to as self-detected three-dimensional data) obtained by a sensor equipped in the own vehicle, such as a rangefinder (e.g., a LiDAR) and a stereo camera to estimate the location of the own vehicle on the three-dimensional map.

As in the case of an HD map suggested by HERE Technologies, for example, a three-dimensional map may include not only a three-dimensional point cloud, but also two-dimensional map data such as information on the shapes of roads and intersections, or information that changes in real-time such as information on a traffic jam and an accident. A three-dimensional map includes a plurality of layers such as layers of three-dimensional data, two-dimensional data, and meta-data that changes in real-time, from among which the device can obtain or refer to only necessary data.

Point cloud data may be a SWLD as described above, or may include point cloud data that is different from keypoints. The transmission/reception of point cloud data is basically carried out in one or more random access units.

A method described below is used as a method of matching a three-dimensional map with self-detected three-dimensional data. For example, the device compares the shapes of the point clouds in each other's point clouds, and determines that portions having a high degree of similarity among keypoints correspond to the same position. When the three-dimensional map is formed by a SWLD, the device also performs matching by comparing the keypoints that form the SWLD with three-dimensional keypoints extracted from the self-detected three-dimensional data.

Here, to enable highly accurate self-location estimation, the following needs to be satisfied: (A) the three-dimensional map and the self-detected three-dimensional data have been already obtained; and (B) their accuracies satisfy a predetermined requirement. However, one of (A) and (B) cannot be satisfied in abnormal cases such as ones described below.

1. A three-dimensional map is unobtainable over communication.

2. A three-dimensional map is not present, or a three-dimensional map having been obtained is corrupt.

3. A sensor of the own vehicle has trouble, or the accuracy of the generated self-detected three-dimensional data is inadequate due to bad weather.

The following describes operations to cope with such abnormal cases. The following description illustrates an example case of a vehicle, but the method described below is applicable to mobile objects on the whole that are capable of autonomous movement, such as a robot and a drone.

Figure 26:
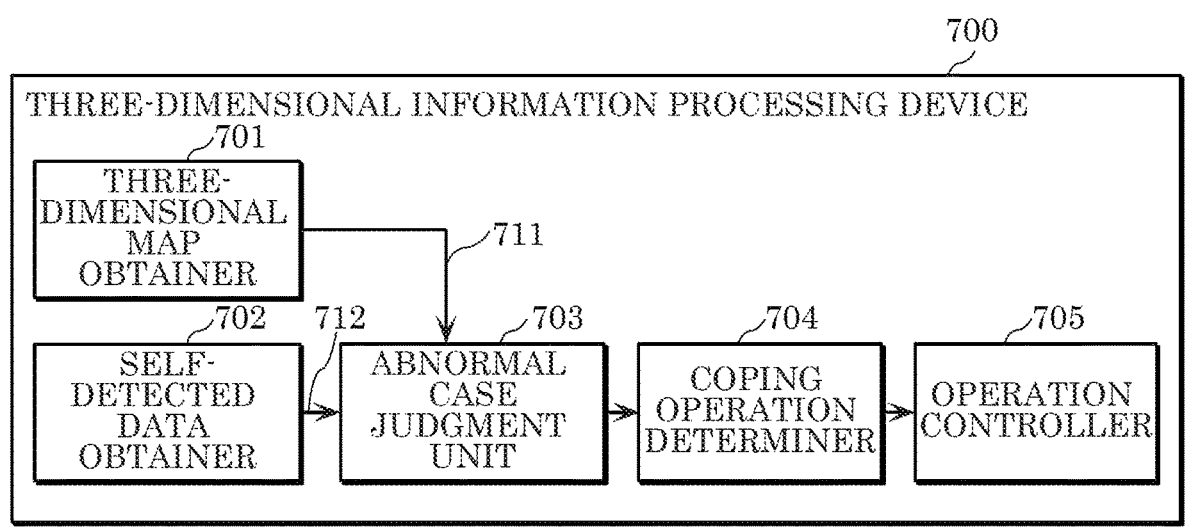
FIG. 26 is a block diagram of a three-dimensional information processing device according to Embodiment 4.

The following describes the structure of the three-dimensional information processing device and its operation according to the present embodiment capable of coping with abnormal cases regarding a three-dimensional map or self-detected three-dimensional data. FIG. 26 is a block diagram of an example structure of three-dimensional information processing device 700 according to the present embodiment.

Three-dimensional information processing device 700 is equipped, for example, in a mobile object such as a car. As shown in FIG. 26, three-dimensional information processing device 700 includes three-dimensional map obtainer 701, self-detected data obtainer 702, abnormal case judgment unit 703, coping operation determiner 704, and operation controller 705.

Note that three-dimensional information processing device 700 may include a non-illustrated two-dimensional or one-dimensional sensor that detects a structural object or a mobile object around the own vehicle, such as a camera capable of obtaining two-dimensional images and a sensor for one-dimensional data utilizing ultrasonic or laser. Three-dimensional information processing device 700 may also include a non-illustrated communication unit that obtains a three-dimensional map over a mobile communication network, such as 4G and 5G, or via inter-vehicle communication or road-to-vehicle communication.

Three-dimensional map obtainer 701 obtains three-dimensional map 711 of the surroundings of the traveling route. For example, three-dimensional map obtainer 701 obtains three-dimensional map 711 over a mobile communication network, or via inter-vehicle communication or road-to-vehicle communication.

Next, self-detected data obtainer 702 obtains self-detected three-dimensional data 712 on the basis of sensor information. For example, self-detected data obtainer 702 generates self-detected three-dimensional data 712 on the basis of the sensor information obtained by a sensor equipped in the own vehicle.

Next, abnormal case judgment unit 703 conducts a predetermined check of at least one of obtained three-dimensional map 711 and self-detected three-dimensional data 712 to detect an abnormal case. Stated differently, abnormal case judgment unit 703 judges whether at least one of obtained three-dimensional map 711 and self-detected three-dimensional data 712 is abnormal.

When the abnormal case is detected, coping operation determiner 704 determines a coping operation to cope with such abnormal case. Next, operation controller 705 controls the operation of each of the processing units necessary to perform the coping operation.

Meanwhile, when no abnormal case is detected, three-dimensional information processing device 700 terminates the process.

Also, three-dimensional information processing device 700 estimates the location of the vehicle equipped with three-dimensional information processing device 700, using three-dimensional map 711 and self-detected three-dimensional data 712. Next, three-dimensional information processing device 700 performs the automatic operation of the vehicle by use of the estimated location of the vehicle.

As described above, three-dimensional information processing device 700 obtains, via a communication channel, map data (three-dimensional map 711) that includes first three-dimensional position information. The first three-dimensional position information includes, for example, a plurality of random access units, each of which is an assembly of at least one subspace and is individually decodable, the at least one subspace having three-dimensional coordinates information and serving as a unit in which each of the plurality of random access units is encoded. The first three-dimensional position information is, for example, data (SWLD) obtained by encoding keypoints, each of which has an amount of a three-dimensional feature greater than or equal to a predetermined threshold.

Three-dimensional information processing device 700 also generates second three-dimensional position information (self-detected three-dimensional data 712) from information detected by a sensor. Three-dimensional information processing device 700 then judges whether one of the first three-dimensional position information and the second three-dimensional position information is abnormal by performing, on one of the first three-dimensional position information and the second three-dimensional position information, a process of judging whether an abnormality is present.

Three-dimensional information processing device 700 determines a coping operation to cope with the abnormality when one of the first three-dimensional position information and the second three-dimensional position information is judged to be abnormal. Three-dimensional information processing device 700 then executes a control that is required to perform the coping operation.

This structure enables three-dimensional information processing device 700 to detect an abnormality regarding one of the first three-dimensional position information and the second three-dimensional position information, and to perform a coping operation therefor.

Embodiment 5

The present embodiment describes a method, etc. of transmitting three-dimensional data to a following vehicle.

Figure 27:
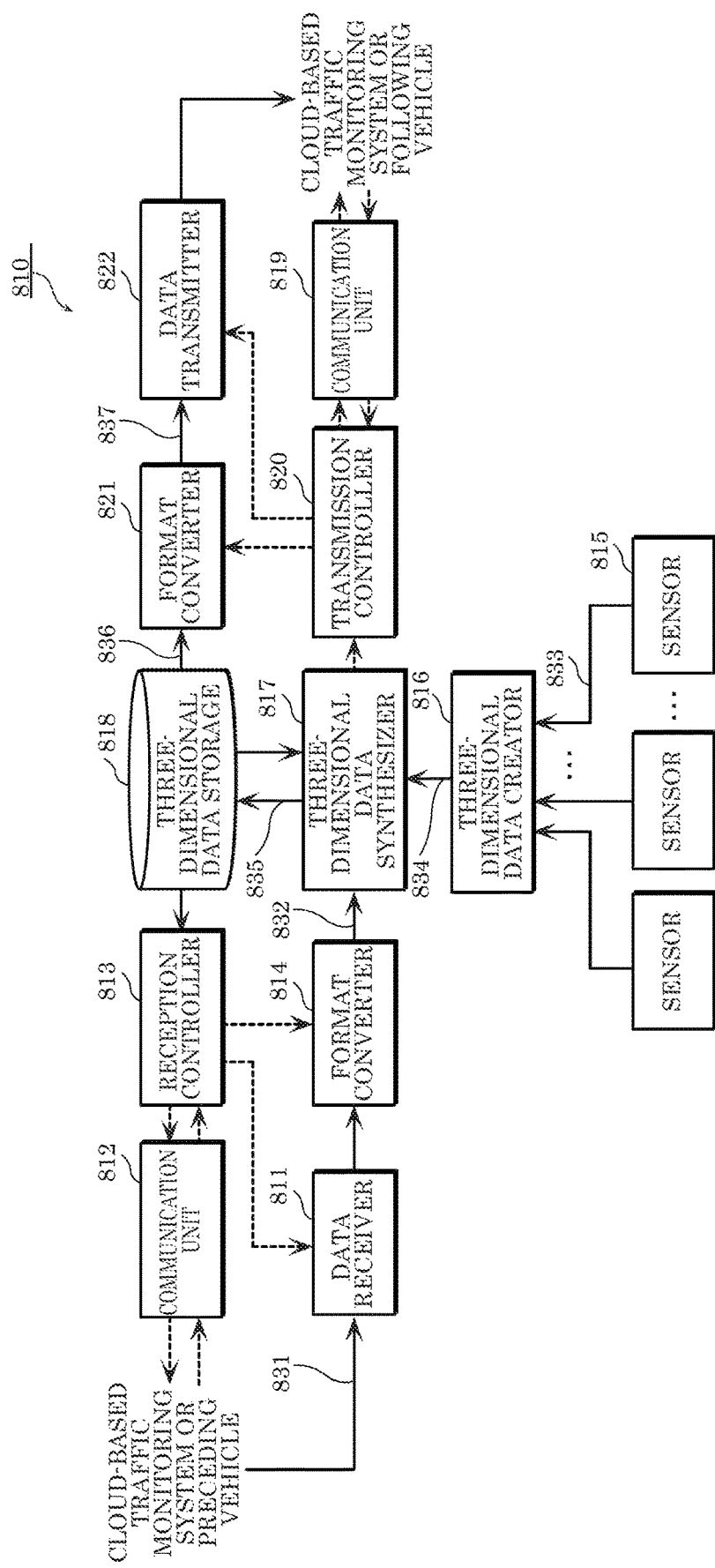
FIG. 27 is a block diagram of a three-dimensional data creation device according to Embodiment 5.

FIG. 27 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point cloud data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Embodiment 6

In embodiment 5, an example is described in which a client device of a vehicle or the like transmits three-dimensional data to another vehicle or a server such as a cloud-based traffic monitoring system. In the present embodiment, a client device transmits sensor information obtained through a sensor to a server or a client device.

Figure 28:
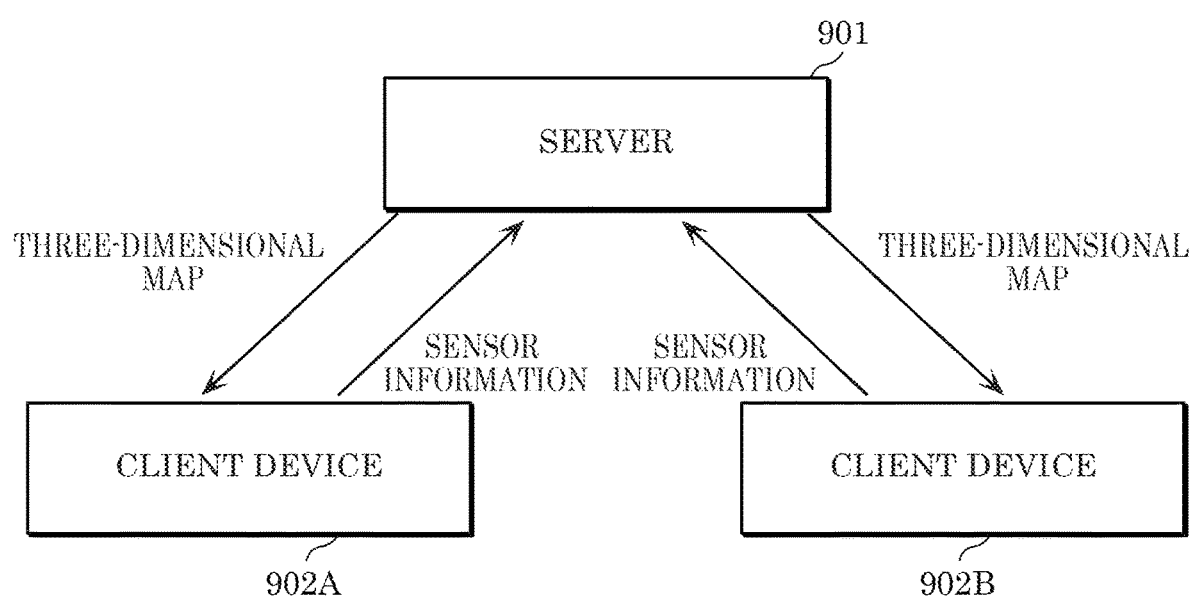
FIG. 28 is a diagram showing a structure of a system according to Embodiment 6.

A structure of a system according to the present embodiment will first be described. FIG. 28 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information Obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device

902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 29:
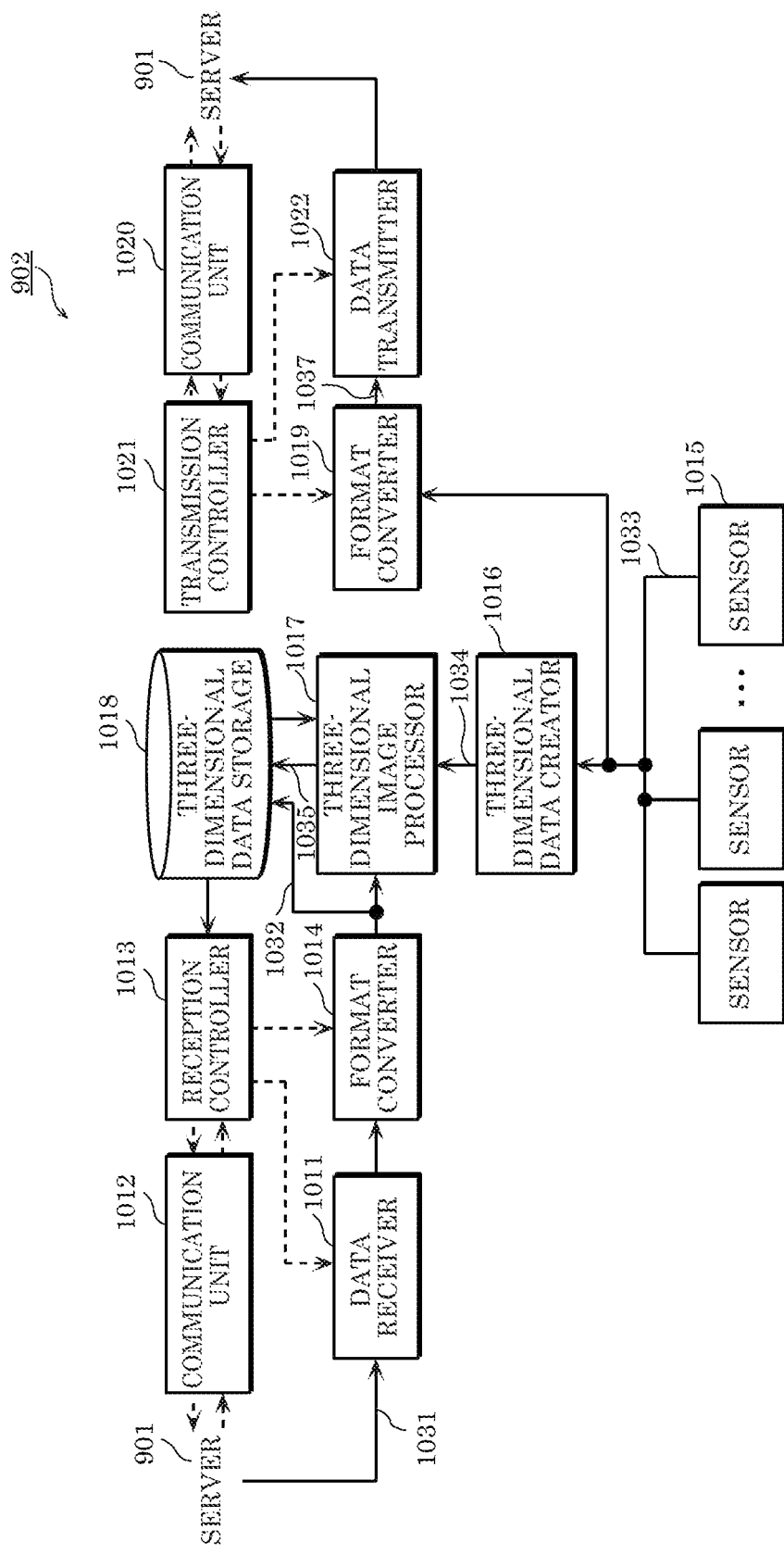
FIG. 29 is a block diagram of a client device according to Embodiment 6.

FIG. 29 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g. transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 815 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point cloud data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 30:
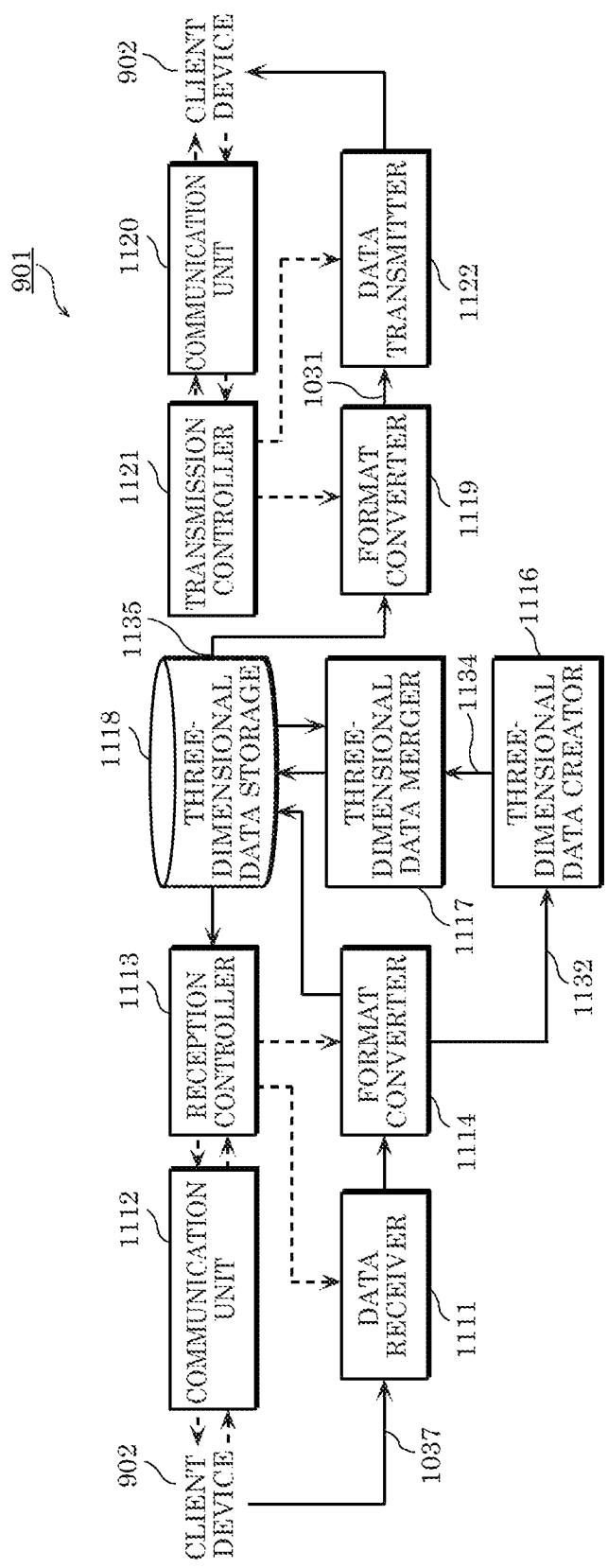
FIG. 30 is a block diagram of a server according to Embodiment 6.

A structure of server 901 will be described next. FIG. 30 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g. transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

Figure 31:
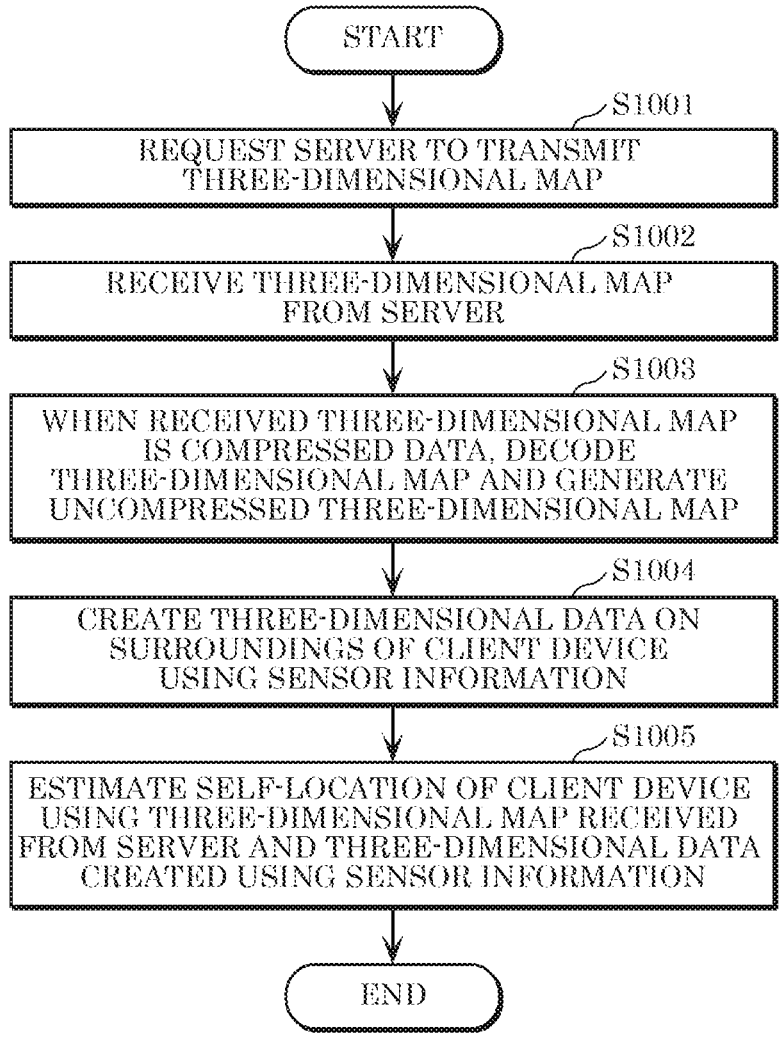
FIG. 31 is a flowchart of a three-dimensional data creation process performed by the client device according to Embodiment 6.

An operational flow of client device 902 will be described next. FIG. 31 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

Figure 32:
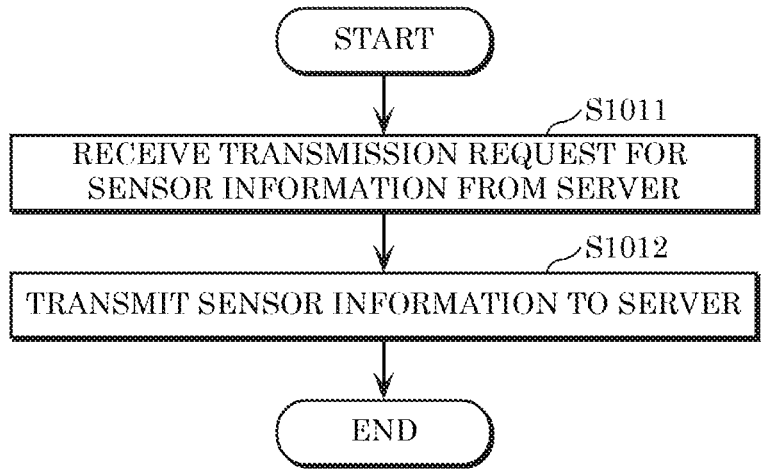
FIG. 32 is a flowchart of a sensor information transmission process performed by the client device according to Embodiment 6.

FIG. 32 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 33:
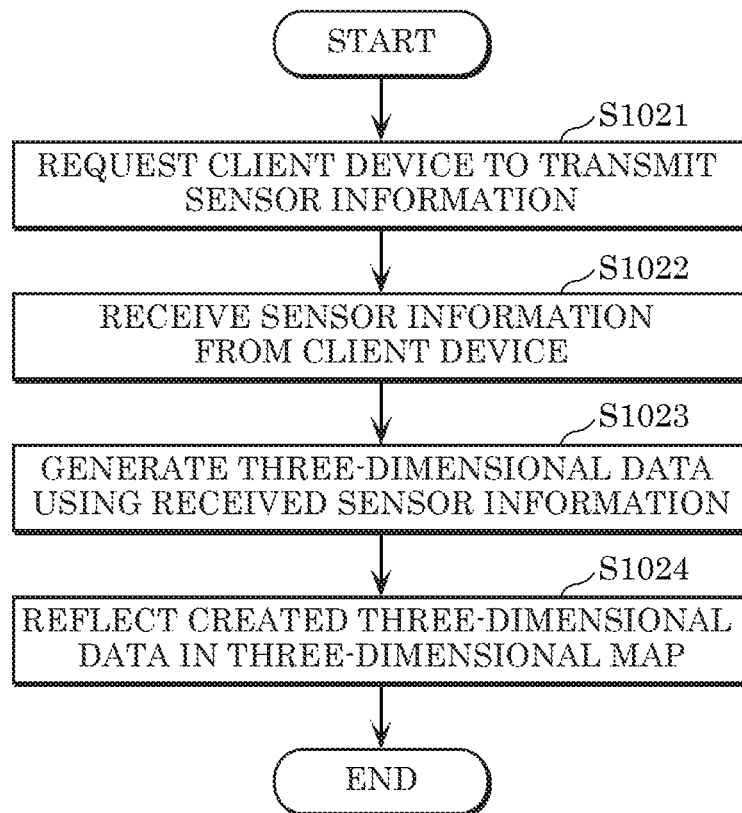
FIG. 33 is a flowchart of a three-dimensional data creation process performed by the server according to Embodiment 6.

An operational flow of server 901 will be described next. FIG. 33 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 34:
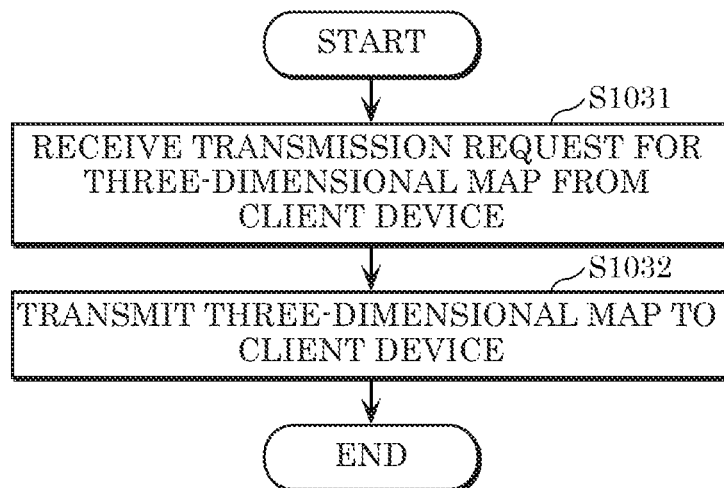
FIG. 34 is a flowchart of a three-dimensional map transmission process performed by the server according to Embodiment 6.

FIG. 34 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

Hereinafter, variations of the present embodiment will be described.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is Obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 35:
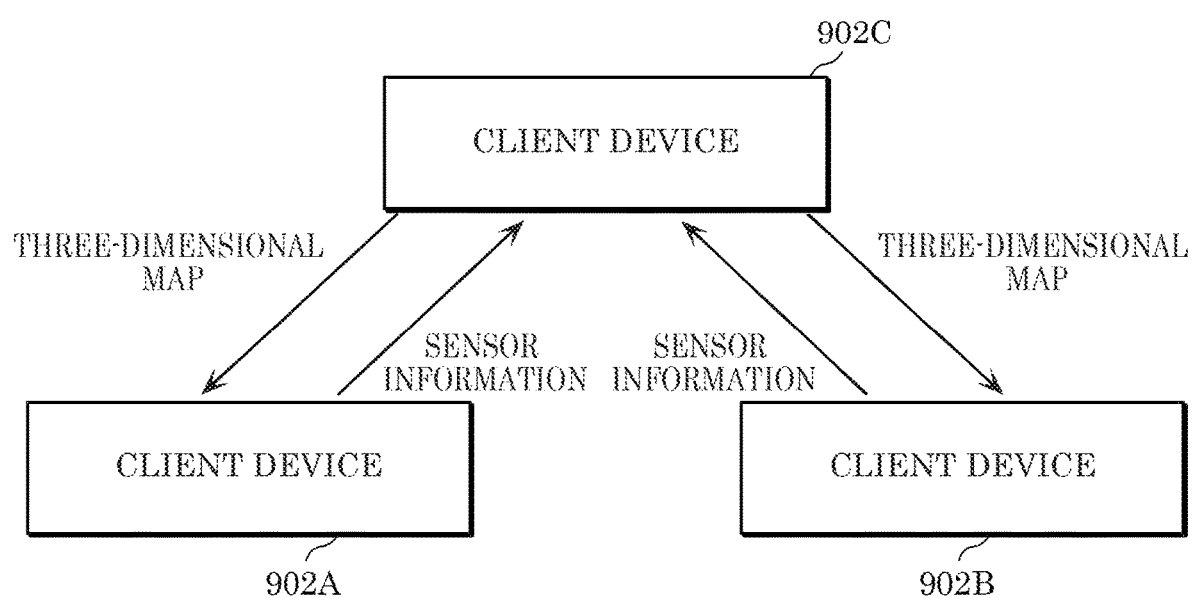
FIG. 35 is a diagram showing a structure of a variation of the system according to Embodiment 6.
Figure 36:
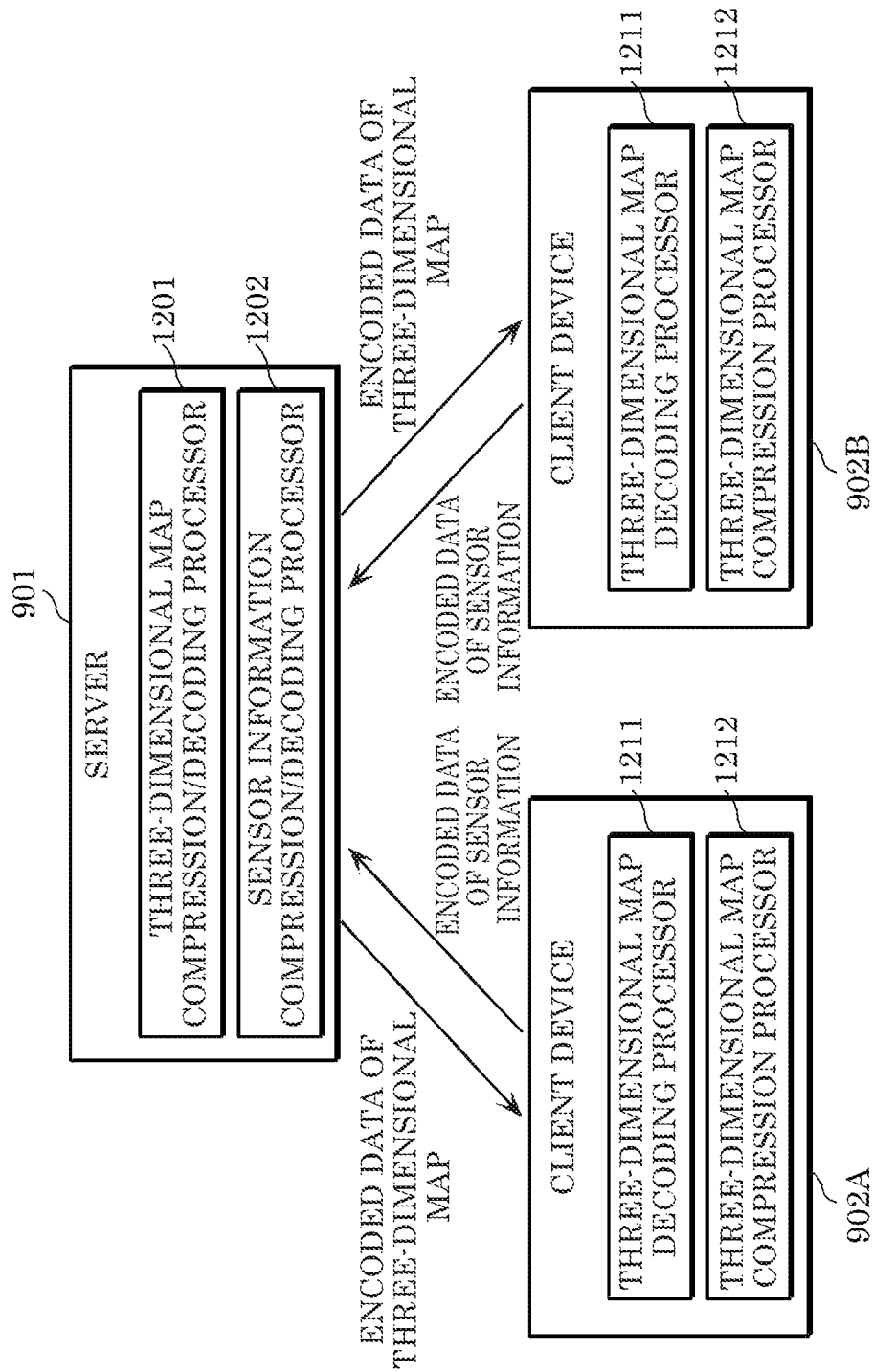
FIG. 36 is a diagram showing a structure of the server and client devices according to Embodiment 6.

Server 901 is not limited to only being a server such as a cloud-based traffic monitoring system, and may also be another (vehicle-mounted) client device. FIG. 35 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figures 85, 86:
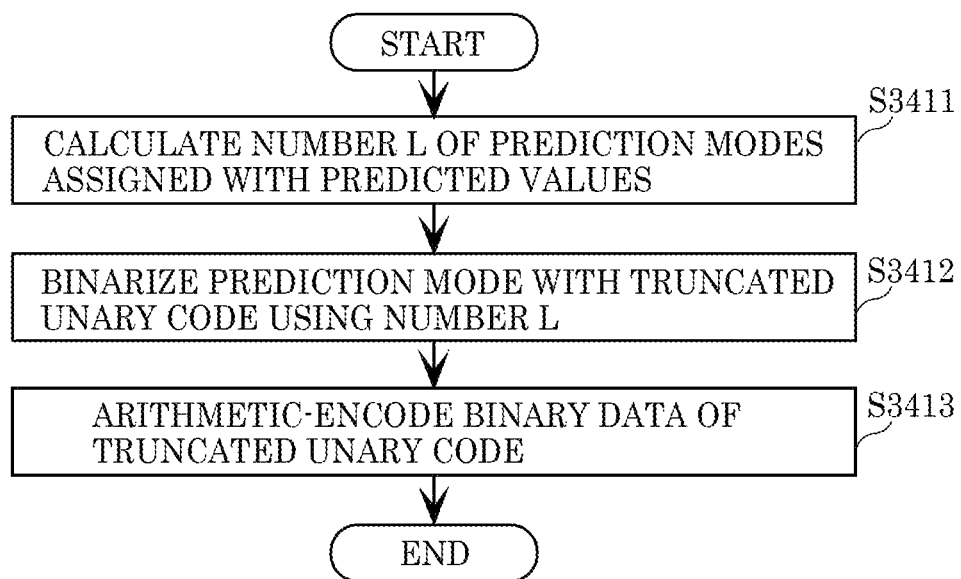
FIG. 85 is a diagram for describing an example of encoding binary data in the binarization table in binarizing and encoding the prediction modes according to Embodiment 9.
FIG. 86 is flowchart of another example of encoding a prediction mode value according to Embodiment 9.

FIG. 86 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits obtained sensor information 1033 to server 901 or another mobile object.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1034 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another mobile object 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Embodiment 7

In the present embodiment, three-dimensional data encoding and decoding methods using an inter prediction process will be described.

Figure 37:
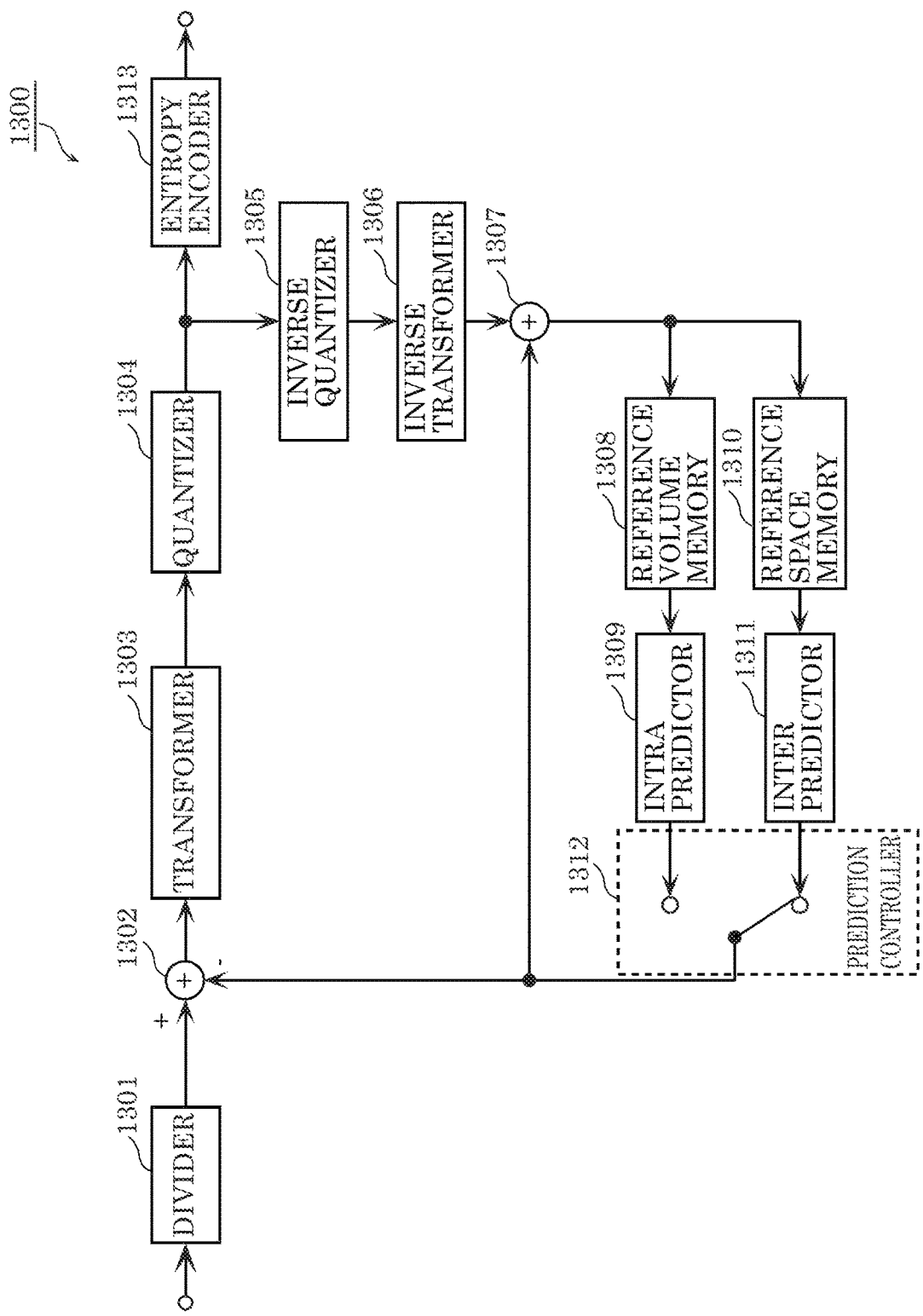
FIG. 37 is a block diagram of a three-dimensional data encoding device according to Embodiment 7.

FIG. 37 is a block diagram of three-dimensional data encoding device 1300 according to the present embodiment. This three-dimensional data encoding device 1300 generates an encoded bitstream (hereinafter, also simply referred to as bitstream) that is an encoded signal, by encoding three-dimensional data. As illustrated in FIG. 37, three-dimensional data encoding device 1300 includes divider 1301, subtractor 1302, transformer 1303, quantizer 1304, inverse quantizer 1305, inverse transformer 1306, adder 1307, reference volume memory 1308, intra predictor 1309, reference space memory 1310, inter predictor 1311, prediction controller 1312, and entropy encoder 1313.

Divider 1301 divides a plurality of volumes (VLMs) that are encoding units of each space (SPC) included in the three-dimensional data. Divider 1301 makes an octree representation (make into an octree) of voxels in each volume. Note that divider 1301 may make the spaces into an octree representation with the spaces having the same size as the volumes. Divider 1301 may also append information (depth information, etc.) necessary for making the octree representation to a header and the like of a bitstream.

Figure 38:
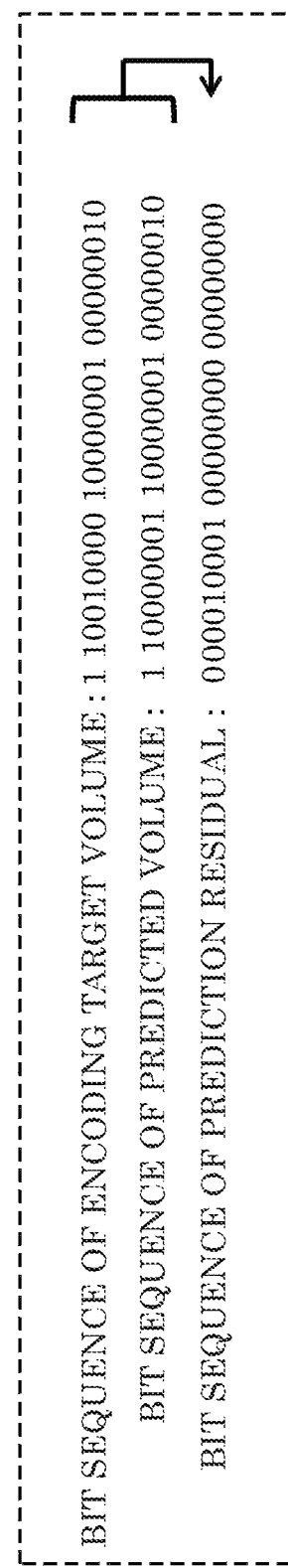
FIG. 38 is a diagram showing an example of a prediction residual according to Embodiment 7.

Subtractor 1302 calculates a difference between a volume (encoding target volume) outputted by divider 1301 and a predicted volume generated through infra prediction or inter prediction, which will be described later, and outputs the calculated difference to transformer 1303 as a prediction residual. FIG. 38 is a diagram showing an example calculation of the prediction residual. Note that bit sequences of the encoding target volume and the predicted volume shown here are, for example, position information indicating positions of three-dimensional points included in the volumes.

Figure 39:
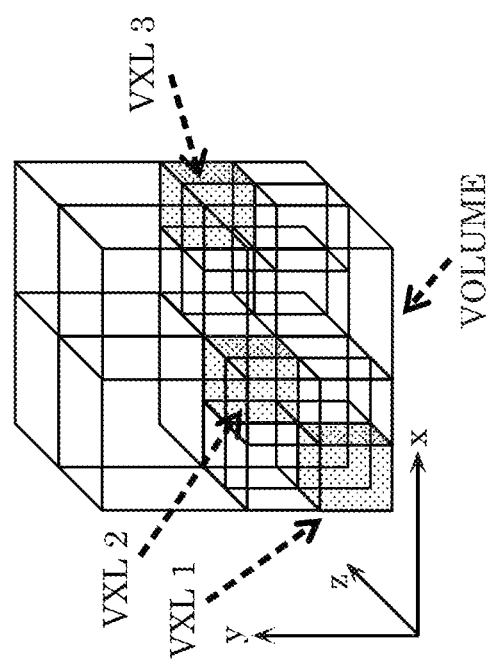
FIG. 39 is a diagram showing an example of a volume according to Embodiment 7.
Figure 40:
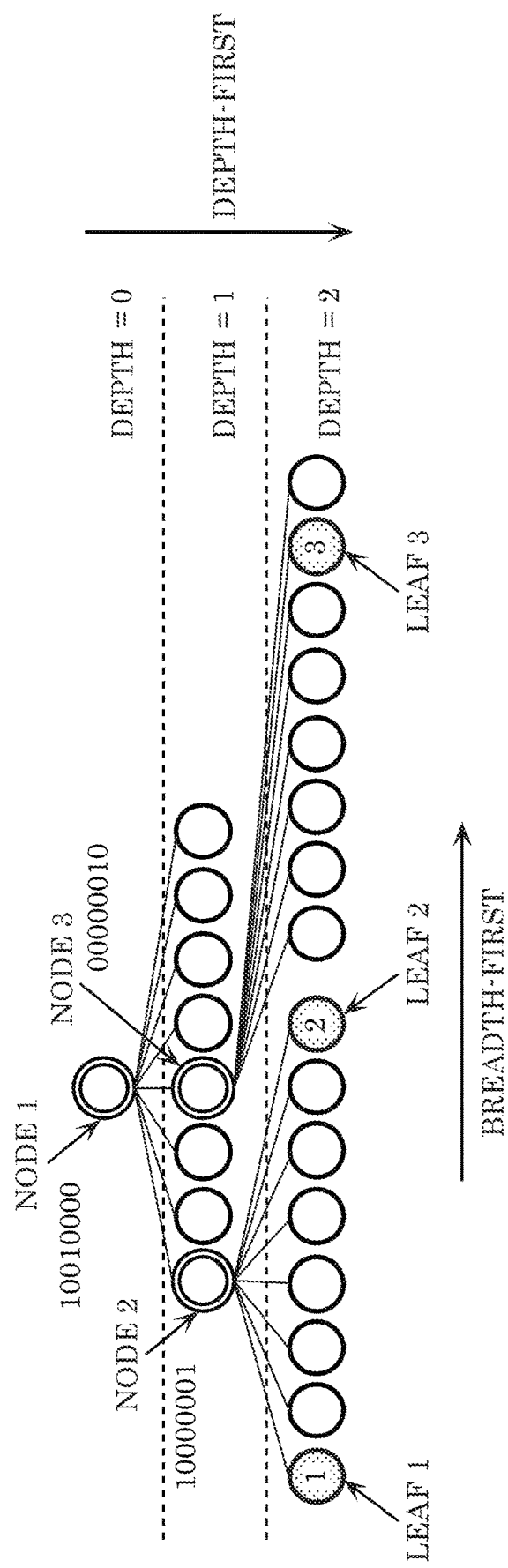
FIG. 40 is a diagram showing an example of an octree representation of the volume according to Embodiment 7.

Hereinafter, a scan order of an octree representation and voxels will be described. A volume is encoded after being converted into an octree structure (made into an octree). The octree structure includes nodes and leaves. Each node has eight nodes or leaves, and each leaf has voxel (VXL) information. FIG. 39 is a diagram showing an example structure of a volume including voxels. FIG. 40 is a diagram showing an example of the volume shown in FIG. 39 having been converted into the octree structure. Among the leaves shown in FIG. 40, leaves 1, 2, and 3 respectively represent VXL 1, VXL 2, and VXL 3, and represent VXLs including a point cloud (hereinafter, active VXLs).

An octree is represented by, for example, binary sequences of 1s and 0s. For example, when giving the nodes or the active VXLs a value of 1 and everything else a value of 0, each node and leaf is assigned with the binary sequence shown in FIG. 40. Thus, this binary sequence is scanned in accordance with a breadth-first or a depth-first scan order. For example, when scanning breadth-first, the binary sequence shown in A of FIG. 41 is obtained. When scanning depth-first, the binary sequence shown in B of FIG. 41 is obtained. The binary sequences obtained through this scanning are encoded through entropy encoding, which reduces an amount of information.

Depth information in the octree representation will be described next. Depth in the octree representation is used in order to control up to how fine a granularity point cloud information included in a volume is stored. Upon setting a great depth, it is possible to reproduce the point cloud information to a more precise level, but an amount of data for representing the nodes and leaves increases. Upon setting a small depth, however, the amount of data decreases, but some information that the point cloud information originally held is lost, since pieces of point cloud information including different positions and different colors are now considered as pieces of point cloud information including the same position and the same color.

Figure 42:
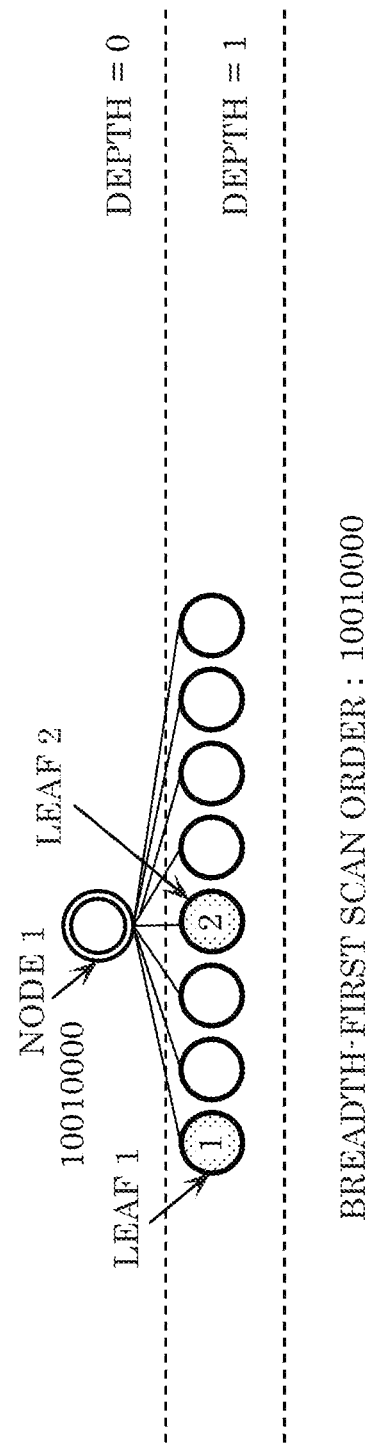
FIG. 42 is a diagram showing an example of an octree representation of a volume according to Embodiment 7.

For example, FIG. 42 is a diagram showing an example in which the octree with a depth of 2 shown in FIG. 40 is represented with a depth of 1. The octree shown in FIG. 42 has a lower amount of data than the octree shown in FIG. 40. In other words, the binarized octree shown in FIG. 42 has a lower bit count than the octree shown in FIG. 40. Leaf 1 and leaf 2 shown in FIG. 40 are represented by leaf 1 shown in FIG. 41. In other words, the information on leaf 1 and leaf 2 being in different positions is lost.

Figure 43:
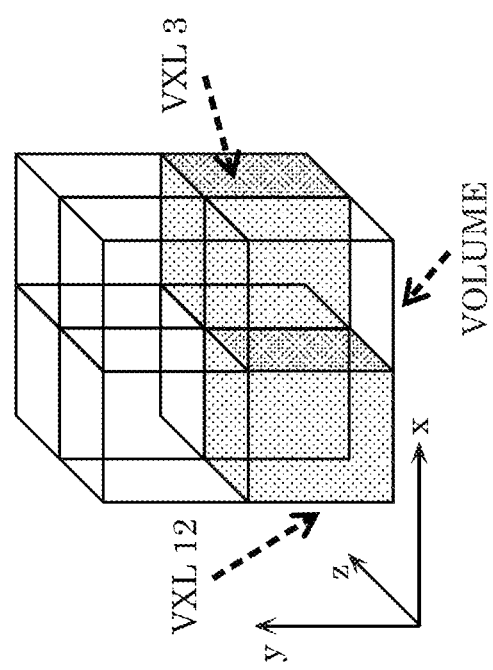
FIG. 43 is a diagram showing an example of the volume according to Embodiment 7.

FIG. 43 is a diagram showing a volume corresponding to the octree shown in FIG. 42. VXL 1 and VXL 2 shown in FIG. 39 correspond to VXL 12 shown in FIG. 43. In this case, three-dimensional data encoding device 1300 generates color information of VXL 12 shown in FIG. 43 using color information of VXL 1 and VXL 2 shown in FIG. 39. For example, three-dimensional data encoding device 1300 calculates an average value, a median, a weighted average value, or the like of the color information of VXL 1 and VXL 2 as the color information of VXL 12. In this manner, three-dimensional data encoding device 1300 may control a reduction of the amount of data by changing the depth of the octree.

Three-dimensional data encoding device 1300 may set the depth information of the octree to units of worlds, units of spaces, or units of volumes. In this case, three-dimensional data encoding device 1300 may append the depth information to header information of the world, header information of the space, or header information of the volume. In all worlds, spaces, and volumes associated with different times, the same value may be used as the depth information. In this case, three-dimensional data encoding device 1300 may append the depth information to header information managing the worlds associated with all times.

When the color information is included in the voxels, transformer 1303 applies frequency transformation, e.g. orthogonal transformation, to a prediction residual of the color information of the voxels in the volume. For example, transformer 1303 creates a one-dimensional array by scanning the prediction residual in a certain scan order. Subsequently, transformer 1303 transforms the one-dimensional array to a frequency domain by applying one-dimensional orthogonal transformation to the created one-dimensional array. With this, when a value of the prediction residual in the volume is similar, a value of a low-frequency component increases and a value of a high-frequency component decreases. As such, it is possible to more efficiently reduce a code amount in quantizer 1304.

Transformer 1303 does not need to use orthogonal transformation in one dimension, but may also use orthogonal transformation in two or more dimensions. For example, transformer 1303 maps the prediction residual to a two-dimensional array in a certain scan order, and applies two-dimensional orthogonal transformation to the obtained two-dimensional array. Transformer 1303 may select an orthogonal transformation method to be used from a plurality of orthogonal transformation methods. In this case, three-dimensional data encoding device 1300 appends, to the bitstream, information indicating which orthogonal transformation method is used. Transformer 1303 may select an orthogonal transformation method to be used from a plurality of orthogonal transformation methods in different dimensions. In this case, three-dimensional data encoding device 1300 appends, to the bitstream, in how many dimensions the orthogonal transformation method is used.

For example, transformer 1303 matches the scan order of the prediction residual to a scan order (breadth-first, depth-first, or the like) in the octree in the volume. This makes it possible to reduce overhead, since information indicating the scan order of the prediction residual does not need to be appended to the bitstream. Transformer 1303 may apply a scan order different from the scan order of the octree. In this case, three-dimensional data encoding device 1300 appends, to the bitstream, information indicating the scan order of the prediction residual. This enables three-dimensional data encoding device 1300 to efficiently encode the prediction residual. Three-dimensional data encoding device 1300 may append, to the bitstream, information (flag, etc.) indicating whether to apply the scan order of the octree, and may also append, to the bitstream, information indicating the scan order of the prediction residual when the scan order of the octree is not applied.

Transformer 1303 does not only transform the prediction residual of the color information, and may also transform other attribute information included in the voxels. For example, transformer 1303 may transform and encode information, such as reflectance information, obtained when obtaining a point cloud through LiDAR and the like.

Transformer 1303 may skip these processes when the spaces do not include attribute information such as color information. Three-dimensional data encoding device 1300 may append, to the bitstream, information (flag) indicating whether to skip the processes of transformer 1303.

Quantizer 1304 generates a quantized coefficient by performing quantization using a quantization control parameter on a frequency component of the prediction residual generated by transformer 1303. With this, the amount of information is further reduced. The generated quantized coefficient is outputted to entropy encoder 1313. Quantizer 1304 may control the quantization control parameter in units of worlds, units of spaces, or units of volumes. In this case, three-dimensional data encoding device 1300 appends the quantization control parameter to each header information and the like. Quantizer 1304 may perform quantization control by changing a weight per frequency component of the prediction residual. For example, quantizer 1304 may precisely quantize a low-frequency component and roughly quantize a high-frequency component. In this case, three-dimensional data encoding device 1300 may append, to a header, a parameter expressing a weight of each frequency component.

Quantizer 1304 may skip these processes when the spaces do not include attribute information such as color information. Three-dimensional data encoding device 1300 may append, to the bitstream, information (flag) indicating whether to skip the processes of quantizer 1304.

Inverse quantizer 1305 generates an inverse quantized coefficient of the prediction residual by performing inverse quantization on the quantized coefficient generated by quantizer 1304 using the quantization control parameter, and outputs the generated inverse quantized coefficient to inverse transformer 1306.

Inverse transformer 1306 generates an inverse transformation-applied prediction residual by applying inverse transformation on the inverse quantized coefficient generated by inverse quantizer 1305. This inverse transformation-applied prediction residual does not need to completely coincide with the prediction residual outputted by transformer 1303, since the inverse transformation-applied prediction residual is a prediction residual that is generated after the quantization.

Adder 1307 adds, to generate a reconstructed volume, (i) the inverse transformation-applied prediction residual generated by inverse transformer 1306 to (ii) a predicted volume that is generated through intra prediction or intra prediction, which will be described later, and is used to generate a pre-quantized prediction residual. This reconstructed volume is stored in reference volume memory 1308 or reference space memory 1310.

Intra predictor 1309 generates a predicted volume of an encoding target volume using attribute information of a neighboring volume stored in reference volume memory 1308. The attribute information includes color information or a reflectance of the voxels. Intra predictor 1309 generates a predicted value of color information or a reflectance of the encoding target volume.

Figure 44:
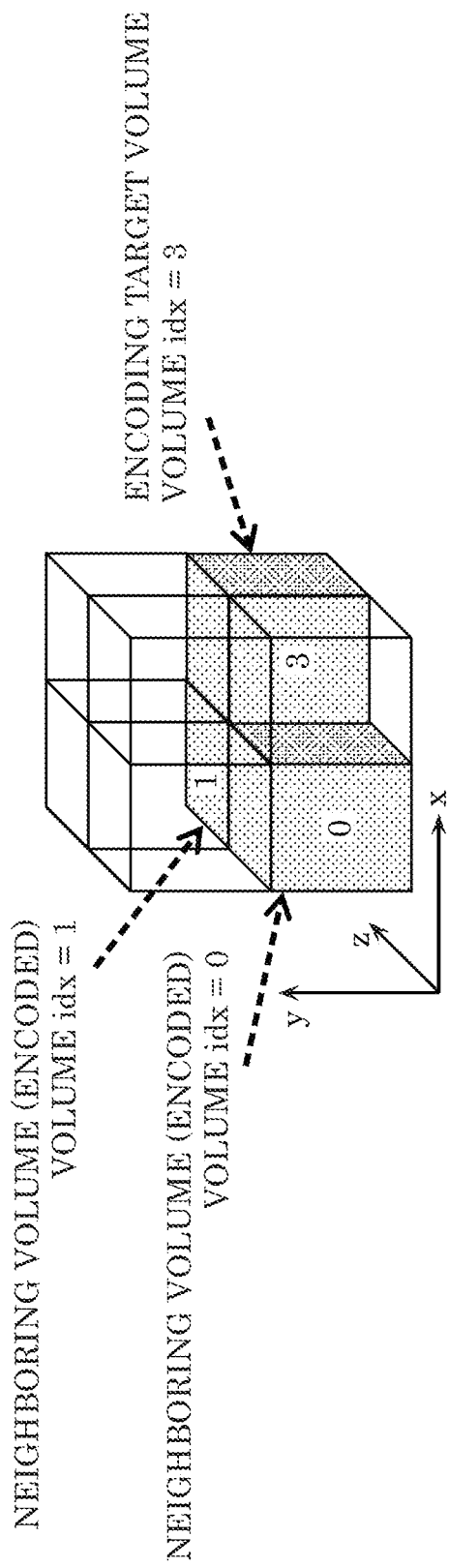
FIG. 44 is a diagram for describing an intra prediction process according to Embodiment 7.

FIG. 44 is a diagram for describing an operation of intra, predictor 1309. For example, intra predictor 1309 generates the predicted volume of the encoding target volume (volume idx=3) shown in FIG. 44, using a neighboring volume (volume idx=0). Volume idx here is identifier information that is appended to a volume in a space, and a different value is assigned to each volume. An order of assigning volume idx may be the same as an encoding order, and may also be different from the encoding order. For example, intra predictor 1309 uses an average value of color information of voxels included in volume idx=0, which is a neighboring volume, as the predicted value of the color information of the encoding target volume shown in FIG. 44. In this case, a prediction residual is generated by deducting the predicted value of the color information from the color information of each voxel included in the encoding target volume. The following processes are performed by transformer 1303 and subsequent processors with respect to this prediction residual. In this case, three-dimensional data encoding device 1300 appends, to the bitstream, neighboring volume information and prediction mode information. The neighboring volume information here is information indicating a neighboring volume used in the prediction, and indicates, for example, volume idx of the neighboring volume used in the prediction. The prediction mode information here indicates a mode used to generate the predicted volume. The mode is, for example, an average value mode in which the predicted value is generated using an average value of the voxels in the neighboring volume, or a median mode in which the predicted value is generated using the median of the voxels in the neighboring volume.

Intra predictor 1309 may generate the predicted volume using a plurality of neighboring volumes. For example, in the structure shown in FIG. 44, intra predictor 1309 generates predicted volume 0 using a volume with volume idx=0, and generates predicted volume 1 using a volume with volume idx=1. Intra predictor 1309 then generates an average of predicted volume 0 and predicted volume 1 as a final predicted volume. In this case, three-dimensional data encoding device 1300 may append, to the bitstream, a plurality of volumes idx of a plurality of volumes used to generate the predicted volume.

Figure 45:
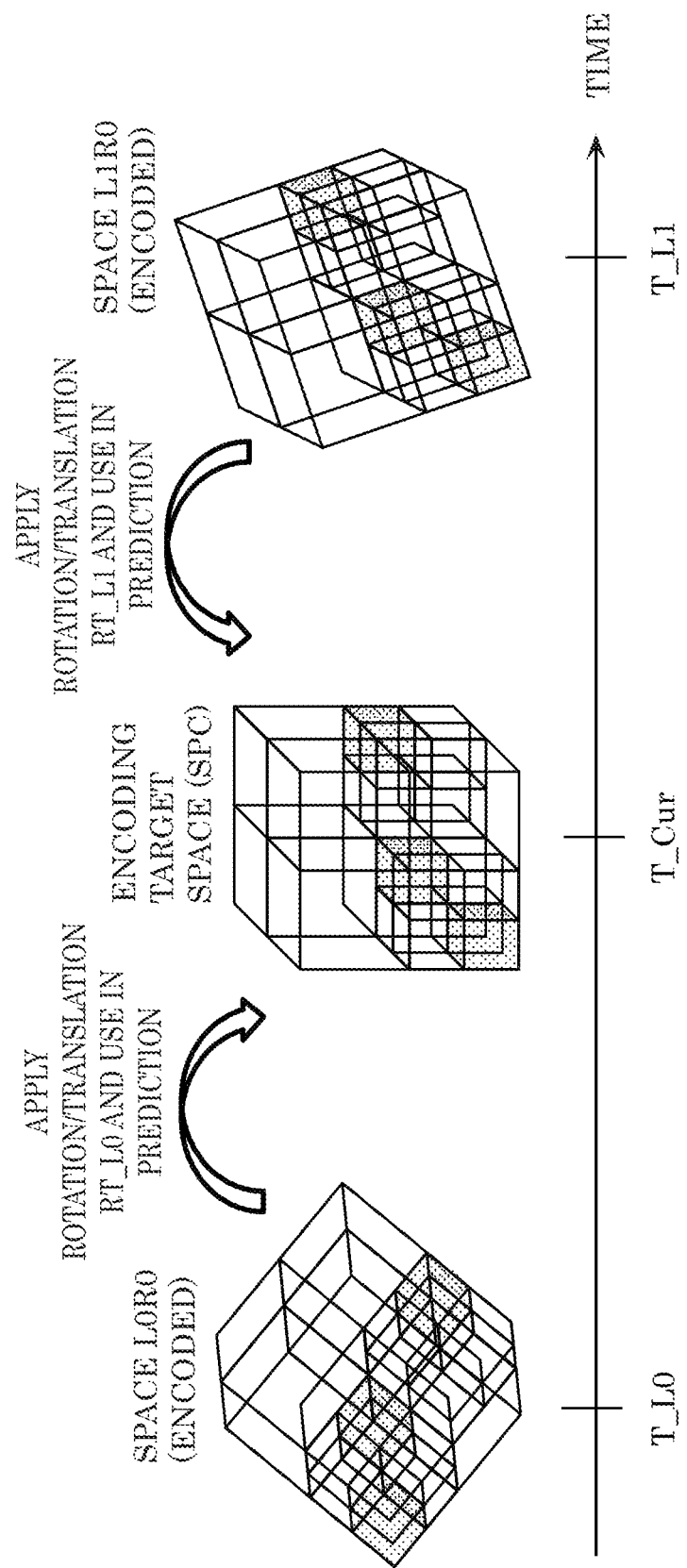
FIG. 45 is a diagram for describing a rotation and translation process according to Embodiment 7.

FIG. 45 is a diagram schematically showing the inter prediction process according to the present embodiment. Inter predictor 1311 encodes (inter predicts) a space (SPC) associated with certain time T_Cur using an encoded space associated with different time T_LX. In this case, inter predictor 1311 performs an encoding process by applying a rotation and translation process to the encoded space associated with different time T_LX.

Three-dimensional data encoding device 1300 appends, to the bitstream, RT information relating to a rotation and translation process suited to the space associated with different time T_LX. Different time T_LX is, for example, time T_L0 before certain time T_Cur. At this point, three-dimensional data encoding device 1300 may append, to the bitstream, RT information RT_L0 relating to a rotation and translation process suited to a space associated with time T_L0.

Alternatively, different time T_LX is, for example, time T_L1 after certain time T_Cur. At this point, three-dimensional data encoding device 1300 may append, to the bitstream, RT information RT_L1 relating to a rotation and translation process suited to a space associated with time T_L1.

Alternatively, inter predictor 1311 encodes (bidirectional prediction) with reference to the spaces associated with time T_L0 and time T_L1 that differ from each other. In this case, three-dimensional data encoding device 1300 may append, to the bitstream, both RT information RT_L0 and RT information relating to the rotation and translation process suited to the spaces thereof.

Note that T_L0 has been described as being before T_Cur and T_L1 as being after T_Cur, but are not necessarily limited thereto. For example, T_L0 and T_L1 may both be before T_Cur. T_L0 and T_L1 may also both be after T_Cur.

Three-dimensional data encoding device 1300 may append, to the bitstream, RT information relating to a rotation and translation process suited to spaces associated with different times, when encoding with reference to each of the spaces. For example, three-dimensional data encoding device 1300 manages a plurality of encoded spaces to be referred to, using two reference lists (list L0 and list L1). When a first reference space in list L0 is L0R0, a second reference space in list L0 is L0R1, a first reference space in list L1 is L1R0, and a second reference space in list L1 is L1R1, three-dimensional data encoding device 1300 appends, to the bitstream, RT information RT_L0R0 of L0R0, RT information RT_L0R1 of L0R1, RT information RT_L1R0 of L1R0, and RT information RT_L1R1 of L1R1. For example, three-dimensional data encoding device 1300 appends these pieces of RT information to a header and the like of the bitstream.

Three-dimensional data encoding device 1300 determines whether to apply rotation and translation per reference space, when encoding with reference to reference spaces associated with different times. In this case, three-dimensional data encoding device 1300 may append, to header information and the like of the bitstream, information (RT flag, etc.) indicating whether rotation and translation are applied per reference space. For example, three-dimensional data encoding device 1300 calculates the RT information and an Iterative Closest Point (ICP) error value, using an ICP algorithm per reference space to be referred to from the encoding target space. Three-dimensional data encoding device 1300 determines that rotation and translation do not need to be performed and sets the RT flag to OFF, when the ICP error value is lower than or equal to a predetermined fixed value. In contrast, three-dimensional data encoding device 1300 sets the RT flag to ON and appends the RT information to the bitstream, when the ICP error value exceeds the above fixed value.

FIG. 46 is a diagram showing an example syntax to be appended to a header of the RT information and the RT flag. Note that a bit count assigned to each syntax may be decided based on a range of this syntax. For example, when eight reference spaces are included in reference list L0, 3 bits may be assigned to MaxRefSpc_l0. The bit count to be assigned may be variable in accordance with a value each syntax can be, and may also be fixed regardless of the value each syntax can be. When the bit count to be assigned is fixed, three-dimensional data encoding device 1300 may append this fixed bit count to other header information.

MaxRefSpc_l0 shown in FIG. 46 indicates a number of reference spaces included in reference list L0. RT_flag_l0[$i$] is an RT flag of reference space i in reference list L0. When RT_flag_l0[$i$] is 1, rotation and translation are applied to reference space i. When RT_flag_l0[$i$] is 0, rotation and translation are not applied to reference space i.

R_l0[$i$] and T_l0[$i$] are RT information of reference space i in reference list L0. R_l0[$i$] is rotation information of reference space i in reference list L0. The rotation information indicates contents of the applied rotation process, and is, for example, a rotation matrix or a quaternion. T_l0[$i$] is translation information of reference space i in reference list L0. The translation information indicates contents of the applied translation process, and is, for example, a translation vector.

MaxRefSpc_l1 indicates a number of reference spaces included in reference list L1. RT_flag_l1[$i$] is an RT flag of reference space i in reference list L1. When RT_flag_l1[$i$] is 1, rotation and translation are applied to reference space i. When RT_flag_l1[$i$] is 0, rotation and translation are not applied to reference space i.

R_l1[$i$] and T_l1[$i$] are RT information of reference space i in reference list L1. R_l1[$i$] is rotation information of reference space i in reference list L1. The rotation information indicates contents of the applied rotation process, and is, for example, a rotation matrix or a quaternion. T_l1[$i$] is translation information of reference space i in reference list L1. The translation information indicates contents of the applied translation process, and is, for example, a translation vector.

Inter predictor 1311 generates the predicted volume of the encoding target volume using information on an encoded reference space stored in reference space memory 1310. As stated above, before generating the predicted volume of the encoding target volume, inter predictor 1311 calculates RT information at an encoding target space and a reference space using an ICP algorithm, in order to approach an overall positional relationship between the encoding target space and the reference space. Inter predictor 1311 then obtains reference space B by applying a rotation and translation process to the reference space using the calculated RT information. Subsequently, inter predictor 1311 generates the predicted volume of the encoding target volume in the encoding target space using information in reference space B. Three-dimensional data encoding device 1300 appends, to header information and the like of the encoding target space, the RT information used to obtain reference space B.

In this manner, inter predictor 1311 is capable of improving precision of the predicted volume by generating the predicted volume using the information of the reference space, after approaching the overall positional relationship between the encoding target space and the reference space, by applying a rotation and translation process to the reference space. It is possible to reduce the code amount since it is possible to limit the prediction residual. Note that an example has been described in which ICP is performed using the encoding target space and the reference space, but is not necessarily limited thereto. For example, inter predictor 1311 may calculate the RT information by performing ICP using at least one of (i) an encoding target space in which a voxel or point cloud count is pruned, or (ii) a reference space in which a voxel or point cloud count is pruned, in order to reduce the processing amount.

When the ICP error value obtained as a result of the ICP is smaller than a predetermined first threshold, i.e., when for example the positional relationship between the encoding target space and the reference space is similar, inter predictor 1311 determines that a rotation and translation process is not necessary, and the rotation and translation process does not need to be performed. In this case, three-dimensional data encoding device 1300 may control the overhead by not appending the RT information to the bitstream.

When the ICP error value is greater than a predetermined second threshold, inter predictor 1311 determines that a shape change between the spaces is large, and intra prediction may be applied on all volumes of the encoding target space. Hereinafter, spaces to which intra prediction is applied will be referred to as intra spaces. The second threshold is greater than the above first threshold. The present embodiment is not limited to ICP, and any type of method may be used as long as the method calculates the RT information using two voxel sets or two point cloud sets.

Figure 47:
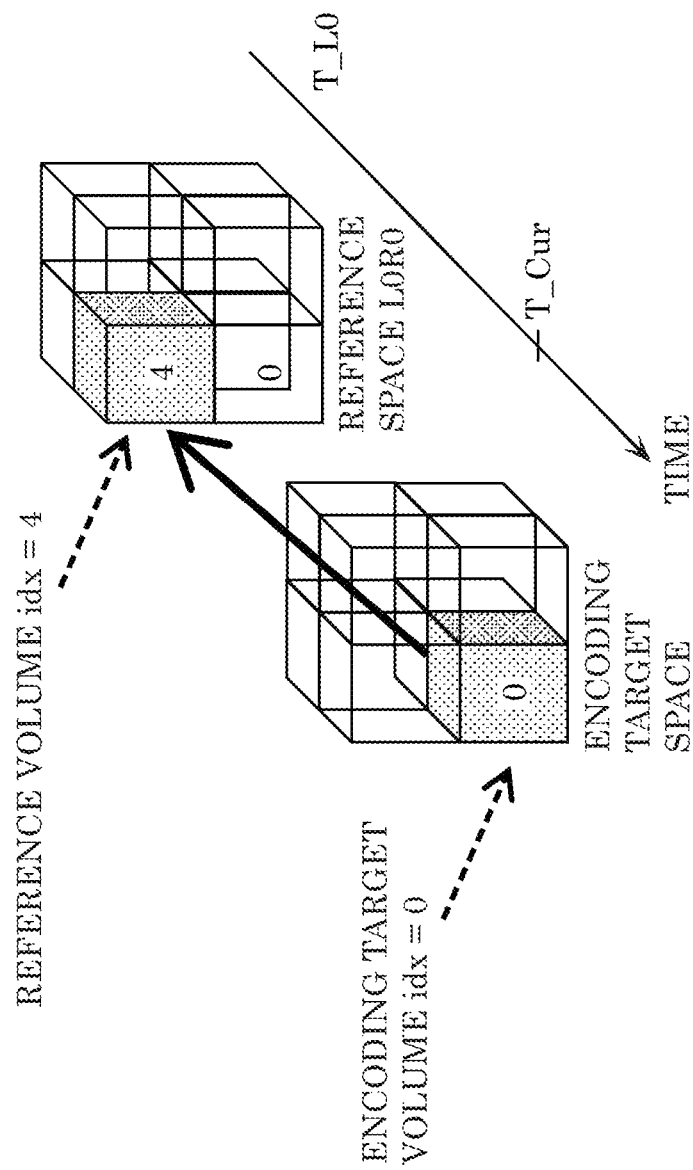
FIG. 47 is a diagram for describing an inter prediction process according to Embodiment 7.

When attribute information, e.g. shape or color information, is included in the three-dimensional data, inter predictor 1311 searches, for example, a volume whose attribute information, e.g. shape or color information, is the most similar to the encoding target volume in the reference space, as the predicted volume of the encoding target volume in the encoding target space. This reference space is, for example, a reference space on which the above rotation and translation process has been performed. Inter predictor 1311 generates the predicted volume using the volume (reference volume) obtained through the search. FIG. 47 is a diagram for describing a generating operation of the predicted volume. When encoding the encoding target volume (volume idx=0) shown in FIG. 47 using inter prediction, inter predictor 1311 searches a volume with a smallest prediction residual, which is the difference between the encoding target volume and the reference volume, while sequentially scanning the reference volume in the reference space. Inter predictor 1311 selects the volume with the smallest prediction residual as the predicted volume. The prediction residuals of the encoding target volume and the predicted volume are encoded through the processes performed by transformer 1303 and subsequent processors. The prediction residual here is a difference between the attribute information of the encoding target volume and the attribute information of the predicted volume. Three-dimensional data encoding device 1300 appends, to the header and the like of the bitstream, volume idx of the reference volume in the reference space, as the predicted volume.

In the example shown in FIG. 47, the reference volume with volume idx=4 of reference space L0R0 is selected as the predicted volume of the encoding target volume. The prediction residuals of the encoding target volume and the reference volume, and reference volume idx=4 are then encoded and appended to the bitstream.

Note that an example has been described in which the predicted volume of the attribute information is generated, but the same process may be applied to the predicted volume of the position information.

Prediction controller 1312 controls whether to encode the encoding target volume using intra prediction or inter prediction. A mode including intra prediction and inter prediction is referred to here as a prediction mode. For example, prediction controller 1312 calculates the prediction residual when the encoding target volume is predicted using intra prediction and the prediction residual when the encoding target volume is predicted using inter prediction as evaluation values, and selects the prediction mode whose evaluation value is smaller. Note that prediction controller 1312 may calculate an actual code amount by applying orthogonal transformation, quantization, and entropy encoding to the prediction residual of the intra prediction and the prediction residual of the inter prediction, and select a prediction mode using the calculated code amount as the evaluation value. Overhead information (reference volume idx information, etc.) aside from the prediction residual may be added to the evaluation value. Prediction controller 1312 may continuously select intra prediction when it has been decided in advance to encode the encoding target space using intra space.

Entropy encoder 1313 generates an encoded signal (encoded bitstream) by variable-length encoding the quantized coefficient, which is an input from quantizer 1304. To be specific, entropy encoder 1313, for example, binarizes the quantized coefficient and arithmetically encodes the obtained binary signal.

Figure 48:
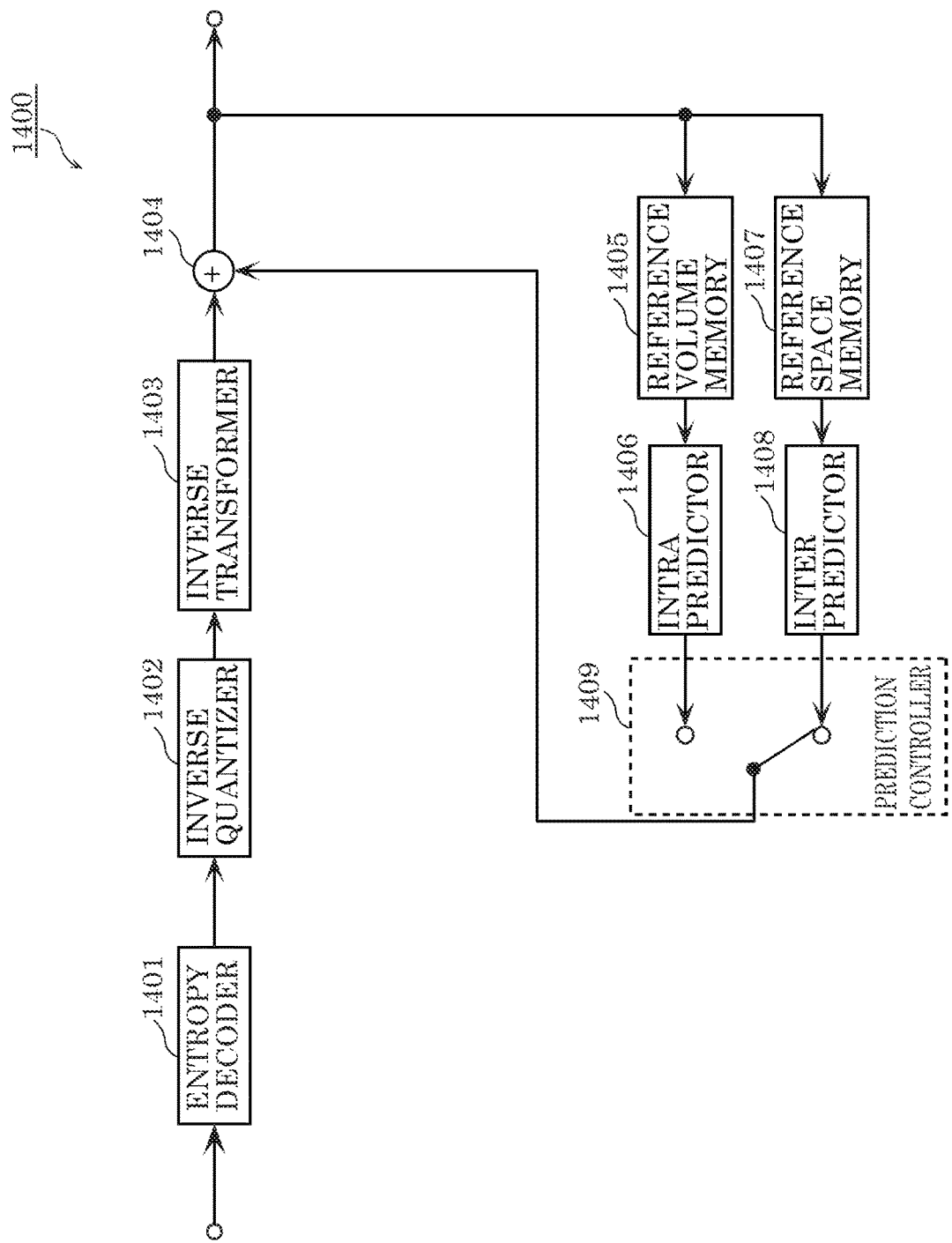
FIG. 48 is a block diagram of a three-dimensional data decoding device according to Embodiment 7.

A three-dimensional data decoding device that decodes the encoded signal generated by three-dimensional data encoding device 1300 will be described next. FIG. 48 is a block diagram of three-dimensional data decoding device 1400 according to the present embodiment. This three-dimensional data decoding device 1400 includes entropy decoder 1401, inverse quantizer 1402, inverse transformer 1403, adder 1404, reference volume memory 1405, intra predictor 1406, reference space memory 1407, inter predictor 1408, and prediction controller 1409.

Entropy decoder 1401 variable-length decodes the encoded signal (encoded bitstream). For example, entropy decoder 1401 generates a binary signal by arithmetically decoding the encoded signal, and generates a quantized coefficient using the generated binary signal.

Inverse quantizer 1402 generates an inverse quantized coefficient by inverse quantizing the quantized coefficient inputted from entropy decoder 1401, using a quantization parameter appended to the bitstream and the like.

Inverse transformer 1403 generates a prediction residual by inverse transforming the inverse quantized coefficient inputted from inverse quantizer 1402. For example, inverse transformer 1403 generates the prediction residual by inverse orthogonally transforming the inverse quantized coefficient, based on information appended to the bitstream.

Adder 1404 adds, to generate a reconstructed volume, (i) the prediction residual generated by inverse transformer 1403 to (ii) a predicted volume generated through intra prediction or intra prediction. This reconstructed volume is outputted as decoded three-dimensional data and is stored in reference volume memory 1405 or reference space memory 1407.

Intra predictor 1406 generates a predicted volume through intra prediction using a reference volume in reference volume memory 1405 and information appended to the bitstream. To be specific, intra predictor 1406 obtains neighboring volume information (e.g. volume idx) appended to the bitstream and prediction mode information, and generates the predicted volume through a mode indicated by the prediction mode information, using a neighboring volume indicated in the neighboring volume information. Note that the specifics of these processes are the same as the above-mentioned processes performed by intra predictor 1309, except for which information appended to the bitstream is used.

Inter predictor 1408 generates a predicted volume through inter prediction using a reference space in reference space memory 1407 and information appended to the bitstream. To be specific, inter predictor 1408 applies a rotation and translation process to the reference space using the RT information per reference space appended to the bitstream, and generates the predicted volume using the rotated and translated reference space. Note that when an RT flag is present in the bitstream per reference space, inter predictor 1408 applies a rotation and translation process to the reference space in accordance with the RT flag. Note that the specifics of these processes are the same as the above-mentioned processes performed by inter predictor 1311, except for which information appended to the bitstream is used.

Prediction controller 1409 controls whether to decode a decoding target volume using intra prediction or inter prediction. For example, prediction controller 1409 selects intra prediction or inter prediction in accordance with information that is appended to the bitstream and indicates the prediction mode to be used. Note that prediction controller 1409 may continuously select intra prediction when it has been decided in advance to decode the decoding target space using intra space.

Hereinafter, variations of the present embodiment will be described. In the present embodiment, an example has been described in which rotation and translation is applied in units of spaces, but rotation and translation may also be applied in smaller units. For example, three-dimensional data encoding device 1300 may divide a space into subspaces, and apply rotation and translation in units of subspaces. In this case, three-dimensional data encoding device 1300 generates RT information per subspace, and appends the generated RT information to a header and the like of the bitstream. Three-dimensional data encoding device 1300 may apply rotation and translation in units of volumes, which is an encoding unit. In this case, three-dimensional data encoding device 1300 generates RT information in units of encoded volumes, and appends the generated RT information to a header and the like of the bitstream. The above may also be combined. In other words, three-dimensional data encoding device 1300 may apply rotation and translation in large units and subsequently apply rotation and translation in small units. For example, three-dimensional data encoding device 1300 may apply rotation and translation in units of spaces, and may also apply different rotations and translations to each of a plurality of volumes included in the obtained spaces.

In the present embodiment, an example has been described in which rotation and translation is applied to the reference space, but is not necessarily limited thereto. For example, three-dimensional data encoding device 1300 may apply a scaling process and change a size of the three-dimensional data. Three-dimensional data encoding device 1300 may also apply one or two of the rotation, translation, and scaling. When applying the processes in multiple stages and different units as stated above, a type of the processes applied in each unit may differ. For example, rotation and translation may be applied in units of spaces, and translation may be applied in units of volumes.

Note that these variations are also applicable to three-dimensional data decoding device 1400.

As stated above, three-dimensional data encoding device 1300 according to the present embodiment performs the following processes. FIG. 48 is a flowchart of the inter prediction process performed by three-dimensional data encoding device 1300.

Three-dimensional data encoding device 1300 generates predicted position information (e.g. predicted volume) using position information on three-dimensional points included in three-dimensional reference data (e.g. reference space) associated with a time different from a time associated with current three-dimensional data (e.g. encoding target space) (S1301). To be specific, three-dimensional data encoding device 1300 generates the predicted position information by applying a rotation and translation process to the position information on the three-dimensional points included in the three-dimensional reference data.

Note that three-dimensional data encoding device 1300 may perform a rotation and translation process using a first unit (e.g. spaces), and may perform the generating of the predicted position information using a second unit (e.g. volumes) that is smaller than the first unit. For example, three-dimensional data encoding device 1300 searches a volume among a plurality of volumes included in the rotated and translated reference space, whose position information differs the least from the position information of the encoding target volume included in the encoding target space. Note that three-dimensional data encoding device 1300 may perform the rotation and translation process, and the generating of the predicted position information in the same unit.

Three-dimensional data encoding device 1300 may generate the predicted position information by applying (i) a first rotation and translation process to the position information on the three-dimensional points included in the three-dimensional reference data, and (ii) a second rotation and translation process to the position information on the three-dimensional points obtained through the first rotation and translation process, the first rotation and translation process using a first unit (e.g. spaces) and the second rotation and translation process using a second unit (e.g. volumes) that is smaller than the first unit.

For example, as illustrated in FIG. 41, the position information on the three-dimensional points and the predicted position information is represented using an octree structure. For example, the position information on the three-dimensional points and the predicted position information is expressed in a scan order that prioritizes a breadth over a depth in the octree structure. For example, the position information on the three-dimensional points and the predicted position information is expressed in a scan order that prioritizes a depth over a breadth in the octree structure.

As illustrated in FIG. 46, three-dimensional data encoding device 1300 encodes an RT flag that indicates whether to apply the rotation and translation process to the position information on the three-dimensional points included in the three-dimensional reference data. In other words, three-dimensional data encoding device 1300 generates the encoded signal (encoded bitstream) including the RT flag. Three-dimensional data encoding device 1300 encodes RT information that indicates contents of the rotation and translation process. In other words, three-dimensional data encoding device 1300 generates the encoded signal (encoded bitstream) including the RT information. Note that three-dimensional data encoding device 1300 may encode the RT information when the RT flag indicates to apply the rotation and translation process, and does not need to encode the RT information when the RT flag indicates not to apply the rotation and translation process.

The three-dimensional data includes, for example, the position information on the three-dimensional points and the attribute information (color information, etc.) of each three-dimensional point. Three-dimensional data encoding device 1300 generates predicted attribute information using the attribute information of the three-dimensional points included in the three-dimensional reference data (S1302).

Three-dimensional data encoding device 1300 next encodes the position information on the three-dimensional points included in the current three-dimensional data, using the predicted position information. For example, as illustrated in FIG. 38, three-dimensional data encoding device 1300 calculates differential position information, the differential position information being a difference between the predicted position information and the position information on the three-dimensional points included in the current three-dimensional data (S1303).

Three-dimensional data encoding device 1300 encodes the attribute information of the three-dimensional points included in the current three-dimensional data, using the predicted attribute information. For example, three-dimensional data encoding device 1300 calculates differential attribute information, the differential attribute information being a difference between the predicted attribute information and the attribute information on the three-dimensional points included in the current three-dimensional data (S1304). Three-dimensional data encoding device 1300 next performs transformation and quantization on the calculated differential attribute information (S1305).

Lastly, three-dimensional data encoding device 1300 encodes (e.g. entropy encodes) the differential position information and the quantized differential attribute information (S1036). In other words, three-dimensional data encoding device 1300 generates the encoded signal (encoded bitstream) including the differential position information and the differential attribute information.

Note that when the attribute information is not included in the three-dimensional data, three-dimensional data encoding device 1300 does not need to perform steps S1302, S1304, and S1305. Three-dimensional data encoding device 1300 may also perform only one of the encoding of the position information on the three-dimensional points and the encoding of the attribute information of the three-dimensional points.

Figure 49:
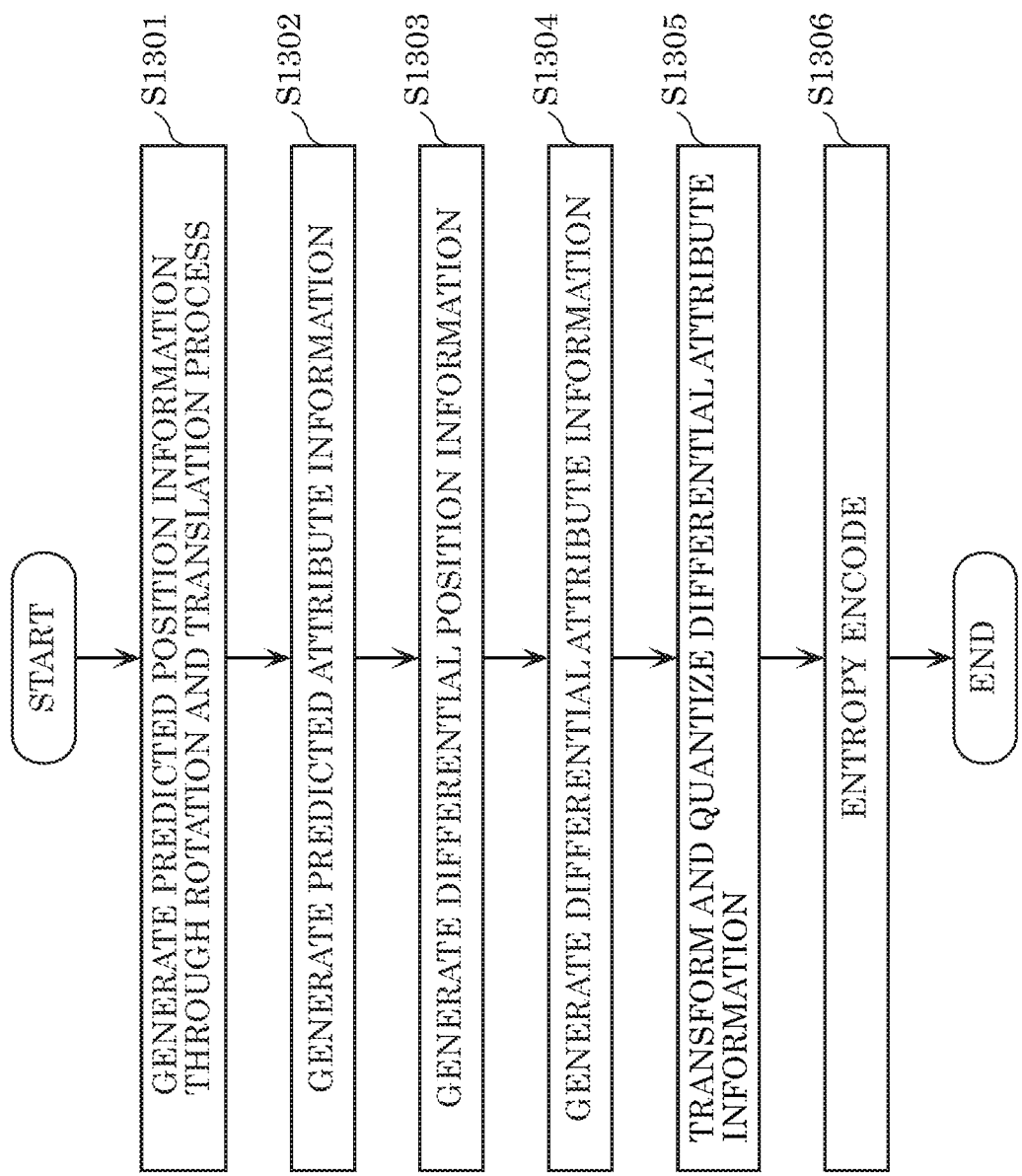
FIG. 49 is a flowchart of a three-dimensional data encoding process performed by the three-dimensional data encoding device according to Embodiment 7.

An order of the processes shown in FIG. 49 is merely an example and is not limited thereto. For example, since the processes with respect to the position information (S1301 and S1303) and the processes with respect to the attribute information (S1302, S1304, and S1305) are separate from one another, they may be performed in an order of choice, and a portion thereof may also be performed in parallel.

With the above, three-dimensional data encoding device 1300 according to the present embodiment generates predicted position information using position information on three-dimensional points included in three-dimensional reference data associated with a time different from a time associated with current three-dimensional data; and encodes differential position information, which is a difference between the predicted position information and the position information on the three-dimensional points included in the current three-dimensional data. This makes it possible to improve encoding efficiency since it is possible to reduce the amount of data of the encoded signal.

Three-dimensional data encoding device 1300 according to the present embodiment generates predicted attribute information using attribute information on three-dimensional points included in three-dimensional reference data; and encodes differential attribute information, which is a difference between the predicted attribute information and the attribute information on the three-dimensional points included in the current three-dimensional data. This makes it possible to improve encoding efficiency since it is possible to reduce the amount of data of the encoded signal.

For example, three-dimensional data encoding device 1300 includes a processor and memory. The processor uses the memory to perform the above processes.

FIG. 48 is a flowchart of the inter prediction process performed by three-dimensional data decoding device 1400.

Three-dimensional data decoding device 1400 decodes (e.g. entropy decodes) the differential position information and the differential attribute information from the encoded signal (encoded bitstream) (S1401).

Three-dimensional data decoding device 1400 decodes, from the encoded signal, an RT flag that indicates whether to apply the rotation and translation process to the position information on the three-dimensional points included in the three-dimensional reference data. Three-dimensional data decoding device 1400 encodes RT information that indicates contents of the rotation and translation process. Note that three-dimensional data decoding device 1400 may decode the RT information when the RT flag indicates to apply the rotation and translation process, and does not need to decode the RT information when the RT flag indicates not to apply the rotation and translation process.

Three-dimensional data decoding device 1400 next performs inverse transformation and inverse quantization on the decoded differential attribute information (S1402).

Three-dimensional data decoding device 1400 next generates predicted position information (e.g. predicted volume) using the position in formation on the three-dimensional points included in the three-dimensional reference data (e.g. reference space) associated with a time different from a time associated with the current three-dimensional data (e.g. decoding target space) (S1403). To be specific, three-dimensional data decoding device 1400 generates the predicted position information by applying a rotation and translation process to the position information on the three-dimensional points included in the three-dimensional reference data.

More specifically, when the RT flag indicates to apply the rotation and translation process, three-dimensional data decoding device 1400 applies the rotation and translation process on the position information on the three-dimensional points included in the three-dimensional reference data indicated in the RT information. In contrast, when the RT flag indicates not to apply the rotation and translation process, three-dimensional data decoding device 1400 does not apply the rotation and translation process on the position information on the three-dimensional points included in the three-dimensional reference data.

Note that three-dimensional data decoding device 1400 may perform the rotation and translation process using a first unit (e.g. spaces), and may perform the generating of the predicted position information using a second unit (e.g. volumes) that is smaller than the first unit. Note that three-dimensional data decoding device 1400 may perform the rotation and translation process, and the generating of the predicted position information in the same unit.

Three-dimensional data decoding device 1400 may generate the predicted position information by applying (i) a first rotation and translation process to the position information on the three-dimensional points included in the three-dimensional reference data, and (ii) a second rotation and translation process to the position information on the three-dimensional points obtained through the first rotation and translation process, the first rotation and translation process using a first unit (e.g. spaces) and the second rotation and translation process using a second unit (e.g. volumes) that is smaller than the first unit.

For example, as illustrated in FIG. 41, the position information on the three-dimensional points and the predicted position information is represented using an octree structure. For example, the position information on the three-dimensional points and the predicted position information is expressed in a scan order that prioritizes a breadth over a depth in the octree structure. For example, the position information on the three-dimensional points and the predicted position information is expressed in a scan order that prioritizes a depth over a breadth in the octree structure.

Three-dimensional data decoding device 1400 generates predicted attribute information using the attribute information of the three-dimensional points included in the three-dimensional reference data (S1404).

Three-dimensional data decoding device 1400 next restores the position information on the three-dimensional points included in the current three-dimensional data, by decoding encoded position information included in an encoded signal, using the predicted position information. The encoded position information here is the differential position information. Three-dimensional data decoding device 1400 restores the position information on the three-dimensional points included in the current three-dimensional data, by adding the differential position information to the predicted position information (S1405).

Three-dimensional data decoding device 1400 restores the attribute information of the three-dimensional points included in the current three-dimensional data, by decoding encoded attribute information included in an encoded signal, using the predicted attribute information. The encoded attribute information here is the differential position information. Three-dimensional data decoding device 1400 restores the attribute information on the three-dimensional points included in the current three-dimensional data, by adding the differential attribute information to the predicted attribute information (S1406).

Note that when the attribute information is not included in the three-dimensional data, three-dimensional data decoding device 1400 does not need to perform steps S1402, S1404, and S1406. Three-dimensional data decoding device 1400 may also perform only one of the decoding of the position information on the three-dimensional points and the decoding of the attribute information of the three-dimensional points.

Figure 50:
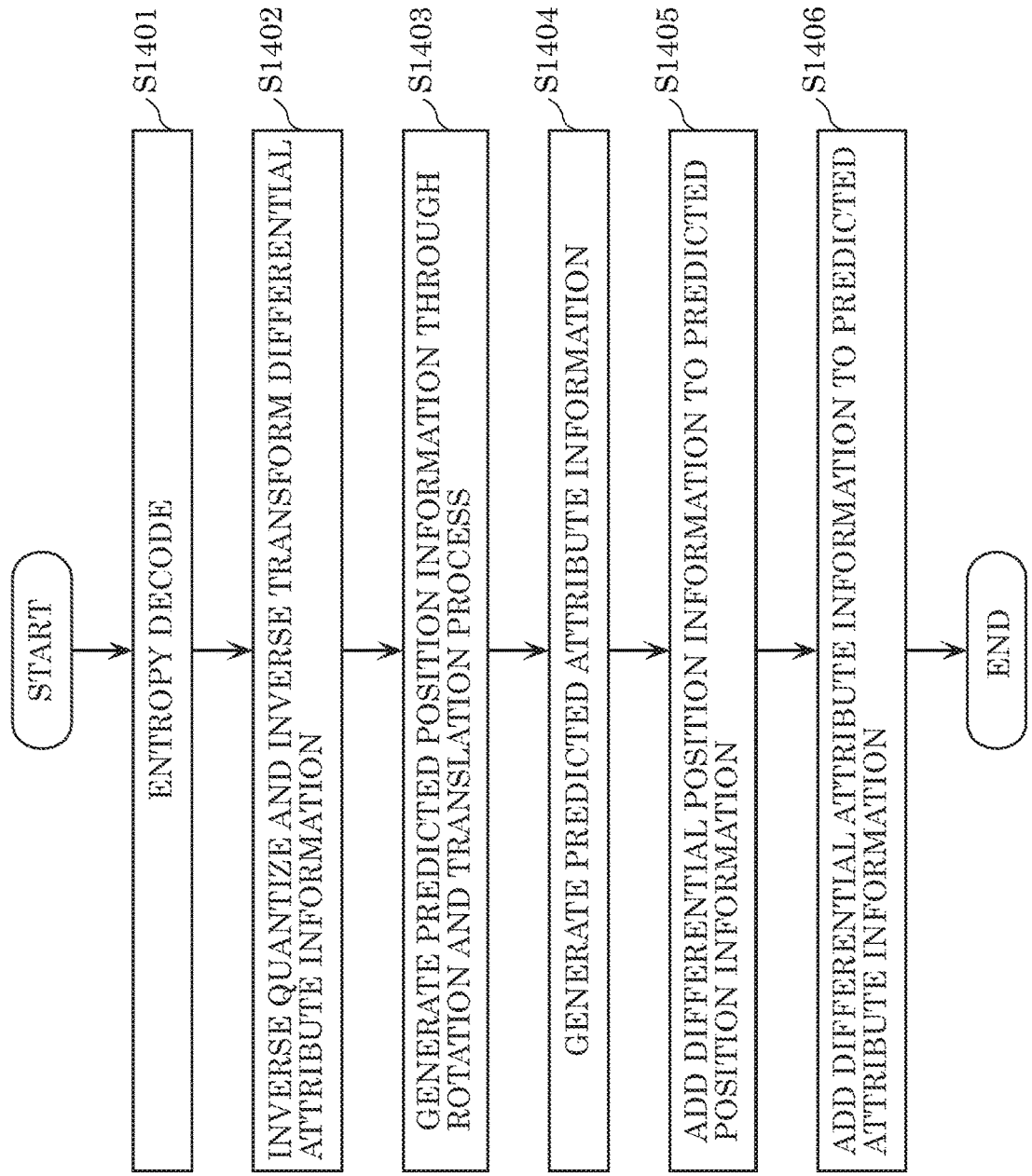
FIG. 50 is a flowchart of a three-dimensional data decoding process performed by the three-dimensional data decoding device according to Embodiment 7.

An order of the processes shown in FIG. 50 is merely an example and is not limited thereto. For example, since the processes with respect to the position information (S1403 and S1405) and the processes with respect to the attribute information (S1402, S1404, and S1406) are separate from one another, they may be performed in an order of choice, and a portion thereof may also be performed in parallel.

Embodiment 8

Information of a three-dimensional point cloud includes geometry information (geometry) and attribute information (attribute). Geometry information includes coordinates (x-coordinate, y-coordinate, z-coordinate) with respect to a certain point. When geometry information is encoded, a method of representing the position of each of three-dimensional points in octree representation and encoding the octree information to reduce a code amount is used instead of directly encoding the coordinates of the three-dimensional point.

On the other hand, attribute information includes information indicating, for example, color information (RGB, YUV, etc.) of each three-dimensional point, a reflectance, and a normal vector. For example, a three-dimensional data encoding device is capable of encoding attribute information using an encoding method different from a method used to encode geometry information.

In the present embodiment, a method of encoding attribute information is explained. It is to be noted that, in the present embodiment, the method is explained based on an example case using integer values as values of attribute information. For example, when each of RGB or YUV color components is of an 8-bit accuracy, the color component is an integer value in a range from 0 to 255. When a reflectance value is of 10-bit accuracy, the reflectance value is an integer in a range from 0 to 1023. It is to be noted that, when the bit accuracy of attribute information is a decimal accuracy, the three-dimensional data encoding device may multiply the value by a scale value to round it to an integer value so that the value of the attribute information becomes an integer value. It is to be noted that the three-dimensional data encoding device may add the scale value to, for example, a header of a bitstream.

As a method of encoding attribute information of a three-dimensional point, it is conceivable to calculate a predicted value of the attribute information of the three-dimensional point and encode a difference (prediction residual) between the original value of the attribute information and the predicted value. For example, when the value of attribute information at three-dimensional point p is Ap and a predicted value is Pp, the three-dimensional data encoding device encodes differential absolute value Diffp=|Ap−Pp|. In this case, when highly-accurate predicted value Pp can be generated, differential absolute value Diffp is small. Thus, for example, it is possible to reduce the code amount by entropy encoding differential absolute value Diffp using a coding table that reduces an occurrence bit count more when differential absolute value Diffp is smaller.

As a method of generating a prediction value of attribute information, it is conceivable to use attribute information of a reference three-dimensional point that is another three-dimensional point which neighbors a current three-dimensional point to be encoded. Here, a reference three-dimensional point is a three-dimensional point in a range of a predetermined distance from the current three-dimensional point. For example, when there are current three-dimensional point p=(x1, y1, z1) and three-dimensional point q=(x2, y2, z2), the three-dimensional data encoding device calculates Euclidean distance d (p, q) between three-dimensional point p and three-dimensional point q represented by (Equation A1).

[Math. 1]

$$d(p,q) = \sqrt{(x1-y1)^2 + (x2-y2)^2 + (x3-y3)^2}$$ (Equation A1)

The three-dimensional data encoding device determines that the position of three-dimensional point q is closer to the position of current three-dimensional point p when Euclidean distance d (p, q) is smaller than predetermined threshold value THd, and determines to use the value of the attribute information of three-dimensional point q to generate a predicted value of the attribute information of current three-dimensional point p. It is to be noted that the method of calculating the distance may be another method, and a Mahalanobis distance or the like may be used. In addition, the three-dimensional data encoding device may determine not to use, in prediction processing, any three-dimensional point outside the predetermined range of distance from the current three-dimensional point. For example, when three-dimensional point r is present, and distance d (p, r) between current three-dimensional point p and three-dimensional point r is larger than or equal to threshold value THd, the three-dimensional data encoding device may determine not to use three-dimensional point r for prediction. It is to be noted that the three-dimensional data encoding device may add the information indicating threshold value THd to, for example, a header of a bitstream.

Figure 51:
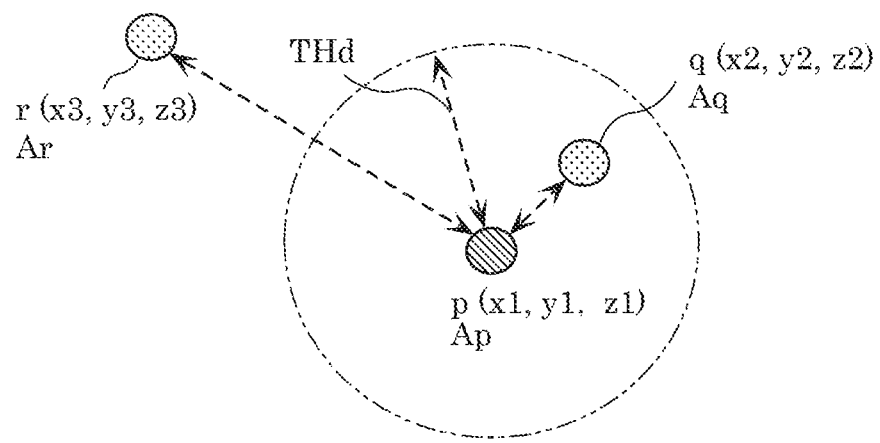
FIG. 51 is a diagram illustrating an example of three-dimensional points according to Embodiment 8.

FIG. 51 is a diagram illustrating an example of three-dimensional points. In this example, distance d (p, q) between current three-dimensional point p and three-dimensional point q is smaller than threshold value THd. Thus, the three-dimensional data encoding device determines that three-dimensional point q is a reference three-dimensional point of current three-dimensional point p, and determines to use the value of attribute information Aq of three-dimensional point q to generate predicted value Pp of attribute information Ap of current three-dimensional point p.

In contrast, distance d (p, r) between current three-dimensional point p and three-dimensional point r is larger than or equal to threshold value THd. Thus, the three-dimensional data encoding device determines that three-dimensional point r is not any reference three-dimensional point of current three-dimensional point p, and determines not to use the value of attribute information Ar of three-dimensional point r to generate predicted value Pp of attribute information Ap of current three-dimensional point p.

In addition, when encoding the attribute information of the current three-dimensional point using a predicted value, the three-dimensional data encoding device uses a three-dimensional point whose attribute information has already been encoded and decoded, as a reference three-dimensional point. Likewise, when decoding the attribute information of a current three-dimensional point to be decoded, the three-dimensional data decoding device uses a three-dimensional point whose attribute information has already been decoded, as a reference three-dimensional point. In this way, it is possible to generate the same predicted value at the time of encoding and decoding. Thus, a bitstream of the three-dimensional point generated by the encoding can be decoded correctly at the decoding side.

Figure 52:
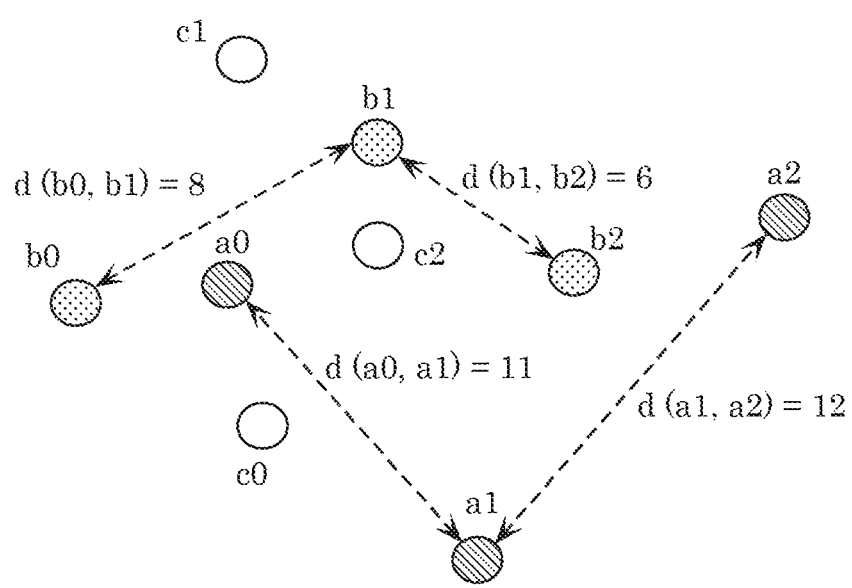
FIG. 52 is a diagram illustrating an example of setting LoDs according to Embodiment 8.

Furthermore, when encoding attribute information of each of three-dimensional points, it is conceivable to classify the three-dimensional point into one of a plurality of layers using geometry information of the three-dimensional point and then encode the attribute information. Here, each of the layers classified is referred to as a Level of Detail (LoD). A method of generating LoDs is explained with reference to FIG. 52.

First, the three-dimensional data encoding device selects initial point a0 and assigns initial point a0 to LoD0. Next, the three-dimensional data encoding device extracts point a1 distant from point a0 more than threshold value Thres_LoD[0] of LoD0 and assigns point a1 to LoD0. Next, the three-dimensional data encoding device extracts point a2 distant from point a1 more than threshold value Thres_LoD[0] of LoD0 and assigns point a2 to LoD0. In this way, the three-dimensional data encoding device configures LoD0 in such a manner that the distance between the points in LoD0 is larger than threshold value Thres_LoD[0].

Next, the three-dimensional data encoding device selects point b0 which has not yet been assigned to any LoD and assigns point b0 to LoD1. Next, the three-dimensional data encoding device extracts point b1 which is distant from point b0 more than threshold value Thres_LoD[1] of LoD1 and which has not yet been assigned to any LoD, and assigns point b1 to LoD1. Next, the three-dimensional data encoding device extracts point b2 which is distant from point b1 more than threshold value Thres_LoD[1] of LoD1 and which has not yet been assigned to any LoD, and assigns point b2 to LoD1. In this way, the three-dimensional data encoding device configures LoD1 in such a manner that the distance between the points in LoD1 is larger than threshold value Thres_LoD[1].

Next, the three-dimensional data encoding device selects point c0 which has not yet been assigned to any LoD and assigns point c0 to LoD2. Next, the three-dimensional data encoding device extracts point c1 which is distant from point c0 more than threshold value Thres_LoD[2] of LoD2 and which has not yet been assigned to any LoD, and assigns point c1 to LoD2. Next, the three-dimensional data encoding device extracts point c2 which is distant from point c1 more than threshold value Thres_LoD[2] of LoD2 and which has not yet been assigned to any LoD, and assigns point c2 to LoD2. In this way, the three-dimensional data encoding device configures LoD2 in such a manner that the distance between the points in LoD2 is larger than threshold value Thres_LoD[2]. For example, as illustrated in FIG. 53, threshold values Thres_LoD[0], Thres_LoD[1], and Thres_LoD[2] of respective LoDs are set.

In addition, the three-dimensional data encoding device may add the information indicating the threshold value of each LoD to, for example, a header of a bitstream. For example, in the case of the example illustrated in FIG. 53, the three-dimensional data encoding device may add threshold values Thres_LoD[0], Thres_LoD[1], and Thres_LoD[2] of respective LoDs to a header.

Alternatively, the three-dimensional data encoding device may assign all three-dimensional points which have not yet been assigned to any LoD in the lowermost-layer LoD. In this case, the three-dimensional data encoding device is capable of reducing the code amount of the header by not assigning the threshold value of the lowermost-layer LoD to the header. For example, in the case of the example illustrated in FIG. 53, the three-dimensional data encoding device assigns threshold values Thres_LoD[0] and Thres_LoD[1] to the header, and does not assign Thres_LoD[2] to the header. In this case, the three-dimensional data encoding device may estimate value 0 of Thres_LoD[2]. In addition, the three-dimensional data encoding device may add the number of LoDs to a header. In this way, the three-dimensional data encoding device is capable of determining the lowermost-layer LoD using the number of LoDs.

Figure 53:
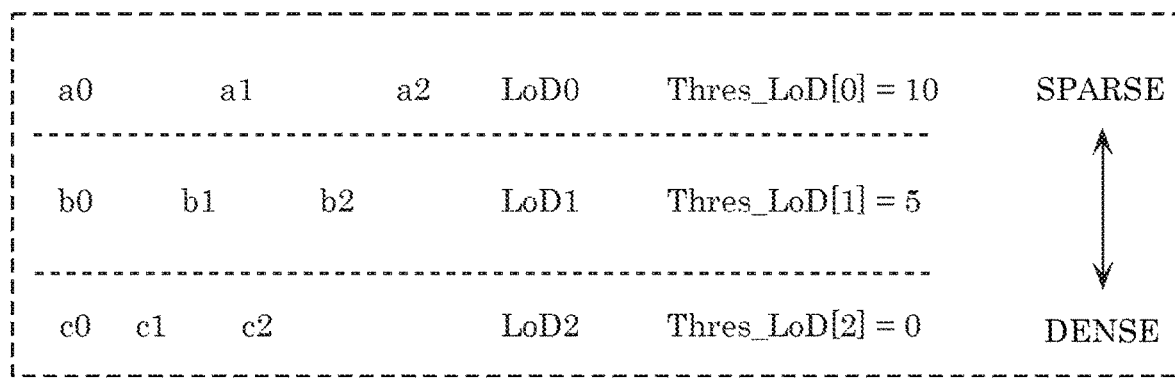
FIG. 53 is a diagram illustrating an example of setting LoDs according to Embodiment 8.

In addition, setting threshold values for the respective layers LoDs in such a manner that a larger threshold value is set to a higher layer, as illustrated in FIG. 53, makes a higher layer (layer closer to LoD0) to have a sparse point cloud (sparse) in which three-dimensional points are more distant and makes a lower layer to have a dense point cloud (dense) in which three-dimensional points are closer. It is to be noted that, in an example illustrated in FIG. 53, LoD0 is the uppermost layer.

In addition, the method of selecting an initial three-dimensional point at the time of setting each LoD may depend on an encoding order at the time of geometry information encoding. For example, the three-dimensional data encoding device configures LoD0 by selecting the three-dimensional point encoded first at the time of the geometry information encoding as initial point a0 of LoD0, and selecting point a1 and point a2 from initial point a0 as the origin. The three-dimensional data encoding device then may select the three-dimensional point whose geometry information has been encoded at the earliest time among three-dimensional points which do not belong to LoD0, as initial point b0 of LoD1. In other words, the three-dimensional data encoding device may select the three-dimensional point whose geometry information has been encoded at the earliest time among three-dimensional points which do not belong to layers (LoD0 to LoDn−1) above LoDn, as initial point n0 of LoDn. In this way, the three-dimensional data encoding device is capable of configuring the same LoD as in encoding by using, in decoding, the initial point selecting method similar to the one used in the encoding, which enables appropriate decoding of a bitstream. More specifically, the three-dimensional data encoding device selects the three-dimensional point whose geometry information has been decoded at the earliest time among three-dimensional points which do not belong to layers above LoDn, as initial point n0 of LoDn.

Hereinafter, a description is given of a method of generating the predicted value of the attribute information of each three-dimensional point using information of LoDs. For example, when encoding three-dimensional points starting with the three-dimensional points included in LoD0, the three-dimensional data encoding device generates current three-dimensional points which are included in LoD1 using encoded and decoded (hereinafter also simply referred to as "encoded") attribute information included in LoD0 and LoD1. In this way, the three-dimensional data encoding device generates a predicted value of attribute information of each three-dimensional point included in LoDn using encoded attribute information included in LoDn' (n'≤n). In other words, the three-dimensional data encoding device does not use attribute information of each of three-dimensional points included in any layer below LoDn to calculate a predicted value of attribute information of each of the three-dimensional points included in LoDn.

For example, the three-dimensional data encoding device calculates an average of attribute information of N or less three dimensional points among encoded three-dimensional points surrounding a current three-dimensional point to be encoded, to generate a predicted value of attribute information of the current three-dimensional point. In addition, the three-dimensional data encoding device may add value N to, for example, a header of a bitstream. It is to be noted that the three-dimensional data encoding device may change value N for each three-dimensional point, and may add value N for each three-dimensional point. This enables selection of appropriate N for each three-dimensional point, which makes it possible to increase the accuracy of the predicted value. Accordingly, it is possible to reduce the prediction residual. Alternatively, the three-dimensional data encoding device may add value N to a header of a bitstream, and may fix the value indicating N in the bitstream. This eliminates the need to encode or decode value N for each three-dimensional point, which makes it possible to reduce the processing amount. In addition, the three-dimensional data encoding device may encode the values of N separately for each LoD. In this way, it is possible to increase the coding efficiency by selecting appropriate N for each LoD.

Alternatively, the three-dimensional data encoding device may calculate a predicted value of attribute information of three-dimensional point based on weighted average values of attribute information of encoded N neighbor three-dimensional points. For example, the three-dimensional data encoding device calculates weights using distance information between a current three-dimensional point and each of N neighbor three-dimensional points.

When encoding value N for each LoD, for example, the three-dimensional data encoding device sets larger value N to a higher layer LoD, and sets smaller value N to a lower layer LoD. The distance between three-dimensional points belonging to a higher layer LoD is large, there is a possibility that it is possible to increase the prediction accuracy by setting large value N, selecting a plurality of neighbor three-dimensional points, and averaging the values. Furthermore, the distance between three-dimensional points belonging to a lower layer LoD is small, it is possible to perform efficient prediction while reducing the processing amount of averaging by setting smaller value N.

Figure 54:
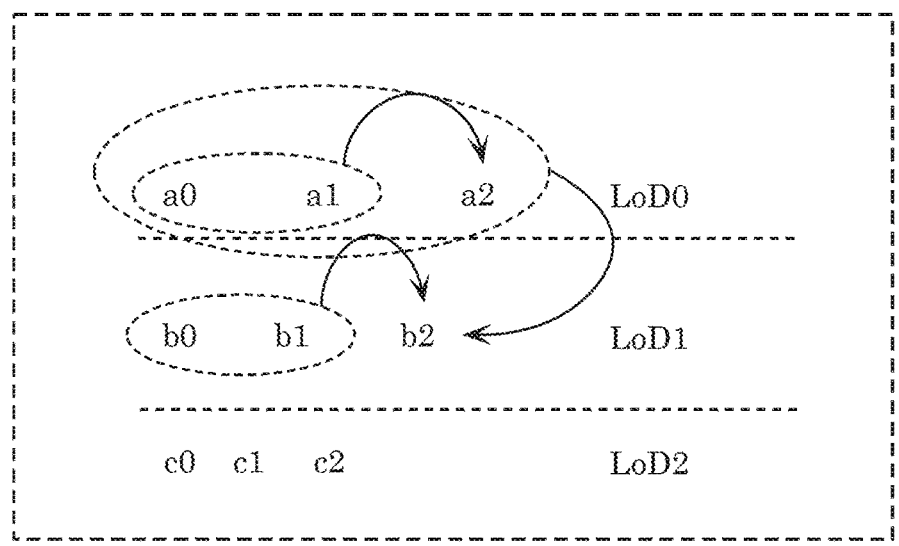
FIG. 54 is a diagram illustrating an example of attribute information to be used for predicted values according to Embodiment 8.

FIG. 54 is a diagram illustrating an example of attribute information to be used for predicted values. As described above, the predicted value of point P included in LoDN is generated using encoded neighbor point P' included in LoDN' (N'≤N). Here, neighbor point P' is selected based on the distance from point P. For example, the predicted value of attribute information of point b2 illustrated in FIG. 54 is generated using attribute information of each of points a0, a1, b0, and b1.

Neighbor points to be selected vary depending on the values of N described above. For example, in the case of N=5, a0, a1, a2, b0, and b1 are selected as neighbor points. In the case of N=4, a0, a1, a2, and b1 are selected based on distance information.

The predicted value is calculated by distance-dependent weighted averaging. For example, in the example illustrated in FIG. 54, predicted value a2p of point a2 is calculated by weighted averaging of attribute information of each of point a0 and a1, as represented by (Equation A2) and (Equation A3). It is to be noted that $A_i$ is an attribute information value of ai.

[Math. 2]

$$a2p = \sum_{i=0}^{1} w_i \times A_i \quad \text{(Equation A2)}$$

$$w_i = \frac{\frac{1}{d(a2, ai)}}{\sum_{j=0}^{1} \frac{1}{d(a2, aj)}} \quad \text{(Equation A3)}$$

In addition, predicted value b2p of point b2 is calculated by weighted averaging of attribute information of each of point a0, a1, a2, b0, and b1, as represented by (Equation A4) and (Equation A6). It is to be noted that $B_i$ is an attribute information value of bi.

[Math. 3]

$$b2p = \sum_{i=0}^{2} wa_i \times A_i + \sum_{i=0}^{1} wb_i \times B_i \quad \text{(Equation A4)}$$

$$wa_i = \frac{\frac{1}{d(b2, ai)}}{\sum_{j=0}^{2} \frac{1}{d(b2, aj)} + \sum_{j=0}^{1} \frac{1}{d(b2, bj)}} \quad \text{(Equation A5)}$$

$$wb_i = \frac{\frac{1}{d(b2, bi)}}{\sum_{j=0}^{2} \frac{1}{d(b2, aj)} + \sum_{j=0}^{1} \frac{1}{d(b2, bj)}} \quad \text{(Equation A6)}$$

In addition, the three-dimensional data encoding device may calculate a difference value (prediction residual) generated from the value of attribute information of a three-dimensional point and neighbor points, and may quantize the calculated prediction residual. For example, the three-dimensional data encoding device performs quantization by dividing the prediction residual by a quantization scale (also referred to as a quantization step). In this case, an error (quantization error) which may be generated by quantization reduces as the quantization scale is smaller. In the other case where the quantization scale is larger, the resulting quantization error is larger.

It is to be noted that the three-dimensional data encoding device may change the quantization scale to be used for each LoD. For example, the three-dimensional data encoding device reduces the quantization scale more for a higher layer, and increases the quantization scale more for a lower layer. The value of attribute information of a three-dimensional point belonging to a higher layer may be used as a predicted value of attribute information of a three-dimensional point belonging to a lower layer. Thus, it is possible to increase the coding efficiency by reducing the quantization scale for the higher layer to reduce the quantization error that can be generated in the higher layer and to increase the prediction accuracy of the predicted value. It is to be noted that the three-dimensional data encoding device may add the quantization scale to be used for each LoD to, for example, a header. In this way, the three-dimensional data encoding device can decode the quantization scale correctly, thereby appropriately decoding the bitstream.

In addition, the three-dimensional data encoding device may convert a signed integer value (signed quantized value) which is a quantized prediction residual into an unsigned integer value (unsigned quantized value). This eliminates the need to consider occurrence of a negative integer when entropy encoding the prediction residual. It is to be rioted that the three-dimensional data encoding device does not always need to convert a signed integer value into an unsigned integer value, and, for example, that the three-dimensional data encoding device may entropy encode a sign bit separately.

The prediction residual is calculated by subtracting a prediction value from the original value. For example, as represented by (Equation A7), prediction residual $a2r$ of point $a2$ is calculated by subtracting predicted value $a2p$ of point $a2$ from value $A_2$ of attribute information of point $a2$. As represented by (Equation A8), prediction residual $b2r$ of point $b2$ is calculated by subtracting predicted value $b2p$ of point $b2$ from value $B_2$ of attribute information of point $b2$.

$$a2r = A_2 - a2p \qquad \text{(Equation A7)}$$

$$b2r = B_2 - b2p \qquad \text{(Equation A8)}$$

In addition, the prediction residual is quantized by being divided by a Quantization Step (QS). For example, quantized value $a2q$ of point $a2$ is calculated according to (Equation A9). Quantized value $b2q$ of point $b2$ is calculated according to (Equation A10). Here, QS_LoD0 is a QS for LoD0, and QS_LoD1 is a QS for LoD1. In other words, a QS may be changed according to an LoD.

$$a2q = a2r/QS\_LoD0 \qquad \text{(Equation A9)}$$

$$b2q = b2r/QS\_LoD1 \qquad \text{(Equation A10)}$$

In addition, the three-dimensional data encoding device converts signed integer values which are quantized values as indicated below into unsigned integer values as indicated below. When signed integer value $a2q$ is smaller than 0, the three-dimensional data encoding device sets unsigned integer value $a2u$ to $-1-(2 \times a2q)$. When signed integer value $a2q$ is 0 or more, the three-dimensional data encoding device sets unsigned integer value $a2u$ to $2 \times a2q$.

Likewise, when signed integer value $b2q$ is smaller than 0, the three-dimensional data encoding device sets unsigned integer value $b2u$ to $-1-(2 \times b2q)$. When signed integer value $b2q$ is 0 or more, the three-dimensional data encoding device sets unsigned integer value $b2u$ to $2 \times b2q$.

In addition, the three-dimensional data encoding device may encode the quantized prediction residual (unsigned integer value) by entropy encoding. For example, the three-dimensional data encoding device may binarize the unsigned integer value and then apply binary arithmetic encoding to the binary value.

It is to be noted that, in this case, the three-dimensional data encoding device may switch binarization methods according to the value of a prediction residual. For example, when prediction residual pu is smaller than threshold value R_TH, the three-dimensional data encoding device binarizes prediction residual pu using a fixed bit count required for representing threshold value R_TH. In addition, when prediction residual pu is larger than or equal to threshold value R_TH, the three-dimensional data encoding device binarizes the binary data of threshold value R_TH and the value of (pu−R_TH), using exponential-Golomb coding, or the like.

For example, when threshold value R_TH is 63 and prediction residual pu is smaller than 63, the three-dimensional data encoding device binarizes prediction residual pu using 6 bits. When prediction residual pu is larger than or equal to 63, the three-dimensional data encoding device performs arithmetic encoding by binarizing the binary data (111111) of threshold value R_TH and (pu−63) using exponential-Golomb coding.

In a more specific example, when prediction residual pu is 32, the three-dimensional data encoding device generates 6-bit binary data (100000), and arithmetic encodes the bit sequence. In addition, when prediction residual pu is 66, the three-dimensional data encoding device generates binary data (111111) of threshold value R_TH and a bit sequence (00100) representing value 3 (66−63) using exponential-Golomb coding, and arithmetic encodes the bit sequence (111111+00100).

In this way, the three-dimensional data encoding device can perform encoding while preventing a binary bit count from increasing abruptly in the case where a prediction residual becomes large by switching binarization methods according to the magnitude of the prediction residual. It is to be noted that the three-dimensional data encoding device may add threshold value R_TH to, for example, a header of a bitstream.

For example, in the case where encoding is performed at a high bit rate, that is, when a quantization scale is small, a small quantization error and a high prediction accuracy are obtained. As a result, a prediction residual may not be large. Thus, in this case, the three-dimensional data encoding device sets large threshold value R_TH. This reduces the possibility that the binary data of threshold value R_TH is encoded, which increases the coding efficiency. In the opposite case where encoding is performed at a low bit rate, that is, when a quantization scale is large, a large quantization error and a low prediction accuracy are obtained. As a result, a prediction residual may be large. Thus, in this case, the three-dimensional data encoding device sets small threshold value R_TH. In this way, it is possible to prevent abrupt increase in bit length of binary data.

In addition, the three-dimensional data encoding device may switch threshold value R_TH for each LoD, and may add threshold value R_TH for each LoD to, for example, a header. In other words, the three-dimensional data encoding device may switch binarization methods for each LoD. For example, since distances between three-dimensional points are large in a higher layer, a prediction accuracy is low, which may increase a prediction residual. Thus, the three-dimensional data encoding device prevents abrupt increase in bit length of binary data by setting small threshold value R_TH to the higher layer. In addition, since distances between three-dimensional points are small in a lower layer, a prediction accuracy is high, which may reduce a prediction residual. Thus, the three-dimensional data encoding device increases the coding efficiency by setting large threshold value R_TH to the lower layer.

FIG. 55 is a diagram indicating examples of exponential-Golomb codes. The diagram indicates the relationships between pre-binarization values (non-binary values) and post-binarization bits (codes). It is to be noted that 0 and 1 indicated in FIG. 55 may be inverted.

The three-dimensional data encoding device applies arithmetic encoding to the binary data of prediction residuals. In this way, the coding efficiency can be increased. It is to be noted that, in the application of the arithmetic encoding, there is a possibility that occurrence probability tendencies of 0 and 1 in each bit vary, in binary data, between an n-bit code which is a part binarized by n bits and a remaining code which is a part binarized using exponential-Golomb coding. Thus, the three-dimensional data encoding device may switch methods of applying arithmetic encoding between the n-bit code and the remaining code.

For example, the three-dimensional data encoding device performs arithmetic encoding on the n-bit code using one or more coding tables (probability tables) different for each bit. At this time, the three-dimensional data encoding device may change the number of coding tables to be used for each bit. For example, the three-dimensional data encoding device performs arithmetic encoding using one coding table for first bit b0 in an n-bit code. The three-dimensional data encoding device uses two coding tables for next bit b1. The three-dimensional data encoding device switches coding tables to be used for arithmetic encoding of bit b1 according to the value (0 or 1) of b0. Likewise, the three-dimensional data encoding device uses four coding tables for next bit b2. The three-dimensional data encoding device switches coding tables to be used for arithmetic encoding of bit b2 according to the values (in a range from 0 to 3) of b0 and b1.

In this way, the three-dimensional data encoding device uses $2^{n-1}$ coding tables when arithmetic encoding each bit bn−1 in n-bit code. The three-dimensional data encoding device switches coding tables to be used according to the values (occurrence patterns) of bits before bn−1. In this way, the three-dimensional data encoding device can use coding tables appropriate for each bit, and thus can increase the coding efficiency.

It is to be noted that the three-dimensional data encoding device may reduce the number of coding tables to be used for each bit. For example, the three-dimensional data encoding device may switch $2^m$ coding tables according to the values (occurrence patterns) of m bits (m<n−1) before bn−1 when arithmetic encoding each bit bn−1. In this way, it is possible to increase the coding efficiency while reducing the number of coding tables to be used for each bit. It is to be noted that the three-dimensional data encoding device may update the occurrence probabilities of 0 and 1 in each coding table according to the values of binary data occurred actually. In addition, the three-dimensional data encoding device may fix the occurrence probabilities of 0 and 1 in coding tables for some bit(s). In this way, it is possible to reduce the number of updates of occurrence probabilities, and thus to reduce the processing amount.

For example, when an n-bit code is b0, b1, b2, . . . , bn−1, the coding table for b0 is one table (CTb0). Coding tables for b1 are two tables (CTb10 and CTb11). Coding tables to be used are switched according to the value (0 or 1) of b0. Coding tables for b2 are four tables (CTb20, CTb21, CTb22, and CTb23). Coding tables to be used are switched according to the values (in the range from 0 to 3) of b0 and b1. Coding tables for bn−1 are $2^{n-1}$ tables (CTbn0, CTbn1, . . . , CTbn ($2^{n-1}$−1)). Coding tables to be used are switched according to the values (in a range from 0 to $2^{n-1}$−1) of b0, b1, . . . , bn−2.

It is to be noted that the three-dimensional data encoding device may apply, to an n-bit code, arithmetic encoding (m=$2^n$) by m-ary that sets the value in the range from 0 to $2^n$−1 without binarization. When the three-dimensional data encoding device arithmetic encodes an n-bit code by an m-ary, the three-dimensional data decoding device may reconstruct the n-bit code by arithmetic decoding the m-ary.

FIG. 56 is a diagram for illustrating processing in the case where remaining codes are exponential-Golomb codes. As indicated in FIG. 56, each remaining code which is a part binarized using exponential-Golomb coding includes a prefix and a suffix. For example, the three-dimensional data encoding device switches coding tables between the prefix and the suffix. In other words, the three-dimensional data encoding device arithmetic encodes each of bits included in the prefix using coding tables for the prefix, and arithmetic encodes each of bits included in the suffix using coding tables for the suffix.

It is to be noted that the three-dimensional data encoding device may update the occurrence probabilities of 0 and 1 in each coding table according to the values of binary data occurred actually. In addition, the three-dimensional data encoding device may fix the occurrence probabilities of 0 and 1 in one of coding tables. In this way, it is possible to reduce the number of updates of occurrence probabilities, and thus to reduce the processing amount. For example, the three-dimensional data encoding device may update the occurrence probabilities for the prefix, and may fix the occurrence probabilities for the suffix.

In addition, the three-dimensional data encoding device decodes a quantized prediction residual by inverse quantization and reconstruction, and uses a decoded value which is the decoded prediction residual for prediction of a current three-dimensional point to be encoded and the following three-dimensional point(s). More specifically, the three-dimensional data encoding device calculates an inverse quantized value by multiplying the quantized prediction residual (quantized value) with a quantization scale, and adds the inverse quantized value and a prediction value to obtain the decoded value (reconstructed value).

For example, quantized value a2$iq$ of point a2 is calculated using quantized value a2$q$ of point a2 according to (Equation A11). Inverse quantized value b2$iq$ of point b2$q$ is calculated using quantized value b2$q$ of point b2 according to (Equation A12). Here, QS_LoD0 is a QS for LoD0, and QS_LoD1 is a QS for LoD1. In other words, a QS may be changed according to an LoD.

$$a2iq = a2q \times QS\_LoD0 \qquad \text{(Equation A11)}$$

$$b2iq = b2q \times QS\_LoD1 \qquad \text{(Equation A12)}$$

For example, as represented by (Equation A13), decoded value a2$rec$ of point a2 is calculated by adding inverse quantization value a2$iq$ of point a2 to predicted value a2$p$ of point a2. As represented by (Equation A14), decoded value b2$rec$ of point b2 is calculated by adding inverse quantized value b2$iq$ of point b2 to predicted value b2$p$ of point b2.

$$a2rec = a2iq + a2p \qquad \text{(Equation A13)}$$

$$b2rec = b2iq + b2p \qquad \text{(Equation A14)}$$

Hereinafter, a syntax example of a bitstream according to the present embodiment is described. FIG. 57 is a diagram indicating the syntax example of an attribute header (attribute_header) according to the present embodiment. The attribute header is header information of attribute information. As indicated in FIG. 57, the attribute header includes the number of layers information (NumLoD), the number of three-dimensional points information (NumOfPoint[i]), a layer threshold value (Thres_LoD[i]), the number of neighbor points information (NumNeighborPoint[i]), a prediction threshold value (THd[i]), a quantization scale (QS[i]), and a binarization threshold value (R_TH[i]).

The number of layers information (NumLoD) indicates the number of LoDs to be used.

The number of three-dimensional points information (NumOfPoint[i]) indicates the number of three-dimensional points belonging to layer i. It is to be noted that the three-dimensional data encoding device may add, to another header, the number of three-dimensional points information indicating the total number of three-dimensional points. In this case, the three-dimensional data encoding device does not need to add, to a header, NumOfPoint [NumLoD−1] indicating the number of three-dimensional points belonging to the lowermost layer. In this case, the three-dimensional data decoding device is capable of calculating NumOfPoint [NumLoD−1] according to (Equation A15). In this case, it is possible to reduce the code amount of the header.

[Math. 4]

$$NumOfPoint[NumLoD-1] = \\ AllNumOfPoint - \sum_{j=0}^{NumLoD-2} NumOfPoint[j]$$

(Equation A15)

The layer threshold value (Thres_LoD[i]) is a threshold value to be used to set layer i. The three-dimensional data encoding device and the three-dimensional data decoding device configure LoDi in such a manner that the distance between points in LoDi becomes larger than threshold value Thres_LoD[i]. The three-dimensional data encoding device does not need to add the value of Thres_LoD [NumLoD−1] (lowermost layer) to a header. In this case, the three-dimensional data decoding device may estimate 0 as the value of Thres_LoD [NumLoD−1]. In this case, it is possible to reduce the code amount of the header.

The number of neighbor points information (NumNeighborPoint[i]) indicates the upper limit value of the number of neighbor points to be used to generate a predicted value of a three-dimensional point belonging to layer i. The three-dimensional data encoding device may calculate a predicted value using the number of neighbor points M when the number of neighbor points M is smaller than NumNeighborPoint[i] (M<NumNeighborPoint[i]). Furthermore, when there is no need to differentiate the values of NumNeighborPoint[i] for respective LoDs, the three-dimensional data encoding device may add a piece of the number of neighbor points information (NumNeighborPoint) to be used in all LoDs to a header.

The prediction threshold value (THd[i]) indicates the upper limit value of the distance between a current three-dimensional point to be encoded or decoded in layer i and each of neighbor three-dimensional points to be used to predict the current three-dimensional point. The three-dimensional data encoding device and the three-dimensional data decoding device do not use, for prediction, any three-dimensional point distant from the current three-dimensional point over THd[i]. It is to be noted that, when there is no need to differentiate the values of THd[i] for respective LoDs, the three-dimensional data encoding device may add a single prediction threshold value (THd) to be used in all LoDs to a header.

The quantization scale (QS[i]) indicates a quantization scale to be used for quantization and inverse quantization in layer i.

The binarization threshold value (R_TH[i]) is a threshold value for switching binarization methods of prediction residuals of three-dimensional points belonging to layer i. For example, the three-dimensional data encoding device binarizes prediction residual pu using a fixed bit count when a prediction residual is smaller than threshold value R_TH, and binarizes the binary data of threshold value R_TH and the value of (pu−R_TH) using exponential-Golomb coding when a prediction residual is larger than or equal to threshold value R_TH. It is to be noted that, when there is no need to switch the values of R_TH[i] between LoDs, the three-dimensional data encoding device may add a single binarization threshold value (R_TH) to be used in all LoDs to a header.

It is to be noted that R_TH[i] may be the maximum value which can be represented by n bits. For example, R_TH is 63 in the case of 6 bits, and R_TH is 255 in the case of 8 bits. Alternatively, the three-dimensional data encoding device may encode a bit count instead of encoding the maximum value which can be represented by n bits as a binarization threshold value. For example, the three-dimensional data encoding device may add value 6 in the case of R_TH[i]=63 to a header, and may add value 8 in the case of R_TH[i]=255 to a header. Alternatively, the three-dimensional data encoding device may define the minimum value (minimum bit count) representing R_TH[i], and add a relative bit count from the minimum value to a header. For example, the three-dimensional data encoding device may add value 0 to a header when R_TH[i]=63 is satisfied and the minimum bit count is 6, and may add value 2 to a header when R_TH[i]=255 is satisfied and the minimum bit count is 6.

Alternatively, the three-dimensional data encoding device may entropy encode at least one of NumLoD, Thres_LoD[i], NumNeighborPoint[i], THd[i], QS[i], and R_TH[i], and add the entropy encoded one to a header. For example, the three-dimensional data encoding device may binarize each value and perform arithmetic encoding on the binary value. In addition, the three-dimensional data encoding device may encode each value using a fixed length in order to reduce the processing amount.

Alternatively, the three-dimensional data encoding device does not always need to add at least one of NumLoD, Thres_LoD[i], NumNeighborPoint[i], THd[i], QS[i], and R_TH[i] to a header. For example, at least one of these values may be defined by a profile or a level in a standard, or the like. In this way, it is possible to reduce the bit amount of the header.

FIG. 58 is a diagram indicating the syntax example of attribute data (attribute_data) according to the present embodiment. The attribute data includes encoded data of the attribute information of a plurality of three-dimensional points. As indicated in FIG. 58, the attribute data includes an n-bit code and a remaining code.

The n-bit code is encoded data of a prediction residual of a value of attribute information or a part of the encoded data. The bit length of the n-bit code depends on value R_TH[i]. For example, the bit length of the n-bit code is 6 bits when the value indicated by R_TH[i] is 63, the bit length of the n-bit code is 8 bits when the value indicated by R_TH[i] is 255.

The remaining code is encoded data encoded using exponential-Golomb coding among encoded data of the prediction residual of the value of the attribute information. The remaining code is encoded or decoded when the value of the n-bit code is equal to R_TH[i]. The three-dimensional data decoding device decodes the prediction residual by adding the value of the n-bit code and the value of the remaining code. It is to be noted that the remaining code does not always need to be encoded or decoded when the value of the n-bit code is not equal to R_TH[i].

Figure 59:
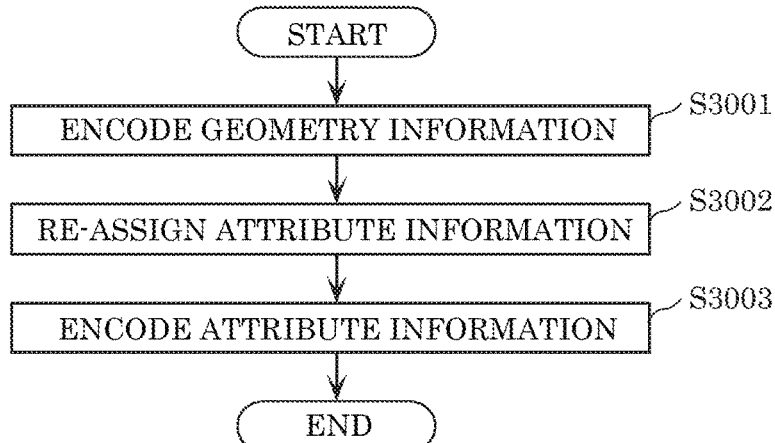
FIG. 59 is a flowchart of a three-dimensional data encoding process according to Embodiment 8.

Hereinafter, a description is given of a flow of processing in the three-dimensional data encoding device. FIG. 59 is a flowchart of a three-dimensional data encoding process performed by the three-dimensional data encoding device.

First, the three-dimensional data encoding device encodes geometry information (geometry) (S3001). For example, the three-dimensional data encoding is performed using octree representation.

When the positions of three-dimensional points changed by quantization, etc, after the encoding of the geometry information, the three-dimensional data encoding device re-assigns attribute information of the original three-dimensional points to the post-change three-dimensional points (S3002). For example, the three-dimensional data encoding device interpolates values of attribute information according to the amounts of change in position to re-assign the attribute information. For example, the three-dimensional data encoding device detects pre-change N three-dimensional points closer to the post-change three-dimensional positions, and performs weighted averaging of the values of attribute information of the N three-dimensional points. For example, the three-dimensional data encoding device determines weights based on distances from the post-change three-dimensional positions to the respective N three-dimensional positions in weighted averaging. The three-dimensional data encoding device then determines the values obtained through the weighted averaging to be the values of the attribute information of the post-change three-dimensional points. When two or more of the three-dimensional points are changed to the same three-dimensional position through quantization, etc., the three-dimensional data encoding device may assign the average value of the attribute information of the pre-change two or more three-dimensional points as the values of the attribute information of the post-change three-dimensional points.

Next, the three-dimensional data encoding device encodes the attribute information (attribute) re-assigned (S3003). For example, when encoding a plurality of kinds of attribute information, the three-dimensional data encoding device may encode the plurality of kinds of attribute information in order. For example, when encoding colors and reflectances as attribute information, the three-dimensional data encoding device may generate a bitstream added with the color encoding results and the reflectance encoding results after the color encoding results. It is to be noted that the order of the plurality of encoding results of attribute information to be added to a bitstream is not limited to the order, and may be any order.

Alternatively, the three-dimensional data encoding device may add, to a header for example, information indicating the start location of encoded data of each attribute information in a bitstream. In this way, the three-dimensional data decoding device is capable of selectively decoding attribute information required to be decoded, and thus is capable of skipping the decoding process of the attribute information not required to be decoded. Accordingly, it is possible to reduce the amount of processing by the three-dimensional data decoding device. Alternatively, the three-dimensional data encoding device may encode a plurality of kinds of attribute information parallel, and may integrate the encoding results into a single bitstream. In this way, the three-dimensional data encoding device is capable of encoding the plurality of kinds of attribute information at high speed.

Figure 60:
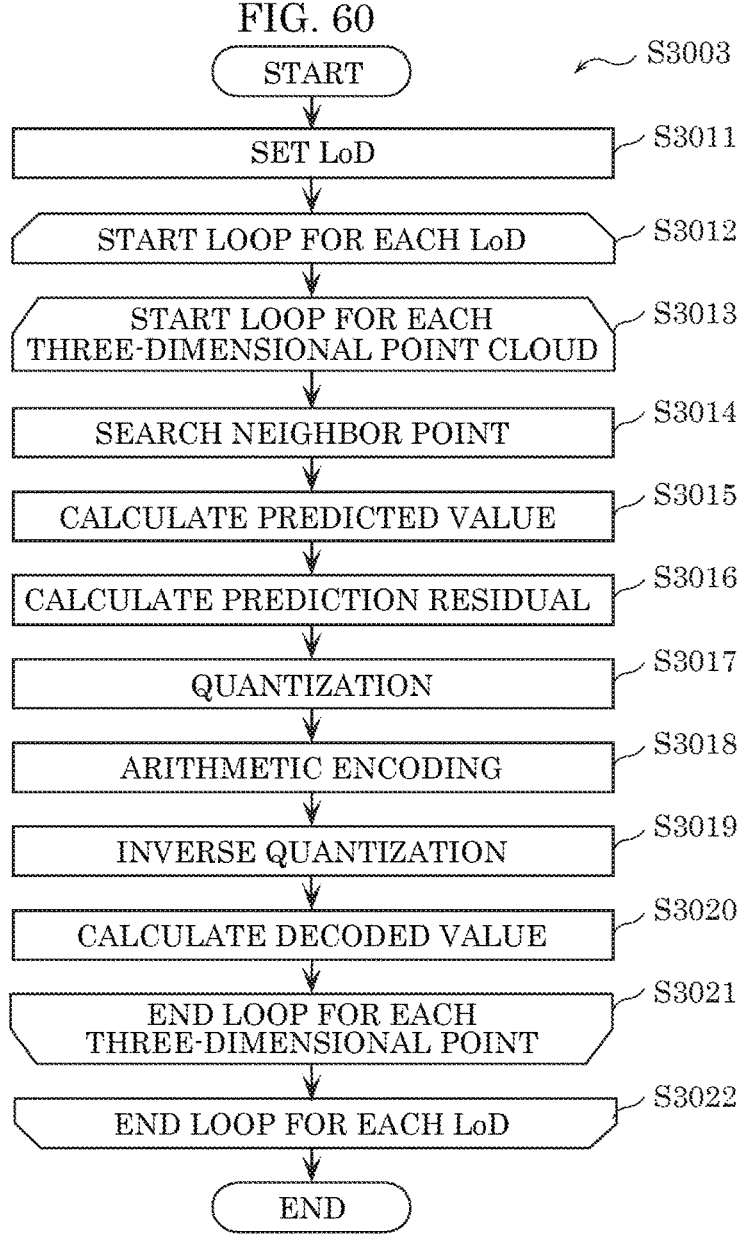
FIG. 60 is a flowchart of an attribute information encoding process according to Embodiment 8.

FIG. 60 is a flowchart of an attribute information encoding process (S3003). First, the three-dimensional data encoding device sets LoDs (S3011). In other words, the three-dimensional data encoding device assigns each of three-dimensional points to any one of the plurality of LoDs.

Next, the three-dimensional data encoding device starts a loop for each LoD (S3012). In other words, the three-dimensional data encoding device iteratively performs the processes of Steps from S3013 to S3021 for each LoD.

Next, the three-dimensional data encoding device starts a loop for each three-dimensional point (S3013). In other words, the three-dimensional data encoding device iteratively performs the processes of Steps from S3014 to S8020 for each three-dimensional point.

First, the three-dimensional data encoding device searches a plurality of neighbor points which are three-dimensional points present in the neighborhood of a current three-dimensional point to be processed and are to be used to calculate a predicted value of the current three-dimensional point (S3014). Next, the three-dimensional data encoding device calculates the weighted average of the values of attribute information of the plurality of neighbor points, and sets the resulting value to predicted value P (S3015). Next, the three-dimensional data encoding device calculates a prediction residual which is the difference between the attribute information of the current three-dimensional point and the predicted value (S3016). Next, the three-dimensional data encoding device quantizes the prediction residual to calculate a quantized value (S3017). Next, the three-dimensional data encoding device arithmetic encodes the quantized value (S3018).

Next, the three-dimensional data encoding device inverse quantizes the quantized value to calculate an inverse quantized value (S3019). Next, the three-dimensional data encoding device adds a prediction value to the inverse quantized value to generate a decoded value (S3020). Next, the three-dimensional data encoding device ends the loop for each three-dimensional point (S3021). Next, the three-dimensional data encoding device ends the loop for each LoD (S3022).

Hereinafter, a description is given of a three-dimensional data decoding process in the three-dimensional data decoding device which decodes a bitstream generated by the three-dimensional data encoding device.

The three-dimensional data decoding device generates decoded binary data by arithmetic decoding the binary data of the attribute information in the bitstream generated by the three-dimensional data encoding device, according to the method similar to the one performed by the three-dimensional data encoding device. It is to be noted that when methods of applying arithmetic encoding are switched between the part (n-bit code) binarized using n bits and the part (remaining code) binarized using exponential-Golomb coding in the three-dimensional data encoding device, the three-dimensional data decoding device performs decoding in conformity with the arithmetic encoding, when applying arithmetic decoding.

For example, the three-dimensional data decoding device performs arithmetic decoding using coding tables (decoding tables) different for each bit in the arithmetic decoding of the n-bit code. At this time, the three-dimensional data decoding device may change the number of coding tables to be used for each bit. For example, the three-dimensional data decoding device performs arithmetic decoding using one coding table for first bit b0 in the n-bit code. The three-dimensional data decoding device uses two coding tables for next bit b1. The three-dimensional data decoding device switches coding tables to be used for arithmetic decoding of bit b1 according to the value (0 or 1) of b0. Likewise, the three-dimensional data decoding device uses four coding tables for next bit b2. The three-dimensional data decoding device switches coding tables to be used for arithmetic decoding of bit b2 according to the values (in the range from 0 to 3) of b0 and b1.

In this way, the three-dimensional data decoding device uses $2^{n-1}$ coding tables when arithmetic decoding each bit bn−1 in the n-bit code. The three-dimensional data decoding device switches coding tables to be used according to the values (occurrence patterns) of bits before bn−1. In this way, the three-dimensional data decoding device is capable of appropriately decoding a bitstream encoded at an increased coding efficiency using the coding tables appropriate for each bit.

It is to be noted that the three-dimensional data decoding device may reduce the number of coding tables to be used for each bit. For example, the three-dimensional data decoding device may switch $2^m$ coding tables according to the values (occurrence patterns) of m bits (m<n−1) before bn−1 when arithmetic decoding each bit bn−1. In this way, the three-dimensional data decoding device is capable of appropriately decoding the bitstream encoded at the increased coding efficiency while reducing the number of coding tables to be used for each bit. It is to be noted that the three-dimensional data decoding device may update the occurrence probabilities of 0 and 1 in each coding table according to the values of binary data occurred actually. In addition, the three-dimensional data decoding device may fix the occurrence probabilities of 0 and 1 in coding tables for some bit(s). In this way, it is possible to reduce the number of updates of occurrence probabilities, and thus to reduce the processing amount.

For example, when an n-bit code is b0, b1, b2, ..., bn−1, the coding table for b0 is one (CTb0). Coding tables for b1 are two tables (CTb10 and CTb11). Coding tables to be used are switched according to the value (0 or 1) of b0. Coding tables for b2 are four tables (CTb20, CTb21, CTb22, and CTb23). Coding tables to be used according to the values (in the range from 0 to 3) of b0 and b1. Coding tables for bn−1 are $2^{n-1}$ tables (CTbn0, CTbn1, ..., CTbn ($2^{n-1}$−1)). Coding tables to be used are switched according to the values (in the range from 0 to $2^{n-1}$−1) of b0, b1, ..., bn−2.

FIG. 61 is a diagram for illustrating processing in the case where remaining codes are exponential-Golomb codes. As indicated in FIG. 61, the part (remaining part) binarized and encoded by the three-dimensional data encoding device using exponential-Golomb coding includes a prefix and a suffix. For example, the three-dimensional data decoding device switches coding tables between the prefix and the suffix. In other words, the three-dimensional data decoding device arithmetic decodes each of bits included in the prefix using coding tables for the prefix, and arithmetic decodes each of bits included in the suffix using coding tables for the suffix.

It is to be noted that the three-dimensional data decoding device may update the occurrence probabilities of 0 and 1 in each coding table according to the values of binary data occurred at the time of decoding. In addition, the three-dimensional data decoding device may fix the occurrence probabilities of 0 and 1 in one of coding tables. In this way, it is possible to reduce the number of updates of occurrence probabilities, and thus to reduce, the processing amount. For example, the three-dimensional data decoding device may update the occurrence probabilities for the prefix, and may fix the occurrence probabilities for the suffix.

Furthermore, the three-dimensional data decoding device decodes the quantized prediction residual (unsigned integer value) by debinarizing the binary data of the prediction residual arithmetic decoded according to a method in conformity with the encoding method used by the three-dimensional data encoding device. The three-dimensional data decoding device first arithmetic decodes the binary data of an n-bit code to calculate a value of the n-bit code. Next, the three-dimensional data decoding device compares the value of the n-bit code with threshold value R_TH.

In the case where the value of the n-bit code and threshold value R_TH match, the three-dimensional data decoding device determines that a bit encoded using exponential-Golomb coding is present next, and arithmetic decodes the remaining code which is the binary data encoded using exponential-Golomb coding. The three-dimensional data decoding device then calculates, from the decoded remaining code, a value of the remaining code using a reverse lookup table indicating the relationship between the remaining code and the value. FIG. 62 is a diagram indicating an example of a reverse lookup table indicating relationships between remaining codes and the values thereof. Next, the three-dimensional data decoding device adds the obtained value of the remaining code to R_TH, thereby obtaining a debinarized quantized prediction residual.

In the opposite case where the value of the n-bit code and threshold value R_TH do not match (the value of the n-bit code is smaller than value R_TH), the three-dimensional data decoding device determines the value of the n-bit code to be the debinarized quantized prediction residual as it is. In this way, the three-dimensional data decoding device is capable of appropriately decoding the bitstream generated while switching the binarization methods according to the values of the prediction residuals by the three-dimensional data encoding device.

It is to be noted that, when threshold value R_TH is added to, for example, a header of a bitstream, the three-dimensional data decoding device may decode threshold value R_TH from the header, and may switch decoding methods using decoded threshold value R_TH. When threshold value R_TH is added to, for example, a header for each LoD, the three-dimensional data decoding device switch decoding methods using threshold value R_TH decoded for each LoD.

For example, when threshold value R_TH is 63 and the value of the decoded n-bit code is 63, the three-dimensional data decoding device decodes the remaining code using exponential-Golomb coding, thereby obtaining the value of the remaining code. For example, in the example indicated in FIG. 62, the remaining code is 00100, and 3 is obtained as the value of the remaining code. Next, the three-dimensional data decoding device adds 63 that is threshold value R_TH, and 3 that is the value of the remaining code, thereby obtaining 66 that is the value of the prediction residual.

In addition, when the value of the decoded n-bit code is 32, the three-dimensional data decoding device sets 32 that is the value of the n-bit code to the value of the prediction residual.

In addition, the three-dimensional data decoding device converts the decoded quantized prediction residual, for example, from an unsigned integer value to a signed integer value, through processing inverse to the processing in the three-dimensional data encoding device. In this way, when entropy decoding the prediction residual, the three-dimensional data decoding device is capable of appropriately decoding the bitstream generated without considering occurrence of a negative integer. It is to be noted that the three-dimensional data decoding device does not always need to convert an unsigned integer value to a signed integer value, and that, for example, the three-dimensional data decoding device may decode a sign bit when decoding a bitstream generated by separately entropy encoding the sign bit.

The three-dimensional data decoding device performs decoding by inverse quantizing and reconstructing the quantized prediction residual after being converted to the signed integer value, to obtain a decoded value. The three-dimensional data decoding device uses the generated decoded value for prediction of a current three-dimensional point to be decoded and the following three-dimensional point(s). More specifically, the three-dimensional data decoding device multiplies the quantized prediction residual by a decoded quantization scale to calculate an inverse quantized value and adds the inverse quantized value and the predicted value to obtain the decoded value.

The decoded unsigned integer value (unsigned quantized value) is converted into a signed integer value through the processing indicated below. When the least significant bit (LSB) of decoded unsigned integer value $a2u$ is 1, the three-dimensional data decoding device sets signed integer value $a2q$ to $-((a2u+1)>>1)$. When the LSB of unsigned integer value $a2u$ is not 1, the three-dimensional data decoding device sets signed integer value $a2q$ to $((a2u>>1)$.

Likewise, when an LSB of decoded unsigned integer value $b2u$ is 1, the three-dimensional data decoding device sets signed integer value $b2q$ to $-((b2u+1)$. When the LSB of decoded unsigned integer value $n2u$ is not 1, the three-dimensional data decoding device sets signed integer value $b2q$ to $((b2u>>1)$.

Details of the inverse quantization and reconstruction processing by the three-dimensional data decoding device are similar to the inverse quantization and reconstruction processing in the three-dimensional data encoding device.

Figure 63:
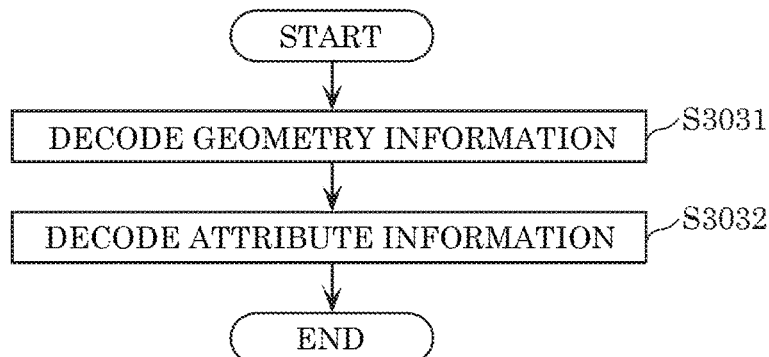
FIG. 63 is a flowchart of a three-dimensional data decoding process according to Embodiment 8.

Hereinafter, a description is given of a flow of processing in the three-dimensional data decoding device. FIG. 63 is a flowchart of a three-dimensional data decoding process performed by the three-dimensional data decoding device. First, the three-dimensional data decoding device decodes geometry information (geometry) from a bitstream (S3031). For example, the three-dimensional data decoding device performs decoding using octree representation.

Next, the three-dimensional data decoding device decodes attribute information (attribute) from the bitstream (S3032). For example, when decoding a plurality of kinds of attribute information, the three-dimensional data decoding device may decode the plurality of kinds of attribute information in order. For example, when decoding colors and reflectances as attribute information, the three-dimensional data decoding device decodes the color encoding results and the reflectance encoding results in order of assignment in the bitstream. For example, when the reflectance encoding results are added after the color encoding results in a bitstream, the three-dimensional data decoding device decodes the color encoding results, and then decodes the reflectance encoding results. It is to be noted that the three-dimensional data decoding device may decode, in any order, the encoding results of the attribute information added to the bitstream.

Alternatively, the three-dimensional data encoding device may add, to a header for example, information indicating the start location of encoded data of each attribute information in a bitstream. In this way, the three-dimensional data decoding device is capable of selectively decoding attribute information required to be decoded, and thus is capable of skipping the decoding process of the attribute information not required to be decoded. Accordingly, it is possible to reduce the amount of processing by the three-dimensional data decoding device. In addition, the three-dimensional data decoding device may decode a plurality of kinds of attribute information in parallel, and may integrate the decoding results into a single three-dimensional point cloud.

In this way, the three-dimensional data decoding device is capable of decoding the plurality of kinds of attribute information at high speed.

Figure 64:
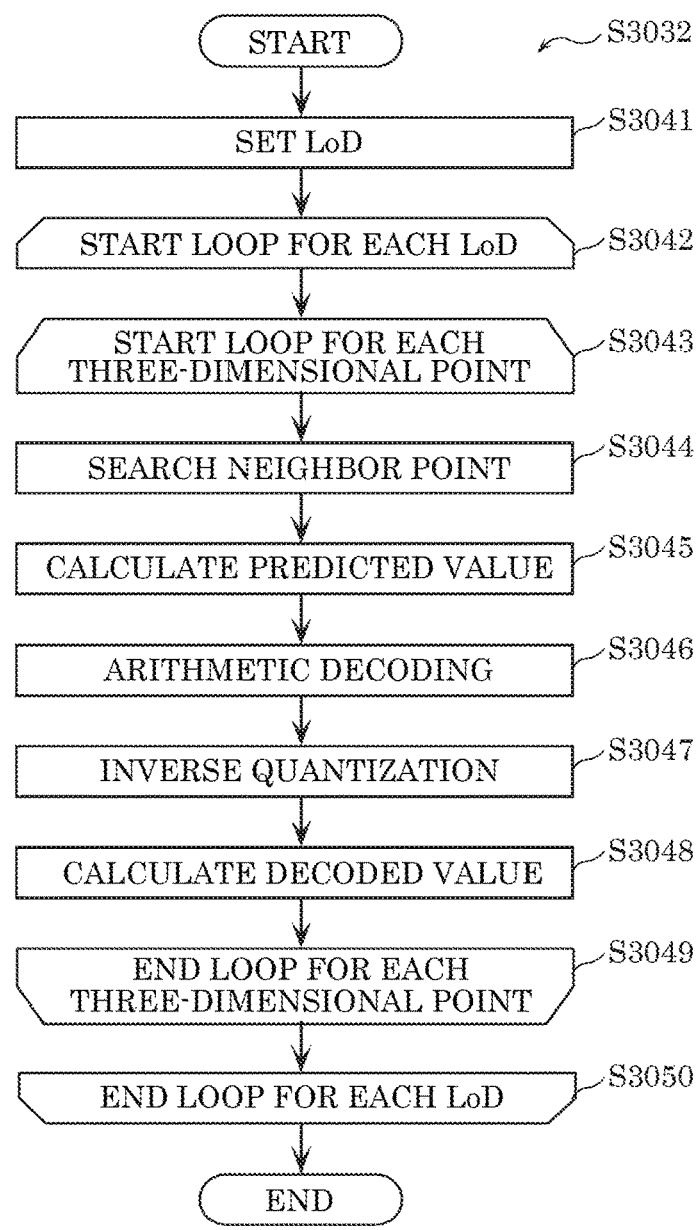
FIG. 64 is a flowchart; of an attribute information decoding process according to Embodiment 8.

FIG. 64 is a flowchart of an attribute information decoding process (S3032). First, the three-dimensional data decoding device sets LoDs (S3041). In other words, the three-dimensional data decoding device assigns each of three-dimensional points having the decoded geometry information to any one of the plurality of LoDs. For example, this assignment method is the same as the assignment method used in the three-dimensional data encoding device.

Next, the three-dimensional data decoding device starts a loop for each LoD (S3042). In other words, the three-dimensional data decoding device iteratively performs the processes of Steps from S3043 to S3049 for each LoD.

Next, the three-dimensional data decoding device starts a loop for each three-dimensional point (S3043). In other words, the three-dimensional data decoding device iteratively performs the processes of Steps from S3044 to S3048 for each three-dimensional point.

First, the three-dimensional data decoding device searches a plurality of neighbor points which are three-dimensional points present in the neighborhood of a current three-dimensional point to be processed and are to be used to calculate a predicted value of the current three-dimensional point to be processed (S3044). Next, the three-dimensional data decoding device calculates the weighted average of the values of attribute information of the plurality of neighbor points, and sets the resulting value to predicted value P (S3045). It is to be noted that these processes are similar to the processes in the three-dimensional data encoding device.

Next, the three-dimensional data decoding device arithmetic decodes the quantized value from the bitstream (S3046). The three-dimensional data decoding device inverse quantizes the decoded quantized value to calculate an inverse quantized value (S3047). Next, the three-dimensional data decoding device adds a predicted value to the inverse quantized value to generate a decoded value (S3048). Next, the three-dimensional data decoding device ends the loop for each three-dimensional point (S3049). Next, the three-dimensional data encoding device ends the loop for each LoD (S3050).

Figure 65:
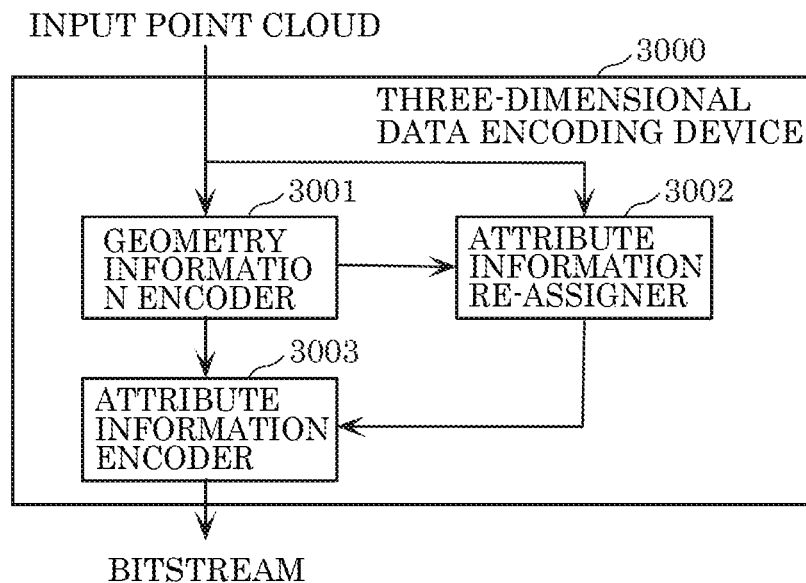
FIG. 65 is a block diagram of a three-dimensional data encoding device according to Embodiment 8.

The following describes configurations of the three-dimensional data encoding device and three-dimensional data decoding device according to the present embodiment. FIG. 65 is a block diagram illustrating a configuration of three-dimensional data encoding device 3000 according to the present embodiment. Three-dimensional data encoding device 3000 includes geometry information encoder 3001, attribute information re-assigner 3002, and attribute information encoder 3003.

Attribute information encoder 3008 encodes geometry information (geometry) of a plurality of three-dimensional points included in an input point cloud. Attribute information re-assigner 3002 re-assigns the values of attribute information of the plurality of three-dimensional points included in the input point cloud, using the encoding and decoding results of the geometry information. Attribute information encoder 3003 encodes the re-assigned attribute information (attribute). Furthermore, three-dimensional data encoding device 3000 generates a bitstream including the encoded geometry information and the encoded attribute information.

Figure 66:
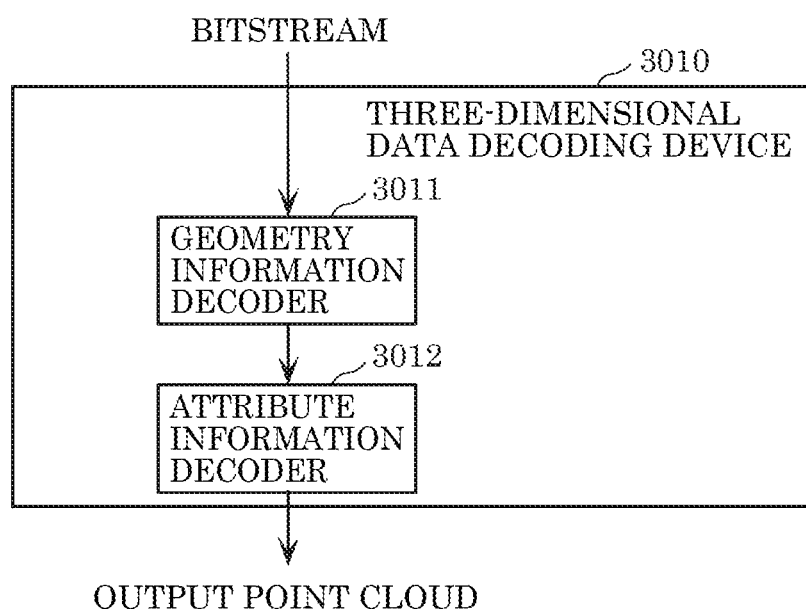
FIG. 66 is a block diagram of a three-dimensional data decoding device according to Embodiment 8.

FIG. 66 is a block diagram illustrating a configuration of three-dimensional data decoding device 3010 according to the present embodiment. Three-dimensional data decoding device 3010 includes geometry information decoder 3011 and attribute information decoder 3012.

Geometry information decoder 3011 decodes the geometry information (geometry) of a plurality of three-dimensional points from a bitstream. Attribute information decoder 3012 decodes the attribute information (attribute) of the plurality of three-dimensional points from the bitstream. Furthermore, three-dimensional data decoding device 3010 integrates the decoded geometry information and the decoded attribute information to generate an output point cloud.

Figure 67:
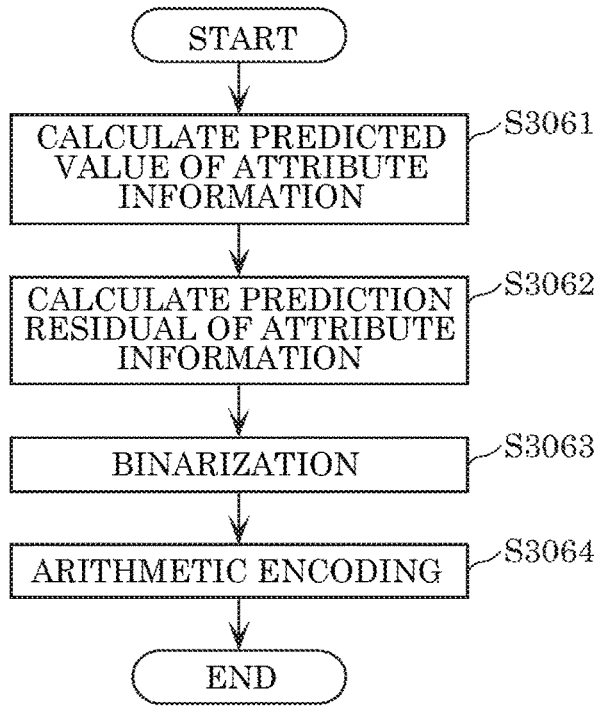
FIG. 67 is a flowchart of a three-dimensional data decoding process according to Embodiment 8.

As described above, the three-dimensional data encoding device according to the present embodiment performs the process illustrated in FIG. 67. The three-dimensional data encoding device encodes a three-dimensional point having attribute information. First, the three-dimensional data encoding device calculates a predicted value of the attribute information of the three-dimensional point (S3061). Next, the three-dimensional data encoding device calculates a prediction residual which is the difference between the attribute information of the three-dimensional point and the predicted value (S3062). Next, the three-dimensional data encoding device binarizes the prediction residual to generate binary data (S3063). Next, the three-dimensional data encoding device arithmetic encodes the binary data (S3064).

In this way, the three-dimensional data encoding device is capable of reducing the code amount of the to-be-coded data of the attribute information by calculating the prediction residual of the attribute information, and binarizing and arithmetic encoding the prediction residual.

For example, in arithmetic encoding (S3064), the three-dimensional data encoding device uses coding tables different for each of bits of binary data. By doing so, the three-dimensional data encoding device can increase the coding efficiency.

For example, in arithmetic encoding (S3064), the number of coding tables to be used is larger for a lower-order bit of the binary data.

For example, in arithmetic encoding (S3064), the three-dimensional data encoding device selects coding tables to be used to arithmetic encode a current bit included in binary data, according to the value of a higher-order bit with respect to the current bit. By doing so, since the three-dimensional data encoding device can select coding tables to be used according to the value of the higher-order bit, the three-dimensional data encoding device can increase the coding efficiency.

For example, in binarization (S3063), the three-dimensional data encoding device: binarizes a prediction residual using a fixed bit count to generate binary data when the prediction residual is smaller than a threshold value (R_TH); and generates binary data including a first code (n-bit code) and a second code (remaining code) when the prediction residual is larger than or equal to the threshold value (R_TH). The first code is of a fixed bit count indicating the threshold value (R_TH), and the second code (remaining code) is obtained by binarizing, using exponential-Golomb coding, the value obtained by subtracting the threshold value (R_TH) from the prediction residual. In arithmetic encoding (S3064), the three-dimensional data encoding device uses arithmetic encoding methods different between the first code and the second code.

With this, for example, since it is possible to arithmetic encode the first code and the second code using arithmetic encoding methods respectively suitable for the first code and the second code, it is possible to increase coding efficiency.

For example, the three-dimensional data encoding device quantizes the prediction residual, and, in binarization (S3068), binarizes the quantized prediction residual. The threshold value (R_TH) is changed according to a quantization scale in quantization. With this, since the three-dimensional data encoding device can use the threshold value suitably according to the quantization scale, it is possible to increase the coding efficiency.

For example, the second code includes a prefix and a suffix. In arithmetic encoding (S3064), the three-dimensional data encoding device uses different coding tables between the prefix and the suffix. In this way, the three-dimensional data encoding device can increase the coding efficiency.

For example, the three-dimensional data encoding device includes a processor and memory, and the processor performs the above process using the memory.

Figure 68:
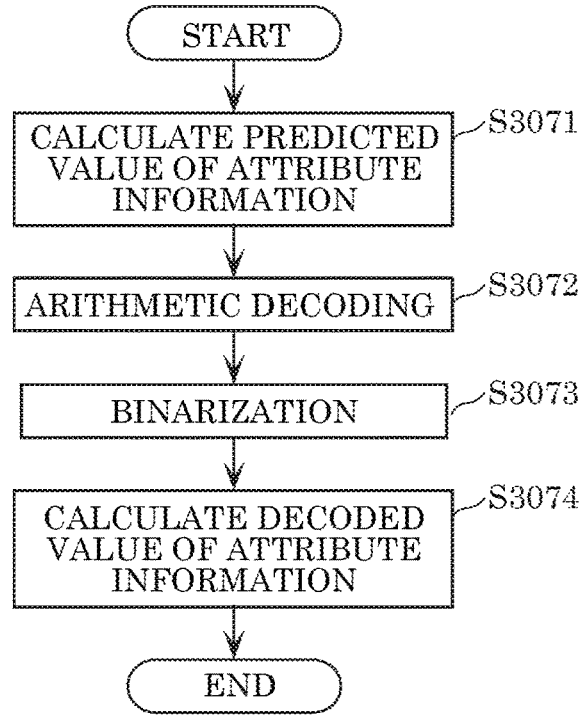
FIG. 68 is a flowchart of a three-dimensional data decoding process according to Embodiment 8.

The three-dimensional data decoding device according to the present embodiment performs the process illustrated in FIG. 68. The three-dimensional data decoding device decodes a three-dimensional point having attribute information. First, the three-dimensional data decoding device calculates a predicted value of the attribute information of a three-dimensional point (S3071). Next, the three-dimensional data decoding device arithmetic decodes encoded data included in a bitstream to generate binary data (S3072). Next, the three-dimensional data decoding device debinarizes the binary data to generate a prediction residual (S3073). Next, the three-dimensional data decoding device calculates a decoded value of the attribute information of the three-dimensional point by adding the predicted value and the prediction residual (S3074).

In this way, the three-dimensional data decoding device is capable of appropriately decoding the bitstream of the attribute information generated by calculating the prediction residual of the attribute information and binarizing and arithmetic decoding the prediction residual.

For example, in arithmetic decoding (S3072), the three-dimensional data decoding device uses coding tables different for each of bits of binary data. With this, the three-dimensional data decoding device is capable of appropriately decoding the bitstream encoded at an increased coding efficiency.

For example, in arithmetic decoding (S3072), the number of coding tables to be used is larger for a lower bit of the binary data.

For example, in arithmetic decoding (S3072), the three-dimensional data decoding device selects coding tables to be used to arithmetic decode a current bit included in binary data, according to the value of a higher-order bit with respect to the current bit. With this, the three-dimensional data decoding device is capable of appropriately decoding the bitstream encoded at an increased coding efficiency.

For example, in debinarizaion (S3073), the three-dimensional data decoding device debinarizes the first code (n-bit code) of a fixed bit count included in the binary data to generate a first value. The three-dimensional data decoding device: determines the first value to be the prediction residual when the first value is smaller than the threshold value (R_TH); and, when the first value is larger than or equal to the threshold value (R_YH), generates a second value by debinarizing the second code (remaining code) which is an exponential-Golomb code included in the binary data and adds the first value and the second value, thereby generating a prediction residual. In the arithmetic decoding (S3072), the three-dimensional data decoding device uses arithmetic decoding methods different between the first code and the second code.

With this, the three-dimensional data decoding device is capable of appropriately decoding the bitstream encoded at an increased coding efficiency.

For example, the three dimensional data decoding device inverse quantizes the prediction residual, and, in addition (S3074), adds the predicted value and the inverse quantized prediction residual. The threshold value (R_TH) is changed according to a quantization scale in inverse quantization. With this, the three-dimensional data decoding device is capable of appropriately decoding the bitstream encoded at an increased coding efficiency.

For example, the second code includes a prefix and a suffix. In arithmetic decoding (S3072), the three-dimensional data decoding device uses different coding tables between the prefix and the suffix. With this, the three-dimensional data decoding device is capable of appropriately decoding the bitstream encoded at an increased coding efficiency.

For example, the three-dimensional data decoding device includes a processor and memory, and the processor performs the above-described process using the memory.

Embodiment 9

Predicted values may be generated by a method different from that in Embodiment 8. Hereinafter, a three-dimensional point to be encoded is referred to as a first three-dimensional point, and one or more three-dimensional points in the vicinity of the first three-dimensional point is referred to as one or more second three-dimensional points in some cases.

For example, in generating of a predicted value of an attribute information item (attribute information) of a three-dimensional point, an attribute value as it is of a closest three-dimensional point among encoded and decoded three-dimensional points in the vicinity of a three-dimensional point to be encoded may be generated as a predicted value. In the generating of the predicted value, prediction mode information (PredMode) may be appended for each three-dimensional point, and one predicted value may be selected from a plurality of predicted values to allow generation of a predicted value. Specifically, for example, it is conceivable that, for total number M of prediction modes, an average value is assigned to prediction mode 0, an attribute value of three-dimensional point A is assigned to prediction mode 1, . . . , and an attribute value of three-dimensional point Z is assigned to prediction mode M−1, and the prediction mode used for prediction is appended to a bitstream for each three-dimensional point. As such, a first prediction mode value indicating a first prediction mode for calculating, as a predicted value, an average of attribute information items of the surrounding three-dimensional points may be smaller than a second prediction mode value indicating a second prediction mode for calculating, as a predicted value, an attribute information item as it is of a surrounding three-dimensional point. Here, the "average value" as the predicted value calculated in prediction mode 0 is an average value of the attribute values of the three-dimensional points in the vicinity of the three-dimensional point to be encoded.

Figures 69, 70:
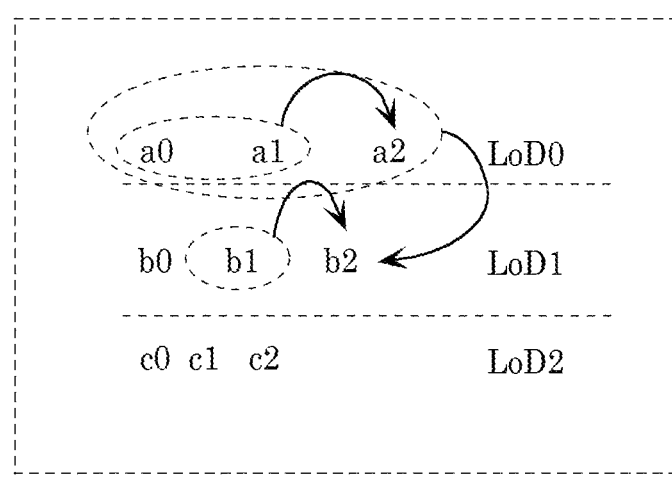
FIG. 69 is a diagram showing a first example of a table representing predicted values calculated in prediction modes according to Embodiment 9.
FIG. 70 is a diagram showing examples of attribute information items (pieces of attribute information) used as the predicted values according to Embodiment 9.

FIG. 69 is a diagram showing a first example of a table representing predicted values calculated in the prediction modes according to Embodiment 9. FIG. 70 is a diagram showing examples of attribute information items used as the predicted values according to Embodiment 9. FIG. 71 is a diagram showing a second example of a table representing predicted values calculated in the prediction modes according to Embodiment 9.

Number M of prediction modes may be appended to a bitstream. Number M of prediction modes may be defined by a profile or a level of standards rather than appended to the bitstream. Number M of prediction modes may be also calculated from number N of three-dimensional points used for prediction. For example, number M of prediction modes may be calculated by M=N+1.

The table in FIG. 69 is an example of a case with number N of three-dimensional points used for prediction being 4 and number M of prediction modes being 5. A predicted value of an attribute information item of point b2 can be generated by using attribute information items of points a0, a1, a2, b1. In selecting one prediction mode from a plurality of prediction modes, a prediction mode for generating, as a predicted value, an attribute value of each of points a0, a1, a2, b1 may be selected in accordance with distance information from point b2 to each of points a0, a1, a2, b1. The prediction mode is appended for each three-dimensional point to be encoded. The predicted value is calculated in accordance with a value corresponding to the appended prediction mode.

The table in FIG. 71 is, as in FIG. 69, an example of a case with number N of three-dimensional points used for prediction being 4 and number M of prediction modes being 5. A predicted value of an attribute information item of point a2 can be generated by using attribute information items of points a0, a1. In selecting one prediction mode from a plurality of prediction modes, a prediction mode for generating, as a predicted value, an attribute value of each of points a0 and a1 may be selected in accordance with distance information from point a2 to each of points a0, a1. The prediction mode is appended for each three-dimensional point to be encoded. The predicted value is calculated in accordance with a value corresponding to the appended prediction mode.

When the number of neighboring points, that is, number N of surrounding three-dimensional points is smaller than four such as at point a2 above, a prediction mode to which a predicted value is not assigned may be written as "not available" in the table.

Assignment of values of the prediction modes may be determined in accordance with the distance from the three-dimensional point to be encoded. For example, prediction mode values indicating a plurality of prediction modes decrease with decreasing distance from the three-dimensional point to be encoded to the surrounding three-dimensional points having the attribute information items used as the predicted values. The example in FIG. 69 shows that points b1, a2, a1, a0 are sequentially located closer to point b2 as the three-dimensional point to be encoded. For example, in the calculating of the predicted value, the attribute information item of point b1 is calculated as the predicted value in a prediction mode indicated by a prediction mode value of "1" among two or more prediction modes, and the attribute information item of point a2 is calculated as the predicted value in a prediction mode indicated by a prediction mode value of "2". As such, the prediction mode value indicating the prediction mode for calculating, as the predicted value, the attribute information item of point b1 is smaller than the prediction mode value indicating the prediction mode for calculating, as the predicted value, the attribute information item of point a2 farther from point b2 than point b1.

Thus, a small prediction mode value can be assigned to a point that is more likely to be predicted and selected due to a short distance, thereby reducing a bit number for encoding the prediction mode value. Also, a small prediction mode value may be preferentially assigned to a three-dimensional point belonging to the same LoD as the three-dimensional point to be encoded.

FIG. 72 is a diagram showing a third example of a table representing predicted values calculated in the prediction modes according to Embodiment 9. Specifically, the third example is an example of a case where an attribute information item used as a predicted value is a value of color information (YUV) of a surrounding three-dimensional point. As such, the attribute information item used as the predicted value may be color information indicating a color of the three-dimensional point.

As shown in FIG. 72, a predicted value calculated in a prediction mode indicated by a prediction mode value of "0" is an average of Y, U, and V components defining a YUV color space. Specifically, the predicted value includes a weighted average Yave of Y component values Yb1, Ya2, Ya1, Ya0 corresponding to points b1, a2, a1, a0, respectively, a weighted average Uave of U component values Ub1, Ua2, Ua1, Ua0 corresponding to points b1, a2, a1, a0, respectively, and a weighted average Vave of V component values Vb1, Va2, Va1, Va0 corresponding to points b1, a2, a1, a0, respectively. Predicted values calculated in prediction modes indicated by prediction mode values of "1" to "4" include color information of the surrounding three-dimensional points b1, a2, a1, a0. The color information is indicated by combinations of the Y, U, and V component values.

In FIG. 72, the color information is indicated by a value defined by the YUV color space, but not limited to the YUV color space. The color information may be indicated by a value defined by an RGB color space or a value defined by any other color space.

As such, in the calculating of the predicted value, two or more averages or two or more attribute information items may be calculated as the predicted values of the prediction modes. The two or more averages or the two or more attribute information items may indicate two or more component values each defining a color space.

For example, when a prediction mode indicated by a prediction mode value of "2" in the table in FIG. 72 is selected, a Y component, a U component, and a V component as attribute values of the three-dimensional point to be encoded may be encoded as predicted values Ya2, Ua2, Va2. In this case, the prediction mode value of "2" is appended to the bitstream.

FIG. 73 is a diagram showing a fourth example of a table representing predicted values calculated in the prediction modes according to Embodiment 9. Specifically, the fourth example is an example of a case where an attribute information item used as a predicted value is a value of reflectance information of a surrounding three-dimensional point. The reflectance information is, for example, information indicating reflectance R.

As shown in FIG. 73, a predicted value calculated in a prediction mode indicated by a prediction mode value of "0" is weighted average Rave of reflectances Rb1, Ra2, Ra1, Ra0 corresponding to points b1, a2, a1, a0, respectively. Predicted values calculated in prediction modes indicated by prediction mode values of "1" to "4" are reflectances Rb1, Ra2, Ra1, Ra0 of surrounding three-dimensional points b1, a2, a1, a0, respectively.

For example, when a prediction mode indicated by a prediction mode value of "3" in the table in FIG. 73 is selected, a reflectance as an attribute value of a three-dimensional point to be encoded may be encoded as predicted value Ra1. In this case, the prediction mode value of "3" is appended to the bitstream.

As shown in FIGS. 89 and 90, the attribute information item may include a first attribute information item and a second attribute information item different from the first attribute information item. The first, attribute information item is, for example, color information. The second attribute information item is, for example, reflectance information. In the calculating of the predicted value, a first predicted value may be calculated by using the first attribute information item, and a second predicted value may be calculated by using the second attribute information item.

When the attribute information item includes a plurality of components like color information such as a YUV color space or an RGB color space, predicted values may be calculated in different prediction modes for the respective components. For example, for the YUV space, predicted values using a Y component, a U component, and a V component may be calculated in prediction modes selected for the respective components. For example, prediction mode values may be selected in prediction mode Y for calculating the predicted value using the Y component, prediction mode U for calculating the predicted value using the U component, and prediction mode V for calculating the predicted value using the V component. In this case, values in tables in FIGS. 91 to 93 described later may be used as the prediction mode values indicating the prediction modes of the components, and the prediction mode values may be appended to the bitstream. The YUV color space has been described above, but the same applies to the RGB color space.

Predicted values including two or more components among a plurality of components of an attribute information item may be calculated in a common prediction mode. For example, for the YUV color space, prediction mode values may be selected in prediction mode Y for calculating the predicted value using the Y component and prediction mode UV for calculating the predicted value using the UV components. In this case, values in tables in FIGS. 91 and 94 described later may be used as the prediction mode values indicating the prediction modes of the components, and the prediction mode values may be appended to the bitstream.

FIG. 74 is a diagram showing a fifth example of a table representing predicted values calculated in the prediction modes according to Embodiment 9. Specifically, the fifth example is an example of a case where an attribute information item used as a predicted value is a Y component value of color information of a surrounding three-dimensional point.

As shown in FIG. 74, a predicted value calculated in prediction mode Y indicated by a prediction mode value of "0" is weighted average Yave of Y component values Yb1, Ya2, Ya1, Ya0 corresponding to points b1, a2, a1, a0, respectively. Predicted values calculated in prediction modes indicated by prediction mode values of "1" to "4" are Y component values Yb1, Ya2, Ya1, Ya0 of surrounding three-dimensional points b1, a2, a1, a0, respectively.

For example, when prediction mode Y indicated by a prediction mode value of "2" in the table in FIG. 74 is selected, a Y component as an attribute value of a three-dimensional point to be encoded may be used as predicted value Ya2 and encoded. In this case, the prediction mode value of "2" is appended to the bitstream.

FIG. 75 is a diagram showing a sixth example of a table representing predicted values calculated in the prediction modes according to Embodiment 9. Specifically, the sixth example is an example of a case where an attribute information item used as a predicted value is a U component value of color information of a surrounding three-dimensional point.

As shown in FIG. 75, a predicted value calculated in prediction mode U indicated by a prediction mode value of "0" is weighted average Uave of U component values Ub1, Ua2, Ua1, Ua0 corresponding to points b1, a2, a1, a0, respectively. Predicted values calculated in prediction modes indicated by prediction mode values of "1" to "4" are U component values Ub1, Ua2, Ua1, Ua0 of surrounding three-dimensional points b1, a2, a1, a0, respectively.

For example, when prediction mode U indicated by a prediction mode value of "1" in the table in FIG. 75 is selected, a U component as an attribute value of a three-dimensional point to be encoded may be encoded as predicted value Ub1. In this case, the prediction mode value of "1" is appended to the bitstream.

FIG. 76 is a diagram showing a seventh example of a table representing predicted values calculated in the prediction modes according to Embodiment 9. Specifically, the seventh example is an example of a case where an attribute information item used as a predicted value is a V component value of color information of a surrounding three-dimensional point.

As shown in FIG. 76, a predicted value calculated in prediction mode V indicated by a prediction mode value of "0" is weighted average Vave of V component values Vb1, Va2, Va1, Va0 corresponding to points b1, a2, a1, a0, respectively. Predicted values calculated in prediction modes indicated by prediction mode values of "1" to "4" are V component values Vb1, Va2, Va1, Va0 of surrounding three-dimensional points b1, a2, a1, a0, respectively.

For example, when prediction mode V indicated by a prediction mode value of "4" in the table in FIG. 76 is selected, a V component as an attribute value of a three-dimensional point to be encoded may be used as predicted value Va0 and encoded. In this case, the prediction mode value of "4" is appended to the bitstream.

FIG. 77 is a diagram showing an eighth example of a table representing predicted values calculated in the prediction modes according to Embodiment 9. Specifically, the eighth example is an example of a case where attribute information items used as predicted values are a U component value and a V component value of color information of a surrounding three-dimensional point.

As shown in FIG. 77, a predicted value calculated in prediction mode U indicated by a prediction mode value of "0" includes weighted average Uave of U component values Ub1, Ub2, Ua1, Ua0 corresponding to points b1, a2, a1, a0, respectively and weighted average Vave of V component values Vb1, Va2, Va1, Va0 corresponding to points b1, a2, a1, a0, respectively. Predicted values calculated in prediction modes indicated by prediction mode values of "1" to "4" include U component values and V component values of surrounding three-dimensional points b1, a2, a1, a0, respectively.

For example, when prediction mode UV indicated by a prediction mode value of "1" in the table in FIG. 77 is selected, a U component and a V component as attribute values of a three-dimensional point to be encoded may be used as predicted values Ub1, Vb1 and encoded. In this case, the prediction mode value of "1" is appended to the bitstream.

A prediction mode in encoding may be selected by RD optimization. For example, it is conceivable that cost cost(P) when certain prediction mode P is selected is calculated, and prediction mode P with minimum cost(P) is selected. Cost cost(P) may be calculated by Equation D1 using, for example, prediction residual residual(P) when a predicted value of prediction mode P is used, bit number bit(P) required for encoding prediction mode P, and adjustment parameter value $\lambda$.

$$\text{cost}(P)=\text{abs}(\text{residual}(P))+\lambda \times \text{bit}(P) \qquad \text{(Equation D1)}$$

where abs(x) denotes an absolute value of x.

A square value of x may be used instead of abs(x).

Using Equation D1 above allows selection of a prediction mode considering balance between a size of a prediction residual and a bit number required for encoding the prediction mode. Different adjustment parameter values $\lambda$ may be set in accordance with values of a quantization scale. For example, at a small quantization scale (at a high bit rate), value $\lambda$ may be set smaller to select a prediction mode with smaller prediction residual residual(P) to increase prediction accuracy as much as possible. At a large quantization scale (at a low bit rate), value $\lambda$ may be set larger to select an appropriate prediction mode while considering bit number bit(P) required for encoding prediction mode P.

"At a small quantization scale" is, for example, when the quantization scale is smaller than a first quantization scale. "At a large quantization scale" is, for example, when the quantization scale is larger than a second quantization scale equal to or greater than the first quantization scale. Values $\lambda$ may be set smaller at smaller quantization scales.

Prediction residual residual(P) is calculated by subtracting a predicted value of prediction mode P from an attribute value of a three-dimensional point to be encoded. Instead of prediction residual residual(P) in calculating of cost, prediction residual residual(P) may be quantized or inverse quantized and added to the predicted value to obtain a decoded value, and a difference (encoding error) from a decoded value when an attribute value of an original three-dimensional point and prediction mode P are used may be reflected in the cost value. This allows selection of a prediction mode with a small encoding error.

In binarizing and encoding a prediction mode, for example, a binarized bit number may be used as bit number bit(P) required for encoding prediction mode P. For example, with number M of prediction modes being 5, as in FIG. 78, a prediction mode value indicating the prediction mode may be binarized by a truncated unary code in accordance with number M of prediction modes with a maximum value of 5. In this case, 1 bit for a prediction mode value of "0", 2 bits for a prediction mode value of "1", 3 bits for a prediction mode value of "2", and 4 bits for prediction mode values of "4" and "5" are used as bit numbers bit(P) required for encoding the prediction mode values. By using the truncated unary code, the bit number is set smaller for smaller prediction mode values. This can reduce an encoding amount of a prediction mode value indicating a prediction mode for calculating a predicted value that is more likely to be selected, for example, that is more likely to minimize cost(P), such as an average value calculated as a predicted value when the prediction mode value is "0", or an attribute information item of a three-dimensional point calculated as a predicted value when the prediction mode value is "1", that is, an attribute information item of a three-dimensional point close to the three-dimensional point to be encoded.

When a maximum value of the number of prediction modes is not determined, as in FIG. 79, a prediction mode value indicating a prediction mode may be binarized by a unary code. When a probability of appearance of each prediction mode is close, as shown in FIG. 80, the prediction mode value indicating the prediction mode may be binarized by a fixed code to reduce an encoding amount.

As bit number bit(P) required for encoding the prediction mode value indicating prediction mode P, binarized data of the prediction mode value indicating prediction mode P may be arithmetic-encoded, and an encoding amount after the arithmetic-encoding may be used as a value of bit(P). This allows calculation of cost using more accurate required bit number bit(P), thereby allowing selection of a more appropriate prediction mode.

FIG. 78 is a diagram showing a first example of a binarization table in binarizing and encoding the prediction mode values according to Embodiment 9. Specifically, the first example is an example of binarizing the prediction mode values with a truncated unary code with number M of prediction modes being 5.

FIG. 79 is a diagram showing a second example of a binarization table in binarizing and encoding the prediction mode values according to Embodiment 9. Specifically, the second example is an example of binarizing the prediction mode values with a unary code with number M of prediction modes being 5.

FIG. 80 is a diagram showing a third example of a binarization table in binarizing and encoding the prediction mode values according to Embodiment 9. Specifically, the third example is an example of binarizing the prediction mode values with a fixed code with number M of prediction modes being 5.

A prediction mode value indicating a prediction mode (PredMode) may be arithmetic-encoded after binarized, and appended to the bitstream. As described above, the prediction mode value may be binarized, for example, by the truncated unary code in accordance with number M of prediction modes. In this case, a maximum bit number after binarization of the prediction mode value is M−1.

The binary data after binarization may be arithmetic-encoded with reference to an encoding table. In this case, for example, encoding tables may be switched for encoding for each bit of the binary data, thereby improving an encoding efficiency. Also, to reduce the number of encoding tables, among the binary data, the beginning bit one bit may be encoded with reference to encoding table A for one bit, and each of remaining bits may be encoded with reference, to encoding table B for remaining bits. For example, in encoding binarized data "1110" with a prediction mode value of "3" in FIG. 81, the beginning bit one bit "1" may be encoded with reference to encoding table A, and each of remaining bits "110" may be encoded with reference to encoding table B.

Figures 81, 82:
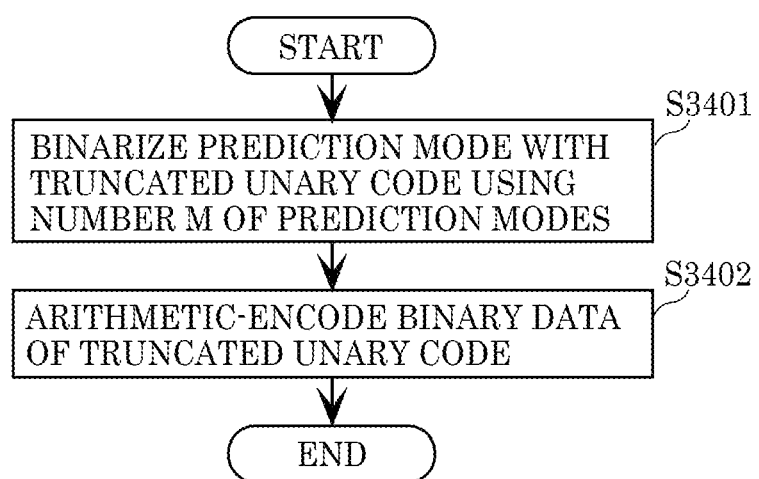
FIG. 81 is a diagram for describing an example of encoding binary data in the binarization table in binarizing and encoding the prediction modes according to Embodiment 9.
FIG. 82 is a flowchart of an example of encoding a prediction mode value according to Embodiment 9.

FIG. 81 is a diagram for describing an example of encoding binary data in the binarization table in binarizing and encoding the prediction modes according to Embodiment 9. The binarization table in FIG. 81 is an example of binarizing the prediction mode values with a truncated unary code with number M of prediction modes being 5.

Thus, an encoding efficiency can be improved by switching the encoding tables in accordance with a bit position of the binary data while reducing the number of encoding tables. Further, in encoding the remaining bits, arithmetic-encoding may be performed by switching the encoding tables for each bit, or decoding may be performed by switching the encoding tables in accordance with a result of the arithmetic-encoding.

In binarizing and encoding the prediction mode value with the truncated unary code using number M of prediction modes, number M of prediction modes used in the truncated unary code may be appended to a header and the like of the bitstream so that the prediction mode can be specified from binary data decoded on a decoding side. Also, value MaxM that may be a value of the number of prediction modes may be defined by standards or the like, and value MaxM−M (M≤MaxM) may be appended to the header. Number M of prediction modes may be defined by a profile or a level of standards rather than appended to the stream.

It is considered that the prediction mode value binarized by the truncated unary code is arithmetic-encoded by switching the encoding tables between one bit part and a remaining part as described above. The probability of appearance of 0 and 1 in each encoding table may be updated in accordance with actually generated binary data. Also, the probability of appearance of 0 and 1 in either of the encoding tables may be fixed. Thus, an update frequency of the probability of appearance may be reduced to reduce a processing amount. For example, the probability of appearance of the one bit part may be updated, and the probability of appearance of the remaining bit part may be fixed.

Figures 83, 84:
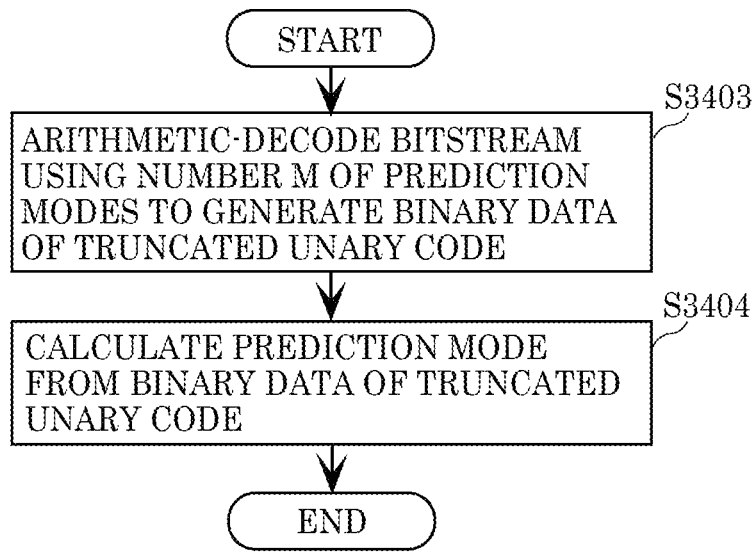
FIG. 83 is a flowchart of an example of decoding a prediction mode value according to Embodiment 9.
FIG. 84 is a diagram showing another example of a table representing predicted values calculated in the prediction modes according to Embodiment 9.

FIG. 82 is a flowchart of an example of encoding a prediction mode value according to Embodiment 9. FIG. 83 is a flowchart of an example of decoding a prediction mode value according to Embodiment 9.

As shown in FIG. 82, in encoding the prediction mode value, first, the prediction mode value is binarized by a truncated unary code in accordance with number M of prediction modes (S3401).

Then, binary data of the truncated unary code is arithmetic-encoded (S3402). Thus, the binary data is included as a prediction mode in the bitstream.

Also, as shown in FIG. 83, in decoding the prediction mode value, first, the bitstream is arithmetic-decoded by using number M of prediction modes to generate binary data of the truncated unary code (S3403).

Then, the prediction mode value is calculated from the binary data of the truncated unary code (S3404).

As a method of binarizing the prediction mode value indicating the prediction mode (PredMode), the example of binarizing with the truncated unary code using number M of prediction modes has been described, but not limited to this. For example, the prediction mode value may be binarized by a truncated unary code in accordance with number L (L≤M) of prediction modes assigned with predicted values. For example, with number M of prediction modes being 5, when two surrounding three-dimensional points are available for prediction of a certain three-dimensional point to be encoded, as shown in FIG. 84, three prediction modes are available and the remaining two prediction modes are not available in some cases. For example, as shown in FIG. 84, with number M of prediction modes being 5, two three-dimensional points in the vicinity of the three-dimensional point to be encoded are available for prediction, and predicted values are not assigned to prediction modes indicated by prediction mode values of "3" and "4" in some cases.

In this case, as shown in FIG. 85, the prediction mode value is binarized by a truncated unary code in accordance with number L of prediction modes assigned with predicted values as a maximum value. This may reduce the bit number after binarization as compared to when the prediction mode value is binarized by the truncated unary code in accordance with number M of prediction modes. For example, in this case, L is 3, and the prediction mode value can be binarized by a truncated unary code in accordance with a maximum value of 3 to reduce the bit number. As such, binarization by the truncated unary code in accordance with number L of prediction modes assigned with predicted values as a maximum value may reduce the bit number after binarization of the prediction mode value.

The binary data after binarization may be arithmetic-encoded with reference to an encoding table. In this case, for example, encoding tables may be switched for encoding for each bit of the binary data, thereby improving an encoding efficiency. Also, to reduce the number of encoding tables, among binarized data, the beginning bit one bit may be encoded with reference to encoding table A for one bit, and each of remaining bits may be encoded with reference to encoding table B for remaining bits. For example, in encoding binarized data "11" with a prediction mode value of "2" in FIG. 85, the beginning bit one bit "1" may be encoded with reference to encoding table A, and remaining bit "1" may be encoded with reference to encoding table B.

FIG. 85 is a diagram for describing an example of encoding binary data in the binarization table in binarizing and encoding the prediction modes according to Embodiment 9. The binarization table in FIG. 85 is an example of binarizing the prediction mode values with a truncated unary code with number L of prediction modes assigned with predicted values being 3.

Thus, an encoding efficiency can be improved by switching the encoding tables in accordance with a bit position of the binary data while reducing the number of encoding tables. Further, in encoding the remaining bits, arithmetic-encoding may be performed by switching the encoding tables for each bit, or decoding may be performed by switching the encoding tables in accordance with a result of the arithmetic-encoding.

In binarizing and encoding the prediction mode value with the truncated unary code using number L of prediction modes assigned with predicted values, a predicted value may be assigned to a prediction mode to calculate number L in the same manner as in encoding and the prediction mode may be decoded by using calculated number L so that the prediction mode can be specified from binary data decoded on a decoding side.

It is considered that the prediction mode value binarized by the truncated unary code is arithmetic-encoded by switching the encoding tables between one bit part and a remaining part as described above. The probability of appearance of 0 and 1 in each encoding table may be updated in accordance with actually generated binary data. Also, the probability of appearance of 0 and 1 in either of the encoding tables may be fixed. Thus, an update frequency of the probability of appearance may be reduced to reduce a processing amount. For example, the probability of appearance of the one bit part may be updated, and the probability of appearance of the remaining bit part may be fixed.

Figure 87:
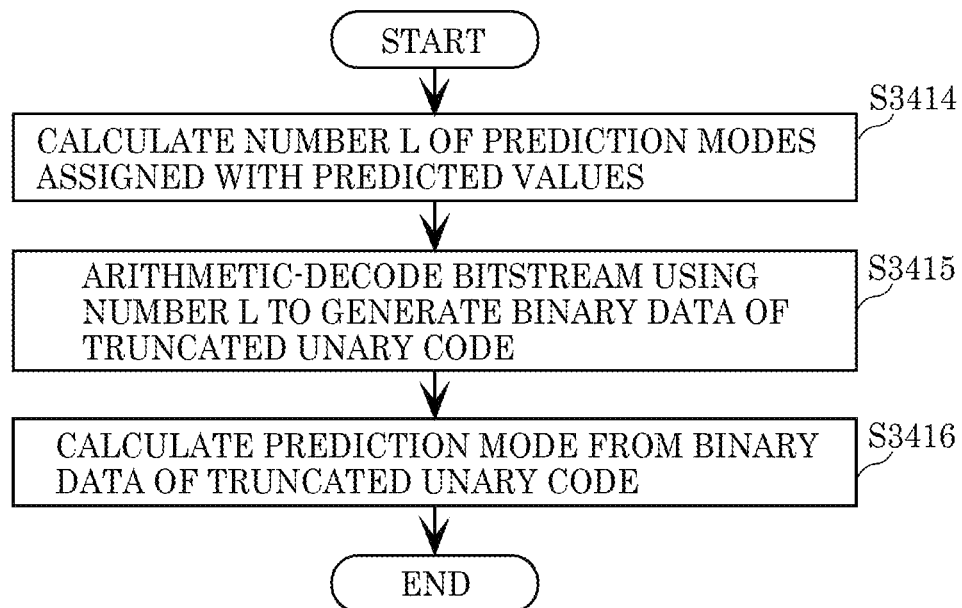
FIG. 87 is a flowchart of another example of decoding a prediction mode value according to Embodiment 9.

FIG. 86 is flowchart of another example of encoding a prediction mode value according to Embodiment 9. FIG. 87 is a flowchart of another example of decoding a prediction mode value according to Embodiment 9.

As shown in FIG. 86, in encoding the prediction mode value, first, number L of prediction modes assigned with predicted values is calculated (S3411).

Then, the prediction mode value is binarized by a truncated unary code in accordance with number L (S3412).

Then, binary data of the truncated unary code is arithmetic-encoded (S3418).

Also, as shown in FIG. 87, in decoding the prediction mode value, first, number L of prediction modes assigned with predicted values is calculated (S3414).

Then, the bitstream is arithmetic-decoded by using number L to generate binary data of the truncated unary code (S3415).

Then, the prediction mode value is calculated from the binary data of the truncated unary code (S3416).

The prediction mode value needs not be appended for all attribute values. For example, if a certain condition is satisfied, the prediction mode may be fixed so that the prediction mode value is not appended to the bitstream, and if the certain condition is not satisfied, the prediction mode may be selected to append the prediction mode value to the bitstream. For example, if condition A is satisfied, the prediction mode value may be fixed at "0" and a predicted value may be calculated from an average value of surrounding three-dimensional points. If condition A is not satisfied, one prediction mode may be selected from a plurality of prediction modes and a prediction mode value indicating the selected prediction mode may be append to the bitstream.

Certain condition A is, for example, that calculated maximum absolute differential value maxdiff of attribute values (a[0] to a[N−1]) of N (encoded and decoded) three-dimensional points in the vicinity of a three-dimensional point to be encoded is smaller than threshold Thfix. When the maximum absolute differential value of the attribute values of the surrounding three-dimensional points is smaller than threshold Thfix, it is determined that there is a small difference between the attribute values of the three-dimensional points and selecting a prediction mode causes no difference in the predicted value. Then, the prediction mode value is fixed at "0" and the prediction mode value is not encoded, thereby allowing generation of an appropriate predicted value while reducing an encoding amount for encoding the prediction mode.

Threshold Thfix may be appended to the header and the like of the bitstream, and the encoder may perform encoding while changing threshold Thfix. For example, in encoding at a high bit rate, the encoder may set threshold Thfix smaller than that at a low bit rate and append threshold Thfix to the header and increase the case of encoding by selecting a prediction mode, and thus perform encoding so that the prediction residual is as small as possible. Also, in encoding at the low bit rate, the encoder sets threshold Thfix larger than that at the high bit rate and appends threshold Thfix to the header, and performs encoding in a fixed prediction mode. As such, increasing the case of encoding in the fixed prediction mode at the low bit rate can improve an encoding efficiency while reducing a bit amount for encoding the prediction mode. Threshold Thfix may be defined by a profile or a level of standards rather than appended to the bitstream.

The N three-dimensional points in the vicinity of the three-dimensional point to be encoded, which are used for prediction, are N encoded and decoded three-dimensional points with a distance from the three-dimensional point to be encoded being smaller than threshold THd. A maximum value of N may be appended as NumNeighborPoint to the bitstream. The value of N needs not always match NumNeighborPoint as in the case where the number of surrounding encoded and decoded three-dimensional points is smaller than NumNeighborPoint.

The example has been given in which the prediction mode value is fixed at "0" if maximum absolute differential value maxdiff of the attribute values of the three-dimensional points in the vicinity of the three-dimensional point to be encoded, which are used for prediction, is smaller than threshold Thfix[i]. However, not limited to this, the prediction mode value may be fixed at any of "0" to "M−1". The prediction mode value to be fixed may be appended to the bitstream.

Figure 88:
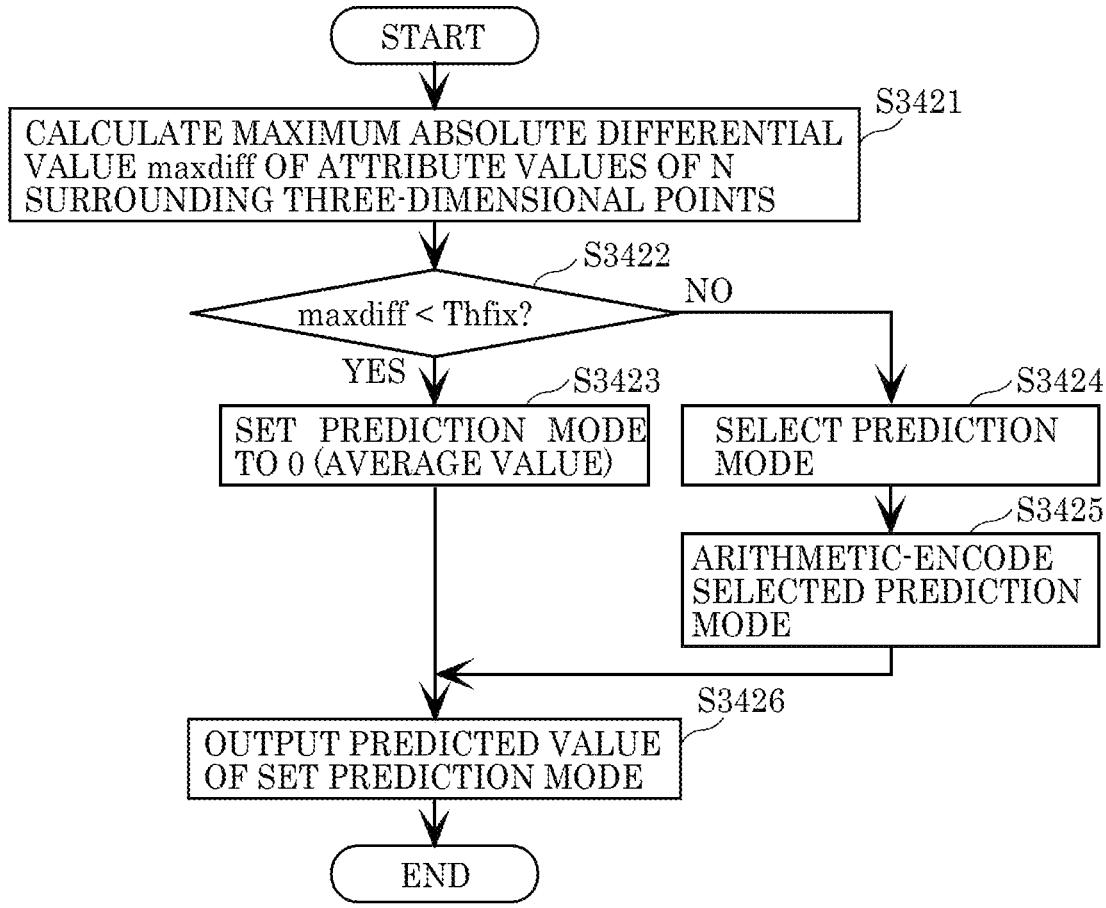
FIG. 88 is a flowchart of an example of a process of determining whether or not a prediction mode value is fixed under condition A in encoding according to Embodiment 9.

FIG. 88 is a flowchart of an example of a process of determining whether or not a prediction mode value is fixed under condition. A in encoding according to Embodiment 9. FIG. 89 is a flowchart of an example of a process of determining whether the prediction mode value is fixed or decoded under condition A in decoding according to Embodiment 9.

As shown in FIG. 88, first, the three-dimensional data encoding device calculates maximum absolute differential value maxdiff of attribute values of N three-dimensional points in the vicinity of a three-dimensional point to be encoded (S3421).

Then, the three-dimensional data encoding device determines whether or not maximum absolute differential value maxdiff is smaller than threshold Thfix (S3422). Threshold Thfix may be encoded and appended to the header and the like of the stream.

When maximum absolute differential value maxdiff is smaller than threshold Thfix (Yes in S3422), the three-dimensional data encoding device sets the prediction mode value to "0" (S3423).

When maximum absolute differential value maxdiff is equal to or greater than threshold Thfix (No in S3422), the three-dimensional data encoding device selects one prediction mode from a plurality of prediction modes (S3424). A process of selecting the prediction mode will be described later in detail with reference to FIG. 96.

Then, the three-dimensional data encoding device arithmetic-encodes a prediction mode value indicating the selected prediction mode (S3425). Specifically, the three-dimensional data encoding device performs steps S3401 and S3402 described with reference to FIG. 82 to arithmetic-encode the prediction mode value. The three-dimensional data encoding device may perform arithmetic-encoding by binarizing prediction mode PredMode with a truncated unary code using the number of prediction modes assigned with predicted values. Specifically, the three-dimensional data encoding device may perform steps S3411 to S3413 described with reference to FIG. 86 to arithmetic-encode the prediction mode value.

The three-dimensional data encoding device calculates a predicted value of the prediction mode set in step S3423 or the prediction mode selected in step S3425 to output the calculated predicted value (S3426). When using the prediction mode value set in step S3423, the three-dimensional data encoding device calculates an average of attribute values of N surrounding three-dimensional points as a predicted value of a prediction mode indicated by the prediction mode value of "0".

Also, as shown in FIG. 89, first, the three-dimensional data decoding device calculates maximum absolute differential value maxdiff of attribute values of N three-dimensional points in the vicinity of a three-dimensional point to be decoded (S3431). Maximum absolute differential value maxdiff may be calculated as shown in FIG. 90. Maximum absolute differential value maxdiff is, for example, a maximum value of a plurality of calculated absolute values of differences between all possible pairs when any two of the N surrounding three-dimensional points are paired.

Then, the three-dimensional data decoding device determines whether or not maximum absolute differential value maxdiff is smaller than threshold Thfix (S3432). Threshold Thfix may be set by decoding the header and the like of the stream.

When maximum absolute differential value maxdiff is smaller than threshold Thfix (Yes in S3432), the three-dimensional data decoding device sets the prediction mode value to "0" (S3433).

When maximum absolute differential value maxdiff is equal to or greater than threshold Thfix (No in S3432), the three-dimensional data decoding device decodes the prediction mode value from the bitstream (S3434).

The three-dimensional data decoding device calculates a predicted value of a prediction mode indicated by the prediction mode value set in step S3433 or the prediction mode value decoded in step S3434 to output the calculated predicted value (S3435). When using the prediction mode value set in step S3433, the three-dimensional data decoding device calculates an average of attribute values of N surrounding three-dimensional points as a predicted value of a prediction mode indicated by the prediction mode value of "0".

FIG. 91 is a diagram showing an example of a syntax according to Embodiment 9. NumLoD, NumNeighborPoint [i], NumPredMode[i], Thfix[i], and NumOfPoint[i] in the syntax in FIG. 91 will be sequentially described.

NumLoD indicates the number of LoDs.

NumNeighborPoint[i] indicates an upper limit value of the number of surrounding points used for generating a predicted value of a three-dimensional point belonging to level i. When number M of surrounding points is smaller than NumNeighborPoint[i] (M<NumNeighborPoint[i]), the predicted value may be calculated by using number M of surrounding points. When a value of NumNeighborPoint[i] needs not be divided among LoDs, one NumNeighborPoint may be appended to the header.

NumPredMode[i] is a total number (M) of prediction modes used for predicting an attribute value of level i. Possible value MaxM of the number of prediction modes may be defined by standards or the like, and value MaxM−M (0<M≤MaxM) may be appended to the header as NumPredMode[i] and binarized by a truncated unary code in accordance with maximum value MaxM−1 and encoded. Number of prediction modes NumPredMode[i] may be defined by a profile or a level of standards rather than appended to the stream. The number of prediction anodes may be defined by NumNeighborPoint[i]+NumPredMode[i]. When the value of NumPredMode[i] needs not be divided among LoDs, one NumPredMode may be appended to the header.

Thfix[i] indicates a threshold of a maximum absolute differential value for determining whether or not a prediction mode of level i is fixed. If the maximum absolute differential value of attribute values of surrounding three-dimensional points used for prediction is smaller than Thfix[i], the prediction mode is fixed at 0. Thfix[i] may be defined by a profile or a level of standards rather than appended to the stream. When the value of Thfix[i] needs not be divided among LoDs, one Thfix may be appended to the header.

NumOfPoint[i] indicates the number of three-dimensional points belonging to level i. When total number AllNumOfPoint of three-dimensional points is appended to another header, NumOfPoint[NumLoD−1] (the number of three-dimensional points belonging to the lowest level) may be calculated by the following equation:

[Math. 5]

$$AllNumOfPoint - \Sigma_{j=0}^{NumLoD-2} NumOfPoint[j] \quad \text{(Equation D2)}$$

rather than appended to the header. This can reduce an encoding amount of the header.

As a setting example of NumPredMode[i], the value of NumPredMode[i] may be set larger for a higher level at which prediction is more difficult due to a longer distance between three-dimensional points belonging to the level, thereby increasing the number of selectable prediction modes. Also, the value NumPredMode[i] may be set smaller for a lower level at which prediction is easy, thereby reducing a bit amount required for encoding the prediction mode. Such setting can increase the number of selectable prediction modes to reduce a prediction residual at the upper level, and reduce an encoding amount of a prediction mode at the lower level, thereby improving an encoding efficiency.

As a setting example of Thfix[i], the value of Thfix[i] may be set smaller for a higher level at which prediction is difficult due to a long distance from the three-dimensional point belonging to LoD, thereby increasing the case of selecting the prediction mode. Also, the value of Thfix[i] may be set larger value for a lower level at which prediction is easy, and the prediction mode may be fixed to reduce a bit amount required for encoding the prediction mode. Such setting can increase the case of selecting the prediction mode to reduce a prediction residual at the upper level, and fix the prediction mode to reduce an encoding amount of the prediction mode at the lower level, thereby improving an encoding efficiency.

NumLoD, NumNeighborPoint[i], NumPredMode[i], Thfix[i], or NumOfPoint[i] described above may be entropy encoded and appended to the header. For example, the values may be binarized and arithmetic-encoded. The values may be encoded at a fixed length to reduce a processing amount.

Figures 92, 93:
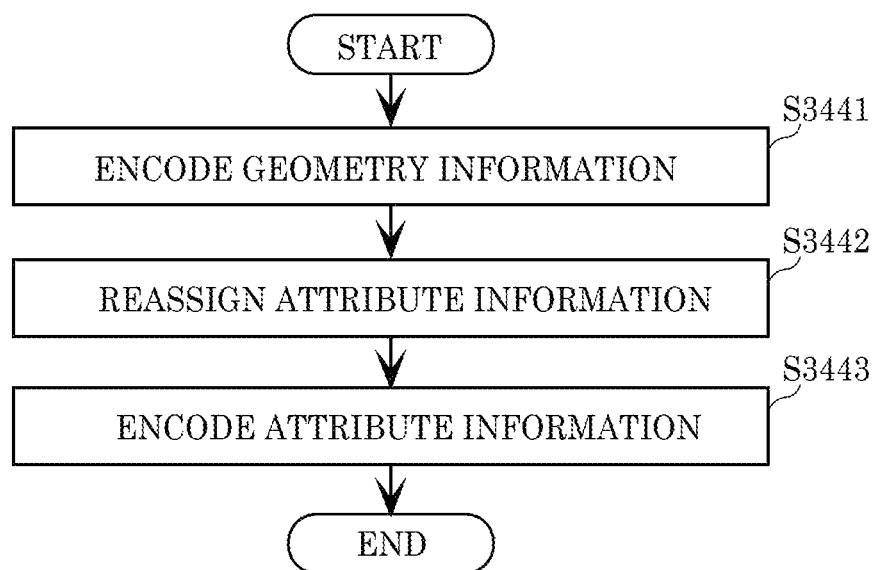
FIG. 92 is a diagram showing an example of a syntax according to Embodiment 9.
FIG. 93 is a flowchart of a three-dimensional data encoding process by a three-dimensional data encoding device according to Embodiment 9.

FIG. 92 is a diagram showing an example of a syntax according to Embodiment 9. PredMode, n-bit code, and remaining code in the syntax in FIG. 92 will be sequentially described.

PredMode indicates a prediction mode for encoding and decoding an attribute value of a j-th three-dimensional point in level i. PredMode is "0" to "M−1" (M is a total number of prediction modes). When PredMode is not in the bitstream (maxdiff≥Thfix[i] && NumPredMode[i]>1 as a condition is not satisfied), the value of PredMode may be estimated as 0. The value of PredMode may be estimated as any of "0" to "M−1", not limited to "0". An estimated value when PredMode is not in the bitstream may be separately appended to the header and the like. PredMode may be binarized by a truncated unary code in accordance with the number of prediction modes assigned with predicted values and arithmetic-encoded.

The n-bit code indicates encoded data of a prediction residual of a value of an attribute information item. A bit length of the n-bit code depends on a value of R_TH[i]. The bit length of the n-bit code is, for example, 6 bits when the value of R_TH[i] is 63, and 8 bits when the value of R_TH[i] is 255.

The remaining code indicates encoded data encoded by Exponential-Golomb among encoded data of the prediction residual of the attribute information item. The remaining code is decoded when the n-bit code is equal to R_TH[i], and the value of the n-bit code is added to the value of the remaining code to decode the prediction residual. When the n-bit code is not equal to R_TH[i] the remaining code needs not be decoded.

Now, a flow of a process of the three-dimensional data encoding device will be described. FIG. 93 is a flowchart of a three-dimensional data encoding process by the three-dimensional data encoding device according to Embodiment 9.

First, the three-dimensional data encoding device encodes geometry information (geometry) (S3441). For example, three-dimensional data encoding is encoding by using an octree representation.

When a position of a three-dimensional point is changed by quantization or the like after encoding of geometry information, the three-dimensional data encoding device reassigns an attribute information item of an original three-dimensional point to the three-dimensional point after change (S3442). For example, the three-dimensional data encoding device performs reassignment by interpolating a value of the attribute information item in accordance with a change amount of the position. For example, the three-dimensional data encoding device detects N three-dimensional points before change close to the three-dimensional position after change, and performs weighted averaging of values of attribute information items of the N three-dimensional points. For example, the three-dimensional data encoding device determines, in the weighted averaging, a weight based on a distance from the three-dimensional position after change to each of the N three-dimensional points. Then, the three-dimensional data encoding device sets the value obtained by the weighted averaging to a value of an attribute information item of the three-dimensional point after change. When two or more three-dimensional points are changed to the same three-dimensional position by quantization or the like, the three-dimensional data encoding device may assign an average value of attribute information items of two or more three-dimensional points before change as a value of an attribute information item of a three-dimensional point after change.

Then, the three-dimensional data encoding device encodes the attribute information item (Attribute) after reassignment (S3443). For example, when encoding multiple types of attribute information items, the three-dimensional data encoding device may sequentially encode the multiple types of attribute information items. For example, when encoding a color and a reflectance as attribute information items, the three-dimensional data encoding device may generate a bitstream appended with a color encoding result followed by a reflectance encoding result. The plurality of encoding results of the attribute information items may be appended to the bitstream in any order, not limited to this.

The three-dimensional data encoding device may append information indicating an encoded data start location of each attribute information item in the bitstream to the header and the like. Thus, the three-dimensional data decoding device can selectively decode an attribute information item that requires decoding, thereby omitting a decoding process of an attribute information item that does not require decoding. This can reduce a processing amount of the three-dimensional data decoding device. The three-dimensional data encoding device may concurrently encode multiple types of attribute information items, and combine encoding results into one bitstream. Thus, the three-dimensional data encoding device can quickly encode the multiple types of attribute information items.

Figure 94:
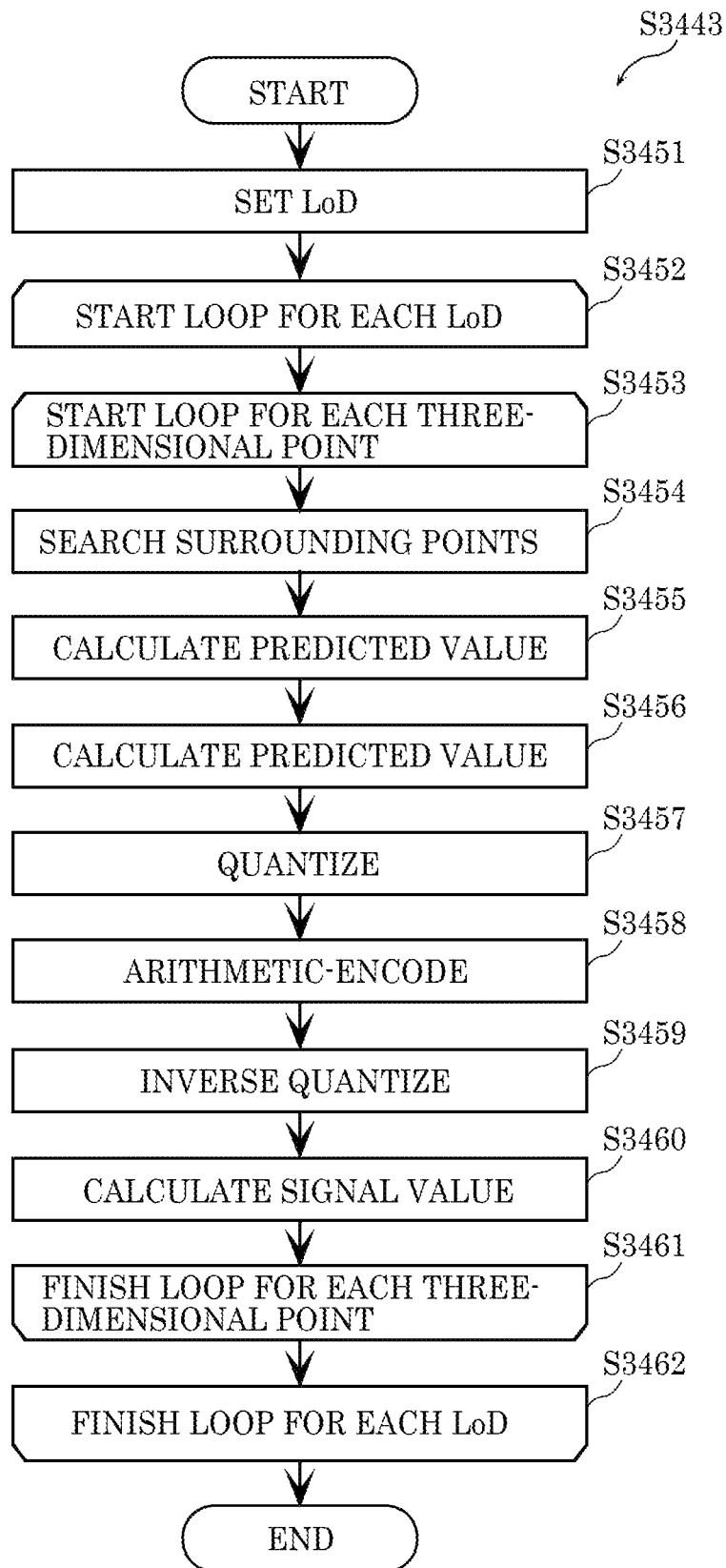
FIG. 94 is a flowchart of an attribute information encoding process according to Embodiment 9.

FIG. 94 is a flowchart of an attribute information item encoding process (S3443) according to Embodiment 9. First, the three-dimensional data encoding device sets LoD (S3451). Specifically, the three-dimensional data encoding device assigns each three-dimensional point to any of a plurality of LoDs.

Then, the three-dimensional data encoding device starts a loop for each LoD (S3452). Specifically, the three-dimensional data encoding device repeats processes in steps S3453 to S3461 for each LoD.

Then, the three-dimensional data encoding device starts a loop for each three-dimensional point (S3453). Specifically, the three-dimensional data encoding device repeats processes in steps S3454 to S3460 for each three-dimensional point.

First, the three-dimensional data encoding device searches a plurality of surrounding points that are three-dimensional points in the vicinity of a target three-dimensional point to be processed and used for calculating a predicted value of the target three-dimensional point (S3454).

Then, the three-dimensional data encoding device calculates predicted value P of the target three-dimensional point (S3455). A specific example of a calculation process of predicted value P will be described later with reference to FIG. 95.

Then, the three-dimensional data encoding device calculates, as a prediction residual, a difference between an attribute information item of the target three-dimensional point and the predicted value (S3456).

Then, the three-dimensional data encoding device quantizes the prediction residual to calculate a quantized value (S3457).

Then, the three-dimensional data encoding device arithmetic-encodes the quantized value (S3458).

The three-dimensional data encoding device inverse quantizes the quantized value to calculate an inverse quantized value (S3459).

Then, the three-dimensional data encoding device adds the predicted value to the inverse quantized value to generate a decoded value (S3460).

Then, the three-dimensional data encoding device finishes the loop for each three-dimensional point (S3461).

The three-dimensional data encoding device also finishes the loop for each LoD (S3462).

Figure 95:
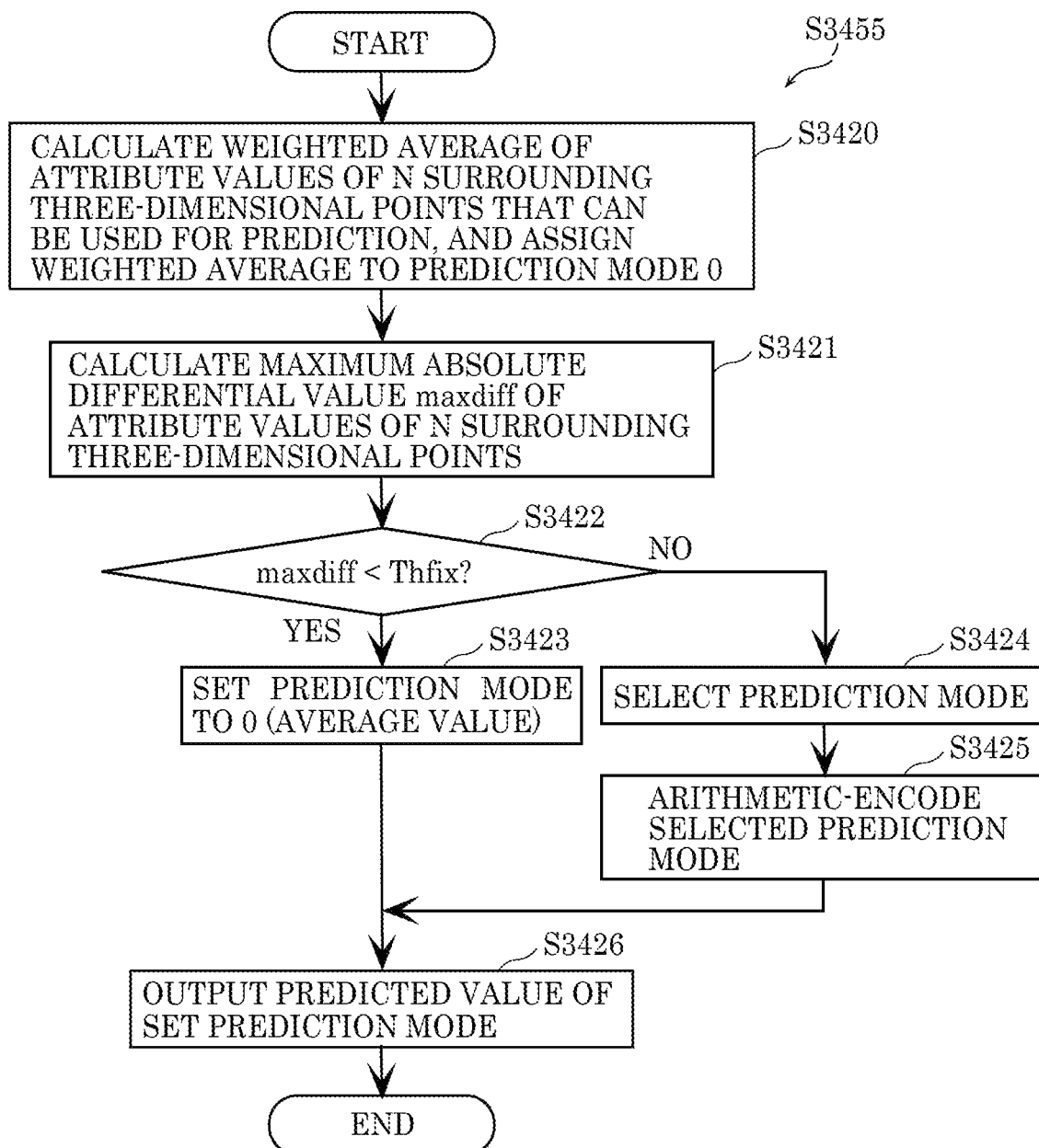
FIG. 95 is a flowchart of a predicted value calculation process by the three-dimensional data encoding device according to Embodiment 9.

FIG. 95 is a flowchart of a predicted value calculation process (S3455) by the three-dimensional data encoding device according to Embodiment 9.

First, the three-dimensional data encoding device calculates a weighted average of attribute values of the N three-dimensional points in the vicinity of the target three-dimensional point to be processed, which can be used for predicting a predicted value of the target three-dimensional point, and assigns the calculated weighted average to a prediction mode indicated by a prediction mode value of "0" (S3420).

Then, the three-dimensional data encoding device performs steps S3421 to S3426 described with reference to FIG. 88 to output a predicted value of the target three-dimensional point.

Figure 96:
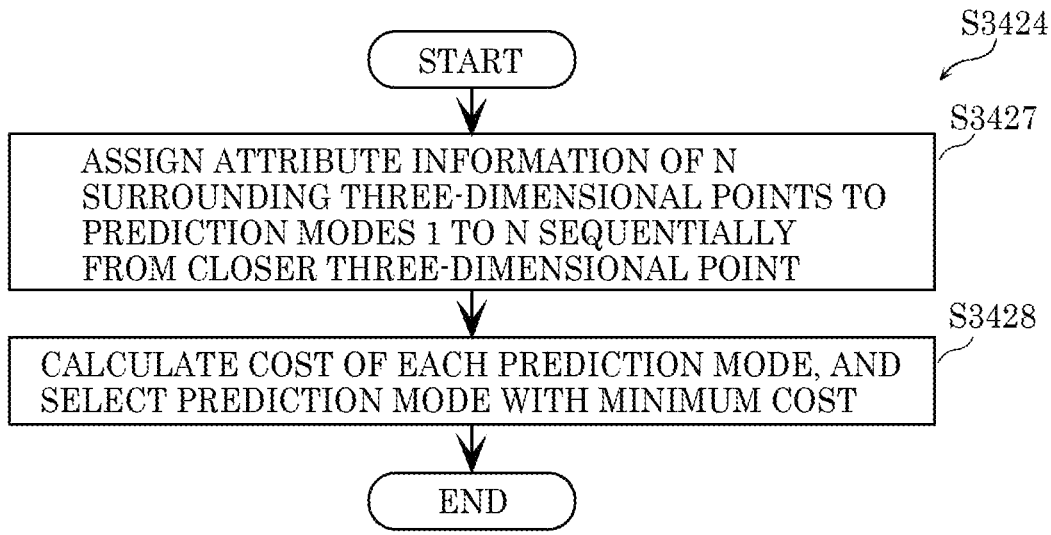
FIG. 96 is a flowchart of a prediction mode selection process according to Embodiment 9.

FIG. 96 is a flowchart of a prediction mode selection process (S3424) according to Embodiment 9.

First, the three-dimensional data encoding device assigns attribute information items of the N three-dimensional points in the vicinity of the target three-dimensional point to prediction mode values of "1" to "N" in one increment sequentially from a three-dimensional point closer to the target three-dimensional point (S3427). The prediction mode values of "0" to "N" are assigned, and thus a total of N+1 prediction modes are generated. When N+1 is larger than maximum number M of prediction modes (NumPredMode) appended to the bitstream, the three-dimensional data encoding device may generate up to M prediction modes.

Then, the three-dimensional data encoding device calculates cost of each prediction mode, and selects a prediction mode with minimum cost (S3428).

Figure 97:
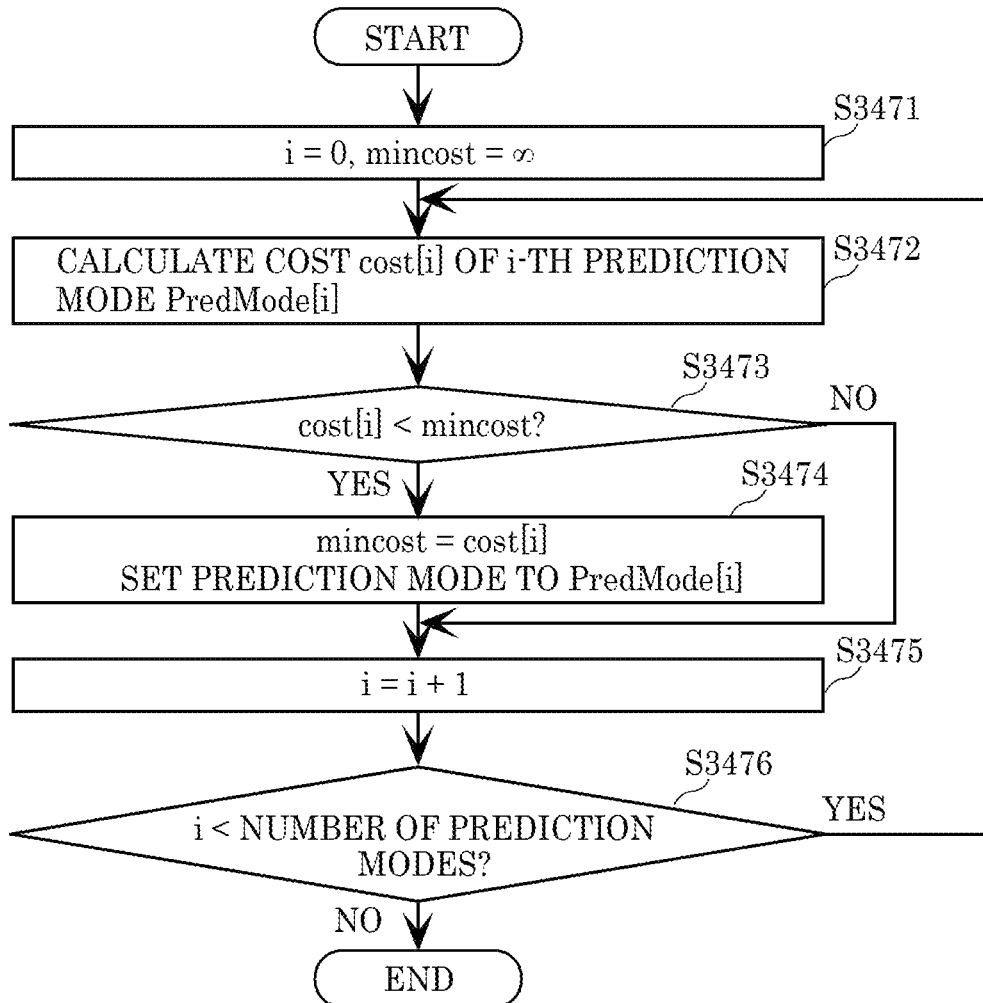
FIG. 97 is a flowchart of a prediction mode selection process that minimizes cost according to Embodiment 9.

FIG. 97 is a flowchart of a prediction mode selection process (S3428) that minimizes cost according to Embodiment 9.

First, the three-dimensional data encoding device sets i=0 and mincost=∞ as initial values (S3471). The set initial values of i and mincost are stored in a memory of the three-dimensional data encoding device.

Then, the three-dimensional data encoding device calculates cost cost[i] of i-th prediction mode PredMode[i] using, for example, Equation D1 (S3472).

Then, the three-dimensional data encoding device determines whether or not calculated cost cost[i] is smaller than mincost stored in the memory (S3473).

Then, when calculated cost cost[i] is smaller than mincost stored in the memory (Yes in S3473), the three-dimensional data encoding device sets mincost=cost[i], sets the prediction mode to predmode[i] (S3474), and goes to step S3475. Specifically, the value of mincost stored in the memory is updated to the value of cost[i], and predmode[i] is stored as a prediction mode in the memory.

When, calculated cost cost[i] is equal to or greater than mincost stored in the memory (No in S3473), the three-dimensional data encoding device goes to step S3475.

Then, the three-dimensional data encoding device increments the value of i by one (S3475).

Then, the three-dimensional data encoding device determines whether or not i is smaller than the number of prediction modes (S3476).

When i is smaller than the number of prediction modes (Yes in S3476), the three-dimensional data encoding device returns to step S3472, and when not (No in S3476), the three-dimensional data encoding device finishes the process of selecting the prediction mode that minimizes cost.

Figure 98:
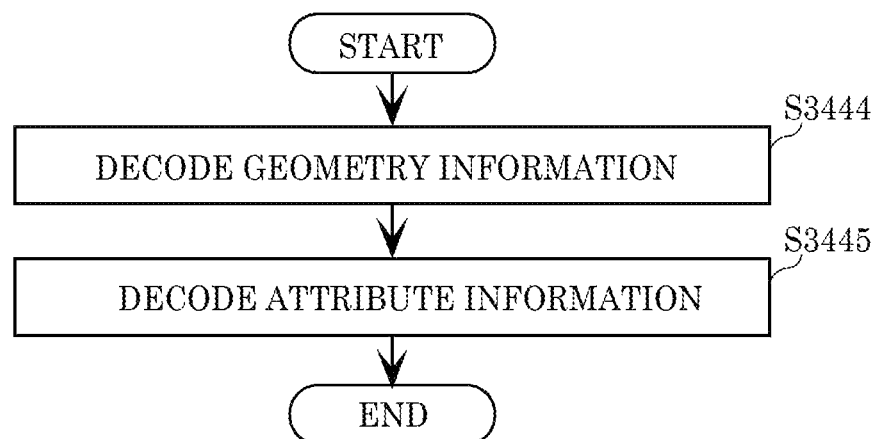
FIG. 98 is a flowchart of a three-dimensional data decoding process by a three-dimensional data decoding device according to Embodiment 9.

Now, a flow of a process of the three-dimensional data decoding device will be described. FIG. 98 is a flowchart of a three-dimensional data decoding process by the three-dimensional data decoding device according to Embodiment 9. First, the three-dimensional data decoding device decodes the geometry information (geometry) from the bitstream (S3444). For example, the three-dimensional data decoding device performs decoding by using an octree representation.

Then, the three-dimensional data decoding device decodes an attribute information item (Attribute) from the bitstream (S3445). For example, when decoding multiple types of attribute information items, the three-dimensional data decoding device may sequentially decode the multiple types of attribute information items. For example, when decoding a color and a reflectance as attribute information items, the three-dimensional data decoding device decodes a color encoding result and a reflectance encoding result in the order of appending to the bitstream. For example, when the bitstream is appended with the color encoding result followed by the reflectance encoding result, the three-dimensional data decoding device decodes the color encoding result and then decodes the reflectance encoding result. The three-dimensional data decoding device may decode encoding results of the attribute information items appended to the bitstream in any order.

The three-dimensional data decoding device may obtain information indicating an encoded data start location of each attribute information item in the bitstream by decoding the header and the like. Thus, the three-dimensional data decoding device can selectively decode an attribute information item that requires decoding, thereby omitting a decoding process of an attribute information item that does not require decoding. This can reduce a processing amount of the three-dimensional data decoding device. The three-dimensional data decoding device may concurrently decode multiple types of attribute information items, and combine decoding results into one three-dimensional point cloud. Thus, the three-dimensional data decoding device can quickly decode the multiple types of attribute information items.

Figure 99:
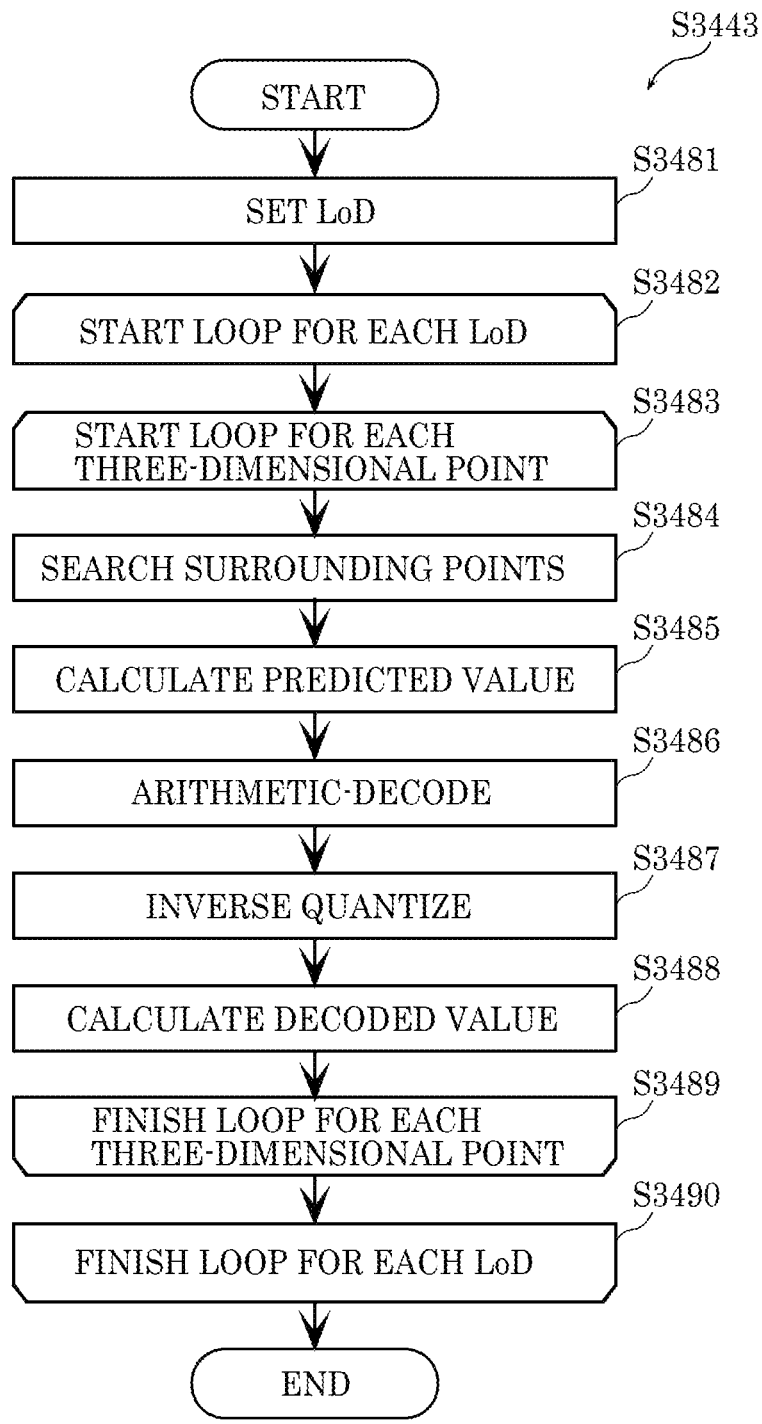
FIG. 99 is a flowchart of an attribute information decoding process according to Embodiment 9.

FIG. 99 is a flowchart of an attribute information item decoding process (S3445) according to Embodiment 9. First, the three-dimensional data decoding device sets LoD (S3481). Specifically, the three-dimensional data decoding device assigns each of a plurality of three-dimensional points having decoded geometry information to any of a plurality of LoDs. For example, this assignment method is the same as that used by the three-dimensional data encoding device.

Then, the three-dimensional data decoding device starts a loop for each LoD (S3482). Specifically, the three-dimensional data decoding device repeats processes in steps S3483 to S3489 for each LoD.

Then, the three-dimensional data decoding device starts a loop for each three-dimensional point (S3483). Specifically, the three-dimensional data decoding device repeats processes in steps S3484 to S3488 for each three-dimensional point.

First, the three-dimensional data decoding device searches a plurality of surrounding points that are three-dimensional points in the vicinity of a target three-dimensional point to be processed and used for calculating a predicted value of the target three-dimensional point (S3484). This process is the same as that by the three-dimensional data encoding device.

Then, the three-dimensional data decoding device calculates predicted value P of the target three-dimensional point (S3485).

Then, the three-dimensional data decoding device arithmetic-decodes a quantized value from the bitstream (S3486).

The three-dimensional data decoding device also inverse quantizes the decoded quantized value to calculate an inverse quantized value (S3487).

Then, the three-dimensional data decoding device adds the predicted value to the inverse quantized value to generate a decoded value (S3488).

Then, the three-dimensional data decoding device finishes the loop for each three-dimensional point (S3489).

The three-dimensional data decoding device also finishes the loop for each LoD (S3490).

Figure 100:
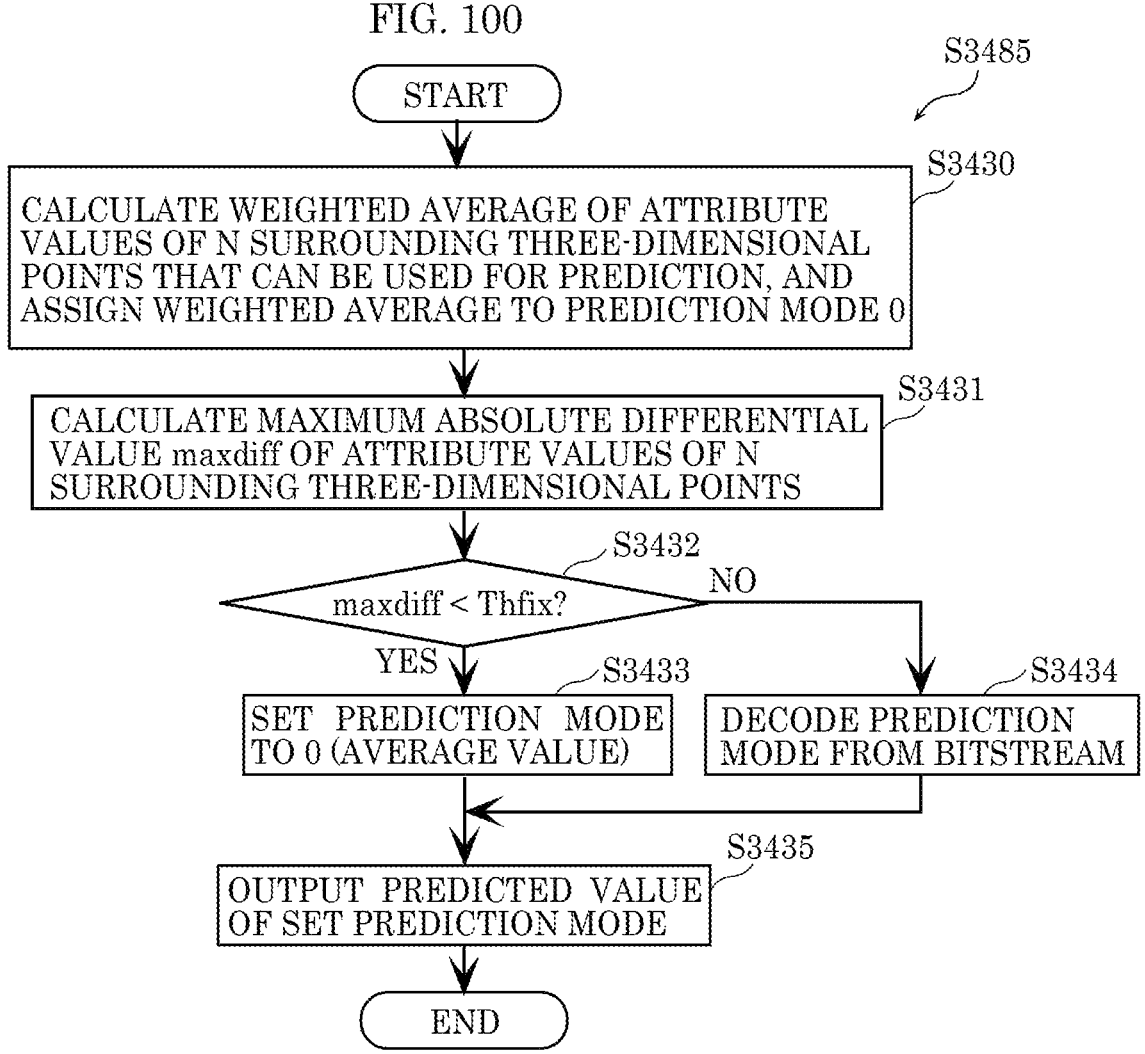
FIG. 100 is a flowchart of a predicted value calculation process by the three-dimensional data decoding device according to Embodiment 9.

FIG. 100 is a flowchart of a predicted value calculation process (S3485) by the three-dimensional data decoding device according to Embodiment 9.

First, the three-dimensional data decoding device calculates a weighted average of attribute values of the N three-dimensional points in the vicinity of the target three-dimensional point to be processed, which can be used for predicting a predicted value of the target three-dimensional point, and assigns the calculated weighted average to a prediction mode indicated by a prediction mode value of "0" (S3430).

Then, the three-dimensional data decoding device performs steps S3431 to S3435 described with reference to FIG. 89 to output a predicted value of the target three-dimensional point.

Instead of performing step S3430, after it is determined Yes in step S3432 or when the prediction mode value decoded in step S3434 is "0", the weighted average of the attribute values of the N three-dimensional points in the vicinity of the target three-dimensional point to be processed, which can be used for predicting a predicted value of the target three-dimensional point, may be calculated as a predicted value. This eliminates the need to calculate the average value in prediction modes other than the prediction mode indicated by the prediction mode value of "0", thereby reducing a processing amount.

Figure 101:
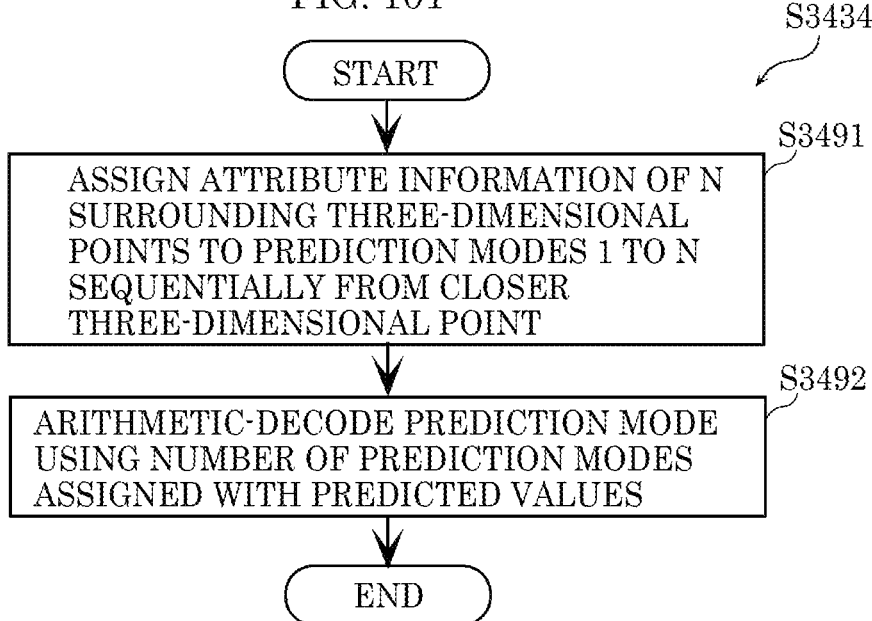
FIG. 101 is a flowchart of a prediction mode decoding process according to Embodiment 9.

FIG. 101 is a flowchart of a prediction mode decoding process (S3434) according to Embodiment 9.

First, the three-dimensional data decoding device assigns attribute information items of the N three-dimensional points in the vicinity of the target three-dimensional point to prediction mode values of "1" to "N" in one increment sequentially from a three-dimensional point closer to the target three-dimensional point (S3491). The prediction mode values of "0" to "N" are assigned, and thus a total of N+1 prediction modes are generated. When N+1 is larger than maximum number M of prediction modes (NumPredMode) appended to the bitstream, the three-dimensional data decoding device may generate up to M prediction modes.

Then, the three-dimensional data decoding device arithmetic-decodes the prediction mode by using the number of prediction modes (S3492). Specifically, the three-dimensional data decoding device may perform steps S3403 and S3404 described with reference to FIG. 83 to arithmetic-decode the prediction mode. The three-dimensional data decoding device may also perform steps S3414 to S3416 described with reference to FIG. 87 to arithmetic-decode the prediction mode.

Figure 102:
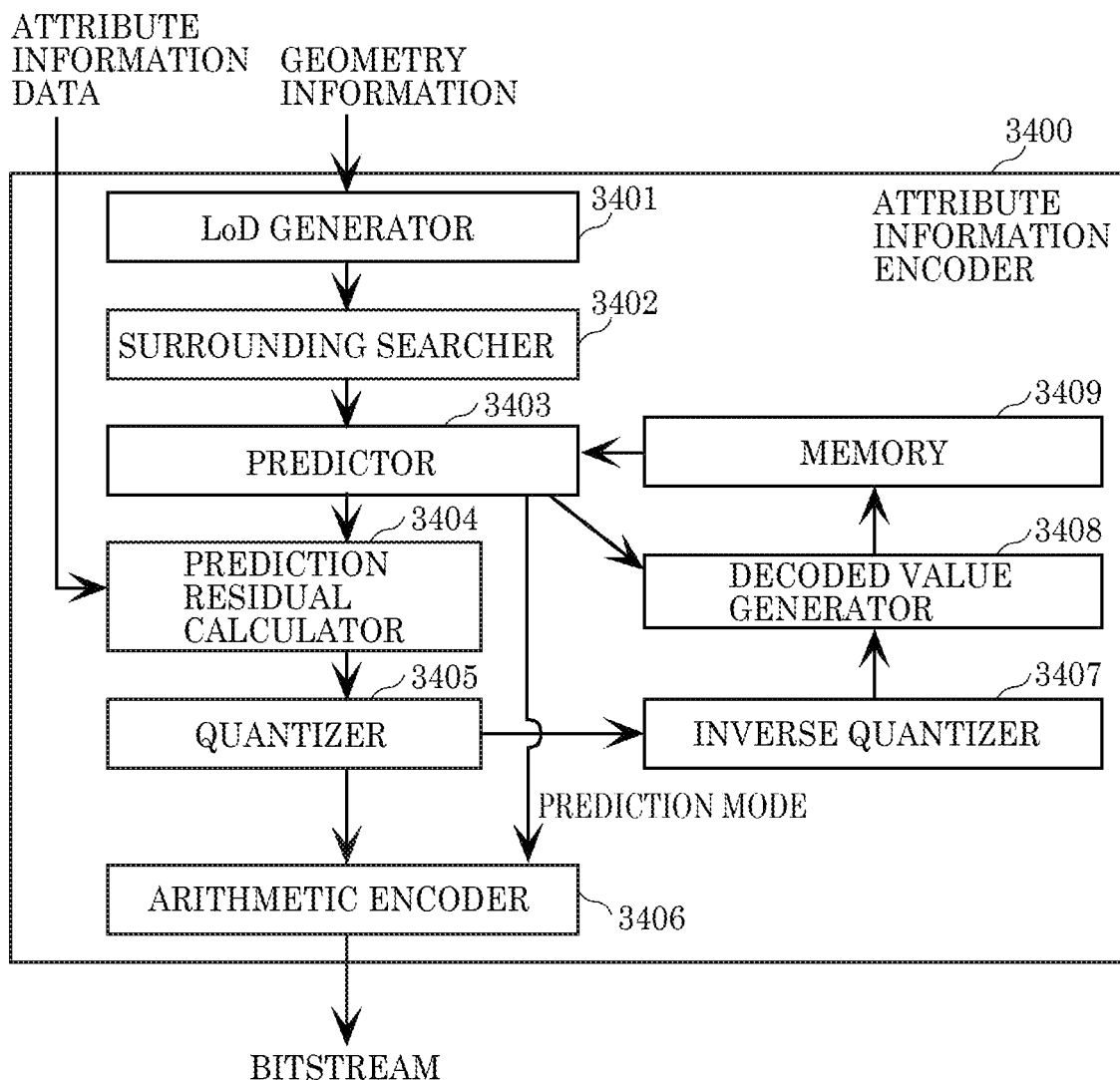
FIG. 102 is a block diagram showing a configuration of an attribute information encoder included in the three-dimensional data encoding device according to Embodiment 9.

FIG. 102 is a block diagram showing a configuration of attribute information encoder 3100 included in the three-dimensional data encoding device according to Embodiment 9. FIG. 102 shows an attribute information encoder in detail among a geometry information encoder, an attribute information item reassigner, and the attribute information encoder included in the three-dimensional data encoding device.

Attribute information encoder 3400 includes LoD generator 3401, surrounding searcher 3402, predictor 3403, prediction residual calculator 3404, quantizer 3405, arithmetic encoder 3406, inverse quantizer 3407, decoded value generator 3408, and memory 3409.

LoD generator 3401 generates LoD by using geometry information geometry) of a three-dimensional point.

Surrounding searcher 3402 searches a neighboring three-dimensional point adjacent to each three-dimensional point by using an LoD generation result by LoD generator 3401 and distance information indicating a distance between three-dimensional points.

Predictor 3403 generates a predicted value of an attribute information item of a target three-dimensional point to be encoded. Specifically, predictor 3403 assigns predicted values to prediction modes indicated by prediction mode values of "0" to "M−1", and selects a prediction mode. Predictor 3403 outputs the selected prediction mode, specifically, the prediction mode value indicating the prediction mode to the arithmetic encoder. Predictor 3403 performs, for example, the process in step S3455.

Prediction residual calculator 3404 calculates (generates) a prediction residual of the predicted value of the attribute information item generated by predictor 3403. Prediction residual calculator 3404 performs the process in step S3456.

Quantizer 3405 quantizes the prediction residual of the attribute information item calculated by prediction residual calculator 3404.

Arithmetic encoder 3106 arithmetic-encodes the prediction residual quantized by quantizer 3105. Arithmetic encoder 3406 outputs a bitstream including the arithmetic-encoded prediction residual, for example, to the three-dimensional data decoding device.

The prediction residual may be binarized, for example, by quantizer 3405 before arithmetic-encoded by arithmetic encoder 3406. Arithmetic encoder 3406 may generate and encode various header information items (header information). Arithmetic encoder 3406 may also obtain a prediction mode used for encoding from Prediction block, and arithmetic-encode and append the prediction mode to the bitstream.

Inverse quantizer 3407 inverse quantizes the prediction residual quantized by quantizer 3405. Inverse quantizer 3407 performs the process in step S3459.

Decoded value generator 3408 adds the predicted value of the attribute information item generated by predictor 3403 to the prediction residual inverse quantized by inverse quantizer 3407 to generate a decoded value.

Memory 3409 stores a decoded value of an attribute information item of each three-dimensional point decoded by decoded value generator 3408. For example, when generating a predicted value of a three-dimensional point having been not yet encoded, predictor 3403 generates a predicted value by using the decoded value of the attribute information item of each three-dimensional point stored in memory 3409.

Figure 103:
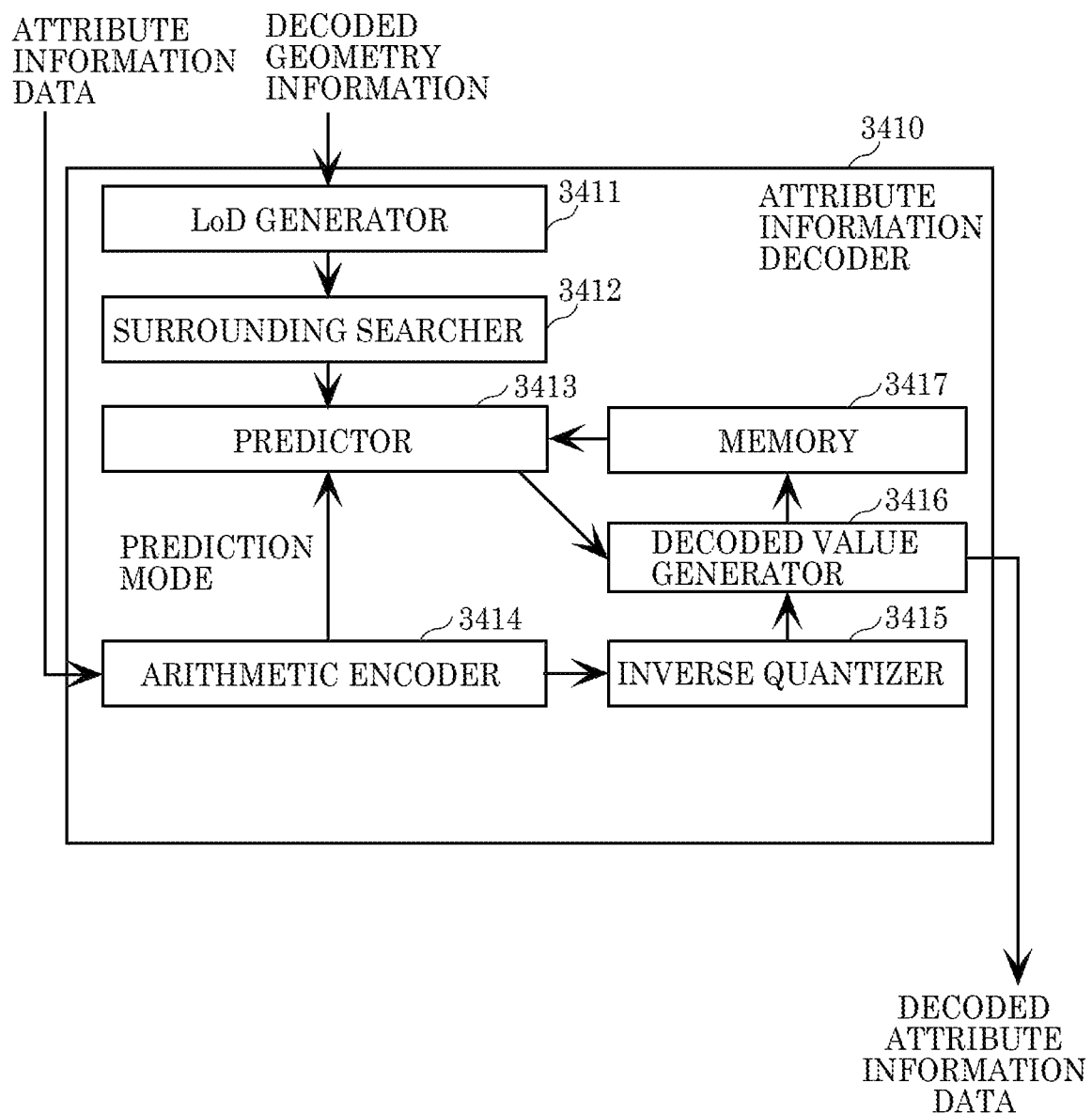
FIG. 103 is a block diagram showing a configuration of an attribute information decoder included in the three-dimensional data decoding device according to Embodiment 9.

FIG. 103 is a block diagram of a configuration of attribute information decoder 3410 included in the three-dimensional data decoding device according to Embodiment 9. FIG. 103 shows an attribute information decoder in detail among a geometry information decoder and the attribute information decoder included in the three-dimensional data decoding device.

Attribute information decoder 3410 includes LoD generator 3411, surrounding searcher 3412, predictor 3413, arithmetic decoder 3414, inverse quantizer 3415, decoded value generator 3416, and memory 3417.

LoD generator 3411 generates LoD by using geometry information (geometry information) of a three-dimensional point decoded by a geometry information decoder (not shown).

Surrounding searcher 3412 searches a neighboring three-dimensional point adjacent to each three-dimensional point by using an LoD generation result by LoD generator 3411 and distance information indicating a distance between three-dimensional points.

Predictor 3413 generates a predicted value of an attribute information item of a target three-dimensional point to be decoded. Predictor 3413 performs, for example, the process in step S3485.

Arithmetic decoder 3414 arithmetic-decodes the prediction residual in the bitstream obtained by attribute information encoder 3400. Arithmetic decoder 3414 may decode various header information items. Arithmetic decoder 3414 may also output an arithmetic-decoded prediction mode to predictor 3413. In this case, predictor 3413 may calculate a predicted value by using the prediction mode obtained by arithmetic decoding by arithmetic decoder 3414.

Inverse quantizer 3415 inverse quantizes the prediction residual arithmetic-decoded by arithmetic decoder 3414.

Decoded value generator 3416 adds the predicted value generated by predictor 3413 and the prediction residual inverse quantized by inverse quantizer 3415 to generate a decoded value. Decoded value generator 3416 outputs decoded attribute information data to any other device.

Memory 3417 stores a decoded value of an attribute information item of each three-dimensional point decoded by decoded value generator 3416. For example, when generating a predicted value of a three-dimensional point having been not yet decoded, predictor 3413 generates a predicted value by using the decoded value of the attribute information item of each three-dimensional point stored in memory 3417.

Figure 104:
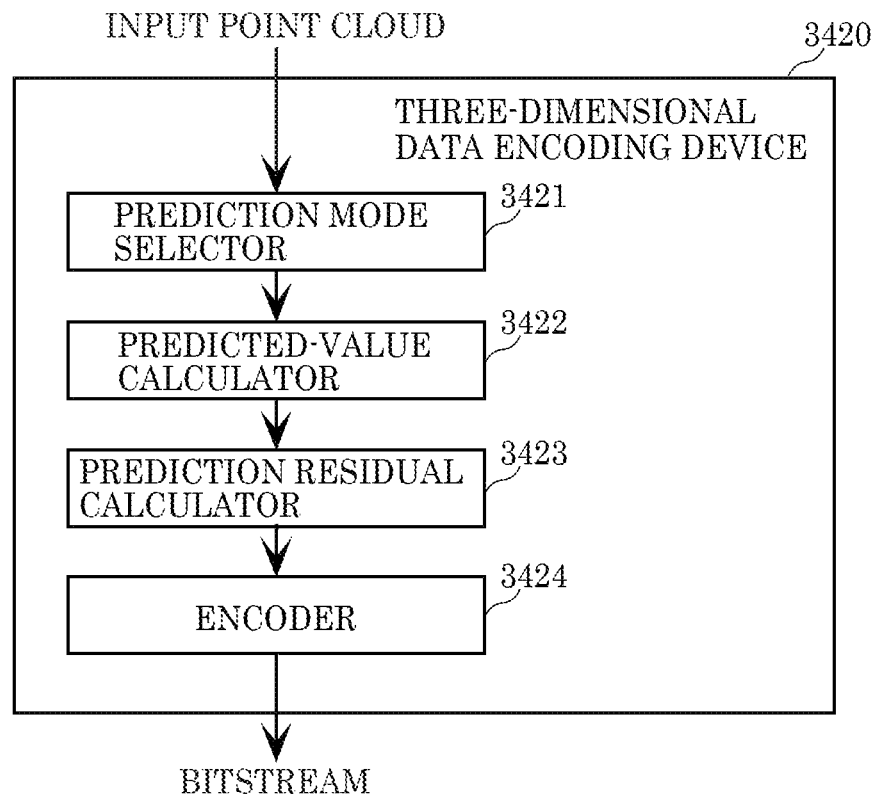
FIG. 104 is a block diagram showing a configuration of the three-dimensional data encoding device according to Embodiment 9.

Next, configurations of the three-dimensional data encoding device and the three-dimensional data decoding device according to this embodiment will be described. FIG. 104 is a block diagram showing the configuration of three-dimensional data encoding device 3420 according to Embodiment 9. Three-dimensional data encoding device 3420 includes prediction mode selector 3421, predicted value calculator 3422, prediction residual calculator 3423, and encoder 3424. Prediction mode selector 3421 selects one prediction mode from two or more prediction modes in accordance with attribute information items of one or more second three-dimensional points in the vicinity of a first three-dimensional point, the two or more prediction modes each being used to calculate a predicted value of an attribute information item of the first three-dimensional point. Predicted value calculator 3422 calculates the predicted value of the prediction mode selected by prediction mode selector 3421. Prediction residual calculator 3423 calculates, as a prediction residual, a difference between the attribute information item of the first three-dimensional point and the predicted value calculated by predicted value calculator 3422. Encoder 3424 generates a bitstream including the selected prediction mode and the calculated prediction residual.

Figure 105:
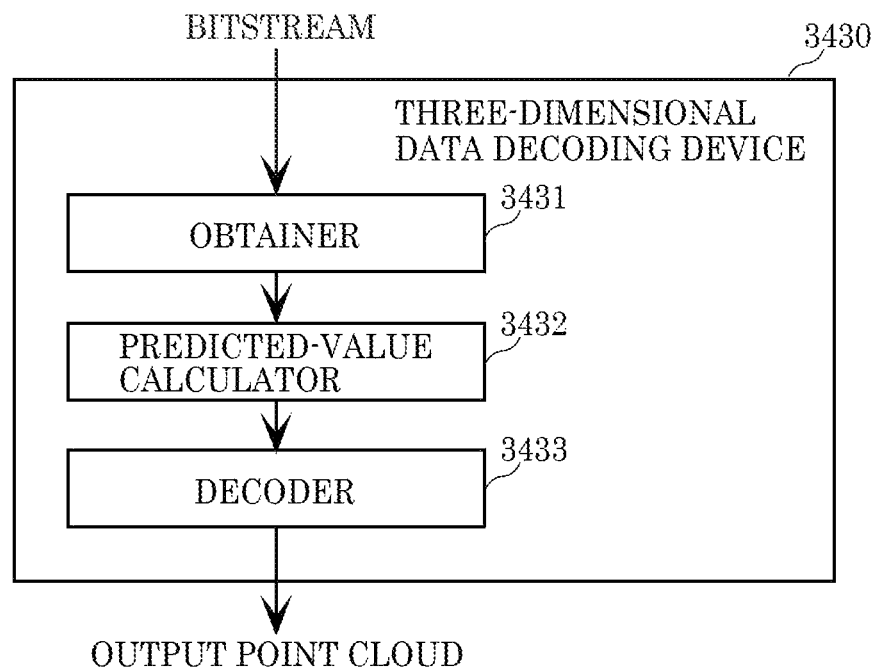
FIG. 105 is a block diagram showing a configuration of the three-dimensional data decoding device according to Embodiment 9.

FIG. 105 is a block diagram showing the configuration of three-dimensional data decoding device 3430 according to Embodiment 9. Three-dimensional data decoding device 3430 includes obtainer 3431, predicted value calculator 3432, and decoder 3433. Obtainer 3431 obtains a bitstream to obtain a prediction mode and a prediction residual. Predicted value calculator 3432 calculates a predicted value of the Obtained prediction mode. Decoder 3433 adds the calculated predicted value to the obtained prediction residual to calculate an attribute information item of the first three-dimensional point.

Figure 106:
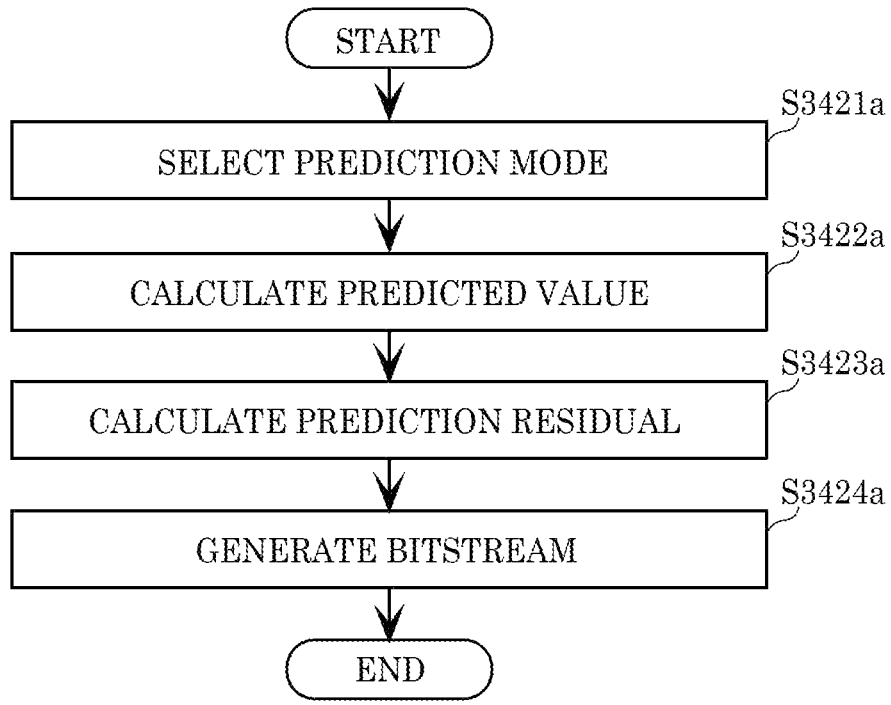
FIG. 106 is a flowchart of processes of the three-dimensional data encoding device according to Embodiment 9.

The three-dimensional data encoding device according to this embodiment performs processes shown in FIG. 106.

The three-dimensional data encoding device selects one prediction mode from two or more prediction modes in accordance with attribute information items of one or more second three-dimensional points in the vicinity of the first three-dimensional point, the two or more prediction modes each being used to calculate a predicted value of an attribute information item of the first three-dimensional point (S3421a). Then, the three-dimensional data encoding device calculates the predicted value of the selected prediction mode (S3422a). Then, the three-dimensional data encoding device calculates, as a prediction residual, a difference between the attribute information item of the first three-dimensional point and the calculated predicted value (S3423a). Then, the three-dimensional data encoding device generates a bitstream including the selected prediction mode and the calculated prediction residual (S3424a).

Thus, the three-dimensional data encoding device can encode an attribute information item by using a predicted value of one prediction mode among two or more prediction modes, thereby improving an encoding efficiency of an attribute information item.

In the calculating of the predicted value (S3422a), the three-dimensional data encoding device calculates, as the predicted value, an average of the attribute information items of the one or more second three-dimensional points in a first prediction mode among the two or more prediction modes, and calculates, as the predicted value, an attribute information item of the one or more second three-dimensional points in a second prediction mode among the two or more prediction modes.

A first prediction mode value indicating the first prediction mode is smaller than a second prediction mode value indicating the second prediction mode. The bitstream includes, as the prediction mode, a prediction mode value indicating the prediction mode selected.

In the calculating of the predicted value (S3422a), two or more averages or two or more attribute information items are calculated as the predicted value of the prediction mode.

The attribute information item is color information indicating a color of a corresponding three-dimensional point, and the two or more averages or the two or more attribute information items indicate two or more component values defining a color space.

In the calculating of the predicted value (S3422a), the three-dimensional data encoding device calculates, as the predicted value, an attribute information item of one second three-dimensional point in a third prediction mode among the two or more prediction modes, and calculates, as the predicted value, an attribute information item of another second three-dimensional point farther from the first three-dimensional point than the one second three-dimensional point in a fourth prediction mode among the two or more prediction modes. A third prediction mode value indicating the third prediction mode is smaller than a fourth prediction mode value indicating the fourth prediction mode. The bitstream includes, as the prediction mode, a prediction mode value indicating the prediction mode selected. Thus, a prediction mode value indicating a prediction mode for calculating a predicted value that is more likely to be selected is set smaller, thereby reducing an encoding amount.

The attribute information item includes a first attribute information item and a second attribute information item different from the first attribute information item. In the calculating of the predicted value (S3422a), the three-dimensional data encoding device calculates a first predicted value by using the first attribute information item, and calculates a second predicted value by using the second attribute information item.

The three-dimensional data encoding device further binarizes the prediction mode value indicating the prediction mode with a truncated unary code in accordance with the number of prediction modes to generate binary data. The bitstream includes the binary data as the prediction mode. This can reduce an encoding amount of a prediction mode value indicating a prediction mode for calculating a predicted value that is more likely to be selected.

In the selecting of the prediction mode (S3421a), when a maximum absolute differential value of the attribute information items of the one or more second three-dimensional points is smaller than a predetermined threshold, the three-dimensional data encoding device selects a prediction mode for calculating, as the predicted value, an average of the attribute information items of the one or more second three-dimensional points, and when the maximum absolute differential value is equal to or greater than the predetermined threshold, the three-dimensional data encoding device selects one prediction mode from the two or more prediction modes. This can reduce a processing amount when the maximum absolute differential value is smaller than the predetermined threshold.

Figure 107:
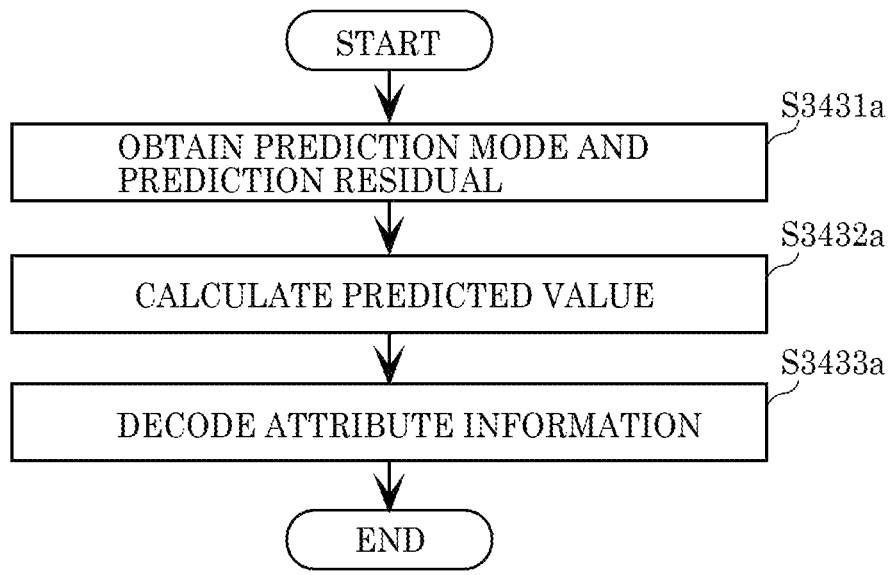
FIG. 107 is a flowchart of processes of the three-dimensional data decoding device according to Embodiment 9.

The three-dimensional data decoding device according to this embodiment performs processes shown in FIG. 107.

The three-dimensional data decoding device obtains a bitstream to obtain a prediction mode and a prediction residual (S3431a). Then, the three-dimensional data decoding device calculates a predicted value of the obtained prediction mode (S3432a). Then, the three-dimensional data encoding device adds the calculated predicted value to the obtained prediction residual to calculate an attribute information item of the first three-dimensional point (S3433a).

This can reduce a processing amount when the maximum absolute differential value is smaller than the predetermined threshold.

In the calculating of the predicted value (S3432a), the three-dimensional data decoding device calculates, as the predicted value, an average of the attribute information items of one or more second three-dimensional points in the vicinity of the first three-dimensional point in the first prediction mode among the two or more prediction modes, and calculates, as the predicted value, an attribute information item of the one or more second three-dimensional points in the second prediction mode among the two or more prediction modes.

A first prediction mode value indicating the first prediction mode is smaller than a second prediction mode value indicating the second prediction mode. The bitstream includes, as the prediction mode, a prediction mode value indicating the prediction mode selected.

In the calculating of the predicted value (S3432a), the three-dimensional data decoding device calculates two or more averages or two or more attribute information items as the predicted value of the prediction mode.

The attribute information item is color information indicating a color of a corresponding three-dimensional point, and the two or more averages or the two or more attribute information items indicate two or more component values defining a color space.

In the calculating of the predicted value (S3432a), an attribute information item of one second three-dimensional point among one or more second three-dimensional points in the vicinity of the first three-dimensional point is calculated as the predicted value in a third prediction mode among the two or more prediction modes, and an attribute information item of another second three-dimensional point farther from the first three-dimensional point than the one second three-dimensional point is calculated as the predicted value in a fourth prediction mode among the two or more prediction modes. A third prediction mode value indicating the third prediction mode is smaller than a fourth prediction mode value indicating the fourth prediction mode. The bitstream includes, as the prediction mode, a prediction mode value indicating the prediction mode selected. Thus, a prediction mode value indicating a prediction mode for calculating a predicted value that is more likely to be selected is set smaller, thereby reducing time for decoding an attribute information item.

The attribute information item includes a first attribute information item and a second attribute information item different from the first attribute information item. In the calculating of the predicted value (S3432a), a first predicted value is calculated by using the first attribute information item, and a second predicted value is calculated by using the second attribute information item.

In the obtaining of the prediction mode (S3431a), the three-dimensional data decoding device obtains, as the prediction mode, binary data binarized by a truncated unary code in accordance with the number of prediction modes.

In the calculating of the predicted value (S3432a), when a maximum absolute differential value of the attribute information item of the one or more second three-dimensional points in the vicinity of the first three-dimensional point is smaller than a predetermined threshold, an average of the attribute information items of the one or more second three-dimensional points is calculated as the predicted value, and when the maximum absolute differential value is equal to or greater than the predetermined threshold, a predicted value of one prediction mode among the two or more prediction modes is calculated as the predicted value.

This can reduce a processing amount when the maximum absolute differential value is smaller than the predetermined threshold.

Embodiment 10

When a three-dimensional data encoding device arithmetically encodes prediction mode values each indicating a prediction mode (PredMode) by binarizing the prediction mode values using truncated unary coding according to the value of M, where M denotes the total number of prediction modes, there is a possibility of generating a prediction mode to which a predicted value is not assigned due to the number of encoded and decoded three-dimensional points which can be used for prediction and are in the vicinity of a three-dimensional point to be encoded. The three-dimensional data encoding device is also referred to as an encoder. A three-dimensional data decoding device is also referred to as a decoder. The embodiment will be described with reference to FIG. 108 through FIG. 110.

FIG. 108 is a diagram according to Embodiment 10 which illustrates an example of a table indicating predicted values calculated according to respective prediction modes by a three-dimensional data encoding device. FIG. 109 is a diagram according to Embodiment 10 which illustrates an example of a binarization table indicating a case in which prediction mode values are encoded by binarization. FIG. 110 is a diagram according to Embodiment 10 which illustrates an example of a table indicating predicted values calculated according to the respective prediction modes by the three-dimensional data decoding device.

For example, FIG. 108 illustrates an example in which, when the total number of prediction modes denoted by M is five and the number of three-dimensional points denoted by N is two, as predicted values calculated according to prediction modes, (i) an average value is assigned to prediction mode 0, (ii) attribute values of N three-dimensional points, where N denotes two, are respectively assigned to prediction mode 1 and prediction mode 2, and (iii) a predicted value is not assigned to prediction mode 3 and prediction mode 4. N three-dimensional points are in the vicinity of a three-dimensional point to be processed and can be used for prediction. In such a case, "not available" indicating an undefined value may be assigned as a predicted value calculated according to prediction mode 3 and prediction mode 4 to both of which a predicted value is not assigned. Since the three-dimensional data encoding device performs encoding according to the value of M, where M denotes the total number of prediction modes and is five in this case, the three-dimensional data encoding device is capable of selecting any one of the live prediction modes. Accordingly, the three-dimensional data encoding device is capable of erroneously selecting prediction mode 3 or prediction mode 4, and appending, to a bitstream, a prediction mode value indicating prediction mode 3 or prediction mode 4 which is erroneously selected. As a consequence, the three-dimensional data decoding device is capable of obtaining a bitstream including the prediction mode value that is erroneously appended, and decoding the prediction mode value that is appended to the obtained bitstream. For this reason, the three-dimensional data decoding device may not be able to correctly decode the bitstream. Hereinafter, the above will be described.

For example, as illustrated in FIG. 109, although the three-dimensional data encoding device erroneously selects prediction mode 3 to which a predicted value is not assigned, the three-dimensional data encoding device can arithmetically encode "1110" that is binary data of "3" which is a prediction mode value indicating prediction mode 3. The arithmetically encoded binary data is appended to the bitstream. It should be noted that an example illustrated in FIG. 109 indicates binary data obtained as the result of binarizing prediction mode values using truncated unary coding according to M, where M denotes the total number of prediction modes and is five. It should be noted that a method of binarizing the prediction mode values need not use the truncated unary coding. The prediction mode values may be binarized using unary coding or fixed coding.

Then, as illustrated in FIG. 110, when the three-dimensional data decoding device obtains the bitstream generated by the three-dimensional encoding device, the three-dimensional data decoding device can obtain, by decoding data included in the bitstream, "1110", that is the binary data of a prediction mode value and "3" which is the prediction mode value. Then, the three-dimensional data decoding device decodes an attribute value of a three-dimensional point to be decoded by calculating a predicted value according to prediction mode 3.

However, prediction mode 3 obtained from the bitstream is a prediction mode erroneously appended, and is the prediction mode to which an undefined value is appended. For this reason, the three-dimensional data decoding device may calculate a value different from the predicted value calculated according to prediction mode 3 by the three-dimensional data encoding device, when calculating a predicted value according to prediction mode 3. That is, unless a predicted value is calculated using a calculation method common to an encoder and a decoder, a discrepancy may occur between a predicted value calculated by the encoder and a predicted value calculated by the decoder. If the discrepancy occurs, the discrepancy affects subsequent prediction performed by the decoder, and the three-dimensional data decoding device may not be able to correctly decode the bitstream.

Accordingly, by predetermining a calculation method which is common to the encoder and the decoder and in which a predetermined fixed value is assigned to a prediction mode to which a predicted value is not assigned, the decoder can decode a prediction mode from a bitstream, can obtain a decoded value using the same initial value used by the encoder, and can correctly decode the bitstream, even if the encoder erroneously generates a prediction residual according to a prediction mode to which a predicted value is not assigned (prediction mode to which an initial value is assigned) and appends the prediction mode to the bitstream.

FIG. 111 is a diagram according to Embodiment 10 which illustrates an example of a table indicating predicted values calculated according to the respective prediction modes by the three-dimensional data encoding device. FIG. 112 is a diagram according to Embodiment 10 which illustrates an example of a binarization table indicating a case in which the prediction mode values are encoded by binarization. FIG. 113 is a diagram according to Embodiment 10 which illustrates an example of a table indicating predicted values calculated according to the respective prediction modes by the three-dimensional data decoding device.

For example, as illustrated in FIG. 108, FIG. 111 illustrates an example in which, when the total number of prediction modes denoted by M is five and the number of three-dimensional points denoted by N is two, as predicted values calculated according to prediction modes, (i) an average value is assigned to prediction mode 0, (ii) attribute values of N three-dimensional points, where N denotes two, are respectively assigned to prediction mode 1 and prediction mode 2, and (iii) a predicted value is not assigned to prediction mode 3 and prediction mode 4. N three-dimensional points are in the vicinity of a three-dimensional point to be processed and can be used for prediction. In such a case, a predetermined fixed value is assigned as a predicted value calculated according to prediction mode 3 and prediction mode 4 to both of which a predicted value is not assigned.

That is, in calculation of a predicted value, the three-dimensional data encoding device calculates a predetermined fixed value as a predicted value calculated according to a prediction mode, when a predicted value based on attribute information of three-dimensional points in the vicinity of a three-dimensional point to be processed is not assigned to a selected prediction mode. For example, in calculation of a predicted value, a case in which a predicted value based on attribute information of three-dimensional points in the vicinity of a three-dimensional point to be processed is not assigned to a selected prediction mode is a case in which a prediction value is not assigned to the prediction mode due to the number of three-dimensional points in the vicinity of the three-dimensional point to be processed being less than or equal to a predetermined number. It should be noted that a case in which a predicted value based on attribute information of three-dimensional points in the vicinity of the three-dimensional point to be processed is not assigned to the selected prediction mode due to the number of three-dimensional points, denoted by N, in the vicinity of the three-dimensional point to be processed being less than or equal to the predetermined number is a case in which an average value and attribute information of the three-dimensional points in the vicinity of the three-dimensional point to be processed are assigned as predicted values, or in other words, a case in which N+1<M, for example.

For example, as illustrated in FIG. 112, although the three-dimensional data encoding device erroneously selects prediction mode 3 to which a predicted value is not assigned, the three-dimensional data encoding device can arithmetically encode "1110" that is binary data of "3" which is a prediction mode value indicating prediction mode 3. The arithmetically encoded binary data is appended to the bitstream. It should be noted that an example illustrated in FIG. 112 indicates binary data obtained as a result of binarizing prediction mode values using truncated unary coding according to the value of M, where M denotes the total number of prediction modes and is five. It should be noted that the diagram illustrated in FIG. 112 is the same as the diagram illustrated in FIG. 109.

Then, as illustrated in FIG. 113, the three-dimensional data decoding device can obtain "1110" that is binary data of "3" which is the prediction mode value indicating prediction mode 3, by decoding data included in the bitstream after obtaining the bitstream generated by the three-dimensional data encoding device. Since the three-dimensional data decoding device needs to calculate a predicted value according to prediction mode 3 to which a predicted value is not assigned, the three-dimensional data decoding device calculates a predetermined fixed value as the predicted value calculated according to prediction mode 3. Accordingly, even if a prediction mode to which a predicted value is not assigned is erroneously selected, a predicted value calculated by the encoder and a predicted value calculated by the decoder coincide with each other. With this, the three-dimensional data decoding device can correctly decode the bitstream.

In this way, the three-dimensional data encoding device calculates one or more predicted values of attribute information of a three-dimensional point to be processed using attribute information of N three-dimensional points in the vicinity of the three-dimensional point to be processed. Then, the three-dimensional data encoding device assigns the one or more predicted values calculated according to M prediction modes, where M denotes the total number of prediction modes, and assigns a predetermined fixed value to a prediction mode to which the one or more predicted values are not assigned.

It should be noted that the predetermined fixed value is an initial value, and is, for example, a value of zero. That is, when an attribute value indicates color information (such as YUV and RGB), the three-dimensional data encoding device and the three-dimensional data decoding device may assign a value of (0, 0, 0) as an initial value, and when an attribute value indicates a degree of reflection, the three-dimensional data encoding device and the three-dimensional data decoding device may assign a value of zero as an initial value.

It should be noted that, as a method of assigning an initial value, the three-dimensional data encoding device and the three-dimensional data decoding device assign an initial value to a prediction mode to which a predicted value is not assigned, but the method of assigning an initial value is not limited to this aforementioned method. Examples of the method will be described with reference to FIG. 114 and FIG. 115.

FIG. 114 illustrates an example according to Embodiment 10 which illustrates an initial table used for processing of assigning predicted values to the prediction modes. FIG. 115 is a diagram according to Embodiment 10 which illustrates an example of a table which is generated using the initial table and in which predicted values are calculated according to the respective prediction modes by the three-dimensional data encoding device.

The three-dimensional data encoding device and the three-dimensional data decoding device generate an initial table by assigning, in advance, an initial value (e.g. a value of zero) as a predicted value calculated according to a prediction mode to all prediction modes, for example. Next, the three-dimensional data encoding device and the three-dimensional data decoding device may update the predicted values assigned to the respective prediction modes with an average value of attribute values of three-dimensional points that can be used for subsequent prediction and are in the vicinity of a three-dimensional point to be processed, or with attribute values of the three-dimensional points in the vicinity of the three-dimensional point to be processed. For example, the three-dimensional data encoding device and the three-dimensional data decoding device may generate, using a table in which an initial value is assigned as a predicted value to all prediction modes as in the initial table illustrated in FIG. 114, a table indicating predicted values calculated according to the respective prediction modes by the three-dimensional data encoding device as illustrated in FIG. 115. Next, the three-dimensional data encoding device calculates predicted values according to the respective prediction modes, using attribute values of N three-dimensional points in the vicinity of the three-dimensional point to be processed. Then, the three-dimensional data encoding device updates the initial values in the initial table with the predicted values calculated according to the respective prediction modes.

For example, the three-dimensional data encoding device and the three-dimensional data decoding device may generate a table indicating predicted values calculated according to respective prediction modes by updating the initial value assigned to prediction mode 0 with an average value of attribute values of three-dimensional points that can be used for prediction and are in the vicinity of a three-dimensional point to be processed, and by updating the initial values assigned to prediction mode 1 and prediction mode 2 with attribute values of the three-dimensional points in the vicinity of the three-dimensional point to be processed. An initial value is to be assigned to a prediction mode to which a predicted value is not assigned also in this case.

As such, when N+1 is less than M when there are M prediction modes and N three-dimensional points in the vicinity of a three-dimensional point to be encoded, an initial value may be assigned as a predicted value calculated according to a prediction mode to which a predicted value is not assigned, or the initial value may be determined as the predicted value due to a predicted value not being assigned, so long as an initial value is assigned to a prediction mode to which a predicted value according to attribute values of the N three-dimensional points is not assigned in the end.

It should be noted that so long as the same value is used by the encoder and the decoder, the initial value is not, limited to a value of zero, and any values may be used.

Figure 116:
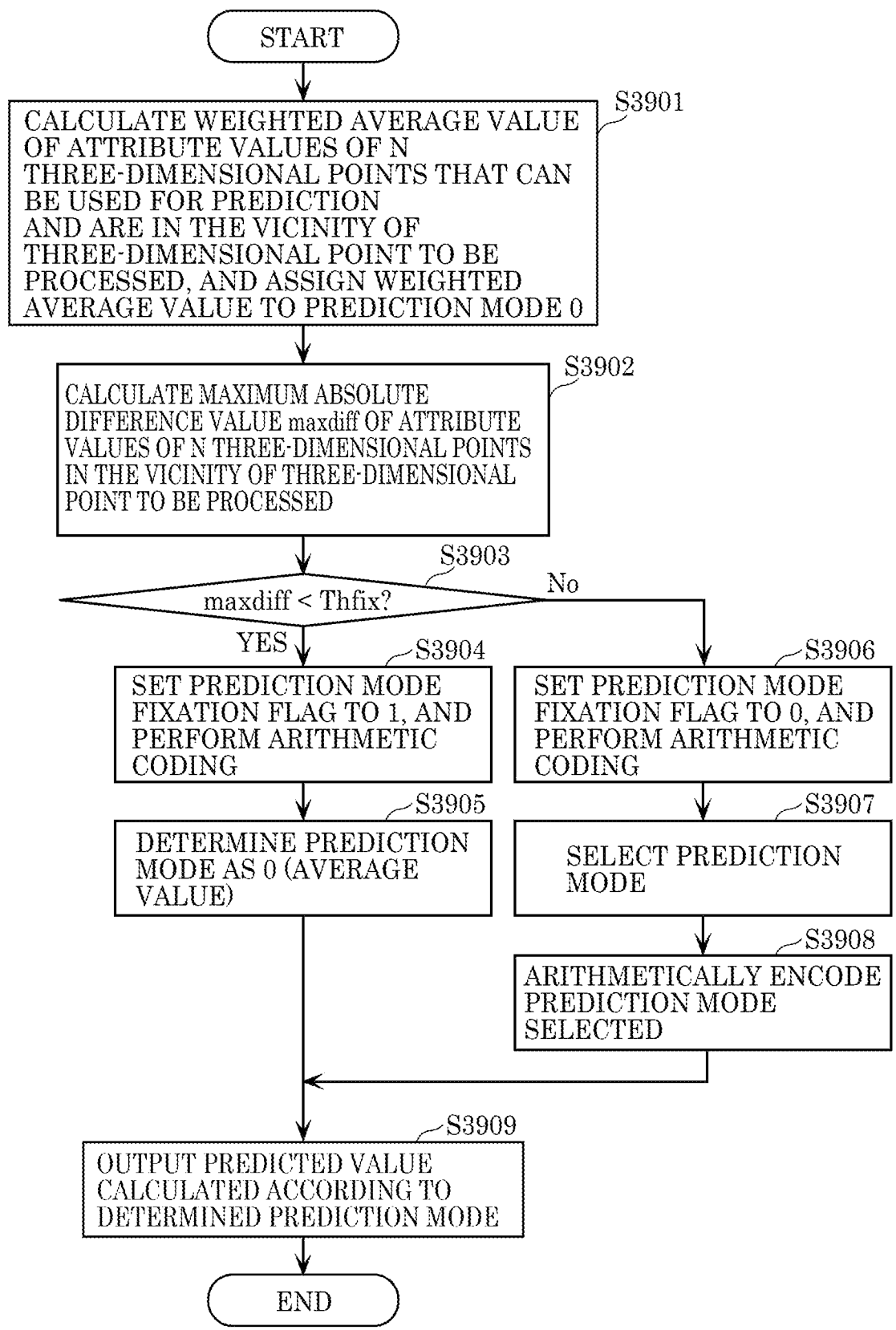
FIG. 116 is a flowchart according to Embodiment 10 which illustrates an example of processing of calculating a predicted value.

FIG. 116 is a flowchart according to Embodiment 10 which illustrates an example of processing of calculating a predicted value.

First, as illustrated in FIG. 116, the three-dimensional data encoding device calculates a weighted average value of attribute values of N three-dimensional points that can be used for prediction of a predicted value of a target three-dimensional point to be processed and are in the vicinity of the target three-dimensional point, and assigns the calculated weighted average value to a prediction mode whose prediction mode value is "0" (S3901).

Next, the three-dimensional data encoding device calculates maximum absolute difference value maxdiff of the attribute values of the N three-dimensional points in the vicinity of the target three-dimensional point to be encoded (S3902).

Next, the three-dimensional data encoding device determines whether maximum absolute difference value maxdiff is less than threshold Thfix (S3903). It should be noted that threshold Thfix may be encoded and appended to, for example, a header of a stream.

When maximum absolute difference value maxdiff is less than threshold Thfix (YES in S3903), the three-dimensional data encoding device sets "1" to a prediction mode fixation flag and arithmetically encodes the prediction mode fixation flag (S3904), and determines the prediction mode value as "0" (S3905).

On the other hand, when maximum absolute difference value maxdiff is greater than or equal to threshold Thfix (NO in S3903), the three-dimensional data encoding device sets "0" to the prediction mode fixation flag and arithmetically encodes the prediction mode fixation flag (S3906), and selects one prediction mode from a plurality of prediction modes (S3907).

Then, the three-dimensional data encoding device arithmetically encodes a prediction mode value indicating the selected prediction mode (S3908).

The three-dimensional data encoding device either outputs the prediction mode value determined in step S3905, or calculates a predicted value according to the prediction mode selected in step S3908 and outputs the calculated predicted value (S3909). When the prediction mode value determined in step S3905 is used, the three-dimensional data encoding device calculates an average of attribute values of N three-dimensional points in the vicinity of a three-dimensional point to be to be processed as a predicted value calculated according to a prediction mode whose prediction mode value is indicated as "0".

It should be noted that the three-dimensional data encoding device may arithmetically encodes prediction mode values each indicating a prediction mode (PredMode) by binarizing the prediction values using truncated unary coding according to M, where M denotes the total number of prediction modes. In addition, the three-dimensional data encoding device may encode NumPredMode indicating the total number of prediction modes, which is denoted by M, and append NumPredMode to a header. With this, the three-dimensional data decoding device can correctly decode the prediction mode values each indicating a prediction mode (PredMode) by decoding NumPredMode in the header. It should be noted that the three-dimensional data encoding device need not encode PredMode when NumPredMode=1. This reduces a code amount since PredMode need not be encoded when NumPredMode=1.

Figure 117:
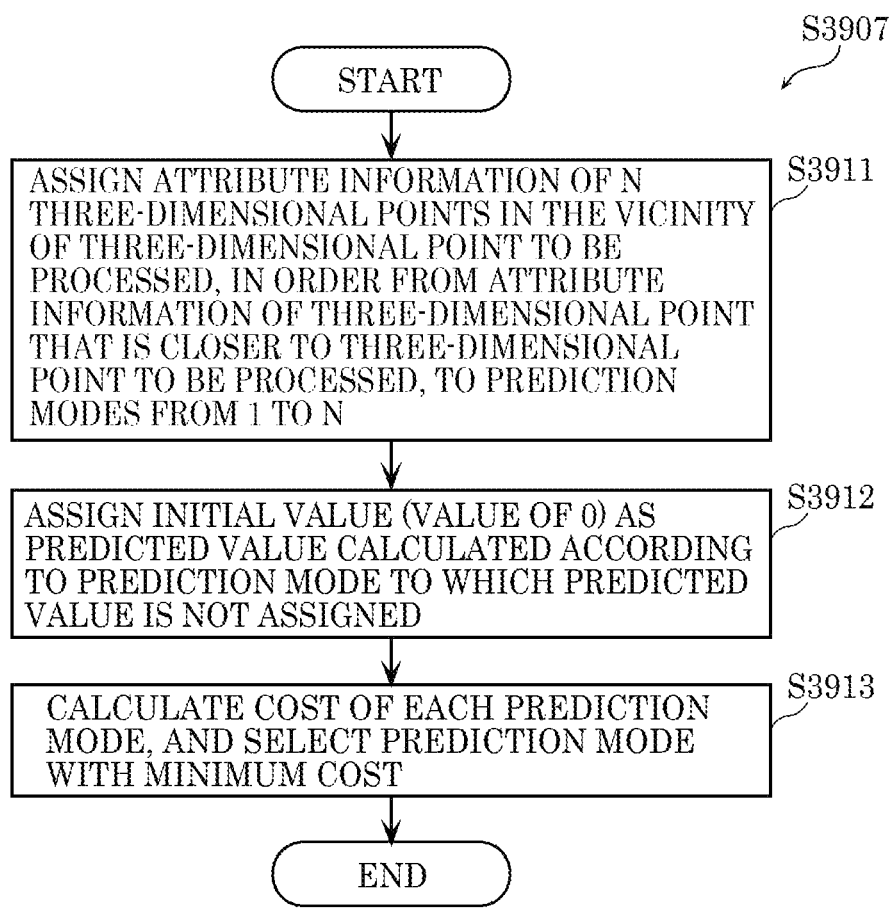
FIG. 117 is a flowchart according to Embodiment 10 which illustrates processing of selecting a prediction mode.

FIG. 117 is a flowchart according to Embodiment 10 which illustrates processing of selecting a prediction mode (S3907).

First, the three-dimensional data encoding device assigns, as predicted values calculated according to prediction modes, attribute information of the N three-dimensional points in the vicinity of the target three-dimensional point, in the order from attribute information of a three-dimensional point closer to the target three-dimensional point, to prediction modes that are indicated in prediction mode values from "1" to "N" which are incremented by one (S3911). It should be noted that since prediction mode values "0" to "N" are assigned, the total number of prediction modes generated is expressed by N+1. When N+1 exceeds the maximum number of prediction modes (NumPredMode), which is denoted by M and is appended to a bitstream, the three-dimensional data encoding device may generate prediction modes up to M prediction modes.

Next, the three-dimensional data encoding device assigns an initial value (e.g. a value of "0") as a predicted value calculated according to a prediction mode to which a predicted value is not assigned (S3912). Specifically, the three-dimensional data encoding device stores, in memory, the initial value and the prediction mode to which a predicted value is not assigned in association with each other.

Next, the three-dimensional data encoding device calculates cost of each prediction mode, and selects a prediction mode with minimum cost (S3913).

Figure 118:
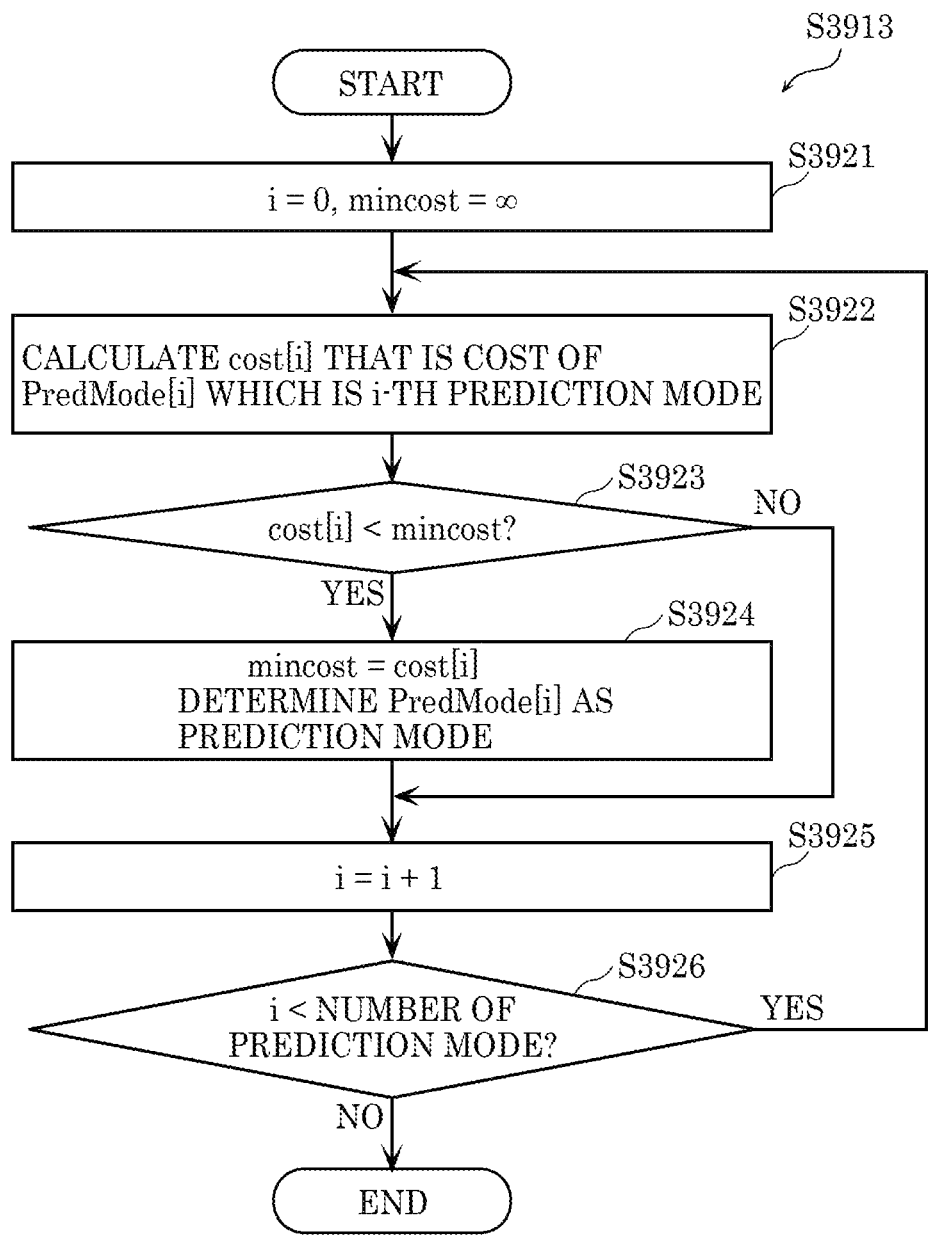
FIG. 118 is a flowchart according to Embodiment 10 which illustrates processing of selecting a prediction mode with minimum cost.

FIG. 118 is a flowchart according to Embodiment 10 which illustrates processing of selecting a prediction mode with minimum cost (S3913). FIG. 118 is a diagram corresponding to the flowchart illustrated in FIG. 97.

First, the three-dimensional data encoding device sets, as initial values, zero to i (i=0), and sets infinity to mincost (mincost=∞) (S3921). The initial values set to i and mincost are stored in the memory of the three-dimensional data encoding device.

Next, the three-dimensional data encoding device calculates, using, for example, formula D1, cost[i] that is the cost of PredMode[i] which is the i-th prediction mode (S3992).

Next, the three-dimensional data encoding device determines whether the calculated cost[i] is less than mincost stored in the memory (S3923).

Next, when the calculated cost[i] is less than mincost stored in the memory (YES in S3923), the three-dimensional data encoding device determines cost[i] as mincost (mincost=cost[i]) and PredMode[i] as a prediction mode (S3924), and then proceeds to step S3925. That is, the three-dimensional data encoding device updates the value of mincost stored in the memory to the value of cost[i], and stores PredMode[i] as the prediction mode in the memory.

On the other hand, when cost[i] that is the calculated cost is greater than or equal to mincost stored in the memory (NO in S3923), the three-dimensional data encoding device proceeds to step S3925.

Next, the three-dimensional data encoding device increments the value of i by one (S3925).

Next, the three-dimensional data encoding device determines whether i is less than the number of prediction modes (S3926).

When i is less than the number of the prediction modes (YES in S3926), the three-dimensional data encoding device returns to step S3922, and when i is flat less than the number of the prediction modes (NO in S3926), the three-dimensional data encoding device terminates the processing of selecting a prediction mode with minimum cost.

Figure 119:
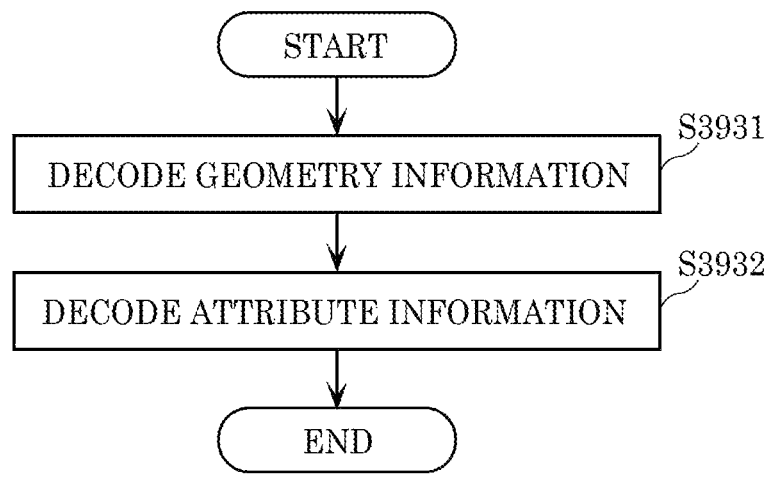

Hereinafter, processing performed by the three-dimensional data decoding device will be described. FIG. 119 is a flowchart according to Embodiment 10 which illustrates three-dimensional data decoding processing performed by the three-dimensional data decoding device. First, the three-dimensional data decoding device decodes geometry information (geometry) from a bitstream (S3931). For example, the three-dimensional data decoding device performs decoding using an octree representation.

Next, the three-dimensional data decoding device decodes attribute information from the bitstream (S3932). For example, when the three-dimensional data decoding device decodes a plurality of types of attribute information, the three-dimensional data decoding device may decode the plurality of types of attribute information one by one. For example, when the three-dimensional data decoding device decodes a color and a degree of reflection as attribute information, the three-dimensional data decoding device decodes an encoded result of the color and an encoded result of the degree of reflection in the order in which the color and the degree of reflection are appended to the bitstream. For example, when the encoded result of the degree of reflection is appended to the bitstream after the encoded result of the color is appended to the bitstream, the three-dimensional data decoding device decodes the encoded result of the color and then decodes the encoded result of the degree of reflection. It should be noted that the three-dimensional data decoding device may decode encoded results of a plurality of types of attribute information which are appended to the bitstream in any order.

In addition, the three-dimensional data decoding device may obtain information indicating a starting location of encoded data of each of items of attribute information in the bitstream by decoding, for example, a header. This allows the three-dimensional data decoding device to selectively decode an item of attribute information that needs to be decoded, and thus the process of decoding an item of attribute information which does not need to be decoded can be omitted. Accordingly, the amount of processing performed by the three-dimensional data decoding device can be reduced. In addition, the three-dimensional data decoding device may decode a plurality of types of attribute information in parallel, and may integrate decoded results into one three-dimensional point cloud. With this, the three-dimensional data decoding device can rapidly decode a plurality of types of attribute information.

Figure 120:
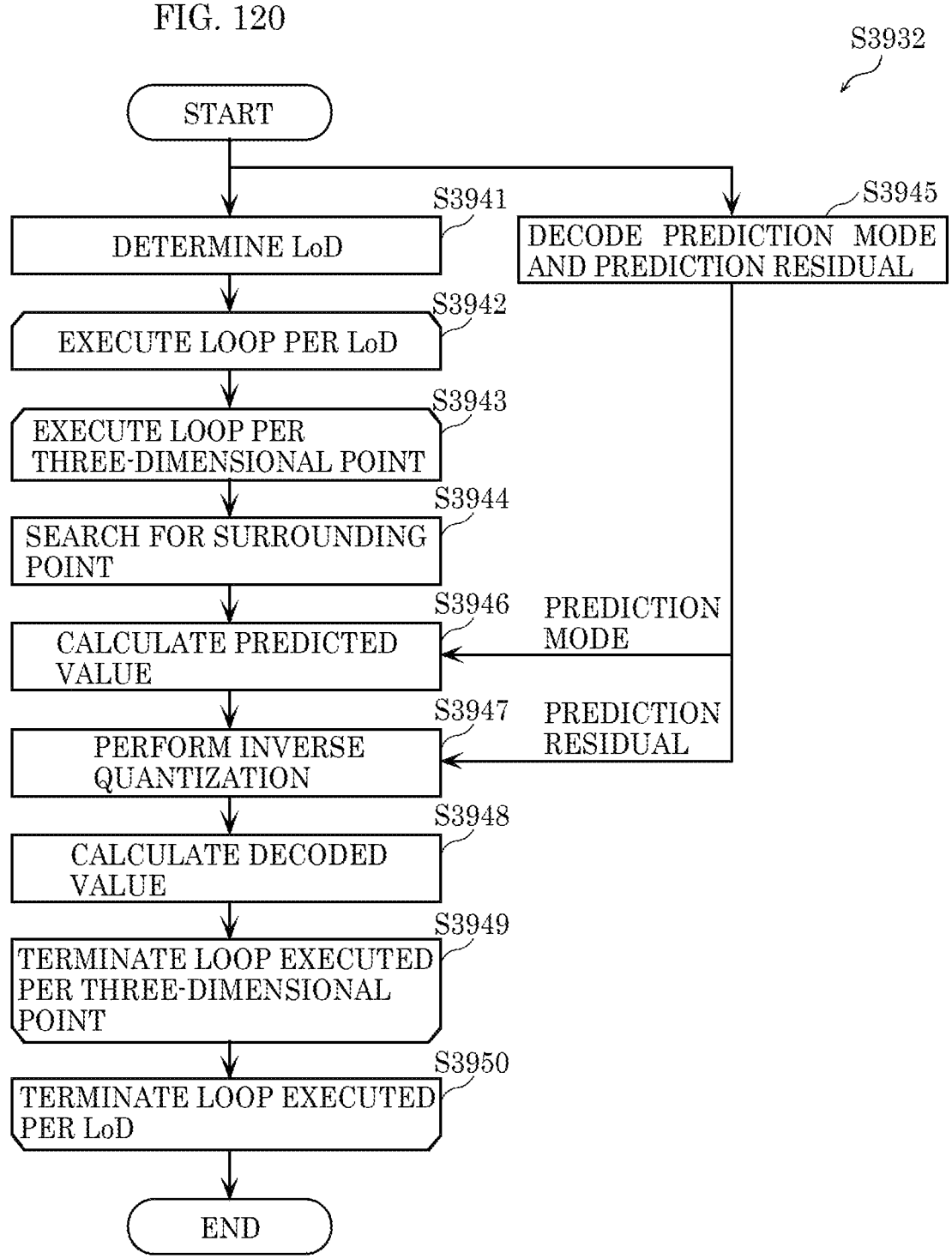

FIG. 120 is a flowchart according to Embodiment 10 which illustrates the attribute information decoding processing (S3932).

First, the three-dimensional data decoding device determines levels of detail (LoDs) (S3941). That is, the three-dimensional data decoding device assigns, to any of the LoDs, a plurality of three-dimensional points that are decoded and include geometry information. For example, this assigning method is the same as the assigning method employed by the three-dimensional data encoding device.

Next, the three-dimensional data decoding device executes a loop per LoD basis (S3942). That is, the three-dimensional data decoding device repeatedly performs, per LoD, processing of steps S3943 through S3949.

Next, the three-dimensional data decoding device executes a loop per three-dimensional point basis (S3943). That is, the three-dimensional data decoding device repeatedly performs, per three-dimensional point, processing of steps S3944 through S3948.

First, the three-dimensional data decoding device searches for a plurality of surrounding points that are three-dimensional points used for calculation of a predicted value of a target three-dimensional point to be processed and are present in the vicinity of the target three-dimensional point (S3944). It should be noted that this processing is the same as the processing performed by the three-dimensional data encoding device.

Here, besides appending NumOfPoint that is the number of three-dimensional points per layer to, for example, a header, the three-dimensional data decoding device separately performs processing of decoding prediction modes (PredMode) in a bitstream and processing of calculating the plurality of surrounding three-dimensional points which can be used for prediction after the LoDs are generated. Specifically, the three-dimensional data decoding device separately performs (i) generation of LoDs (S3941) and searching of surrounding points (S3944), and (ii) calculation of predicted values (S3946) and arithmetic decoding of an n-bit code and a remaining code (decoding of a prediction mode and a prediction residual in S3945). Accordingly, the three-dimensional data decoding device may perform steps S3941, S3944, and S3946, and step S3945 in parallel. This can reduce time required for overall processing.

The three-dimensional data decoding device arithmetically decodes a prediction mode and a prediction residual from a bitstream of attribute information (S3945).

Next, the three-dimensional data decoding device calculates, according to the prediction mode obtained in step S3945, predicted value P of the target three-dimensional point (S3946), it should be noted that details of processing of calculating the predicted value will be described later with reference to FIG. 121.

In addition, the three-dimensional data decoding device calculates an inverse-quantized value by inverse quantizing a quantized value that is decoded as the prediction residual (S3947).

Next, the three-dimensional data decoding device generates a decoded value by adding the predicted value to the inverse-quantized value (S3948).

Next, the three-dimensional data decoding device terminates the loop executed per three-dimensional point (S3949).

The three-dimensional data decoding device also terminates the loop executed per LoD (S3950).

Figure 121:
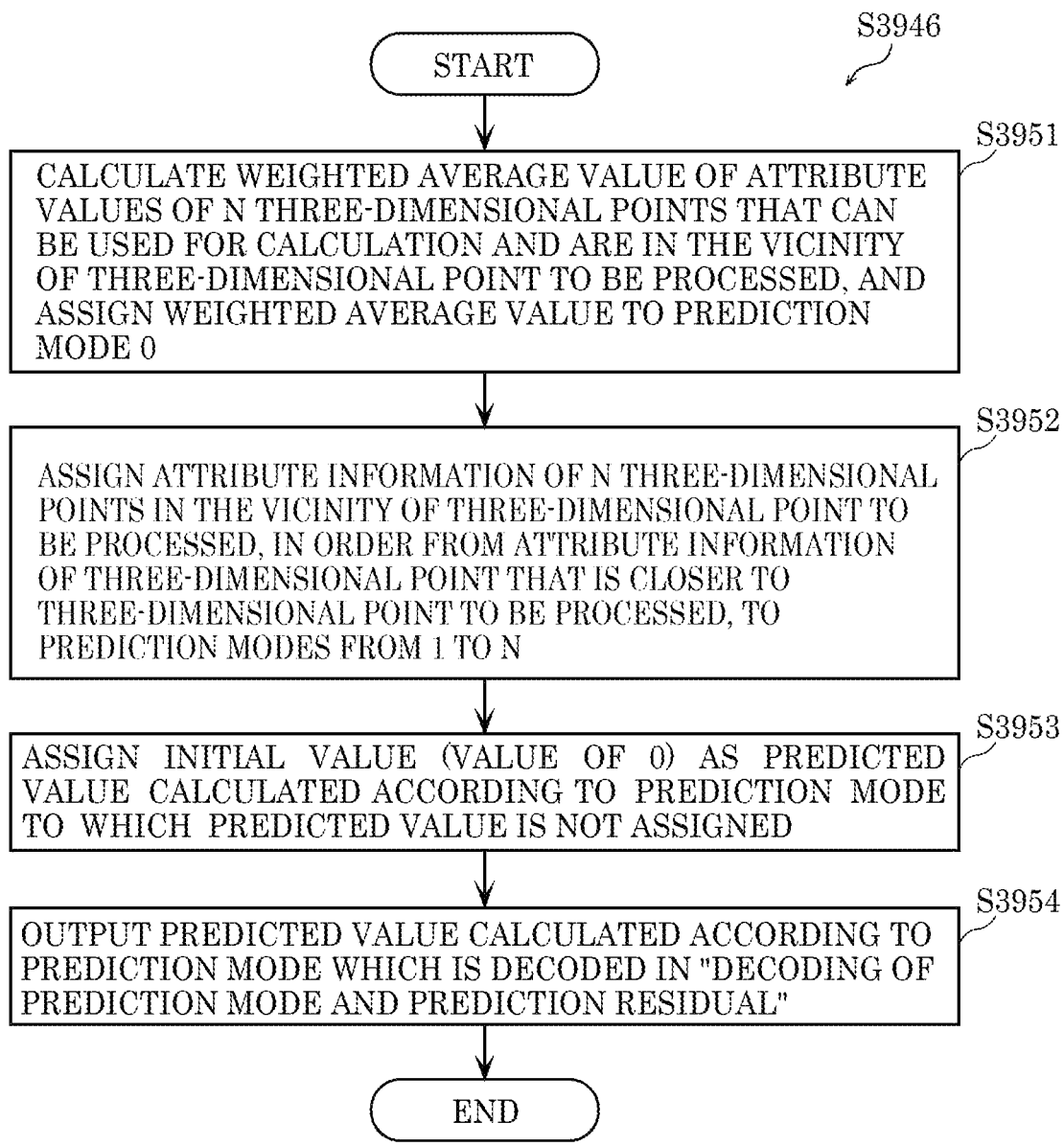

FIG. 121 is a flowchart according to Embodiment 10 which illustrates processing of calculating a predicted value (S3946).

First, the three-dimensional data decoding device calculates a weighted average value of attribute values of N three-dimensional points that can be used for calculation of a predicted value of a target three-dimensional point to be processed and are in the vicinity of the target three-dimensional point, and assigns the calculated weighted average value to a prediction mode whose prediction mode value is "0" (S3951).

Next, the three-dimensional data decoding device assigns as predicted values calculated according to the prediction modes, attribute information of the N three-dimensional points in the vicinity of the target three-dimensional point, in the order from attribute information of a three-dimensional point closer to the target three-dimensional point, to prediction modes that are indicated in prediction mode values from "1" to "N" which are incremented y one (S3952). It should be nested that since the prediction mode values are assigned from "0" to "N", the total number of prediction modes generated is expressed by N+1. When the total number of prediction modes expressed by N+1 exceeds the number of the maximum prediction modes (NumPredMode), which is denoted by M and is appended to the bitstream, the three-dimensional data decoding device may generate prediction modes up to M prediction modes.

Next, the three-dimensional data decoding device assigns an initial value (e.g. a value of "0") as a predicted value calculated according to a prediction mode to which a predicted value is not assigned (S3953). Specifically, the three-dimensional data decoding device stores, in memory, the initial value and the prediction mode to which a predicted value is not assigned in association with each other.

Next, the three-dimensional data decoding device outputs a predicted value calculated according to a prediction mode that is indicated by the prediction mode value decoded in "decoding of a prediction mode and a prediction residual" in step S3945 (S3954).

It should be noted that, instead of performing step S3953 and step S3954, the three-dimensional data decoding device may determine whether a value (e.g. a value expressed by "prediction mode value+1") based on a prediction mode value indicating a prediction mode is greater than the number of predicted values calculated based on attribute information of three-dimensional points in the vicinity of a target three-dimensional point to be processed, and may assign a predetermined fixed value as a predicted value calculated according to the prediction mode when the value based on a prediction mode value is greater than the number of predicted values. For example, when a decoded prediction mode (PredMode) indicates a prediction mode to which a prediction value is not assigned (i.e. PredMode>N), the three-dimensional data decoding device may output an initial value (i.e. a value of "0") as a predicted value. In addition, when the decoded prediction mode (PredMode) indicates a prediction mode to which a predicted value is not assigned (i.e. PredMode>N), the three-dimensional data decoding device may define the case as violation of standards, and may output an error signal indicating violation of standards.

Although FIG. 116 through FIG. 121 illustrate examples in which each of the three-dimensional data encoding device and the three-dimensional data decoding device performs processing of assigning an initial value to a prediction mode to which a predicted value is not assigned, the three-dimensional data encoding device and the three-dimensional data decoding device may calculate predicted values according to prediction modes by updating the predicted values after generating an initial table as described with reference to FIG. 114 and FIG. 115.

For example, the three-dimensional data encoding device may perform the processing illustrated in FIG. 122 and FIG. 123 instead of performing the processing illustrated in FIG. 116 and FIG. 117 among the processing described with reference to FIG. 116 through FIG. 118.

Figure 122:
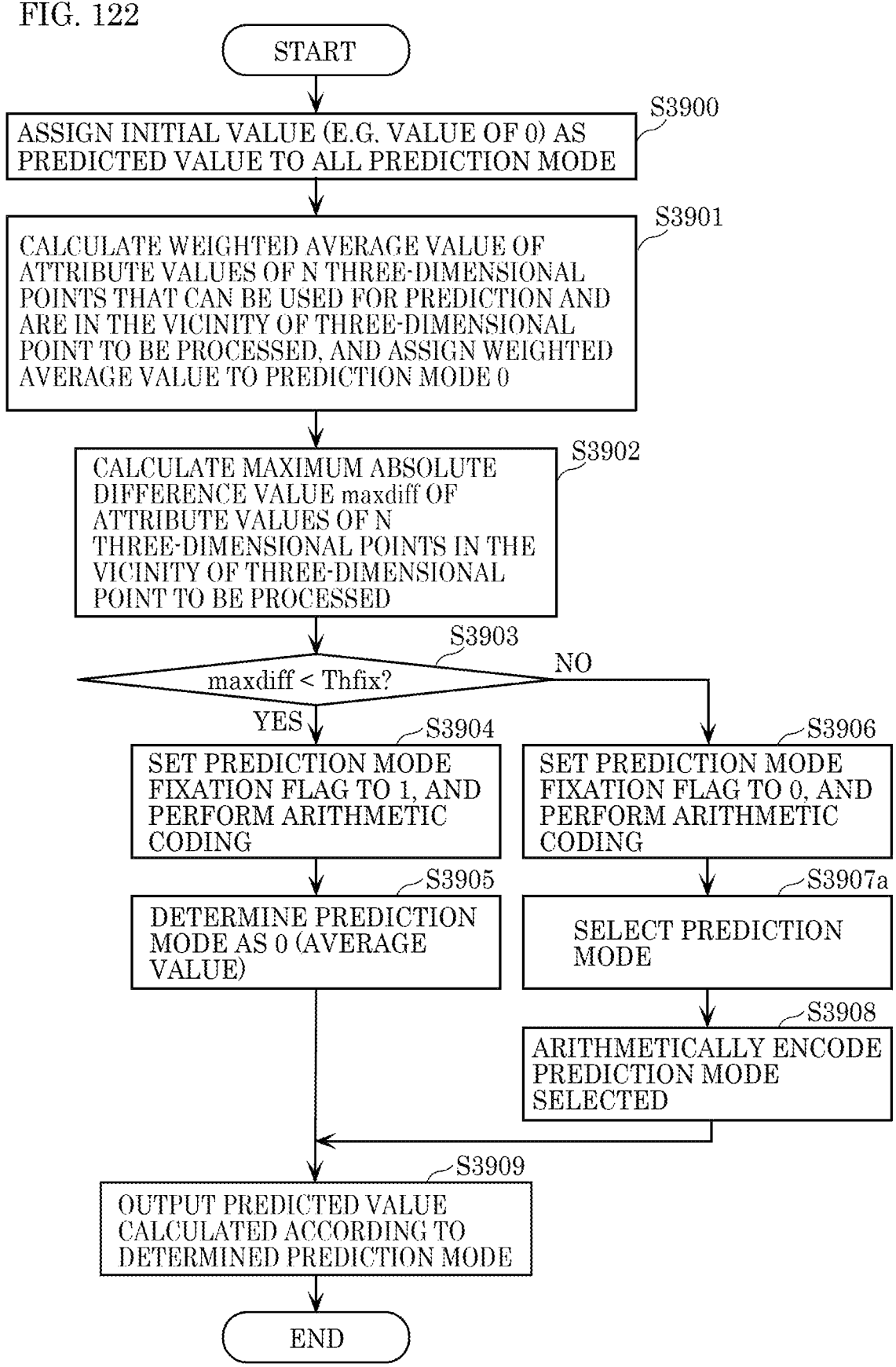

FIG. 122 is a flowchart according to Embodiment 10 which illustrates another example of processing of calculating a predicted value. A difference from FIG. 116 is that FIG. 122 includes step S3900 in addition to the processing illustrated in FIG. 116. Another difference from FIG. 116 is that step S3907a is performed instead of step S3907.

In this case, as illustrated in FIG. 122, the three-dimensional data encoding device assigns, in the first place, an initial value (e.g. a value of "0") as a predicted value calculated according to a prediction mode to all prediction modes (S3900). That is, the three-dimensional data encoding device generates an initial table.

Next, the three-dimensional data encoding device performs steps S3901 through S3906, S3907a, S3908, and S3909. Here, step S3907a which is a difference from FIG. 116 will be described with reference to FIG. 123.

Figure 123:
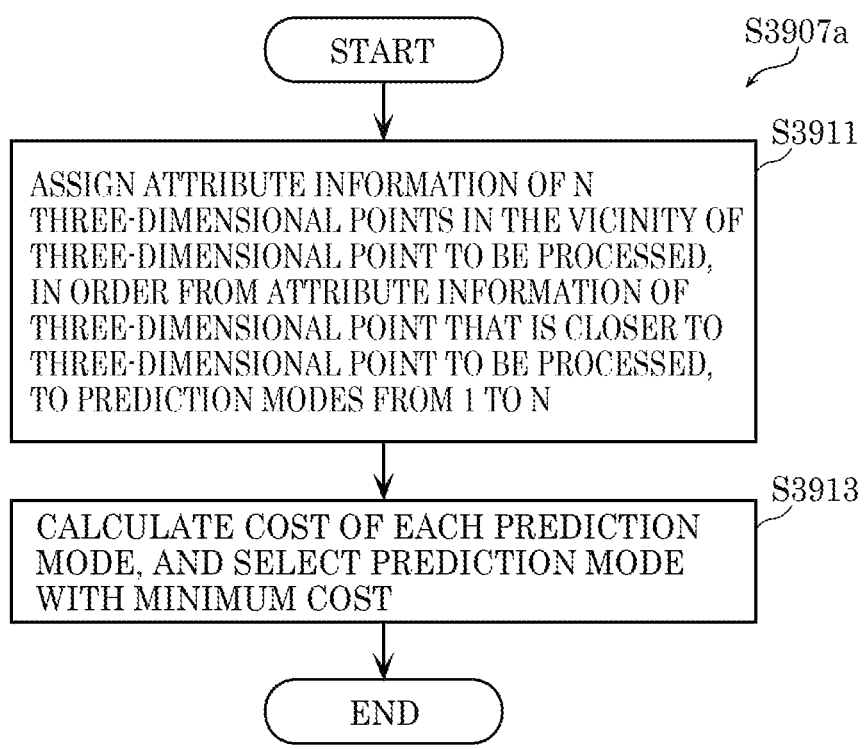

FIG. 123 is a flowchart according to Embodiment 10 which illustrates processing of selecting a prediction mode (S3907a).

The three-dimensional data encoding device performs steps S3911 and S3913 among steps S3911 through S3913 illustrated in FIG. 117. By performing step S3911, a calculated average value or a calculated attribute value updates an initial value assigned to a prediction mode that corresponds to the calculated average value or the calculated attribute value.

In addition, for example, the three-dimensional data decoding device may perform processing illustrated in FIG. 124 instead of performing processing described with reference to FIG. 121 among the processing described with reference to FIG. 12 through FIG. 14.

Figure 124:
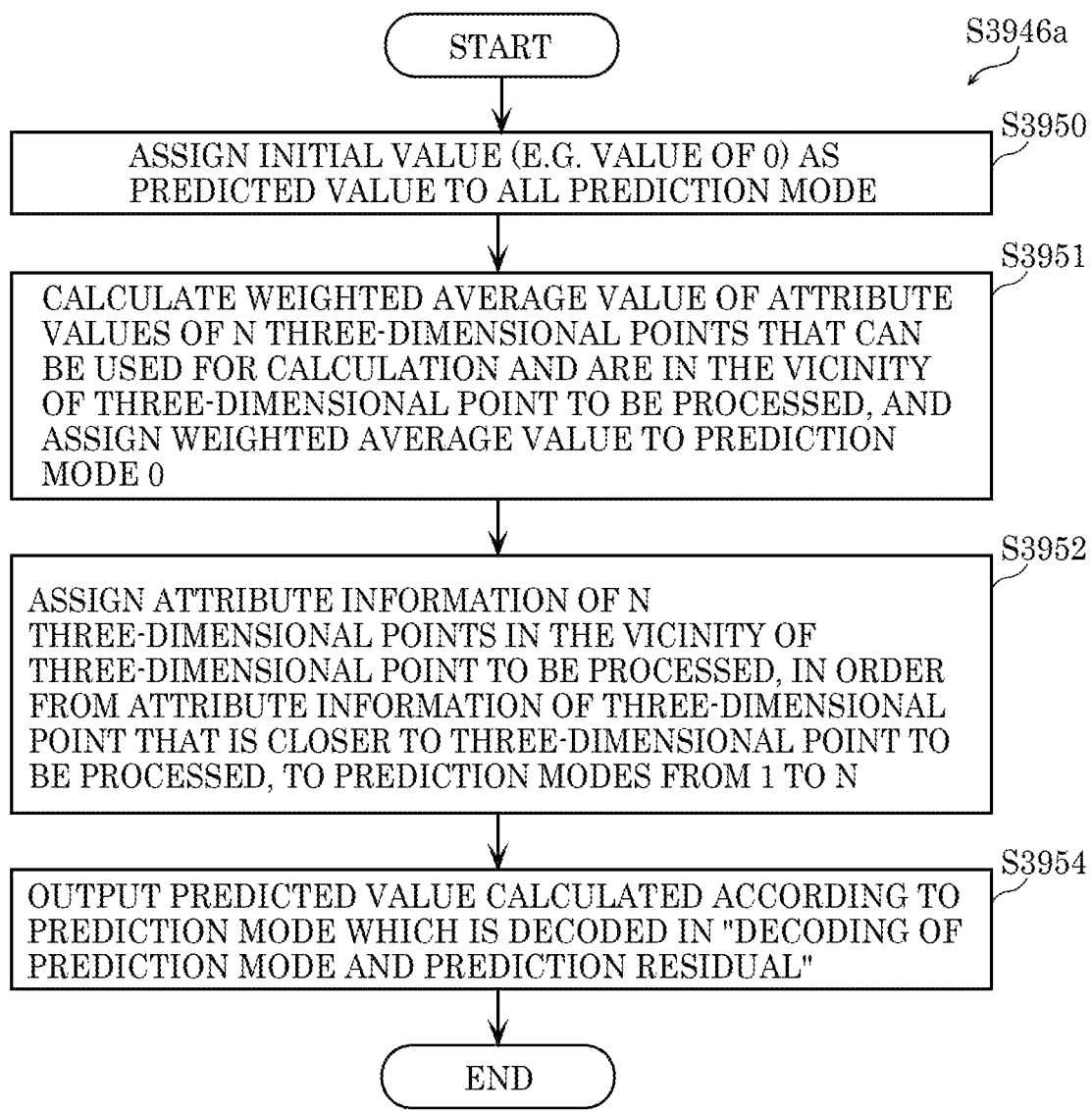

FIG. 124 is a flowchart according to Embodiment 10 which illustrates processing of calculating a predicted value (S3946a).

The three-dimensional data decoding device assigns an initial value (e.g. a value of "0") as a predicted value calculated according to a prediction mode to all prediction modes (S3950).

Next, the three-dimensional data decoding device performs steps S3951, S3952, and S3954 which are illustrated in FIG. 121.

Figure 125:
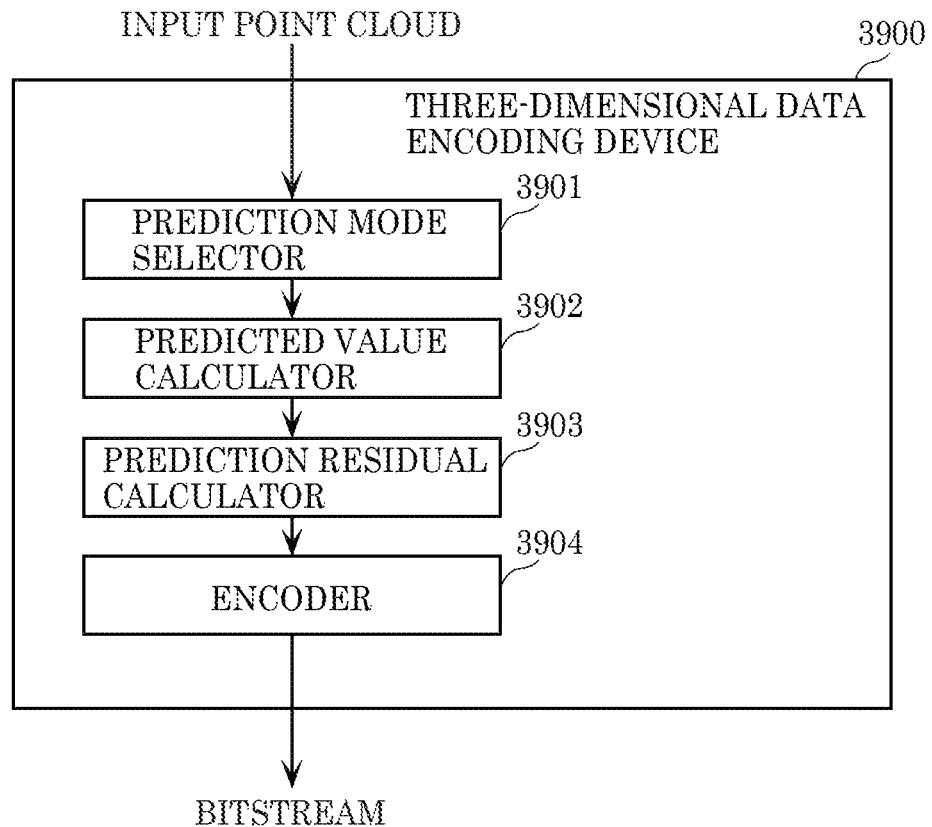

Next, configurations of the three-dimensional data encoding device and the three-dimensional data decoding device according to the embodiment will be described. FIG. 125 is a block diagram according to Embodiment 10 which illustrates a configuration of three-dimensional data encoding device 3900. This three-dimensional data encoding device 3900 includes prediction mode selector 3901, predicted value calculator 3902, prediction residual calculator 3903, and encoder 3904.

Prediction mode selector 3901 selects one prediction mode among two or more prediction modes for calculating a predicted value of attribution information of a first three-dimensional point, using attribution information of one or more second three-dimensional points in the vicinity of the first three-dimensional point. Predicted value calculator 3902 calculates a predicted value according to the selected prediction mode. Predicted value calculator 3902 calculates, in calculation of the predicted value, a predetermined fixed value as the predicted value calculated according to the selected prediction mode in a case in which a predicted value based on attribute information of the second three-dimensional points is not assigned to the selected prediction mode due to the number of the second three-dimensional points being less than or equal to a predetermined number. Prediction residual calculator 3903 calculates a prediction residual that indicates a difference between the attribute information of the first three-dimensional point and the calculated predicted value. Encoder 3904 generates a bitstream that includes the prediction mode and the prediction residual.

Figure 126:
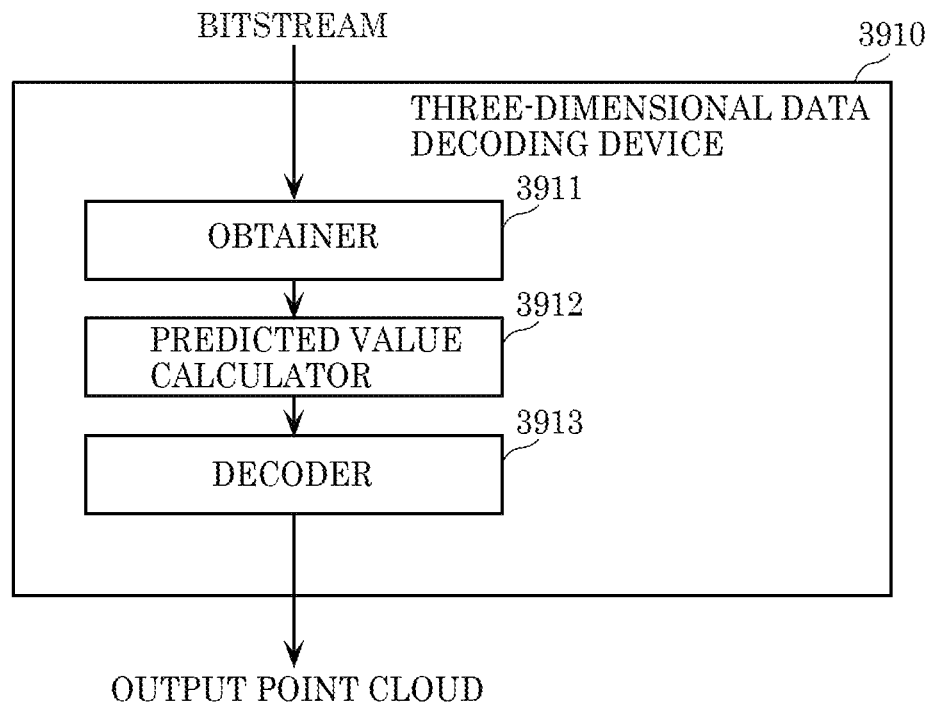

FIG. 126 is a block diagram according to Embodiment 10 which illustrates a configuration of three-dimensional data decoding device 3910. This three-dimensional data decoding device 3910 includes obtainer 3911, predicted value calculator 3912, and decoder 3913. Obtainer 3911 obtains the prediction mode and the prediction residual of a first three-dimensional point among a plurality of three-dimensional points by obtaining a bitstream. Predicted value calculator 3912 calculates a predicted value according to the obtained prediction mode. Predicted value calculator 3912 calculates, in calculation of the predicted value, a predetermined fixed value as a predicted value calculated according to the obtained prediction mode in a case in which the predicted value based on attribute information of one or more second three-dimensional points in the vicinity of the first three-dimensional point is not assigned to the obtained prediction mode due to the number of the one or more second three-dimensional points in the vicinity of the first three-dimensional point being less than or equal to a predetermined number. Decoder 3913 calculates the attribute information of the first three-dimensional point by adding the predicted value and the prediction residual.

Figure 127:
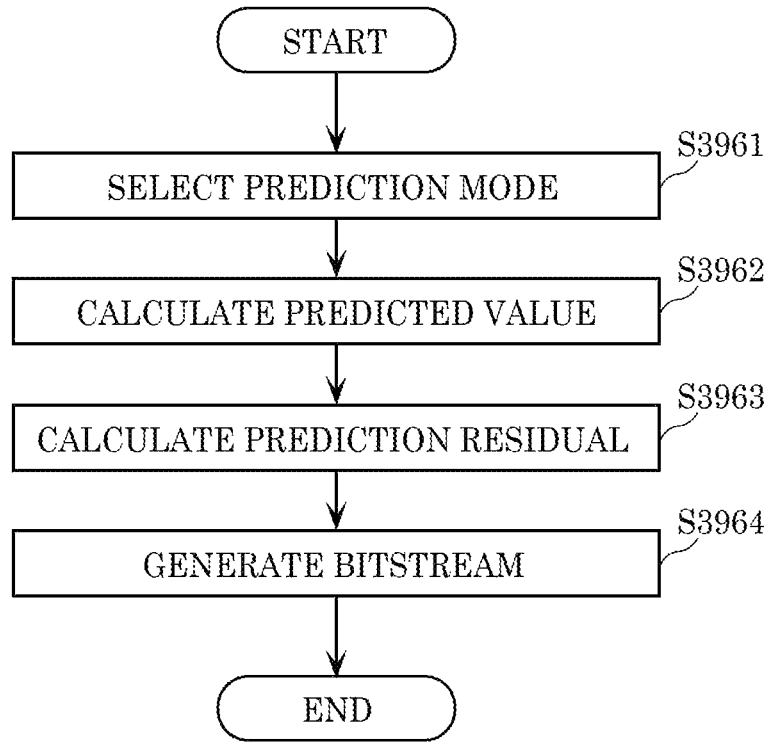

Three-dimensional data encoding device according to the embodiment performs processing illustrated in FIG. 127.

The three-dimensional encoding device selects one prediction mode among two or more prediction modes for calculating a predicted value of attribution information of a first three-dimensional point, using attribution information of one or more second three-dimensional points in the vicinity of the first three-dimensional point (S3961). Next, the three-dimensional data encoding device calculates a predicted value according to the selected prediction mode (S3962). In calculation of the predicted value (S3962), the three-dimensional data encoding device calculates a predetermined fixed value as a predicted value calculated according to the prediction mode in a case in which a predicted value based on attribute information of the second three-dimensional points in the vicinity of the first three-dimensional point is not assigned to the selected prediction mode due to the number of the second three-dimensional points being less than or equal to a predetermined number. Next, the three-dimensional data encoding device generates a bitstream that includes the prediction mode and a prediction residual (S3964).

According to the processing described above, a predetermined fixed value is assigned as a predicted value to a prediction mode, to which one or more predicted values are not assigned. For this reason, a bitstream to be generated includes a prediction mode and a prediction residual that is calculated according to a predicted value calculated according to a selected prediction mode. Accordingly, when decoding attribute information of a three-dimensional point to be processed from an obtained bitstream, the three-dimensional data decoding device can calculate a predicted value that coincides with a predicted value that is calculated in the encoding, since, as a predicted value, a predetermined fixed value is assigned to the prediction mode to which one or more predicted values are not assigned in the same manner as the three-dimensional data encoding method. Therefore, the three-dimensional data decoding device can correctly decode the attribute information of the three-dimensional point to be processed.

In addition, the predetermined fixed value is an initial value. Moreover, the predetermined fixed value is zero.

In addition, in calculation of one or more predicted values (S3962), an average of attribute information of the one or more second three-dimensional points is calculated as a predicted value calculated according to a first prediction mode among two or more prediction modes, and attribute information of the one or more second three-dimensional points is calculated as a predicted value calculated according to a second prediction mode among the two or more prediction modes.

In addition, the two or more prediction modes are indicated by prediction mode values each having a different value. A prediction mode value that indicates a prediction mode to which the average is assigned as a predicted value is less than a prediction mode value that indicates a prediction mode to which the attribute information of the one or more second three-dimensional points is assigned as a predicted value.

In addition, the two or more prediction modes are indicated by prediction mode values each having a different value. A prediction mode value that indicates a prediction mode to which attribute information of one second three-dimensional point is assigned as a predicted value is less than a prediction mode value that indicates a prediction mode to which attribute information of another second three-dimensional point, which is located further away from the first third-three dimensional point than the one second three-dimensional point, is assigned as a predicted value.

Figure 128:
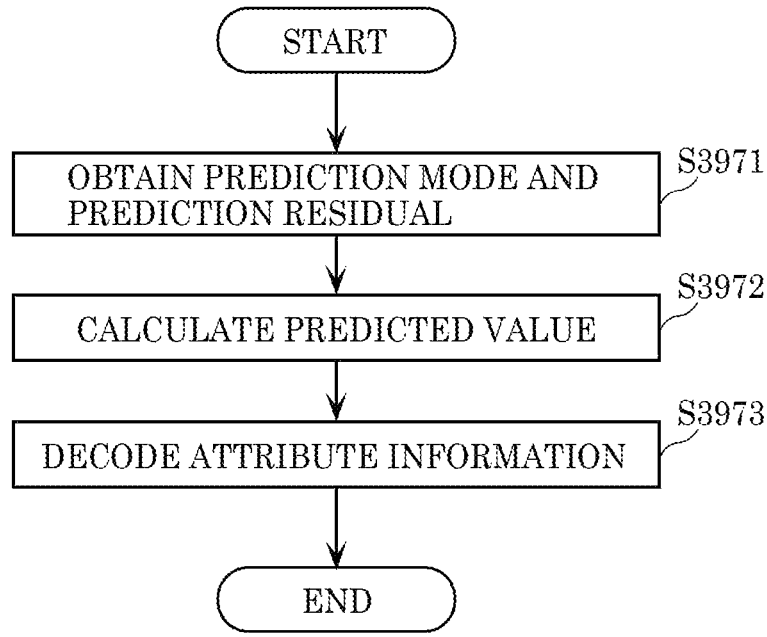

The three-dimensional data decoding device according to the embodiment performs processing illustrated in FIG. 128.

The three-dimensional data decoding device obtains a prediction mode and a prediction residual of a first three-dimensional point among a plurality of three-dimensional points by obtaining a bitstream (S3971). Next, the three-dimensional data decoding device calculates a predicted value according to the obtained prediction mode (S3972). In calculation of the predicted value (S3972), the three-dimensional data decoding device calculates a predetermined fixed value as a predicted value calculated according to the prediction mode in a case in which a predicted value based on attribute information of one or more second three-dimensional points in the vicinity of the first three-dimensional point is not assigned to the obtained prediction mode due to the number of the one or more second three-dimensional points being less than or equal to a predetermined number. Next, the three-dimensional data decoding device calculates attribute information of the first three-dimensional point by adding the predicted value and the prediction residual (S3973).

According to the processing described above, when decoding attribute information of a three-dimensional point to be processed from the obtained bitstream, a predicted value that coincides with a predicted value that is calculated in the encoding can be calculated, since, as a predicted value, a predetermined fixed value is assigned to a prediction mode to which one or more predicted values are not assigned in the same manner as the three-dimensional data encoding method. Therefore, the attribute information of the three-dimensional point to be processed can be correctly decoded.

In addition, the predetermined fixed value is an initial value. Moreover, the predetermined fixed value is zero.

In addition, in the calculation of one or more predicted values (S3972), an average of attribute information of the one or more second three-dimensional points is calculated as a predicted value calculated according to a first prediction mode among two or more prediction modes, and attribute information of the one or more second three-dimensional points is calculated as a predicted value calculated according to a second prediction mode among the two or more prediction modes.

In addition, the two or more prediction modes are indicated by prediction mode values each having a different value. A prediction mode value that indicates a prediction mode to which the average is assigned as a predicted value is less than a prediction mode value that indicates a prediction mode to which the attribute information of the one or more second three-dimensional points is assigned as a predicted value.

In addition, the two or more prediction modes are indicated by prediction mode values each having a different value. A prediction mode value that indicates a prediction mode to which attribute information of one second three-dimensional point is assigned as a predicted value is less than a prediction mode value that indicates a prediction mode to which attribute information of another second three-dimensional point, which is located further away from the first third-three dimensional point than the one second three-dimensional point, is assigned as a predicted value.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be implemented by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in parallelized or time-divided manner.

Also, the processing order of executing the steps shown in the flowcharts is a mere illustration for specifically describing the present disclosure, and thus may be an order other than the above order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A three-dimensional data encoding method of encoding a plurality of three-dimensional points, the three-dimensional data encoding method comprising:
   selecting one prediction mode using one or more second three-dimensional points in a vicinity of a first three-dimensional point, the one prediction mode being selected from among two or more prediction modes;
   calculating a predicted value of attribute information of the first three-dimensional point according to the selected one prediction mode;
   calculating a prediction residual that is a difference between the attribute information of the first three-dimensional point and the calculated predicted value; and
   generating a bitstream that includes the selected one prediction mode and the prediction residual,
   wherein in the calculating of the predicted value, a predetermined fixed value is assigned as a predicted value in a case in which a total number of the one or more second three-dimensional points available to calculate the predicted value in the selected one prediction mode is less than or equal to a predetermined number corresponding to the selected one prediction mode.

2. The three-dimensional data encoding method according to claim 1,
wherein the predetermined fixed value is an initial value.

3. The three-dimensional data encoding method according to claim 1,
wherein the predetermined fixed value is zero.

4. The three-dimensional data encoding method according to claim 1,
wherein in the calculating of the predicted value:
an average of attribute information of the one or more second three-dimensional points is calculated as the predicted value calculated according to a first prediction mode among the two or more prediction modes; and
the attribute information of the one or more second three-dimensional points is calculated as the predicted value calculated according to a second prediction mode among the two or more prediction modes.

5. The three-dimensional data encoding method according to claim 4,
wherein the two or more prediction modes are indicated by prediction mode values each having a different value, and
a prediction mode value indicating a prediction mode to which the average is assigned as a predicted value is less than a prediction mode value indicating a prediction mode to which attribute information of the one or more second three-dimensional points is assigned as a predicted value.

6. The three-dimensional data encoding method according to claim 1,
wherein the two or more prediction modes are indicated by prediction mode values each having a different value, and
a prediction mode value indicating a prediction mode to which attribute information of one second three-dimensional point among the one or more second three-dimensional points is assigned as a predicted value is less than a prediction mode value indicating a prediction mode to which attribute information of another second three-dimensional point among the one or more second three-dimensional points is assigned as a predicted value, the another second three-dimensional point being located further away from the first three-dimensional point than the one second three-dimensional point.

7. The three-dimensional data encoding method according to claim 1,
wherein in the calculating of the predicted value, the predicted value is calculated to be equal to a value of the attribute information of a single three-dimensional point among the second three-dimensional points based on the one prediction mode selected in a case in which the total number is greater than the predetermined number.

8. The three-dimensional data encoding method according to claim 1,
wherein in the calculating of the predicted value, a value of the attribute information of a single three-dimensional point among the second three-dimensional points is assigned as the predicted value in a case in which the total number is greater than the predetermined number.

9. The three-dimensional data encoding method according to claim 1, wherein
indices are provided to indicate the respective prediction modes,
the indices include a first index to indicate the one prediction mode and a second index to indicate another prediction mode different from the one prediction mode, the predetermined fixed value being not assigned as the predicted value in the other prediction mode, and
the first index is larger than the second index.

10. The three-dimensional data encoding method according to claim 9, further comprising:
performing arithmetic coding on the first index to store the first index coded in the bitstream.

11. The three-dimensional data encoding method according to claim 1,
wherein each of the plurality of three-dimensional points is classified into one of a plurality of layers using geometry information of the plurality of three-dimensional points.

12. A three-dimensional data decoding method of decoding a plurality of three-dimensional points, the three-dimensional data decoding method comprising:
obtaining a prediction mode and a prediction residual of a first three-dimensional point among the plurality of three-dimensional points by obtaining a bitstream, the obtained prediction mode being selected to be included in the bitstream using one or more second three-dimensional points in a vicinity of the first three-dimensional point, the obtained prediction mode being selected from among two or more prediction modes;
calculating a predicted value of attribute information of the first three-dimensional point according to the obtained prediction mode; and
calculating attribute information of the first three-dimensional point by adding the predicted value and the prediction residual,
wherein in the calculating of the predicted value, a predetermined fixed value is assigned as a predicted value in a case in which a total number of one or more second three-dimensional points available to calculate the predicted value in the obtained prediction mode is less than or equal to a predetermined number corresponding to the obtained prediction mode.

13. The three-dimensional data decoding method according to claim 12,
wherein the predetermined fixed value is an initial value.

14. The three-dimensional data decoding method according to claim 12,
wherein the predetermined fixed value is zero.

15. The three-dimensional data decoding method according to claim 12,
wherein in the calculating of the predicted value:
an average of attribute information of the one or more second three-dimensional points is calculated as the predicted value calculated according to a first prediction mode among two or more prediction modes; and
the attribute information of the one or more second three-dimensional points is calculated as the predicted value calculated according to a second prediction mode among the two or more prediction modes.

16. The three-dimensional data decoding method according to claim 15, wherein the two or more prediction modes are indicated by prediction mode values each having a different value, and a prediction mode value indicating a prediction mode to which the average is assigned as a predicted value is less than a prediction mode value indicating a prediction mode to which attribute information of the one or more second three-dimensional points is assigned as a predicted value.

17. The three-dimensional data decoding method according to claim 12, wherein two or more prediction modes are indicated by prediction mode values each having a different value, and a prediction mode value indicating a prediction mode to which attribute information of one second three-dimensional point among the one or more second three-dimensional points is assigned as a predicted value is less than a prediction mode value indicating a prediction mode to which attribute information of another second three-dimensional point among the one or more second three-dimensional points is assigned as a predicted value, the another second three-dimensional point being located further away from the first three-dimensional point than the one second three-dimensional point.

18. A three-dimensional data encoding device that encodes a plurality of three-dimensional points, the three-dimensional data encoding device comprising:

a processor; and
memory,
wherein using the memory, the processor:
selects one prediction mode using one or more second three-dimensional points in a vicinity of a first three-dimensional point, the one prediction mode being selected from among two or more prediction modes;
calculates a predicted value of attribute information of the first three-dimensional point according to the selected one prediction mode;
calculates a prediction residual that is a difference between the attribute information of the first three-dimensional point and the calculated predicted value;
generates a bitstream that includes the selected one prediction mode and the prediction residual; and
in the calculating of the predicted value, assigns a predetermined fixed value as a predicted value in a case in which a total number of the one or more second three-dimensional points available to calculate the predicted value in the selected one prediction mode is less than or equal to a predetermined number corresponding to the selected one prediction mode.

19. A three-dimensional data decoding device that decodes a plurality of three-dimensional points, the three-dimensional data decoding device comprising:

a processor; and
memory,
wherein using the memory, the processor:
obtains a prediction mode and a prediction residual of a first three-dimensional point among the plurality of three-dimensional points by obtaining a bitstream, the obtained prediction mode being selected to be included in the bitstream using one or more second three-dimensional points in a vicinity of the first three-dimensional point, the obtained prediction mode being selected from among two or more prediction modes;
calculates a predicted value of attribute information of the first three-dimensional point according to the obtained prediction mode;
calculates attribute information of the first three-dimensional point by adding the predicted value and the prediction residual; and
in the calculating of the predicted value, assigns a predetermined fixed value as a predicted value in a case in which a total number of the one or more second three-dimensional points available to calculate the predicted value in the obtained prediction mode is less than or equal to a predetermined number corresponding to the obtained prediction mode.

20. A three-dimensional data encoding method of encoding a plurality of three-dimensional points, the three-dimensional data encoding method comprising:

selecting a prediction mode using one or more second three-dimensional points in a vicinity of a first three-dimensional point;
calculating a predicted value of attribute information of the first three-dimensional point based on the selected prediction mode;
calculating a prediction residual that is a difference between a value of the attribute information and the calculated predicted value; and
generating a bitstream that includes the prediction residual,
wherein the predicted value is calculated only when a total number of the one or more second three-dimensional points is greater than a predetermined number corresponding to the selected prediction mode.

* * * * *